US 12,241,647 B2

(12) United States Patent
Schubert et al.

(10) Patent No.: US 12,241,647 B2
(45) Date of Patent: Mar. 4, 2025

(54) BUILDING SYSTEM FOR BUILDING EQUIPMENT WITH FAULT BASED DATA HEALTH OPERATIONS

(71) Applicant: Tyco Fire & Security GmbH, Neuhausen am Rheinfall (CH)

(72) Inventors: Shawn D. Schubert, Oak Creek, WI (US); Vineet Binodshanker Sinha, Brookfield, WI (US); Mohammad N. Elbsat, Milwaukee, WI (US); Michael J. Wenzel, Grafton, WI (US); Kirk H. Drees, Cedarburg, WI (US)

(73) Assignee: TYCO FIRE & SECURITY GMBH, Neuhausen am Rheinfall (CH)

(*) Notice: Subject to any disclaimer, the term of this patent is extended or adjusted under 35 U.S.C. 154(b) by 29 days.

(21) Appl. No.: 17/708,929

(22) Filed: Mar. 30, 2022

(65) Prior Publication Data
US 2023/0110033 A1  Apr. 13, 2023

Related U.S. Application Data

(60) Provisional application No. 63/281,409, filed on Nov. 19, 2021, provisional application No. 63/255,347, filed on Oct. 13, 2021.

(51) Int. Cl.
F24F 11/49 (2018.01)
F24F 11/37 (2018.01)
(Continued)

(52) U.S. Cl.
CPC .............. F24F 11/49 (2018.01); F24F 11/37 (2018.01); F24F 11/38 (2018.01); F24F 11/46 (2018.01);
(Continued)

(58) Field of Classification Search
CPC .. F24F 11/49; F24F 11/37; F24F 11/38; F24F 11/46; F24F 11/56; F24F 11/52;
(Continued)

(56) References Cited

U.S. PATENT DOCUMENTS 4,660,386 A    4/1987  Hansen et al.
8,706,515 B2   4/2014  Cobbs et al.
(Continued)

FOREIGN PATENT DOCUMENTS

CN    108171421 A      6/2018
EP    3 547 233 A1    10/2019
(Continued)

OTHER PUBLICATIONS

Merriam-Webster, "algorithm," Dictionary Entry Pulled from https://www.merriam-webster.com, Mar. 10, 2023 (1 page).
(Continued)

Primary Examiner — Santosh R Poudel
(74) Attorney, Agent, or Firm — Foley & Lardner LLP

(57) ABSTRACT

A building system that operates to receive a plurality of data samples from building equipment of the building and identity whether one or more data samples of the plurality of data samples are anomalous indicating that one or more pieces of the building equipment are possibly experiencing a fault. The building system operates to generate one or more data health scores for the building equipment based on whether the one or more data samples are anomalous, the one or more data health scores indicating quality levels of the plurality of data samples and generate user interface data configured to cause a user device to display a user interface providing indications of the one or more pieces of building equipment that are possibly experiencing the fault and the one or more data health scores.

16 Claims, 87 Drawing Sheets

(51) Int. Cl.
    *F24F 11/38*       (2018.01)
    *F24F 11/46*       (2018.01)
    *F24F 11/56*       (2018.01)
    *G05B 17/02*       (2006.01)
    *G05D 23/19*       (2006.01)
    *G06F 3/04817*     (2022.01)
    *G06F 3/0482*      (2013.01)
    *G06Q 10/20*       (2023.01)
    *G06Q 50/163*      (2024.01)
    *H04L 51/046*      (2022.01)

(52) U.S. Cl.
    CPC .............. *F24F 11/56* (2018.01); *G05B 17/02* (2013.01); *G05D 23/1917* (2013.01); *G05D 23/193* (2013.01); *G06F 3/04817* (2013.01); *G06F 3/0482* (2013.01); *G06Q 10/20* (2013.01); *G06Q 50/163* (2013.01); *H04L 51/046* (2013.01)

(58) Field of Classification Search
    CPC ....... F24F 11/63; G05B 17/02; G05B 19/042; G05D 23/1917; G05D 23/193; G06F 3/04817; G06F 3/0482; G06Q 10/20; G06Q 50/163; H04L 51/046
    See application file for complete search history.

(56) References Cited

U.S. PATENT DOCUMENTS

| | | | |
|---|---|---|---|
| 8,706,537 | B1 | 4/2014 | Young et al. |
| 8,812,971 | B2 | 8/2014 | Benedek et al. |
| 10,031,494 | B2 | 7/2018 | Holaso |
| 10,318,895 | B1 | 6/2019 | Norwood et al. |
| 10,718,632 | B1 | 7/2020 | Platt et al. |
| 10,796,554 | B2 | 10/2020 | Vincent et al. |
| 10,832,564 | B2 | 11/2020 | Subramanian et al. |
| 11,056,242 | B1 | 7/2021 | Jain et al. |
| 11,176,016 | B1* | 11/2021 | Pandit .................. G06F 11/321 |
| 11,323,765 | B1 | 5/2022 | Obaidi |
| 11,449,084 | B1 | 9/2022 | Taylor et al. |
| 11,598,544 | B1 | 3/2023 | Schubert et al. |
| 11,635,737 | B1 | 4/2023 | Warren et al. |
| 11,668,481 | B2 | 6/2023 | Granger et al. |
| 11,894,145 | B2 | 2/2024 | Palanivel et al. |
| 11,898,419 | B2 | 2/2024 | Gao |
| 2003/0217323 | A1* | 11/2003 | Guterman ............... G11C 11/56 714/763 |
| 2005/0137929 | A1 | 6/2005 | Frazier et al. |
| 2007/0260410 | A1* | 11/2007 | Raymond .......... G05B 23/0264 702/81 |
| 2009/0107159 | A1 | 4/2009 | Mann et al. |
| 2010/0286937 | A1 | 11/2010 | Hedley et al. |
| 2011/0061015 | A1 | 3/2011 | Drees et al. |
| 2011/0087988 | A1 | 4/2011 | Ray et al. |
| 2012/0221165 | A1 | 8/2012 | Ooba et al. |
| 2013/0060385 | A1 | 3/2013 | Leen et al. |
| 2013/0086010 | A1 | 4/2013 | Wenzel et al. |
| 2013/0090769 | A1 | 4/2013 | McKie et al. |
| 2013/0154839 | A1 | 6/2013 | Barton |
| 2014/0032506 | A1 | 1/2014 | Hoey et al. |
| 2014/0046682 | A1 | 2/2014 | Soto et al. |
| 2014/0214187 | A1* | 7/2014 | Redenbo .............. G05D 1/0038 700/83 |
| 2014/0222665 | A1 | 8/2014 | Kamel et al. |
| 2015/0015412 | A1 | 1/2015 | Abbassian et al. |
| 2015/0026268 | A1 | 1/2015 | Hui et al. |
| 2015/0061859 | A1 | 3/2015 | Matsuoka et al. |
| 2015/0066578 | A1 | 3/2015 | Manocchia et al. |
| 2015/0077737 | A1 | 3/2015 | Belinsky et al. |
| 2015/0127174 | A1 | 5/2015 | Quam et al. |
| 2015/0178865 | A1 | 6/2015 | Anderson et al. |
| 2015/0370927 | A1 | 12/2015 | Flaherty et al. |
| 2015/0371347 | A1 | 12/2015 | Hayward |
| 2016/0210569 | A1 | 7/2016 | Enck |
| 2016/0239766 | A1 | 8/2016 | Cameron |
| 2016/0274551 | A1* | 9/2016 | Mishra ..................... G05B 9/02 |
| 2016/0321587 | A1 | 11/2016 | Gitt et al. |
| 2016/0335731 | A1 | 11/2016 | Hall |
| 2016/0352508 | A1* | 12/2016 | Guillen-Hernandez ..................... H04L 9/003 |
| 2017/0004414 | A1 | 1/2017 | Flores et al. |
| 2017/0052536 | A1 | 2/2017 | Warner et al. |
| 2017/0076263 | A1 | 3/2017 | Bentz et al. |
| 2017/0124842 | A1 | 5/2017 | Sinha et al. |
| 2017/0169380 | A1 | 6/2017 | Maroli et al. |
| 2017/0212482 | A1 | 7/2017 | Boettcher et al. |
| 2017/0213303 | A1 | 7/2017 | Papadopoulos et al. |
| 2017/0242940 | A1 | 8/2017 | Yu et al. |
| 2017/0249417 | A1 | 8/2017 | Gosieski et al. |
| 2017/0316319 | A1 | 11/2017 | Livingston et al. |
| 2018/0102954 | A1 | 4/2018 | Schubert et al. |
| 2018/0179888 | A1* | 6/2018 | Switzer ................. E21B 47/125 |
| 2018/0211168 | A1 | 7/2018 | Khurshudov |
| 2018/0296192 | A1 | 10/2018 | Sakai |
| 2019/0025776 | A1 | 1/2019 | Bhattacharya et al. |
| 2019/0138512 | A1 | 5/2019 | Pourmohammad et al. |
| 2019/0138964 | A1* | 5/2019 | Morita ............. G06Q 10/06315 |
| 2019/0174207 | A1 | 6/2019 | Cella et al. |
| 2019/0212712 | A1 | 7/2019 | Wenzel et al. |
| 2019/0264936 | A1 | 8/2019 | Bailey et al. |
| 2019/0318553 | A1 | 10/2019 | Pati et al. |
| 2020/0057827 | A1 | 2/2020 | Eckenrode et al. |
| 2020/0103871 | A1 | 4/2020 | Laycock et al. |
| 2020/0162280 | A1 | 5/2020 | Drees et al. |
| 2020/0162354 | A1* | 5/2020 | Drees ....................... G06N 7/01 |
| 2020/0184792 | A1 | 6/2020 | Pourmohammad et al. |
| 2020/0200416 | A1 | 6/2020 | Granger et al. |
| 2020/0226525 | A1 | 7/2020 | Bhattacharya et al. |
| 2020/0227172 | A1 | 7/2020 | Perkins et al. |
| 2020/0285226 | A1 | 9/2020 | Chatterjee et al. |
| 2020/0286025 | A1 | 9/2020 | Ramchandran |
| 2020/0309400 | A1 | 10/2020 | Vettigli et al. |
| 2020/0320454 | A1 | 10/2020 | Almashor et al. |
| 2020/0408566 | A1 | 12/2020 | Kang et al. |
| 2021/0097842 | A1 | 4/2021 | Paton et al. |
| 2021/0118556 | A1 | 4/2021 | Caffarel et al. |
| 2021/0125129 | A1 | 4/2021 | Vega et al. |
| 2021/0172632 | A1 | 6/2021 | Saunders et al. |
| 2021/0200170 | A1 | 7/2021 | Ploegert et al. |
| 2021/0217532 | A1 | 7/2021 | Heimerl |
| 2021/0225528 | A1 | 7/2021 | Viengkham et al. |
| 2021/0225529 | A1 | 7/2021 | Viengkham et al. |
| 2021/0279804 | A1 | 9/2021 | Shakfeh |
| 2021/0310070 | A1 | 10/2021 | Dillon et al. |
| 2021/0312789 | A1 | 10/2021 | Linn |
| 2021/0313075 | A1 | 10/2021 | Mc Namara et al. |
| 2021/0334422 | A1 | 10/2021 | El-Diraby et al. |
| 2021/0334538 | A1 | 10/2021 | Marotta et al. |
| 2021/0342961 | A1 | 11/2021 | Winter et al. |
| 2021/0374296 | A1 | 12/2021 | Minnier |
| 2021/0374297 | A1 | 12/2021 | McDade |
| 2021/0398690 | A1 | 12/2021 | Gibson et al. |
| 2022/0058173 | A1 | 2/2022 | O'Farrell et al. |
| 2022/0058545 | A1 | 2/2022 | Warake et al. |
| 2022/0067851 | A1 | 3/2022 | Sinha et al. |
| 2022/0102007 | A1 | 3/2022 | Palanivel et al. |
| 2022/0108262 | A1 | 4/2022 | Cella et al. |
| 2022/0113924 | A1 | 4/2022 | Meruva et al. |
| 2022/0137580 | A1 | 5/2022 | Burroughs et al. |
| 2022/0203287 | A1 | 6/2022 | Wenger et al. |
| 2022/0203288 | A1 | 6/2022 | Wenger et al. |
| 2022/0205962 | A1 | 6/2022 | Vanderkoy |
| 2022/0207215 | A1 | 6/2022 | Liu et al. |
| 2022/0221184 | A1 | 7/2022 | Gupta et al. |
| 2022/0228756 | A1 | 7/2022 | Gupta et al. |
| 2022/0254483 | A1 | 8/2022 | Boisvert et al. |
| 2022/0277851 | A1 | 9/2022 | Wellig |
| 2022/0282886 | A1 | 9/2022 | Hriljac et al. |
| 2022/0293261 | A1 | 9/2022 | McBrady et al. |
| 2022/0305438 | A1 | 9/2022 | Wenger et al. |
| 2022/0305881 | A1 | 9/2022 | Neu et al. |
| 2022/0342403 | A1 | 10/2022 | Sinha et al. |

(56) References Cited

U.S. PATENT DOCUMENTS

| | | |
|---|---|---|
| 2022/0399105 A1 | 12/2022 | Block et al. |
| 2022/0404056 A1 | 12/2022 | Bloemer et al. |
| 2023/0004916 A1 | 1/2023 | Lo et al. |
| 2023/0039468 A1 | 2/2023 | Winter et al. |
| 2023/0085641 A1 | 3/2023 | Jones et al. |
| 2023/0152763 A1 | 5/2023 | Davis et al. |
| 2024/0135294 A1 | 4/2024 | Warake et al. |

FOREIGN PATENT DOCUMENTS

| | | |
|---|---|---|
| WO | WO-2013/043863 A1 | 3/2013 |
| WO | WO-2019/017555 A1 | 1/2019 |
| WO | WO-2020/264095 A1 | 12/2020 |
| WO | WO-2021/099637 A1 | 5/2021 |

OTHER PUBLICATIONS

Ashrae Epidemic Task Force, "Core Recommendations for Reducing Airborne Infectious Aerosol Exposure," Jan. 6, 2021, 1 Page.

Ashrae, "Ashrae Resources Available to Address COVID-19 Concerns: Ashrae Resources Provide Proactive Guidance in Addressing the Spread of COVID-19 in Buildings," URL: https://www.ashrae.org/about/news/2020/ashrae-resources-available-to-address-covid-19-concerns, Feb. 27, 2020, 7 Pages.

Autocase, "Business case and sustainability metrics for your building project: Sign up for Autocase's Free Insights today and get started!" URL: https://autocase.com/software/, Retrieved from Internet Dec. 10, 2021, 14 Pages.

Byrom et al., "Indoor Air Quality, Data Insights Take Center Stage," HPAC Engineering, Jul./Aug. 2021, 1 Page.

Carrier, "WebCTRL Automated Logic's WebCTRL? Building Automation/Intelligent Building Management System," URL: https://www.carrier.com/commercial/en/in/products/commercial-products/controls/webctrl/, Retrieved from Internet Dec. 10, 2021, 2 Pages.

Delos Living, "Delos Labs: Science is our DNA," URL: https://delos.com/research/delos-labs/, Retrieved from Internet Dec. 10, 2021, 5 Pages.

Fitwel—Center for Active Design, "Certification: How does the Fitwel Process Work" URL: https://www.fitwel.org/certification/, Retrieved from Internet Dec. 10, 2021, 4 Pages.

Honeywell International, "Healthy Buildings contribute to a healthy organization," URL: https://buildings.honeywell.com/us/en/solutions/healthy-buildings, Retrieved from Internet Dec. 10, 2021, 5 Pages.

Honeywell International, "Software for Digital Transformation: The Intelligent Operations you didn't know existed—and you didn't know you needed. This is Honeywell Forge." URL: https://www.honeywellforge.ai/us/en?utm_source=google&utm_medium=paid-search&utm_campaign=honeywell-forge-brand&gclid=EAlaIQobChMlyuyl9ObX9AIVwZmGCh1ycgLKEAAYASAAEglzbfD_BwE, Retrieved from Internet Dec. 10, 2021, 8 Pages.

International Search Report and Written Opinion for PCT Appl. Ser. No. PCT/US2021/046348 dated Nov. 4, 2021 (16 pages).

International Well Building Institute, "Meet Well v2," URL: https://www.wellcertified.com/certification/v2/, Retrieved from Internet Dec. 9, 2021, 7 pages.

International Well Building Institute, "Well Building Standard," URL: https://standard.wellcertified.com/well, Retrieved from Internet Dec. 10, 2021, 5 Pages.

Processmap, "Comprehensive Solutions for Global Enterprises," URL: https://www.processmap.com/enterprise/, Retrieved form Internet Dec. 10, 2021, 7 Pages.

U.S. Green Building Council, "Leed Certification for New Buildings," URL: https://www.usgbc.org/leed/rating-systems/new-buildings, Retrieved from Internet Dec. 9, 2021, 6 pages.

World Clean Building Council, "What is green building?" URL: https://www.worldgbc.org/what-green-building, Retrieved from Internet Dec. 10, 2021, 3 pages.

Alvarado et al., "A Methodology to Monitor Airborne PM10 Dust Particles Using a Small Unmanned Aerial Vehicle," Sensors, 2017, vol. 17 (25 pages).

Newsham et al., "Effect of green building certification on organizational productivity metrics," Building Research & Information, 2018, vol. 46, No. 7 (pp. 755-766).

Juan et al., "A hybrid decision support system for sustainable office building renovation and energy performance improvement." Energy and Buildings, 2010, 42 (pp. 290-297).

Wei et al., "A Deep-Reinforcement-Learning-Based Recommender System for Occupant-Driven Energy Optimization in Commercial Buildings," IEEE Internet of Things Journal, Jul. 2020, vol. 7, No. 7 (12 pages).

Qolomany et al., "Leveraging Machine Learning and Big Data for Smart Buildings: A Comprehensive Survey," IEEE Access, 2019 (pp. 90316-90356).

Al-Haidary, H., "BIM for Energy Modelling of Green Buildings," Thesis, American University of Sharjah, United Arab Emirates, 2018 (113 pages).

Petri et al., "Optimizing Energy Efficiency in Operating Built Environment Assets through Building Information Modeling: A Case Study," 2017, Energies 10.8 (17 pages).

Ding et al., "An approach integrating geographic information system and building information modelling to assess the building health of commercial buildings," Journal of Cleaner Production, Feb. 12, 2020 (18 pages).

Ekici et al., "Performative computational architecture using swarm and evolutionary optimisation: A review," Building and Environment, 2019, 147 (pp. 356-371).

Hopfe, C.J., "Uncertainty and sensitivity analysis in building performance simulation for decision support and design optimization," Phd Thesis 1 (Research TU/e | Graduation TU/e), Built Environment, Eindhoven University of Technology, 2009 (230 pages).

Kim et al., "An integrated psychological response score of the occupants based on their activities and the indoor environmental quality condition changes," Building and Environment, 2017, 123 (pp. 66-77).

Kolokotsa et al., "Decision support methodologies on the energy efficiency and energy management in buildings," Advances in Building Energy Research, 2009, vol. 3, (pp. 121-146).

Abraham, Y.S., "Integrating occupant values and preferences with building systems in conditioned environments," Dissertation, Pennsylvania State University, Graduate School of the College of Engineering, 2018 (235 pages).

Asdrubali et al. "A comparison between environmental sustainability rating systems LEED and ITACA for residential buildings," Building and Environment 86, 2015 (pp. 98-108).

\* cited by examiner

1500

Healthy Building · System Info · Analytics · Define Dashboard

Today 56°F | 70°F · Tomorrow 48°F | 54°F · Friday 28°F | 32°F · Operator

1502 — Today's Score
72 — People Health
People Health is a cumulative score of all the areas seen on this screen. This copy is a placeholder area for an example.
View History

1504 — Wellness
| Category | Scores | Alerts | |
|---|---|---|---|
| Water | ● 64 | 25 | Details |
| Fitness | ● 68 | 20 | Details |
| Food | ▲ 72 | 15 | Details |

1506 — Recommendations
| Category | Scores | Alerts | |
|---|---|---|---|
| Occupancy | ● 92 | 25 | Details |
| Emergency | ● 68 | 20 | Details |
| Accessibility | ▲ 72 | 15 | Details |

1514 — Recommendations (All Widgets · May 2020)
| Description | Impact | Action |
|---|---|---|
| Change AB102 Air Filter | +10 | Details |
| Lower Temperature Room 12 | +3 | Details |
| Change Water Filter in Cafe | +3 | Details |
| Sanitize Desk 165 | +1 | Details |
| Sanitize Desk 075 | +1 | Details |

1508 — Air
| Category | Scores | Alerts | |
|---|---|---|---|
| Handwashing | ● 64 | 25 | Details |

1510 — Ergonomics
| Category | Scores | Alerts | |
|---|---|---|---|
| Light | ● 64 | 25 | Details |
| Comfort | ● 68 | 20 | Details |
| Seat | ▲ 72 | 15 | Details |
| Sound | ▲ 76 | 13 | Details |
| Mind | ● 80 | 2 | Details |
| Social | ● 83 | 1 | Details |

1512 — Cleanliness & Anti-infection
| Category | Scores | Alerts | |
|---|---|---|---|
| Handwashing | ● 92 | 25 | Details |
| Pest Control | ● 68 | 20 | Details |
| Sanitization | ▲ 72 | 15 | Details |

1516 — Alerts
| Description | Impact | Action |
|---|---|---|
| Security Alarm Building 10 | -9 | Details |
| Chemical Detected Room 109 | -6 | Details |
| Unscanned Entry Station 10 | -6 | Details |
| BAS Alerts over 100 | -5 | Details |
| Cellular Network Outage | -4 | Details |

Performance Advisor ... Today 69°F|59°F  Tomorrow 69°F|62°F  Thursday 73°F|68°F  Operator ▾

• Indoor Health  ◉ Employee Comfort  ▦ Space Utilization  ✦ Energy Efficiency  ⇩ Asset Upkeep Search...   Recommendations   Audit Log   📅 May 2020 - Jun 2020

< To Recommendations List

Recommendation Actions
Adjust clean air delivery for NW Zone of Floor 1 - Option 1
The following actions need to be completed to achieve the results of Option 1 of this recommendation:

Operational Adjustments:

| Set Supply Temp. Setpoint for AHU 1 to 71°F. | Switch In-Zone Disinfecting Device IZDD F1 NW Zone to ON. | Change the Economizer Threshold Temperature for AHU 1 to 71°F. | Change the Minimum Outside Air Flow Setpoint for AHU 1 to 8.4 cfm |
|---|---|---|---|
| Go to Command & Control | Go to Command & Control | Go to Command & Control | Go to Command & Control |
| Mark as Complete | Mark as Complete | Mark as Complete | Mark as Complete |

⟵ 1681    ⟵ 1682

Design Adjustments (optional):

| Install a Filter of MERV 13 or above in AHU 1. | Add an additional In-zone Disinfection Unit to Floor 1 > NW Zone. |
|---|---|
| Contact your HVAC provider. | Contact your HVAC provider. |
| Mark as Complete | Mark as Complete |

⟵ 1683

Option 1 Recommendation Results:
The following results will be achieved once all the above actions are completed.

IDR Score  ◯ =Good  ▦ =Average  ◆ =Poor

(86)  Energy Cost  ↑$3,100/mo  +10% over-budget  11kW/hr

Air Flow  Clean Air Delivery: 10.5ACH  Outdoor Air Ventilation: 3.2ACH

FIG. 16D

Undo Recommendation Actions for Option 1

Since you have now rejected Option 1, you will need to reset the following actions you have already completed.

Operational Adjustments:

- Set Supply Temp. Setpoint for AHU 1 to 71°F.
  - Go to Command & Control
  - Mark as Complete

- Switch In-Zone Disinfecting Device IZDD F1 NW Zone to ON.
  - Go to Command & Control
  - Mark as Complete

- Change the Economizer Threshold Temperature for AHU 1 to 71°F.
  - Go to Command & Control
  - Mark as Complete

- Change the Minimum Outside Air Flow Setpoint for AHU 1 to 8.4 cfm
  - Go to Command & Control
  - Mark as Complete

Design Adjustments (optional):

- Install a Filter of MERV 13 or above in AHU 1.
  - Contact your HVAC provider.
  - Mark as Complete

- Add an additional In-zone Disinfection Unit to Floor 1 > NW Zone.
  - Contact your HVAC provider.
  - Mark as Complete

Performance Advisor

● Indoor Health | ○ Employee Comfort | ▦ Space Utilization | ✦ Energy Efficiency | ⌂ Asset Upkeep Today 69°F | 59°F   Tomorrow 69°F | 62°F   Thursday 73°F | 68°F   Operator ▾

Search...   Recommendations   Audit Log

May 2020 - Jun 2020

< To Recommendations List

Recommendation Actions
Adjust clean air delivery for NW Zone of Floor 1 - Option 2
The following actions need to be completed to achieve the results of Option 1 of this recommendation:

Operational Adjustments:

| Set Supply Temp. Setpoint for AHU 1 to 73°F. | Switch In-Zone Disinfecting Device IZDD F1 NW Zone to ON. | Change the Economizer Threshold Temperature for AHU 1 to 72°F. | Change the Minimum Outside Air Flow Setpoint for AHU 1 to 8.0 cfm |
|---|---|---|---|
| Go to Command & Control | Go to Command & Control | Go to Command & Control | Go to Command & Control |
| Mark as Complete | Mark as Complete | Mark as Complete | Mark as Complete |

1688 ⌐    1689 ⌐

Design Adjustments (optional):

| Install a Filter of MERV 13 or above in AHU 1. | Add an additional In-zone Disinfection Unit to Floor 1 > NW Zone. |
|---|---|
| Contact your HVAC provider. | Contact your HVAC provider. |
| Mark as Complete | Mark as Complete |

Option 1 Recommendation Results:
The following results will be achieved once all the above actions are completed.

○ =Good  ▨ =Average  ◆ =Poor

1690 ⌐

| IDR Score | Energy Cost | Air Flow |
|---|---|---|
| 73 | ↑ $1,100/mo On Budget 7kW/hr | Clean Air Delivery: 9.3ACH<br>Outdoor Air Ventilation: 2.2ACH |

FIG. 21

Occupant Health And Wellness Parameters — 404
Light Parameters — 614

| Category | Parameter | Sub parameter | Criteria | Allocated Score (AS) | Total Instances (TI) | Deviation Instances (DI) | Score Calculation |
|---|---|---|---|---|---|---|---|
| Essential | Indoor Light | Desk Light Control | Light on/off control based on occupancy in space | 02 | NA | NA | Score = AS if system in place for use case |
| Essential | Indoor Light | Desk Light Control | Provision to control desk light | 02 | NA | NA | Score = AS if system in place for use case |
| Enhance | Indoor Light | Meeting Room | Provision for Mood Light control | 01 | NA | NA | Score = AS if system in place for use case |
| Enhance | Indoor Light | Desk Light Control | Desk light intensity control based on outdoor light | 01 | NA | NA | Score = AS if system in place for use case |
| Enhance | Indoor Light | Desk Light Control | Provision to control desk light intensity | 01 | NA | NA | Score = AS if system in place for use case |
| Optimum | Outdoor Light | Outdoor Conditions | Notify occupant when outside conditions are optimum | 01 | NA | NA | Score = AS if system in place for use case |
| Optimum | Indoor Light | Desk Light Control | Provision to control desk light color | 01 | NA | NA | Score = AS if system in place for use case |

2100

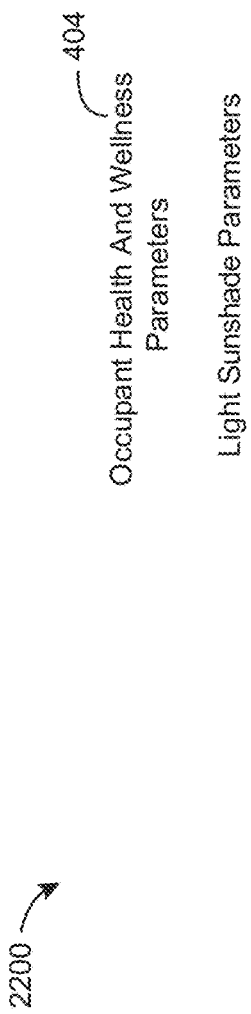

FIG. 22

Occupant Health And Wellness Parameters — 404

Light Sunshade Parameters

| Category | Parameter | Sub parameter | Criteria | Allocated Score (AS) | Total Instances (TI) | Deviation Instances (DI) | Score Calculation |
|---|---|---|---|---|---|---|---|
| Essential | Sunshade | Sunshade control | Automatic Sunshade Control based on sun position | 01 | No. of instances | No. of instances | Score = AS* ((TI−DI)/TI) |
| Essential | Sunshade | Sunshade Control | Provision to control sunshade for occupant | 02 | NA | NA | Score = AS if system in place for use case |
| Optimum | Sunshade | Sunshade Control | Sunshade opening alert when outside conditions are optimum | 01 | NA | NA | Score = AS if system in place for use case |

2200

Occupant Health And Wellness Parameters — 404

Seating Parameters — 620

| Category | Parameter | Sub parameter | Criteria | Allocated Score (AS) | Total Instances (TI) | Deviation Instances (DI) | Score Calculation |
|---|---|---|---|---|---|---|---|
| Essential | Indoor Light | Hot Desking | Provision to book standing desk | 01 | NA | NA | Score = AS if system in place for use case |
| Essential | Indoor Light | Hot Desking | Provision to check standing desk sanitization status * | 02 | NA | NA | Score = AS if system in place for use case |
| Essential | Indoor Light | Hot Desking | Provision to request standing desk sanitization | 01 | NA | NA | Score = AS if system in place for use case |
| Enhance | Indoor Light | Hot Desking | Provision to book seat with view | 01 | NA | NA | Score = AS if system in place for use case |
| Enhance | Indoor Light | Seating | Flexible desk arrangement to collaborate effectively | 01 | NA | NA | Score = AS if system in place for use case |
| Optimum | Outdoor Light | Seating | Provision to adjust posture and height of desk | 01 | NA | NA | Score = AS if system in place for use case |
| Optimum | Indoor Light | Seating | AI based auto posture and height adjustment | 01 | NA | NA | Score = AS if system in place for use case |

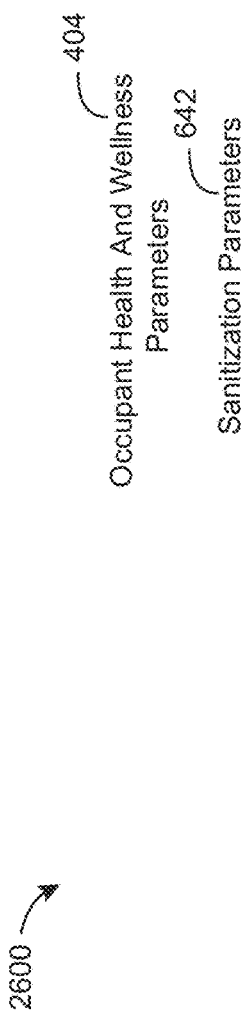

FIG. 26

Occupant Health And Wellness Parameters — 404
Sanitization Parameters — 642

| Category | Parameter | Sub parameter | Criteria | Allocated Score (AS) | Total Instances (TI) | Deviation Instances (DI) | Score Calculation |
|---|---|---|---|---|---|---|---|
| Essential | Sanitization | Sanitization | Common Space Sanitization Schedule | 01 | NA | NA | Score = AS if system in place for use case |
| Essential | Sanitization | Sanitization | Common Space Sanitization Status | 03 | NA | NA | Score = AS if system in place for use case |
| Essential | Sanitization | Sanitization | Common Space Sanitization request * | 02 | NA | NA | Score = AS if system in place for use case |

2600

Occupant Health And Wellness Parameters — 404
Food Parameters — 634

| Category | Parameter | Sub parameter | Criteria | Allocated Score (AS) | Total Instances (TI) | Deviation Instances (DI) | Score Calculation |
|---|---|---|---|---|---|---|---|
| Essential | Food | Food Ordering | Cafeteria Food menu along with nutrition | 02 | NA | NA | Score = AS if system in place for use case |
| Essential | Food | Nourishment | Provide Nutrition Education via Occupant app | 02 | NA | NA | Score = AS if system in place for use case |
| Enhance | Food | Food Ordering | Provision to order food from occupant app | 01 | NA | NA | Score = AS if system in place for use case |
| Enhance | Food | Fruit Basket | Fruit Basket arrival notification to occupant | 01 | NA | NA | Score = AS if system in place for use case |
| Enhance | Food | Food Break | Customized lunch and coffee break alerts to occupant | 01 | NA | NA | Score = AS if system in place for use case |
| Optimum | Food | Eating Area | Navigation to nearest indoor and outdoor eating area | 01 | NA | NA | Score = AS if system in place for use case |
| Optimum | Food | Food | Navigation to nearest farmers' market | 01 | NA | NA | Score = AS if system in place for use case |

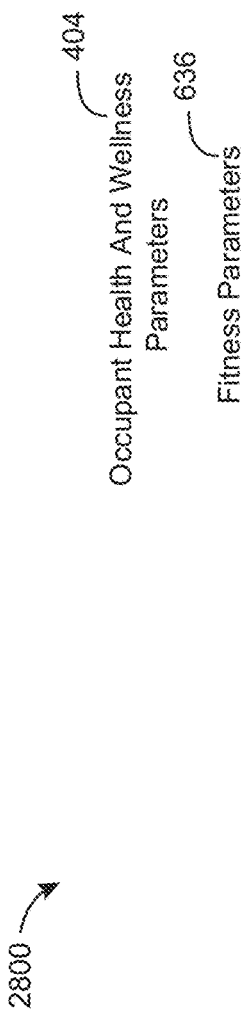

FIG. 28

| Category | Parameter | Sub parameter | Criteria | Allocated Score (AS) | Total Instances (TI) | Deviation Instances (DI) | Score Calculation |
|---|---|---|---|---|---|---|---|
| Essential | Fitness | Fitness program | Alerts and notifications of fitness program by organization | 01 | NA | NA | Score = AS if system in place for use case |
| Essential | Fitness | Fitness awareness | Promote Physical Activity | 03 | NA | NA | Score = AS if system in place for use case |
| Enhance | Fitness | Movement | Customized no movement reminder for occupant | 02 | NA | NA | Score = AS if system in place for use case |
| Enhance | Fitness | Gym occupancy status | Customized reminder when gym is unoccupied | 01 | NA | NA | Score = AS if system in place for use case |
| Enhance | Fitness | Bicycle stand booking | Provision to book bicycle stand in advance | 01 | NA | NA | Score = AS if system in place for use case |

Occupant Health And Wellness Parameters — 404
Fitness Parameters — 636
2800

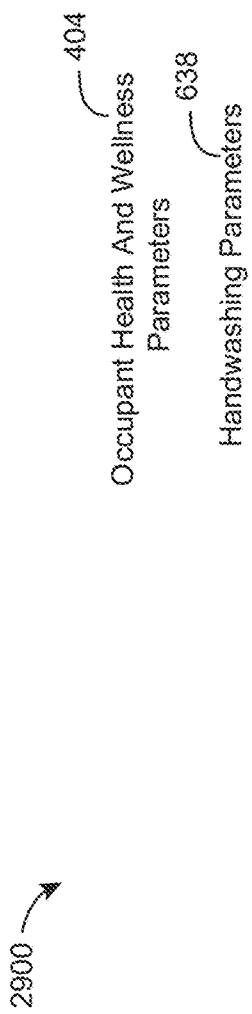

Occupant Health And Wellness Parameters — 404

Handwashing Parameters — 638

| Category | Parameter | Sub parameter | Criteria | Allocated Score (AS) | Total Instances (TI) | Deviation Instances (DI) | Score Calculation |
|---|---|---|---|---|---|---|---|
| Essential | Hand Washing | Hand Washing | Hand washing reminder when occupant enter in office | 03 | NA | NA | Score = AS if system in place for use case |
| Essential | Hand Washing | Hand Washing | Proper hand washing guide in occupant app | 01 | NA | NA | Score = AS if system in place for use case |
| Essential | Hand Washing | Hand Washing | Hand wash alert when in contact with COVID-19 person | 02 | NA | NA | Score = AS if system in place for use case |
| Enhance | Hand Washing | Soap Dispenser | Raise a request to refill soap dispenser | 01 | NA | NA | Score = AS if system in place for use case |
| Enhance | Hand Washing | Touchless | Touchless handwashing | 01 | NA | NA | Score = AS if system in place for use case |
| Optimum | Hand washing | Hand Washing | Average time spent for handwashing less than X sec. | 01 | NA | NA | Score = AS if system in place for use case |

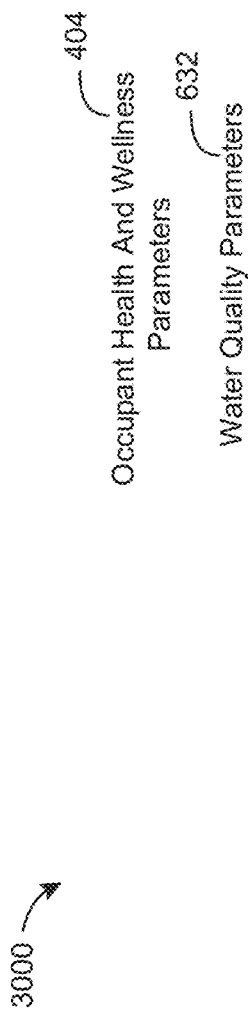

FIG. 30

| Category | Parameter | Sub parameter | Criteria | Allocated Score (AS) | Total Instances (TI) | Deviation Instances (DI) | Score Calculation |
|---|---|---|---|---|---|---|---|
| Essential | Water Quality | Containment Level | Contaminent level is below threshold limit | 05 | No. of instances | No. of Instances | Score = AS* ((TI-DI)/TI) |
| Essential | Water Consumption | Awareness | Alerts and notification for spread awareness | 01 | NA | NA | Score = AS if system in place for use case |
| Essential | Water Quality | Hot Water Quality | Provision to raise temperature of Hot Water to kill Ameba | 02 | NA | NA | Score = AS if system in place for use case |
| Enhance | Water Quality | Water refilling Station | Navigation to nearest hot/cold water refilling source | 01 | NA | NA | Score = AS if system in place for use case |
| Enhance | Water Quality | Water refilling Station | Provision to raise request to refill water refilling station | 01 | NA | NA | Score = AS if system in place for use case |
| Enhance | Water Quality | Water Quality | Provision to raise complain about water quality | 01 | NA | NA | Score = AS if system in place for use case |
| Optimum | Water Quality | Dehydration alert | AI based reminder for occupant to drink water | 01 | NA | NA | Score = AS if system in place for use case |

Occupant Health And Wellness Parameters — 404
Mind Parameters — 622

| Category | Parameter | Sub parameter | Criteria | Allocated Score (AS) | Total Instances (TI) | Deviation Instances (DI) | Score Calculation |
|---|---|---|---|---|---|---|---|
| Essential | Mind | Mental Health | Mental Health awareness | 02 | NA | NA | Score = AS if system in place for use case |
| Essential | Mind | Mental Health | Access to organization Mental Health Education program | 01 | NA | NA | Score = AS if system in place for use case |
| Essential | Mind | Suicide Prevention | Access to suicide prevention resources | 01 | NA | NA | Score = AS if system in place for use case |
| Enhance | Mind | Stress | Access to organization Stress Management Programs | 01 | NA | NA | Score = AS if system in place for use case |

Occupant Health And Wellness Parameters — 404
Social Parameters — 624

| Category | Parameter | Sub parameter | Criteria | Allocated Score (AS) | Total Instances (TI) | Deviation Instances (DI) | Score Calculation |
|---|---|---|---|---|---|---|---|
| Essential | Social | Social | Alerts and notification of organization social events | 01 | NA | NA | Score = AS if system in place for use case |
| Essential | Social | Social | Colleague birthday reminder | 01 | NA | NA | Score = AS if system in place for use case |
| Essential | Social | Social | Nearby Social events | 01 | NA | NA | Score = AS if system in place for use case |

Occupant Health And Wellness Parameters — 404

Physical User Health Parameters

| Category | Parameter | Sub parameter | Criteria | Allocated Score (AS) | Total Instances (TI) | Deviation Instances (DI) | Score Calculation |
|---|---|---|---|---|---|---|---|
| Essential | Eyes | Eyes Relaxation | Customized alerts to occupant to look away from screen | 01 | NA | NA | SS = AS if customized alerts to occupant to look away from screen |
| Essential | Disease Control | Social Distancing | Provision alert occupant when someone is less than 3 feet distance | 02 | NA | NA | SS = AS if provision alert occupant when someone is less than 3 feet distance |
| Enhance | Disease Control | Medical Leave | Provision to update sick leave in occupant app | 01 | NA | NA | SS = AS if provision to update sick leave in occupant app |
| Enhance | Disease Control | Contact Tracing | Provision for contact tracing | 01 | NA | NA | SS = AS if provision for contact tracing |
| Enhance | Disease Control | Air Replacement | Provision for air replacement request in case nearby employee infected by Viral disease | 01 | NA | NA | SS = AS if provision for air replacement request in case nearby employee infected by Viral disease |
| Optimum | Health | Health Data | Alerts and Notification to occupant when irregularity in health data | 01 | NA | NA | SS = AS if Alerts and Notification to occupant when irregularity in health data |

Adjust clean air delivery rate to achieve lower infectious disease transmission risk.

Current State: ← 4602

IDR Score: 75
IAQ Score: 32
Energy Cost: $1,200/mo
+3% over-budget
8kW/hr

Scores: ◯ 81-100=Good  ⊘ 51-80=Average  ● 0-50=Poor

| Air Flow | | Comfort | | UV Disinfection | | Air Quality | | Filtration | |
|---|---|---|---|---|---|---|---|---|---|
| Clean Air Delivery | 8.5 ACH | Supply Air Temp Setpoint | 75°F | System UV Disinfection | Yes | CO2 | 73 ppm | System Air Filtration | Merv V8 |
| Minimum Ventilation | 8.5 ACH | Humidity | 73% | In-Zone UV Disinfection | No | PM 2.5 | 23 ug/m3 | In-Zone Air Filtration | No |
| | | | | | | PM10 | 27 ug/m3 | | |
| | | | | | | VOC | 32 ppm | | |

Recommendations: ← 4604
Choose from the options below to optimize between airborne infection risk and energy spend. View Advanced Selector

Option 1: ← 4606

IDR Score: 86
IAQ Score: 93
Energy Cost: ↑ $3,100/mo
+10% over-budget
11kW/hr

| Air Flow | | Comfort | | UV Disinfection | | Air Quality | | Filtration | |
|---|---|---|---|---|---|---|---|---|---|
| Clean Air Delivery | 10.5 ACH | Supply Air Temp Setpoint | 71°F | System UV Disinfection | No | CO2 | 52 ppm | System Air Filtration | Merv V8 |
| Minimum Ventilation | 3.2 ACH | Humidity | 65% | In-Zone UV Disinfection | No | PM 2.5 | 18 ug/m3 | In-Zone Air Filtration | No |
| | | | | | | PM10 | 21 ug/m3 | | |
| | | | | | | VOC | 16 ppm | | |

| POINTS | COMMAND/STATUS | | INDEFINITELY | TIMER FOR COMMAND | TIMER REMAINING | STATUS |
|---|---|---|---|---|---|---|
| Outside Air Temperature | 82 | °F | ☐ | 00 : 00 | | |
| Outside Air Humidity | 48.53 | %RH | ☐ | 00 : 00 | | |
| Occupancy Mode | Unoccupied ˅ | sts | ☐ | 00 : 00 | | |
| Operation Mode | Enable ˅ | sts | ☐ | 00 : 00 | | |
| Supply Air Fan Status | 0 | sts | ☐ | 00 : 00 | | |
| Supply Air Fan Command | Off ˅ | sts | ☐ | 00 : 00 | | |
| Supply Air Fan Output | 0 | % | ☐ | 00 : 00 | | |
| Supply Air Flow | 0 | CFM | ☐ | 00 : 00 | | |
| Supply Air Flow | 0 | CFM | ☐ | 00 : 00 | | |
| Return Air Fan Status | 0 | sts | ☐ | 00 : 00 | | |
| Return Air Fan Command | Off ˅ | sts | ☐ | 00 : 00 | | |
| Return Air Fan Output | 0 | % | ☐ | 00 : 00 | | |
| Supply Air Pressure Setpoint | 0 | in wc | ☐ | 00 : 00 | | |
| Economizer Mode | Off ˅ | sts | ☐ | 00 : 00 | | |
| Cooling Output | 0 | % | ☐ | 00 : 00 | | |
| Heating Output | 0 | % | ☐ | 00 : 00 | | |
| Outdoor Air Damper Output | 0 | % | ☐ | 00 : 00 | | |
| Supply Air Temperature Setpoint | 77 | °F | ☐ | 00 : 00 | | |

FIG. 50

| | | | | | | | | |
|---|---|---|---|---|---|---|---|---|
| Time | Category | Equip | Space Name | Observations | Recommendations | Basis of Recommendation | Basis | Accept/Reject | Reject Reason |
| 28 JUN 2020 8:35AM CST | Indoor Health | AHU-1 | Building-1 > Floor 1 > Zone A | Employee Corner is predicted to be under occupied between 5:00 PM to 6:00 PM | Suggest to Change the Temperature setpoint to 74°F. | Predicted occupancy based on which appropriate temperature setpoint is recommended. | First Lastname | Accepted View Required Actions | |
| 19 SEP 2020 8:35AM CST | Indoor Health | RTU-3 | Area 1 Vancouver_Roof | ⋮ | ⋮ | ⋮ | First Lastname | View Options ✕ | |
| 19 SEP 2020 8:35AM CST | Indoor Health | RTU-3 | Area 1 Vancouver_Roof | ⋮ | ⋮ | ⋮ | First Lastname | View Options | Rejected Reset Actions |
| 19 SEP 2020 8:35AM CST | Asset Upkeep | RTU-3 | Area 1 Vancouver_Roof | ⋮ | ⋮ | ⋮ | First Lastname | ✓ ✕ ☑ Auto-Accept | |
| 19 SEP 2020 8:35AM CST | Energy Emergency | RTU-3 | Area 1 Vancouver_Roof | ⋮ | ⋮ | ⋮ | First Lastname | ✓ ✕ ☐ Auto-Accept | |
| 19 SEP 2020 8:35AM CST | Space Utilization | RTU-3 | Area 1 Vancouver_Roof | ⋮ | ⋮ | ⋮ | First Lastname | ✓ ✕ | |
| 19 SEP 2020 8:35AM CST | Asset Upkeep | RTU-3 | Area 1 Vancouver_Roof | ⋮ | ⋮ | ⋮ | First Lastname | ✓ ✕ ☐ Auto-Accept | |

Space Utilization — 5606
View all recommendations in OBEM

| Time | Observations | Recommendations |
|---|---|---|
| 8:35AM CST | Space X is predicted to be under-occupied between 5:00 PM to 6:00 PM | Change the setpoint to XX Deg C/Deg F for Equipment X for the next XX minutes. |
| 8:35AM CST | Space X is predicted to be under-occupied between 5:00 PM to 6:00 PM | Change the setpoint to XX Deg C/Deg F for Equipment X for the next XX minutes. |
| 8:35AM CST | Space X is predicted to be under-occupied between 5:00 PM to 6:00 PM | Change the setpoint to XX Deg C/Deg F for Equipment X for the next XX minutes. |
| 8:35AM CST | Space X is predicted to be under-occupied between 5:00 PM to 6:00 PM | Change the setpoint to XX Deg C/Deg F for Equipment X for the next XX minutes. |
| 8:35AM CST | Space X is predicted to be under-occupied between 5:00 PM to 6:00 PM | Change the setpoint to XX Deg C/Deg F for Equipment X for the next XX minutes. |

Energy Efficiency — 5608
View all recommendations in OBEM

| Time | Observations | Recommendations |
|---|---|---|
| 8:35AM CST | Space X is predicted to be under-occupied between 5:00 PM to 6:00 PM | Change the setpoint to XX Deg C/Deg F for Equipment X for the next XX minutes. |
| 8:35AM CST | Space X is predicted to be under-occupied between 5:00 PM to 6:00 PM | Change the setpoint to XX Deg C/Deg F for Equipment X for the next XX minutes. |
| 8:35AM CST | Space X is predicted to be under-occupied between 5:00 PM to 6:00 PM | Change the setpoint to XX Deg C/Deg F for Equipment X for the next XX minutes. |
| 8:35AM CST | Space X is predicted to be under-occupied between 5:00 PM to 6:00 PM | Change the setpoint to XX Deg C/Deg F for Equipment X for the next XX minutes. |
| 8:35AM CST | Space X is predicted to be under-occupied between 5:00 PM to 6:00 PM | Change the setpoint to XX Deg C/Deg F for Equipment X for the next XX minutes. |

Asset Upkeep — 5610
View all recommendations in OBEM

| Time | Observations | Recommendations |
|---|---|---|
| 8:35AM CST | Space X is predicted to be under-occupied between 5:00 PM to 6:00 PM | Change the setpoint to XX Deg C/Deg F for Equipment X for the next XX minutes. |
| 8:35AM CST | Space X is predicted to be under-occupied between 5:00 PM to 6:00 PM | Change the setpoint to XX Deg C/Deg F for Equipment X for the next XX minutes. |
| 8:35AM CST | Space X is predicted to be under-occupied between 5:00 PM to 6:00 PM | Change the setpoint to XX Deg C/Deg F for Equipment X for the next XX minutes. |
| 8:35AM CST | Space X is predicted to be under-occupied between 5:00 PM to 6:00 PM | Change the setpoint to XX Deg C/Deg F for Equipment X for the next XX minutes. |
| 8:35AM CST | Space X is predicted to be under-occupied between 5:00 PM to 6:00 PM | Change the setpoint to XX Deg C/Deg F for Equipment X for the next XX minutes. |

| 6800 → Device Name | Install Location | Score | Data Received | Data Expected | Percentage Received | Last Sample | Anomalies Detected | FDD Rules Impacted |
|---|---|---|---|---|---|---|---|---|
| ◆ ORM-AHU1 | Ormeta Penthouse | 0 ↓ | 0 | 12,000 | 0.0% | 18 Aug 2021 18:01:00 | 0 | 50 |
| ◆ ORM-AHU2 | Ormeta F3 | 0 ↓ | 0 | 12,000 | 0.0% | 18 Aug 2021 18:01:00 | 0 | 48 |
| ◆ ORM-VAV96 | Ormeta F2 | 0 ↓ | 0 | 12 | 0.0% | 18 Aug 2021 18:01:00 | 0 | 8 |
| ◆ ORM-VAV97 | Ormeta F2 | 0 ↓ | 0 | 12 | 0.0% | 18 Aug 2021 18:01:00 | 0 | 7 |
| ◆ ORM-VAV98 | Ormeta F2 | 0 ↓ | 0 | 14 | 0.0% | 18 Aug 2021 18:01:00 | 0 | 7 |

Rows per page: 5    1-5 of 20

Meter Health Data — 6804

| Device Name | Install Location | Score | Data Received | Data Expected | Percentage Received | Last Sample | Anomalies Detected | FDD Rules Impacted |
|---|---|---|---|---|---|---|---|---|
| ◆ WIL-PW1 | Wilamont Basement | 0 ↓ | 0 | 296 | 0.0% | 18 Aug 2021 03:47:00 | 0 | 5 |
| ◆ WIL-PW2 | Wilamont Basement | 0 ↓ | 0 | 296 | 0.0% | 18 Aug 2021 03:47:00 | 0 | 5 |
| ◆ WIL-PW2 | Wilamont Basement | 0 ↓ | 0 | 288 | 0.0% | 18 Aug 2021 03:47:00 | 0 | 5 |
| ◎ WIL-PW2 | Wilamont Basement | 10 → | 288 | 288 | 100.0% | 20 Aug 2021 18:30:00 | 0 | 0 |
| ◎ WIL-PW2 | Wilamont Basement | 10 → | 288 | 288 | 100.0% | 20 Aug 2021 18:30:00 | 0 | 0 |

Rows per page: 5    1-5 of 20

Partner Integration Data Health — 6808

| Integration Name | Score | Data Received | Data Expected | Percentage Received | Last Sample | Anomalies Detected |
|---|---|---|---|---|---|---|
| ◆ ORM-AHU1 | 67 | 67 | 100 | 67.0% | 15 Aug 2021 03:47:00 | 0 |
| ◆ ORM-AHU2 | 70 | 75 | 100 | 75.0% | 15 Aug 2021 02:45:30 | 1 |

Rows per page: 5    1-5 of 20

BUILDING SYSTEM FOR BUILDING EQUIPMENT WITH FAULT BASED DATA HEALTH OPERATIONS

CROSS-REFERENCE TO RELATED PATENT APPLICATIONS

This application claims the benefit of, and priority to, U.S. Provisional Patent Application No. 63/255,347 filed Oct. 13, 2021 and U.S. Provisional Patent Application No. 63/281,409 filed Nov. 19, 2021. The entirety of each of these patent applications is incorporated by reference herein.

BACKGROUND

The present disclosure relates to building systems of a building. The present disclosure relates more particularly to health of the building.

In some embodiments, a building includes various building systems that operate to provide environmental control, security, fire response, and various other services for a building. However, based on the operation of the building systems, the performance of building spaces may change based on the operation of the building systems, i.e., whether the building systems are operating correctly or have encountered errors. Users may occupy the spaces of the building. The mental and physical wellbeing of users may be based on the operation of the building systems and/or services offered within the building. Furthermore, the operation of the building systems may affect energy usage and pollution generation, affecting the environment surrounding the building.

SUMMARY

External Scoring Model Integration

One implementation of the present disclosure is a building system of a building, the building system including one or more storage devices storing instructions developed by a first entity and stored thereon that, when executed by one or more processors, cause the one or more processors to receive building data from one or more building systems of the building, receive an indication of an external scoring model, the external scoring model defining a scoring methodology for the building, the external scoring model defined by a second entity different from the first entity, and generate one or more scores with the external scoring model and the building data. The instructions cause the one or more processors to implement one or more updates to the one or more building systems of the building, the one or more updates updating operation of the building to improve at least one of the one or more scores.

In some embodiments, the instructions cause the one or more processors to perform a data validity analysis on the building data, the data validity analysis identifying whether values of the building data are valid and generate a user interface and cause the user interface to include an indication of a result of the data validity analysis.

In some embodiments, the instructions cause the one or more processors to receive occupant feedback regarding the one or more scores via a user device, determine whether the occupant feedback confirms or denies accuracy of the one or more scores, and generate a user interface and cause the user interface to display an indication of whether the occupant feedback confirms or denies the accuracy of the one or more scores.

In some embodiments, the instructions cause the one or more processors to generate an external certification defined by the second entity based on the one or more scores of the external scoring model.

In some embodiments, the instructions cause the one or more processors to implement the one or more updates to the one or more building systems of the building, the one or more updates updating operation of the building to improve at least one of the one or more scores, the one or more updates including at least one of an update to an operating setting of the one or more building systems controlling an environmental condition of the building, a work order to perform maintenance on the one or more building systems, and an update to add a new system or service to the one or more building systems.

In some embodiments, the instructions cause the one or more processors to generate recommendations for improving the one or more scores and generate a user interface and cause the user interface to include indications of the recommendations.

In some embodiments, the instructions cause the one or more processors to generate a recommendation interface indicating one or more current operational or design parameters of the building and one or more recommended changes to the operational or design parameters of the building, receive one or more updates to the recommended changes to the operational or design parameters of the building via the recommendation interface, simulate an impact on the one or more scores resulting from the one or more updates to the recommended changes to the operational or design parameter of the building, and cause the recommendation interface to display an indication of the impact to the one or more scores.

In some embodiments, the instructions cause the one or more processors to generate, based on the building data, an overall building score of the building based on an internal scoring model indicating a second scoring methodology of the building defined by the first entity, the second scoring methodology indicating scoring parameters including one or more space parameters indicating health levels of spaces of the building, one or more planet health parameters relating to an effect of the building on environmental pollution, and one or more people parameters relating to at least one of physical or mental health of occupants of the building. In some embodiments, the instructions cause the one or more processors to implement one or more updates to the one or more building systems of the building, the one or more updates updating operation of the building to improve at least one of the one or more scores, wherein the one or more updates update operation of the building to improve at least one of the one or more space parameters, the one or more planet health parameters, or the one or more people parameters causing the overall building score to improve.

In some embodiments, the effect of the building on the environmental pollution is based on operations performed by the one or more building systems. In some embodiments, the physical or mental health of the occupants of the building is caused by the operations of the one or more building systems.

In some embodiments, the instructions cause the one or more processors to determine, based on the building data, one or more space health scores for the one or more space parameters of the building, determine, based on the building data, one or more planet health scores for the one or more planet health parameters of the building, and determine, based on the building data, one or more people health scores for the one or more people parameters of the building.

In some embodiments, the instructions cause the one or more processors to generate one or more user interfaces, the one or more user interfaces displaying the one or more scores, the overall building score, the one or more space health scores, the one or more planet health scores, and the one or more people health scores.

In some embodiments, the instructions cause the one or more processors to generate, based on the building data, the overall building score of the building based on the one or more space health scores, the one or more planet health scores, and the one or more people health scores and cause the one or more processors to generate a user interface including an overall building score element including an indication of the overall building score, the one or more space health scores, the one or more planet health scores, and the one or more people health scores.

In some embodiments, the user interface further includes an element including scores of buildings including the building, the scores indicating overall scores for the buildings, people health scores for the buildings, place health scores of the buildings, and planet health scores for the buildings. In some embodiments, the element sorts the buildings based on the overall scores from lowest overall score to highest overall score.

In some embodiments, the user interface further includes the element including recommendations for the buildings, the recommendations indicating actions to improve the overall scores of the buildings. In some embodiments, the element indicates a particular building associated with each of the recommendations and a potential score impact to a particular overall score of the overall scores of the buildings.

Another implementation of the present disclosure is a method including receiving, by a processing circuit, building data from one or more building systems of a building, wherein the processing circuit executes instructions developed by a first entity, receiving, by the processing circuit, an indication of an external scoring model, the external scoring model defining a scoring methodology for the building, the external scoring model defined by a second entity different from the first entity, generating, by the processing circuit, one or more scores with the external scoring model and the building data, and implementing, by the processing circuit, one or more updates to the one or more building systems of the building, the one or more updates updating operation of the building to improve at least one of the one or more scores.

In some embodiments, the method includes generating, by the processing circuit, an external certification defined by the second entity based on the one or more scores of the external scoring model.

In some embodiments, the one or more updates update operation of the building to improve at least one of the one or more scores, the one or more updates including at least one of an update to an operating setting of the one or more building systems controlling an environmental condition of the building, a work order to perform maintenance on the one or more building systems, and an update to add a new system or service to the one or more building systems.

In some embodiments, the method includes generating, by the processing circuit, recommendations for improving the one or more scores and generating, by the processing circuit, a user interface and cause the user interface to include indications of the recommendations.

In some embodiments, the method includes generating, by the processing circuit, a recommendation interface indicating one or more current operational or design parameters of the building and one or more recommended changes to the operational or design parameters of the building, receiving, by the processing circuit, one or more updates to the recommended changes to the operational or design parameters of the building via the recommendation interface, simulating, by the processing circuit, an impact on the one or more scores resulting from the one or more updates to the recommended changes to the operational or design parameter of the building, and causing, by the processing circuit, the recommendation interface to display an indication of the impact to the one or more scores.

Another implementation of the present disclosure is a building system of a building, the building system including one or more storage devices storing instructions developed by a first entity and one or more processors configured to execute the instructions, causing the one or more processors to receive building data from one or more building systems of the building. The instructions cause the one or more processors to receive an indication of an external scoring model, the external scoring model defining a scoring methodology for the building, the external scoring model defined by a second entity different from the first entity, generate one or more scores with the external scoring model and the building data, and implement one or more updates to the one or more building systems of the building, the one or more updates updating operation of the building to improve at least one of the one or more scores.

Occupant Based Building Health Score Verification

Another implementation of the present disclosure is a building system of a building including one or more storage devices storing instructions thereon that, when executed by one or more processors, cause the one or more processors to receive building data from one or more building systems of the building. The instructions cause the one or more processors to generate, based on the building data, one or more building health scores of the building, receive user feedback regarding the one or more building health scores via one or more user devices, determine whether the user feedback confirms or denies an accuracy of the one or more building health scores, and generate a user interface and cause the user interface to display the one or more building health scores and an indication of whether the user feedback confirms or denies the accuracy of the one or more building health scores.

In some embodiments, the instructions cause the one or more processors to generate an element indicating whether the user feedback confirms or denies the accuracy of the one or more building health scores. In some embodiments, the instructions cause the one or more processors to cause the user interface to display values of the one or more building health scores and the element.

In some embodiments, the one or more building health scores include building health scores. In some embodiments, the user feedback individually confirms or denies the accuracy of the building health scores. In some embodiments, the instructions cause the one or more processors to cause the user interface to individually display the building health scores and a corresponding indication of whether the user feedback confirms or denies the accuracy of the building health scores.

In some embodiments, the user feedback includes individual user feedbacks of users. In some embodiments, the instructions the instructions causes the one or more processors to determine whether the user feedback confirms or denies the accuracy of the one or more building health scores by generating a score based on the individual user feedbacks and determining whether the score is greater than or less than a level.

In some embodiments, the one or more building health scores include at least one of one or more space health scores indicating health levels of spaces of the building, one or more planet health scores relating to an effect of the building on environmental pollution, one or more people health scores relating to at least one of physical or mental health of occupants of the building, or an overall building health score based on the one or more space health scores, the one or more planet health scores, and the one or more people health scores.

In some embodiments, the instructions are developed by a first entity. In some embodiments, the one or more building health scores include an external score generated based on an external scoring model and the building data, the external scoring model defining a scoring methodology for the building, the external scoring model defined by a second entity different from the first entity.

In some embodiments, the instructions cause the one or more processors to implement one or more updates to the one or more building systems of the building based at least on the user feedback confirming or denying the accuracy of the one or more building health scores, the one or more updates updating operation of the building to improve the one or more building health scores.

In some embodiments, the one or more updates include at least one of an update to an operating setting of the one or more building systems controlling an environmental condition of the building, a work order to perform maintenance on the one or more building systems, or an update to add a new system or service to the one or more building systems.

In some embodiments, the instructions cause the one or more processors to generate a message including a question, the question prompting a user to provide the user feedback confirming or denying the accuracy of the one or more building health scores, communicate the message to user devices, and receive the user feedback from the user devices.

In some embodiments, the question is a text based question in a natural language.

In some embodiments, the message further includes one or more selectable elements indicating at least one of confirming the accuracy of the one or more building health scores or denying the accuracy of the one or more building health scores. In some embodiments, the instructions cause the one or more processors to receive the user feedback from the user devices responsive to users interacting with the one or more selectable elements via the user devices.

Another implementation of the present disclosure is a method including receiving, a processing circuit, building data from one or more building systems of a building, generating, by the processing circuit, based on the building data, one or more building health scores of the building, receiving, by the processing circuit, user feedback regarding the one or more building health scores via one or more user devices and determining, by the processing circuit, whether the user feedback confirms or denies an accuracy of the one or more building health scores. The method includes generating, by the processing circuit, a user interface and cause the user interface to display the one or more building health scores and an indication of whether the user feedback confirms or denies the accuracy of the one or more building health scores.

In some embodiments, the method includes generating, by the processing circuit, an element indicating whether the user feedback confirms or denies the accuracy of the one or more building health scores and causing, by the processing circuit, the user interface to display values of the one or more building health scores and the element.

In some embodiments, the one or more building health scores include building health scores. In some embodiments, the user feedback individually confirms or denies the accuracy of the building health scores. In some embodiments, the method further includes causing, by the processing circuit, the user interface to individually display the building health scores and a corresponding indication of whether the user feedback confirms or denies the accuracy of the building health scores.

In some embodiments, the user feedback includes individual user feedbacks of users. In some embodiments, the method further includes determining, by the processing circuit, whether the user feedback confirms or denies the accuracy of the one or more building health scores by generating a score based on the individual user feedbacks and determining whether the score is greater than or less than a level.

In some embodiments, the method includes generating, by the processing circuit, a message including a question, the question prompting a user to provide the user feedback confirming or denying the accuracy of the one or more building health scores, communicating, by the processing circuit, the message to user devices, and receiving, by the processing circuit, the user feedback from the user devices.

In some embodiments, the question is a text based question in a natural language.

In some embodiments, the message further includes one or more selectable elements indicating at least one of confirming the accuracy of the one or more building health scores or denying the accuracy of the one or more building health scores. In some embodiments, the method further includes receiving, by the processing circuit, the user feedback from the user devices responsive to users interacting with the one or more selectable elements via the user devices.

Another implementation of the present disclosure is a building system of a building including one or more storage devices storing instructions thereon and one or more processors configured to execute the instructions causing the one or more processors to receive building data from one or more building systems of the building. The instructions cause the one or more processors to generate, based on the building data, one or more building health scores of the building, receive user feedback regarding the one or more building health scores via one or more user devices, determine whether the user feedback confirms or denies an accuracy of the one or more building health scores, and generate a user interface and cause the user interface to display the one or more building health scores and an indication of whether the user feedback confirms or denies the accuracy of the one or more building health scores.

In some embodiments, the instructions cause the one or more processors to generate a message including a question, the question prompting a user to provide the user feedback confirming or denying the accuracy of the one or more building health scores, communicate the message to user devices, and receive the user feedback from the user devices.

Building Data Health

One implementation of the present disclosure is a building system of a building including one or more storage devices storing instructions thereon that, when executed by one or more processors, cause the one or more processors to receive building data from one or more building data sources associated with the building, generate, based on the building data, one or more data health scores for the building data received from the one or more building data sources, the one or more data health scores indicating quality levels of the building data, and generate user interface data configured to cause a user device to display a user interface providing indications of the one or more data health scores.

In some embodiments, the instructions cause the one or more processors to perform one or more operations based on the one or more data health scores, wherein the one or more operations improve the quality levels of the building data.

In some embodiments, the one or more building data sources include building equipment of the building. In some embodiments, the instructions cause the one or more processors to perform the one or more operations by communicating operational commands to the building equipment causing the building equipment to operate to improve the quality levels of the building data.

In some embodiments, the instructions cause the one or more processors to perform the one or more operations by generating a work order including instructions to perform one or more maintenance activities for equipment of the building, wherein performing the one or more maintenance activities for the equipment improves the quality levels of the building data.

In some embodiments, the one or more data health scores include an overall data health score for the building.

In some embodiments, the instructions cause the one or more processors to record values of a health score of the one or more data health scores over time as the values are generated, generate a trend element, the trend element providing a trend of the values of the health score, and cause the user interface to include the trend element.

In some embodiments, the building data includes building data sets produced by building data sources. In some embodiments, the building data sources include a first data sources of a first type that provide a first data set of the building data sets and a second data sources of a second type that provide a second data set of the building data sets. In some embodiments, the instructions cause the one or more processors to generate a first data health score based on the first data set and a second data health score based on the second data set and generate a user interface element including a first indication of the first type and a first corresponding indication of the first data health score and a second indication of the second type and a second corresponding indication of the second data health score. The instructions cause the one or more processors to cause the user interface to include the user interface element.

In some embodiments, the instructions cause the one or more processors to receive first building data from one or more first building data sources associated with a first building and receive second building data from one or more second building data sources associated with a second building, generate a first data health score for the first building, the first data health score indicating first quality levels of the first building data of the first building, generate a second data health score for the second building, the second data health score indicating second quality levels of the second building data of the second building, and generate a user interface element including a first indication of the first building and a first corresponding indication of the first data health score, a second indication of the second building and a second corresponding indication of the second data health score, and cause the user interface to include the user interface element.

In some embodiments, the instructions cause the one or more processors to execute a first application and a second application, identify, from the building data, a first data set consumed by the first application and a second data set consumed by the second application, generate a first data health score based on the first data set and a second data health score based on the second data set, generate a user interface element including a first indication of the first application and a first corresponding indication of the first data health score and a second indication of the second application and a second corresponding indication of the second data health score, and cause the user interface to include the user interface element.

In some embodiments, the one or more building data sources include a first building device and a second building device. In some embodiments, the building data includes first building data of the first building device and second building data of the second building device. In some embodiments, the one or more data health scores include a first data health score for the first building device based on the first building data and a second data health score for the second building device based on the second building data. In some embodiments, the instructions cause the one or more processors to generate a user interface element including a first indication of the first building device and a first corresponding indication of the first data health score and a second indication of the second building device and a second corresponding indication of the second data health score and cause the user interface to include the user interface element.

In some embodiments, the instructions are developed by a first entity, wherein the one or more building data sources include an external data source managed by a second entity different from the first entity, the external data source providing external data. In some embodiments, one data health score of the one or more data health scores indicates particular quality levels of the external data. In some embodiments, the instructions cause the one or more processors to generate a user interface element including an indication of the external data source and a corresponding indication of the one data health score and cause the user interface to include the user interface element.

In some embodiments, the instructions cause the one or more processors to generate, based on the building data, the one or more data health scores by identifying data anomalies of the building data, identifying a number of data samples of the building data received from the one or more building data sources, performing a comparison by comparing the number of data samples to an expected number of data samples, and generating the one or more data health scores based on the data anomalies and the comparison.

In some embodiments, a value of a health score of the one or more data health scores decreases non-linearly with an increase to a number of the data anomalies of the building data.

In some embodiments, the instructions cause the one or more processors to identify data anomalies of the building data by performing at least one of determining whether a data value of a data sample of the building data is outside a range of values, determining whether values of data samples of the building data change at a rate that is outside a range of rates of change, or performing a peer comparison by comparing data samples of the building data of one building data source to a peer metric, the peer metric based on data samples of data sources of a same type as the one building data source.

Another implementation of the present disclosure is a method including receiving, by a processing circuit, building data from one or more building data sources associated with a building, generating, by the processing circuit, based on the building data, one or more data health scores for the building data received from the one or more building data sources, the one or more data health scores indicating quality levels of the building data, and generate, by the processing circuit, user interface data configured to cause a user device to display a user interface providing indications of the one or more data health scores.

In some embodiments, the one or more building data sources include building equipment of the building. In some embodiments, the method further includes performing, by the processing circuit, the one or more operations by communicating operational commands to the building equipment causing the building equipment to operate to improve the quality levels of the building data.

In some embodiments, the one or more data health scores include an overall data health score for the building.

In some embodiments, the method includes recording, by the processing circuit, values of a health score of the one or more data health scores over time as the values are generated, generating, by the processing circuit, a trend element, the trend element providing a trend of the values of the health score, and causing, by the processing circuit, the user interface to include the trend element.

In some embodiments, the method includes generating, by the processing circuit, based on the building data, the one or more data health scores by identifying data anomalies of the building data, identifying a number of data samples of the building data received from the one or more building data sources, performing a comparison by comparing the number of data samples to an expected number of data samples, and generating the one or more data health scores based on the data anomalies and the comparison.

In some embodiments, a value of a health score of the one or more data health scores decreases non-linearly with an increase to a number of the data anomalies of the building data.

Another implementation of the present disclosure is a building system including one or more storage devices storing instructions thereon and one or more processors configured to execute the instructions, causing the one or more processors to receive building data from a plurality of pieces of building equipment of a plurality of buildings, generate, based on the building data, a plurality of data health scores indicating data quality levels of the plurality of buildings, a plurality of different categories of the building equipment, and a plurality of different applications that consume the building data, generate user interface data configured to cause a user device to display a user interface providing indications of the plurality of data health scores, and perform one or more operations based on the plurality of data health scores to improve at least one of the plurality of data health scores.

Multiple Certification Management

Another implementation of the present disclosure is a building system of a building, the building system including one or more storage devices storing instructions stored thereon that, when executed by one or more processors, cause the one or more processors to receive a first building health score indicating a health level of the building and a second building health score indicating the health level of the building, the first building health score generated based on a first scoring methodology defined by a first entity and the second building health score generated based on a second scoring methodology defined by a second entity different from the first entity, cause a display of a user device to display a user interface, the user interface indicating the first building health score and the second building health score, and perform one or more operations based on at least one of the first building health score or the second building health score, the one or more operations improving at least one of the first building health score or the second building health score.

In some embodiments, at least one of the first building health score or the second building health score are certification levels provided by at least one of the first entity or the second entity.

In some embodiments, the instructions cause the one or more processors to perform the one or more operations by communicating operational commands to building equipment causing the building equipment to operate to improve the at least one of the first building health score or the second building health score.

In some embodiments, the instructions cause the one or more processors to perform the one or more operations by generating a work order including instructions to perform one or more maintenance activities for equipment of the building, wherein performing the one or more maintenance activities for the equipment improves the first building health score or the second building health score.

In some embodiments, the first scoring methodology is an internal scoring methodology and the second scoring methodology is an external soring methodology.

In some embodiments, the instructions cause the one or more processors to generate a campaign to bring the first building health score from a first level to a second level, wherein the campaign includes operations performed over time that cause the first building health score to increase from the first level to the second level, cause the user interface to include an indication of the campaign and receive an interaction with the campaign via the user device, and execute the campaign responsive to receiving the interaction with the campaign causing the operations to be performed over time.

In some embodiments, at least one of the first building health score or the second building health score include at least one of one or more space health scores indicating health levels of spaces of the building, one or more planet health scores relating to an effect of the building on environmental pollution, one or more people health scores relating to at least one of physical or mental health of occupants of the building, or an overall building health score based on the one or more space health scores, the one or more planet health scores, and the one or more people health scores.

In some embodiments, the instructions cause the one or more processors to generate a recommendation, the recommendation indicating one or more updates to the building, determine a first change to the first building health score resulting from the one or more updates to the building, determine a second change to the second building health score resulting from the one or more updates to the building, and cause the user interface to include an indication of the recommendation, the first change, and the second change.

In some embodiments, the first change and the second change are both increases or the first change is an increase and the second change is a decrease.

In some embodiments, the instructions cause the one or more processors to record first values of the first building health score and second values of the second building health score over time, generate a user interface element trending the first values of the first building health score and the second values of the second building health score over time, and cause the user interface to include the user interface element.

In some embodiments, the instructions cause the one or more processors to generate one or more first predictions of the first building health score at one or more future times based on the first values, generate one or more second predictions of the second building health score at one or more future times based on the second values, cause the user interface element to extend a first trend of the first building health score to the one or more future times with the one or more first predictions and extend a second trend of second building health score to the one or more future time with the one or more second predictions.

In some embodiments, the instructions cause the one or more processors to receive a selection of a future value of the first building health score at a future time, generate one or more actions that cause the first building health score to be the future value once the future time is reached, and implement the one or more actions.

Another implementation of the present disclosure is a method including receiving, by a processing circuit, a first building health score indicating a health level of the building and a second building health score indicating the health level of the building, the first building health score generated based on a first scoring methodology defined by a first entity and the second building health score generated based on a second scoring methodology defined by a second entity different from the first entity. The method includes causing, by the processing circuit, a display of a user device to display a user interface, the user interface indicating the first building health score and the second building health score and performing, by the processing circuit, one or more operations based on at least one of the first building health score or the second building health score, the one or more operations improving at least one of the first building health score or the second building health score.

In some embodiments, at least one of the first building health score or the second building health score are certification levels provided by at least one of the first entity or the second entity.

In some embodiments, the first scoring methodology is an internal scoring methodology and the second scoring methodology is an external soring methodology.

In some embodiments, the method further includes generating, by the processing circuit, a campaign to bring the first building health score from a first level to a second level, wherein the campaign includes operations performed over time that cause the first building health score to increase from the first level to the second level, causing, by the processing circuit, the user interface to include an indication of the campaign and receive an interaction with the campaign via the user device, and executing, by the processing circuit, the campaign responsive to receiving the interaction with the campaign causing the operations to be performed over time.

In some embodiments, at least one of the first building health score or the second building health score include at least one of one or more space health scores indicating health levels of spaces of the building, one or more planet health scores relating to an effect of the building on environmental pollution, one or more people health scores relating to at least one of physical or mental health of occupants of the building, or an overall building health score based on the one or more space health scores, the one or more planet health scores, and the one or more people health scores.

In some embodiments, the method further includes generating, by the processing circuit, a recommendation, the recommendation indicating one or more updates to the building, determining, by the processing circuit, a first change to the first building health score resulting from the one or more updates to the building, determining, by the processing circuit, a second change to the second building health score resulting from the one or more updates to the building, and causing, by the processing circuit, the user interface to include an indication of the recommendation, the first change, and the second change.

In some embodiments, the first change and the second change are both increases or the first change is an increase and the second change is a decrease.

Another implementation of the present disclosure is a building system of a building. The system includes one or more storage devices storing instructions stored thereon and one or more that, when executed by one or more processors, cause the one or more processors to receive a first building health score indicating a health level of the building and a second building health score indicating the health level of the building, the first building health score generated based on a first scoring methodology defined by a first entity and the second building health score generated based on a second scoring methodology defined by a second entity different from the first entity. The instructions cause the one or more processors to cause a display of a user device to display a user interface, the user interface indicating the first building health score and the second building health score and perform one or more operations based on at least one of the first building health score or the second building health score, the one or more operations improving at least one of the first building health score or the second building health score.

Building Data Health With Fault Analysis

Another implementation of the present disclosure is a building system of a building including one or more storage devices storing instructions thereon that, when executed by one or more processors, cause the one or more processors to receive data samples from building equipment of the building and identity whether one or more data samples of the data samples are anomalous indicating that the building equipment is experiencing a fault. The instructions cause the one or more processors to generate one or more data health scores for the building equipment based on whether the one or more data samples are anomalous, the one or more data health scores indicating quality levels of the data samples, cause a display of a user device to display a user interface, the user interface providing indications of the building equipment and the one or more data health scores, and perform one or more operations based on the one or more data health scores, wherein the one or more operations improve the quality levels of the data samples.

In some embodiments, the instructions cause the one or more processors to perform the one or more operations by communicating operational commands to the building equipment causing the building equipment to operate to improve the quality levels of the data samples.

In some embodiments, the instructions cause the one or more processors to perform the one or more operations by generating a work order including instructions to perform one or more maintenance activities on the building equipment, wherein performing the one or more maintenance activities on the building equipment improves the quality levels of the data samples.

In some embodiments, the building equipment includes pieces of building equipment of the building. In some embodiments, the one or more data health scores include an overall data health score for the building indicating an overall data health of data of the pieces of building equipment.

In some embodiments, the instructions cause the one or more processors to record values of a health score of the one or more data health scores over time as the values are generated, generate a trend element, the trend element providing a trend of the values of the health score, and cause the user interface to include the trend element.

In some embodiments, the data samples include building data sample sets produced by pieces of building equipment of the building equipment. In some embodiments, the pieces of building equipment include a first piece of building equipment of a first type that provides a first data sample set and a second piece of building equipment of a second type that provides a second data sample set. In some embodiments, the instructions cause the one or more processors to generate a first data health score based on the first data sample set and a second data health score based on the second data sample set, generate a user interface element including a first indication of the first type and a first corresponding indication of the first data health score and a second indication of the second type and a second corresponding indication of the second data health score, and cause the user interface to include the user interface element.

In some embodiments, the instructions cause the one or more processors to receive first data samples from a first piece of building equipment associated with a first building and receive second data samples from a second piece of building equipment associated with a second building, generate a first data health score for the first building, the first data health score indicating first quality levels of the first data samples, generate a second data health score for the second building, the second data health score indicating second quality levels of the second data samples, generate a user interface element including a first indication of the first building and a first corresponding indication of the first data health score, a second indication of the second building and a second corresponding indication of the second data health score, and cause the user interface to include the user interface element.

In some embodiments, the instructions cause the one or more processors to execute a first application and a second application, identify, from the data samples, a first data set consumed by the first application and a second data set consumed by the second application, generate a first data health score based on the first data set and a second data health score based on the second data set, generate a user interface element including a first indication of the first application and a first corresponding indication of the first data health score and a second indication of the second application and a second corresponding indication of the second data health score, and cause the user interface to include the user interface element.

In some embodiments, the building equipment include a first building device and a second building device. In some embodiments, the data samples includes first building data samples of the first building device and second building data samples of the second building device. In some embodiments, the one or more data health scores include a first data health score for the first building device based on the first building data samples and a second data health score for the second building device based on the second building data samples. In some embodiments, the instructions cause the one or more processors to generate a user interface element including a first indication of the first building device and a first corresponding indication of the first data health score and a second indication of the second building device and a second corresponding indication of the second data health score and cause the user interface to include the user interface element.

In some embodiments, the instructions cause the one or more processors to identify data anomalies of the data samples by performing at least one of determining whether a data value of a data sample of the data samples is outside a range of values, determining whether values of data samples of the data samples change at a rate that is outside a range of rates of change, or performing a peer comparison by comparing data samples of the data samples of the building equipment to a peer metric, the peer metric based on data samples of pieces of building equipment of a same type as the building equipment.

In some embodiments, the instructions cause the one or more processors to generate, based on the data samples, the one or more data health scores by identifying a number of data samples of the data samples, performing a comparison by comparing the number of data samples to an expected number of data samples, and generating the one or more data health scores based on the comparison and whether the one or more data samples of the data samples are anomalous.

In some embodiments, a value of a health score of the one or more data health scores decreases non-linearly with an increase to a number of data anomalies of the data samples.

Another implementation of the present disclosure is a method including receiving, by a processing circuit, data samples from building equipment of a building, identifying, by the processing circuit, whether one or more data samples of the data samples are anomalous indicating that the building equipment is experiencing a fault, generating, by the processing circuit, one or more data health scores for the building equipment based on whether the one or more data samples are anomalous, the one or more data health scores indicating quality levels of the data samples, causing, by the processing circuit, a display of a user device to display a user interface, the user interface providing indications of the building equipment and the one or more data health scores, and performing, by the processing circuit, one or more operations based on the one or more data health scores, wherein the one or more operations improve the quality levels of the data samples.

In some embodiments, the method includes performing, by the processing circuit, the one or more operations includes communicating operational commands to the building equipment causing the building equipment to operate to improve the quality levels of the data samples.

In some embodiments, the method includes recording, by the processing circuit, values of a health score of the one or more data health scores over time as the values are generated, generating, by the processing circuit, a trend element, the trend element providing a trend of the values of the health score, and causing, by the processing circuit, the user interface to include the trend element.

In some embodiments, the method includes executing, by the processing circuit, a first application and a second application, identifying, by the processing circuit, from the data samples, a first data set consumed by the first application and a second data set consumed by the second application, generating, by the processing circuit, a first data health score based on the first data set and a second data health score based on the second data set, generating, by the processing circuit, a user interface element including a first indication of the first application and a first corresponding indication of the first data health score and a second indication of the second application and a second corresponding indication of the second data health score, and causing, by the processing circuit, the user interface to include the user interface element.

In some embodiments, the method includes identifying, by the processing circuit, data anomalies of the data samples by performing at least one of determining whether a data value of a data sample of the data samples is outside a range of values, determining whether values of data samples of the data samples change at a rate that is outside a range of rates of change, or performing a peer comparison by comparing data samples of the data samples of the building equipment to a peer metric, the peer metric based on data samples of pieces of building equipment of a same type as the building equipment.

In some embodiments, the method includes generating, by the processing circuit, based on the data samples, the one or more data health scores by identifying a number of data samples of the data samples, performing a comparison by comparing the number of data samples to an expected number of data samples, and generating the one or more data health scores based on the comparison and whether the one or more data samples of the data samples are anomalous.

In some embodiments, a value of a health score of the one or more data health scores decreases non-linearly with an increase to a number of data anomalies of the data samples.

Another implementation of the present disclosure is a building system of a building including one or more storage devices storing instructions thereon and one or more processors configured to execute the instructions causing the one or more processors to receive data samples from building equipment of the building. The instructions cause the one or more processors to identity whether one or more data samples of the data samples are anomalous indicating that the building equipment is experiencing a fault, generate one or more data health scores for the building equipment based on whether the one or more data samples are anomalous, the one or more data health scores indicating quality levels of the data samples, cause a display of a user device to display a user interface, the user interface providing indications of the building equipment and the one or more data health scores, and perform one or more operations based on the one or more data health scores, wherein the one or more operations improve the quality levels of the data samples.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 15 is an occupant health interface, according to an exemplary embodiment.

FIG. 16B is another space performance user interface including infection risk and air quality information, according to an exemplary embodiment.

FIG. 16D is a user interface including optional adjustments for one of the recommendations of the interface of FIG. 16C, according to an exemplary embodiment.

FIG. 16E is a user interface including accepted operational adjustments for the one recommendation of FIG. 16D, according to an exemplary embodiment.

FIG. 16F is a user interface including optional adjustments for another one of the recommendations of the interface of FIG. 16C, according to an exemplary embodiment.

FIG. 16G is a user interface including recommendations where a first recommendation needs to be reset before a second recommendation can be accepted, according to an exemplary embodiment.

FIG. 21 is a table of light parameter scoring, according to an exemplary embodiment.

FIG. 22 is a table of light sunshade parameter scoring, according to an exemplary embodiment.

FIG. 24 is a table of healthy building parameter scoring, according to an exemplary embodiment.

FIG. 26 is a table of sanitization parameter scoring, according to an exemplary embodiment.

FIG. 27 is a table of food parameter scoring, according to an exemplary embodiment.

FIG. 28 is a table of fitness parameter scoring, according to an exemplary embodiment.

FIG. 29 is a table of handwashing parameter scoring, according to an exemplary embodiment.

FIG. 30 is a table of water quality parameter scoring, according to an exemplary embodiment.

FIG. 34 is a table of mind parameter scoring, according to an exemplary embodiment.

FIG. 35 is a table of social parameter scoring, according to an exemplary embodiment.

FIG. 36 is a table of physical user health parameter scoring, according to an exemplary embodiment.

FIG. 39 is a schematic drawing of a building health interface for a group of buildings, according to an exemplary embodiment.

FIG. 40 is a schematic drawing of a building health interface for one building of the group of buildings of FIG. 39, according to an exemplary embodiment.

FIG. 41 is a schematic drawing of people health information interface of the one building of the group of buildings of FIG. 40, according to an exemplary embodiment.

FIG. 43 is a schematic drawing of the building health interface of FIG. 40 where a user selects an air quality alert with an associated recommendation, according to an exemplary embodiment.

FIGS. 45A-B is a schematic drawing of an interface showing infectious disease related risk information and recommendations, according to an exemplary embodiment.

FIGS. 46A-B is a schematic drawing of an interface including recommendations addressing infectious disease transmission risk, according to an exemplary embodiment.

FIG. 47 is a schematic drawing of an interface including recommendations for improving user health scores, according to an exemplary embodiment.

FIG. 49 is a command and control interface where a user can input operating settings for building equipment, according to an exemplary embodiment.

FIG. 50 is a user interface including recommendations relating to indoor health, according to an exemplary embodiment.

FIG. 51 is a user interface of an audit log of recommendations of the user interface of FIG. 50, according to an exemplary embodiment.

FIG. 52 is a user interface including recommendations relating to occupant comfort, according to an exemplary embodiment.

FIG. 53 is a user interface including recommendations relating to space utilization, according to an exemplary embodiment.

FIG. 54 is a user interface including recommendations relating to energy efficiency, according to an exemplary embodiment.

FIG. 55 is a user interface including recommendations relating to asset upkeep, according to an exemplary embodiment.

FIGS. 56A-B is a user interface including indoor health recommendations, employee productivity recommendations, space utilization recommendations, energy efficiency recommendations, and asset upkeep recommendations, according to an exemplary embodiment.

FIG. 58 is a user interface indicating energy consumption for a space that a user searches for, according to an exemplary embodiment.

FIG. 60 is a schematic diagram of a user interface providing scoring for factors of the external scoring model, according to an exemplary embodiment.

FIG. 61 is a schematic diagram of a user interface including healthy building scoring for the building, according to an exemplary embodiment.

FIG. 62 is a schematic diagram of a user interface including people related healthy building scores for the building, according to an exemplary embodiment.

FIG. 65 is a schematic diagram of the user interface of FIG. 64 providing a recommendation for improving the healthy building scoring for the building and including a key indicating various ranges of capital costs for a building performance improvement, according to an exemplary embodiment.

FIGS. 67A-B are a schematic diagram of a user interface including data health scores, according to an exemplary embodiment.

FIGS. 68A-B are a schematic diagram of a user interface including data health scores for various data sources and of data metrics for the various data sources used to determine the data health scores, according to an exemplary embodiment.

DETAILED DESCRIPTION

Overview

Figure 1:
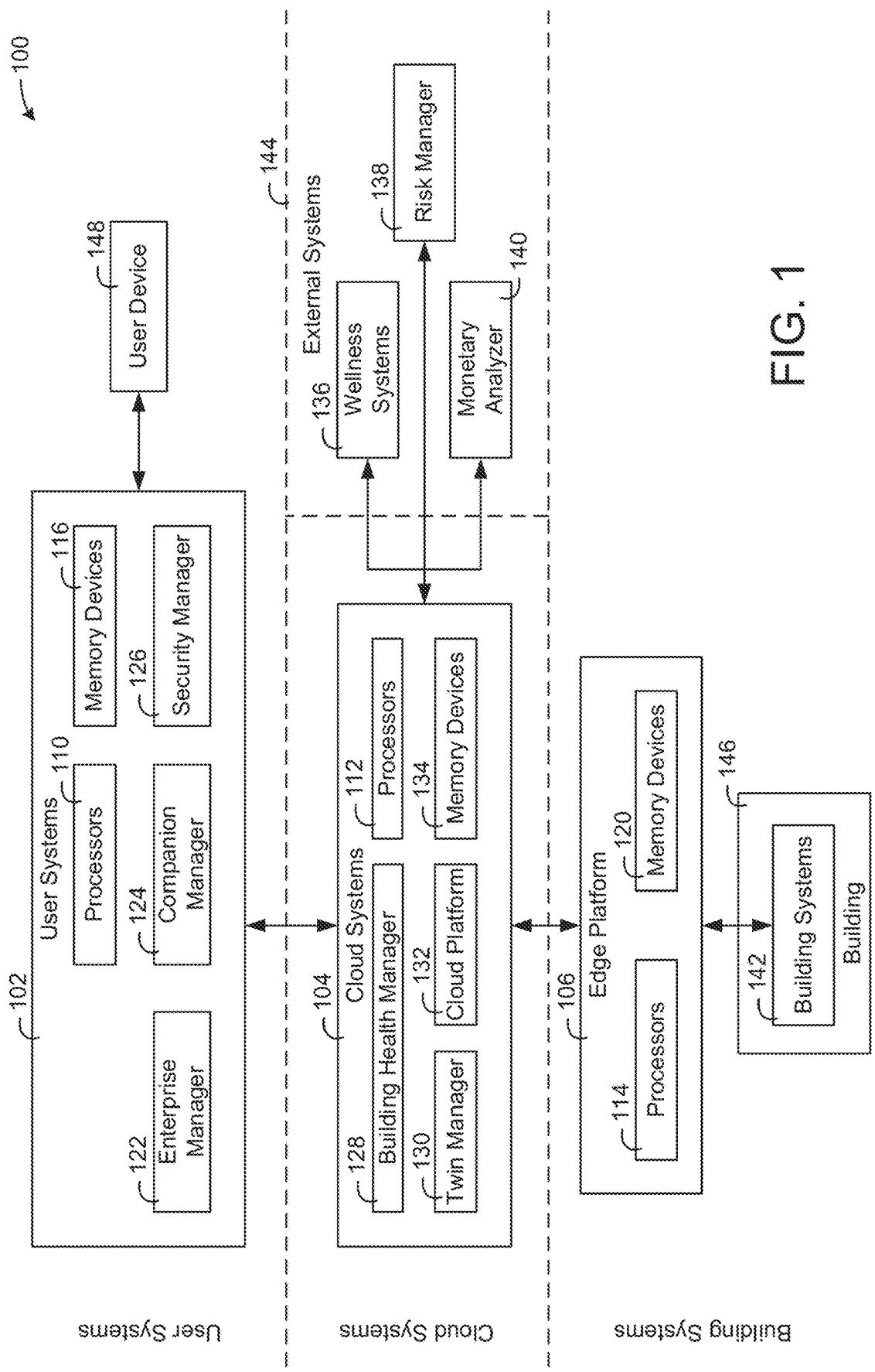
FIG. 1 is a block diagram of a system including building systems, cloud systems, and user systems including a building health manager for managing building health, according to an exemplary embodiment.

Referring generally to the FIGURES, systems and methods for building health analysis are shown, according to an exemplary embodiment. A building system can perform a building health analysis to determine an overall building health score for a building, for a building facility, and/or for multiple buildings, in some embodiments. The overall building health score can be based on factors that affect the health of spaces within the building, people within the building, and/or environmental conditions of the planet.

By incorporating the health of spaces, people, and the planet into a single score, a high level conclusion of the performance of the building can be reached. If the parameters are considered by the building system individually, the building system may be biased towards that parameter since the other parameters may be ignored. For example, if person health is considered exclusively, excess pollution could be created by the building negatively affecting the planet. Therefore, a composite score considering parameters for spaces, people, and the planet can be generated and used by the building system to operate the building.

Furthermore, the various parameters of a building and/ro building system may be disparate, partially or completely unrelated. For example, parameters that deal with occupant productivity may be unrelated to parameters that deal with equipment maintenance. Therefore, to consider these components, or scores for these components and draw an overall conclusion for the health of a building may be difficult. For example, a user interface that individually illustrates occupant productivity scores and equipment maintenance scores may be difficult for a user to comprehend or make sense of. However, higher level scores that combine various lower level scores each for a different disparate parameter and/or are based on a variety of disparate parameters can allow for a user to readily and effectively understand the health of their building. My combining multiple disparate parameters together under a higher level score, which can be viewed in a user interface, a user is presented with greater insight than they would otherwise be capable of determining through analyzing each disparate parameter individually.

In some embodiments, the building system determines individual scores for various parameters related to building health, user health, and planet health. The building system can generate user interfaces to display the various scores for the various building health parameters, user health parameters, and/or planet health parameters. Furthermore, the user interfaces can include overall building health scores generated by the building system from the building health parameters, the user health parameters, and/or the planet health parameters.

In some embodiments, the user interface can highlight issues causing the various scores shown in the user interface to be low, below particular values. The building system can, in some embodiments, analyze the building data to determine recommendations to raise the various scores. The recommendations can, in some implementations, be user actions that the user can perform or authorize the building system to perform the actions. In some embodiments, the building system is configured to take automatic actions to improve the score(s).

In some embodiments, the recommendations may impact multiple health scores, e.g., planet health scores, people health scores, and space health scores. The recommendation can indicate whether each health score is impacted positively or negatively by the recommendation. For example, increasing air circulation in order to increase space sanitization for people health may increase people health scores but cause the building to consume additional energy, reducing the sustainability score for planet health. In addition, there may be a monetary cost that could be calculated by the building system for recommendations. The cost could be displayed within the recommendations. Recommendations with impact indications and cost would be valuable for building personnel to decide whether to implement recommendations.

In some embodiments, the building system is configured to optimize multiple health parameters in a building in order to achieve the best and/or a balanced set of parameters for health of people, places, and planet scores. For example, the building system could be configured to optimize air temperatures, clean air conditions, efficient use of energy resources, efficient cleaning and sanitization processes, reliable system performance, and/or facility security. The optimization performed by the building system could make it easy for facility managers to select building operating modes that automatically optimize multiple building health parameters to achieve appropriate outcomes rather than achieving some outcomes but sacrificing others. Using artificial intelligence (AI) and digital twin technologies, the building system can be configured to create an autonomously controlled healthy building that operates to optimize occupant health, space health, and/or planet health and/or provide recommendations to prioritize some parameters over others.

By tracking health scores of a building, the building system can identify performance issues and automatically, or through user action, perform operations to improve health score(s) of a building. For example, the building system can operate to make sure that a building has appropriate Wi-Fi coverage and reliable network bandwidth. Furthermore, the building system can operate to improve air quality and/or water quality. In some embodiments, the building system operates to efficiently consume resources such as water and electricity. In some embodiments, the building system can operate to reduce equipment system faults. In some embodiments, the building system can operate to maintain building equipment by scheduling maintenance and inspection. In some embodiments, the building system can operate to verify that cleaning is scheduled for cleaning staff at appropriate times.

In some embodiments, the building system can integrate external scoring model standards developed by other entities (e.g., a different software developer, standards body, equipment manufacturer, service offering body, business, etc.). The entity of the external scoring model can be a different entity than the developer (e.g., software developers, architects, software company, hardware company, etc.) of the building system described herein. The building system can receive indications of the methodologies (e.g., scoring rules) of the external scoring model and implement the external scoring model. In this regard, the building system can run its own internal scoring methodology but also one or multiple external scoring methodologies. This allows users to review, within a single application or in one or multiple user interfaces, how their building scores according to different methodologies. In some cases, the building system can provide various scores of an internal scoring methodologies (scoring methodologies defined by the entity that developed the building system) but also certifications resulting from scores of external scoring methodologies.

The building system allows for a flexible integration of one or more different external scoring methodologies allowing for a plug-and-play functionality for scoring model integration. Instead of requiring significant reconfiguration of the software run by the building system, the system can receive an indication of a scoring methodology from a user, ingest the scoring methodology, run the new scoring methodology responsive to the user request. This allows the building systems scoring to be flexible and adapt to the preferences of the user without requiring a software developer to redevelop the building system. In some embodiments, the building system can retrieve the scoring methodology through an API of a system that stores the scoring methodology. As new scoring methodologies are developed and/or adopted in an industry, the building system can flexibly integrate the new scoring methodologies by connecting to an external system, receiving the external scoring methodology, and running the external soring methodology, all without requiring software redevelopment or requiring a user to install new software of the external system for the external scoring methodology. Furthermore, this allows the user to continue using the software developed by the building system instead of installing, learning, and/or using new software. Furthermore, by integrating external scoring methodologies into the building system, credential management of login credentials is improved. Normally, credentials would need to be stored for the building system and each external system running an external scoring methodology. However, because the external scoring methodologies are all integrated into the building system, the only credential that needs to be stored is the credential for the building system.

A user interface generated by the building system, in some embodiments, can track multiple scores generated via one or more external scoring standards and/or one or more internal scoring standards. Because each scoring standard may score a building differently, understanding the relationships between scoring standards may be important for a user to plan the various improvements that the user makes for the building. For example, a building renovation may have different levels of impact to each of the scoring standards. In some cases, a building renovation may have a positive impact to one score and a negative impact to another score. In this regard, the user interface can provide a user with indications of the scores of the various scoring standards and data indicating how the various scores are interrelated.

Because the user interface integrates multiple scores of multiple scoring standards together, new scores of scoring standards can be added without requiring the development of an interface specific to the new scoring standard. Furthermore, this user interface simplifies and consolidates the information of the various scores of the various scoring standards making the user interface more intuitive without requiring the user to switch between multiple different user interfaces, each specific to one scoring standard, to understand the interrelations between the various scoring standards. Also, because the scoring methodologies are combined within one user interface, the building system does not require a software application to store a user interface for each scoring methodology. This memory reduction makes the software application lighter requiring less memory and/or processing capabilities for a system running the software application.

In some embodiments, the building system can perform data health scoring for the building. The building system may collect data from various data sources, e.g., gateways, building controllers, external data sources, etc. The building may operate against the collected data, e.g., to make control decisions, derive analytics, determine insights, etc. The health of the data may affect control decisions and/or derived information. In this regard, it may be important to have healthy and reliable data for the building system. In some embodiments, the building system can perform various analysis operations to identify, score, track, and/or improve the health of data. Data health scores resulting from the analysis can be displayed in a user interface. Data health scores can indicate the level of quality of data, e.g., whether the data is reliable, free from errors, free from corruptions, free from anomalies, produced by a fault free data source, etc. The building system can generate an overall data health score for a building. In some embodiments, the overall data health score is based on lower level data health scores, e.g., data health scores generated for specific buildings of a group of buildings, specific device types of groups of device types, specific devices of each device group, applications associated with the data, etc.

The data health scores can provide a user with an insight to the quality of their data and allows the user to make updates and/or improvements to their building systems which improve the quality of their data. Furthermore, the user interface allows for a user to track how the updates are improving their data quality. This improvement of data quality leads to an improvement in the performance of control algorithms and/or analytics that consume the underlying data. The user interface can illustrate data health by device, device type, building, etc. Furthermore, the building system can identify what portion of data from data produced by data sources of the building is consumed by an application. The building system can score the portion of data to identify the specific data health of data for the application. This can provide a user with a unique insight of data health not just for data sources, but specific to applications that consume the data of the data sources. This application based health score would not be clear from only data health for the data sources.

In some embodiments, the various scores that are generated by the building system as discussed herein can be validated with user input. In some cases, a score generated by the building system may appear to be correct based on the data which the building system generates the score based on, but the score may not actually correctly reflect the reality of a building. For example, the building system may generate a people health score for a building to be a high value because the building system stores data indicating that the building includes a gym with workout equipment. However, if the workout equipment is broken or is not functioning properly, in reality, the score should be generated to a lower level. In this regard, the building system can provide questions to various users of the building inquiring whether they agree or disagree with various scores generated by the building system and/or inquiring regarding various features of the building. The building system can collect the user feedback and generate an indication of the user feedback agreeing or disagreeing with the generated scores. In some embodiments, the building system can cause user interfaces displaying the scores generated by the building system to also include an indication of whether occupants of the building verified the scores of the building.

Normally, the building system would verify information (e.g., health scores) through the measurements of sensors of the building. However, missing sensor or broken sensors makes this sensor based verification difficult. Furthermore, some conditions measured by the building system may not be directly measurable through sensors. By using user feedback, the building system can verify health scores that it may not normally be able to verify.

Referring now to FIG. 1, a system 100 including building systems, cloud systems, and user systems including a building health manager for managing building health, according to an exemplary embodiment. The system 100 includes an edge platform 106, cloud systems 104, user systems 102, and/or external systems 144 (e.g., wellness systems 136, monetary analyzer 140, and/or a risk manager 138). The edge platform 106, the cloud systems 104, and/or the user systems 102 include processors 110-114 and/or memory devices 116-120.

The processors 110-114 and/or memory devices 116-120 can be devices of one or multiple servers, computer systems, cloud systems, etc. The processors 110-114 can be general purpose or specific purpose processors, application specific integrated circuits (ASICs), one or more field programmable gate arrays (FPGAs), a group of processing components, and/or other suitable processing component. The processors 110-114 may be configured to execute computer code and/or instructions stored in the memory devices 116-120 or received from other computer readable media (e.g., CDROM, network storage, a remote server, etc.).

The memory devices 116-120 can include one or more devices (e.g., memory units, memory devices, storage devices, etc.) for storing data and/or computer code for completing and/or facilitating the various processes described in the present disclosure. The memory devices 116-120 can include random access memory (RAM), read-only memory (ROM), hard drive storage, temporary storage, non-volatile memory, flash memory, optical memory, or any other suitable memory for storing software objects and/or computer instructions. The memory devices 116-120 can include database components, object code components, script components, or any other type of information structure for supporting the various activities and information structures described in the present disclosure. The memory devices 116-120 can be communicably connected to the processors 110-114 and can include computer code for executing (e.g., by the processors) one or more of the processors 110-114 described herein.

The cloud systems 104 includes a twin manager 130 and a cloud platform 132. The twin manager 130, the cloud platform 132, and/or the edge platform 106 can be the same as, or similar to, the components described U.S. patent application Ser. No. 17/134,671 filed Dec. 28, 2020, the entirety of which is incorporated by reference herein. The cloud systems 104 further include a building health manager 128. The edge platform 106 can be configured to integrate with building systems 142 to receive building data and provide the building data to the cloud systems 104. Furthermore, the cloud platform 132 can facilitate routing of the building data and/or enrichment of the building data based on a digital twin of a building managed by the twin manager 130. In some embodiments, the building systems 142 are environmental control systems, lighting systems, security systems, fire response systems, and/or any other type of building system.

The building health manager 128 can be configured to generate health scores for parameters such as planet health parameters, people health parameters, and/or space health parameters. Furthermore, the building health manager 128 can be configured to generate an overall health score from the scores for the planet health parameters, people health parameters, and/or space health parameters. The building health manager 128 can receive data from the building systems 142 and generate the scores for the planet health parameters, people health parameters, and/or space health parameters. The building health manager 128 can generate a building automation system (BAS) performance index, a light management system (LMS) performance index, a shade performance index, etc.

The building health manager 128 can receive building data from the building systems 142 and/or the external systems 144 for determining person health scores. The building data can include temperature, humidity, indoor air quality (IAQ), building lighting information, building sunshade information, seating information, sanitization information, emergency information, dining options, social distancing information, thermal control data, occupancy data, mental health data, social event data, etc. The building health manager 128 can determine occupant health scores for occupants and/or perform one or more control operations to improve the person health scores. For example, the building health manager 128 can determine and/or update control values for temperature, humidity, IAQ, light, and/or sunshade to improve person health scores.

The building health manager 128 can generate scores for system health of a building 146. The system health scores for building management systems (BMS), light management systems (LMS), sunshade systems, electrical metering and fire alarm systems, accessibility, transportation systems, parking management systems, power generation, access control systems, recycling systems, etc. Furthermore, the building health manager 128 can generate safety and security system health scores based on hardware point data, cyber security data (e.g., network cyber security data, Wi-Fi security data, firewall and/or port blocking data, antivirus data, etc.), fire alarm and suppression system data, electrical system data, water leak detection data, fire suppression system data, sprinkler system data, smoke detection data, staircase pressurization system data, evacuation system data, etc. Furthermore, the building health manager 128 can determine resource health scores for electrical usage, gas usage, and/or water usage (e.g., chilled or heated water usage) based on meter data received from the building systems 142.

The building health manager 128 can receive security system data from CCTVs, intrusion systems, glass-break systems, number plate recognition systems, evacuation system data, facial recognition systems, biometric reader systems. Furthermore, the building health manager 128 can be configured to generate service health scores indicating mechanical, electrical, sound systems, chemical systems, life safety, and transportation system, and/or plumbing system service.

In some embodiments, the building data received from the edge platform 106 is ingested and stored in a digital twin of the building 146 managed by the twin manager 130. The digital twin can be the digital twin described in U.S. patent application Ser. No. 17/134,671 filed Dec. 28, 2020. The digital twin can be a graph including edges and nodes representing the entities of the building 146 (e.g., the building 146, spaces of the building 146, devices, users, systems, etc.) and relationships between the entities. In some embodiments, the digital twin can store health data of the building 146 used by the building health manager 128 to generate the planet health scores, space health scores, people health scores, and/or overall building scores. The digital twin can store health related metadata descriptions for points, devices, systems, equipment, spaces, buildings, etc. The digital twin can, in some embodiments, store health scores for the entities of the digital twin, e.g., health scores for buildings, spaces, people, etc.

In some embodiments, the building health manager 128 can be configured to search and filter health criteria for displaying health information and scores on a user device 148. Furthermore, various building control operations, e.g., calculations, logic, workflows, automation, machine learning, artificial intelligence, etc. that the building health manager 128 may execute to control the building systems 142, can all incorporate health scores for inputs and outputs of the building control operations. In this regard, the building control operations may execute to account for health and improve health scores. For example, a machine learning algorithm that determines setpoints to use in a zone based on predicted occupancy can incorporate health scores into the setpoint optimization to determine setpoints that result in ideal health scores.

The cloud systems 104 are configured to receive health data from the various external systems 144. The health data received from the external systems 144 can be used by the building health manager 128 to determine health scores. For example, the cloud systems 104 can connect with other external systems 144 managed and/or owned by the same or a different entity, e.g., partner systems. The wellness systems 136 can provide information on the mental, emotional, and/or physical health of occupants of the building 146. The risk manager 138 can provide risk related data for the building 146, the building systems 142 of the building 146 and/or occupants of the building 146. For example, the risk manager 138 can provide risk scores to the cloud systems 104. The risk manager 138 can be the systems described in U.S. application Ser. No. 16/143,221 filed Sep. 26, 2018, the entirety of which is incorporated by reference herein. The external systems 144 further include a monetary analyzer 140. The monetary analyzer 140 can be configured to perform monetization optimizations and/or provide expense reports of the building 146 to the cloud systems 104 based on the operation of the building systems 142.

The system 100 includes a user device 148. The user device 148 can be any device that provides information to a user and receives input from the user. The user device can include various input and/or output devices, e.g., a keyboard, a mouse, a touch screen, a microphone, a speaker, a display, etc. The user device 148 can be a smartphone, a tablet, a laptop, a desktop computer, a console, a smart television, etc.

The user systems 102 can manage user interfaces displayed on the user device 148. The user systems 102 can generate the user interfaces and cause the user device 148 to display the user interfaces. In some embodiments, the user systems 102 can be configured to provide input to the user systems 102 via the user interfaces. The user systems 102 include an enterprise manager 122, a companion manager 124, and a security manager 126. The user interfaces may be the user interfaces shown and described with reference to FIGS. 13-18, 37, and 38.

The enterprise manager 122 can generate one or more interfaces that provide visibility to building health aspects with health scores, descriptions, trends, insights, and/or actionable recommendations. The enterprise manager 122 can provide easy, intuitive navigation and drill down for rollups of health data to organize detailed information related to concepts and scores. Furthermore, the interfaces can include progress reports.

The companion manager 124 can provide occupant health information in user interfaces. The occupant health information can include feedback on clean, comfortable spaces (e.g., air, water, light, sanitization, etc.), social distancing and connectivity information, productivity measures, nourishment and fitness goals, reward points, etc. Furthermore, the companion manager 124 can provide user interfaces including health information for spaces. The information can include systems availability and/or provide feedback on janitorial services. Furthermore, the companion manager 124 can provide planet health information. For example, the interface can include responsibility and conversation information, corporate sustainability progress and success, nature information, and/or reward points.

The security manager 126 can provide security information via user interfaces for security professionals. The information can include health for spaces (e.g., places within a building), safety and security risk information, process and actionable recommendations for improving health and/or risk, etc.

In some embodiments, the cloud systems 104 can receive data from the building systems 142 and/or the external systems 144. The building health manager 128 can generate health scores based on the data. The data can include space equipment relationships, time series data for temperature, humidity, pressure, IAQ, velocity, light and sunshade data. In some embodiments, the building health manager 128 can be configured to generate thermal, air, and/or light health scores based on the data. Furthermore, based on the data, the health manager 128 can perform HVAC, light, and/or sunshade command and/or control. In some embodiments, the cloud systems 104 can manage a pest administration portal to review and schedule pest control for the building 146.

In some embodiments, the building health manager 128 can be configured to receive mechanical and/or electrical fault data from the building systems 142. Based on the fault data (or the absence of fault data), the building health manager 128 can generate building health scores for the building 146. The fault data can include high air pressure faults, high water pressure faults, high temperature faults, coil freezing faults, high voltage faults, overload faults, short circuit faults, earth faults, high harmonic faults, etc.

Figure 2:
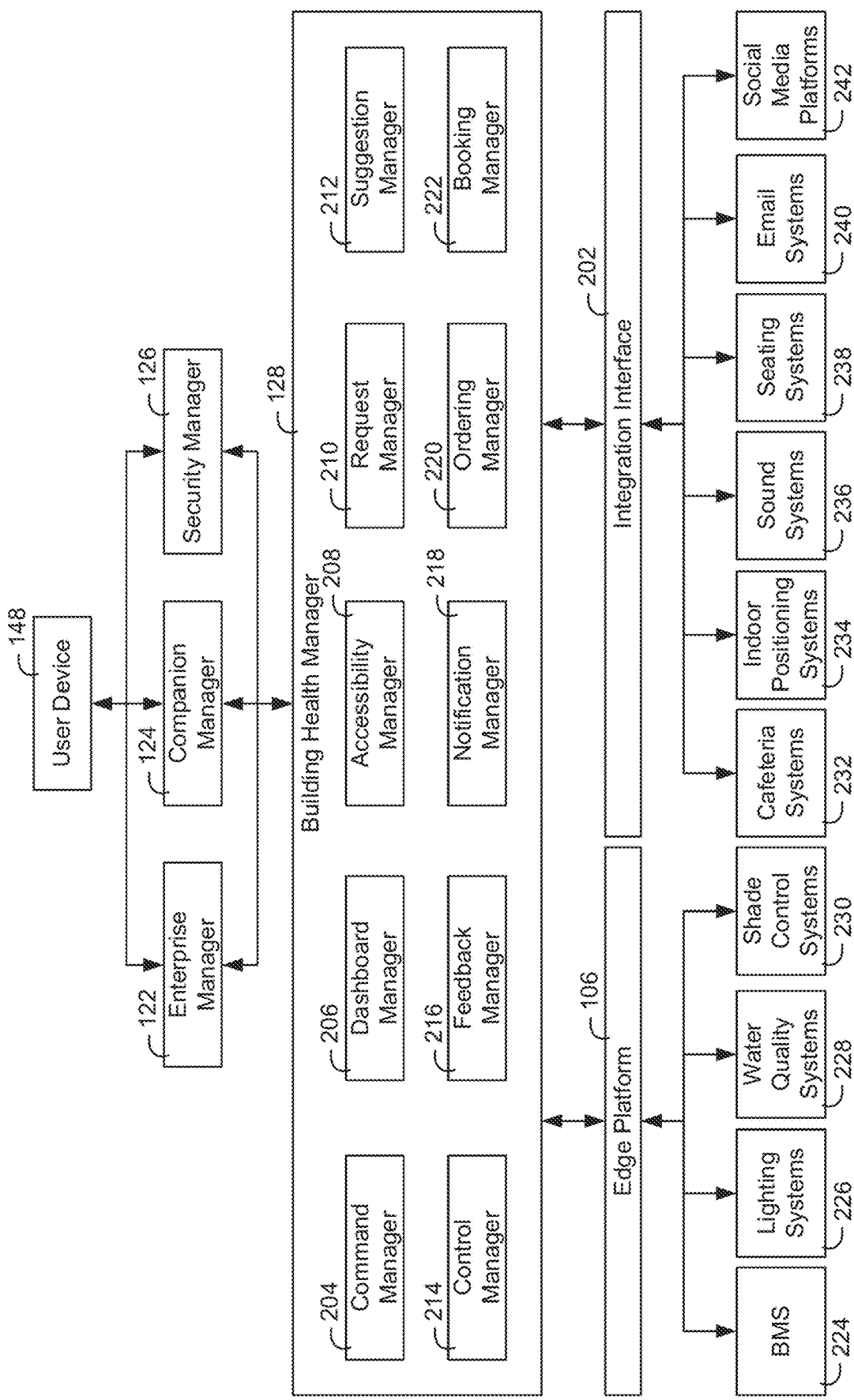
FIG. 2 is a block diagram of the building health manager in greater detail, according to an exemplary embodiment.

Referring now to FIG. 2, the building health manager 128 is shown in greater detail, according to an exemplary embodiment. The building health manager 128 is shown to receive building data from systems 224-242 via the edge platform 106 and via an integration interface 202. The systems 224-242 can be systems of the building systems 142. In some embodiments, the integration interface 202 is an Application Programming Interface (API) that interfaces systems 234-242 with the building health manager 128. The building management system (BMS) 224 which can include systems for heating the building 146, cooling the building 146, controlling air quality within the building 146, etc. The lighting systems 226 can include lights and/or light control systems configured to control lighting parameters in various zones of the building 146, e.g., turn lights on or off, control the level of light, control the hue of light, etc.

The water quality systems 228 can be configured to measure water quality of water for the building 146, e.g., water used in the building 146 or used by particular systems of the building 146. The shade control system 230 can be configured to control the shades (e.g., control shade position) of various windows of the building 146. The cafeteria systems 232 can be configured to manage food ordering and/or food delivery within the building 146. The indoor positioning systems 234 can be configured to identify occupants and/or track the location of occupants within the building 146, e.g., through Wi-Fi triangulation or trilateration, Bluetooth beacons, 5G tracking, GPS, etc.

The sound systems 236 can be control sound played by speakers throughout various zones of the building 146. The sound systems 236 can control announcements, music, white noise, etc. The email systems 240 can manage email servers for sending and/or receiving emails. The email systems 240 can manage email accounts for various employees, tenants, and/or users of the building 146. The social media platforms 242 can be a social media platform that facilitates message post feeds, group conversations, messaging, etc. The social media platforms 242 can include social media accounts for the building 146 or entity, e.g., a company, a tenant of the building 146, an employee of the building 146, etc.

The seating systems 238 can be systems that perform desk scheduling, e.g., hot-desking. Furthermore, the seating systems 238 can track the number and locations of desks, seats, tables, chairs, couches, etc. throughout the building. For example, the seating systems 238 can provide the building health manager 128 with data pertaining to seating, seating scheduling, and/or what types of seats occupants are using.

The building health manager 128 includes various components for managing or operating the systems 224-242. The building health manager 128 includes a command manager 204, a dashboard manager 206, an accessibility manager 208, a request manager 210, a suggestion manager 212, a control manager 214, a feedback manager 216, a notification manager 218, an ordering manager 220, and a booking manager 222.

The command manager 204 can be configured to control systems 224-242. The command manager 204 can receive commands for controlling characteristics of the building 146 from the user device 148 and operate the systems 224-242 based on the commands. The command manager 204 can control zone temperature, control HVAC equipment on or off status, control optimum equipment start, control humidity, control indoor air quality (IAQ), control static pressure, operate an air/night purge mode, control air velocity in the building 146, control particulate matters in the building 146, activate filters, control organic gasses in the building 146, control inorganic gasses in the building 146, control radon levels in the building 146, control water quality in the building 146, control water temperature, turn lights on or off, control light intensity, control sunshades, control noise levels of the building 146, control music played in the building 146, personalize comfort, turn desk lights on or off, control desk light intensity, control desk light color, control music played in a gym, etc.

The dashboard manager 206 can generate dashboards for display via the user device 148. The user device 148 can provide input via the dashboards. The dashboard can display, and/or provide control over, zone temperature, static pressure, air velocity, particulate matters, gasses, water quality, light status, sunshade status, sanitization status, gym occupancy status, etc.

The feedback manager 216 can aggregate feedback received from the user device 148. The feedback manager 216 can generate feedback reports based on the feedback collected. The feedback reports can include complaints and/or feedback over building smell, water quality, noise levels, employee sickness, etc.

The accessibility manager 208 can facilitate navigation or directions for the user device 148. The accessibility manager 208 can receive navigation requests via the user device 148 and generate navigation directions for display to the user via the user device 148. The navigation directions can aid users in finding or viewing information pertaining to water refilling stations, eating areas, contract tracing, gardens, other employees, rooms, etc. In some embodiments, the accessibility manager 208 receives data from elevator systems and/or escalator systems.

The notification manager 218 can be configured to generate alerts pushed and/or communicated to the user device 148. The alerts can be a dehydration alert, a sunshade alert, a sanitization completed alert, duress alarms, a food order ready alert, a fruit basket arrived alert, a lunch break alert, a coffee break alert, an eye relaxation alert, a social distancing alert, a health data alert, a fitness program alert, a pest control status, a fitness awareness alert, a no movement alert, a gym occupancy alert, a hand washing alert, a sanitization alert, a medical emergency alert, an indoor air quality alert, a bush fire alert, a mental health program alert, a nearby social event alert, etc.

The request manager 210 can receive requests from the user device 148 and make control updates and/or notify technicians to improve systems of the building 146 based on the requests. The requests may be requests to improve smell, improve air replacement, add more water refilling stations, request a desk or room booking, request sanitization for an area or desk, order food, pest control, playing music in a gym, facilitate air replacement, book a bicycle or vehicle, etc.

The ordering manager 220 can be configured to order food and/or drinks for users. A user can place an order to the cafeteria systems 232 via the user device 148. In some embodiments, the order can include a delivery request with delivery location (e.g., employee desk).

The suggestion manager 212 can be configured to generate suggestions for improving employee mental and/or physical health. The suggestion manager 212 can send the suggestions to the user device 148. The suggestions may be nourishment education, physical activity suggestions, hand washing suggestions, mental health suggestions, suicide prevention help, etc. The booking manager 222 can be configured to facilitate room or desk booking. For example, the booking manager 222 can book conference rooms, meeting rooms, make gym appointment bookings, etc. Furthermore, the booking manager 222 can facilitate desk booking, e.g., hot-desking.

Figure 3:
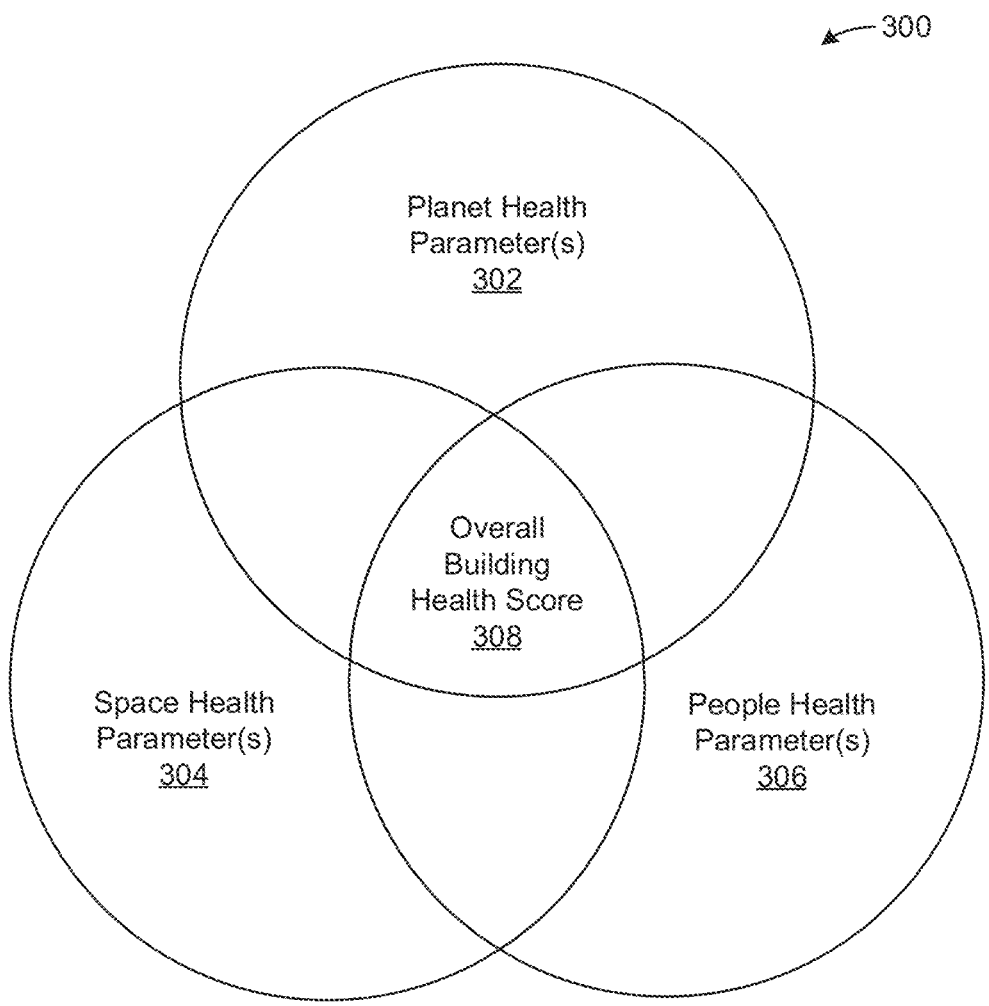
FIG. 3 is a Venn diagram of planet health parameters, space health parameters, and people health parameters contributing to an overall building health score, according to an exemplary embodiment.

Referring now to FIG. 3, a Venn diagram 300 of planet health parameters 302, space health parameters 304, and people health parameters 306 contributing to an overall building health score 308 is shown, according to an exemplary embodiment. The planet health parameters 302, the space health parameters 304, and the people health parameters 306 can individually describe the health of different aspects of the building 146, e.g., the planet, spaces of the building 146, and people of the building 146. Together, the planet health parameters 302, the space health parameters 304, and the people health parameters 306 can contribute to an overall building health score 308. In some embodiments, the people health parameters 306 do not include any medical records of individuals. In this regard, the building health manager 128 can determine the influence of building system operation on the mental and/or physical health of occupants without requiring private medical records.

The planet health parameters 302 can be scores that describe the effect of operating the building 146 on the planet. For example, the planet health parameters 302 can indicate how much energy is consumed by the building 146, how much pollution is generated by the building 146, how much air is filtered by the building 146, etc.

The people health parameters 306 can be scores that describe the effect of operation of the building 146 and/or services offered by the building 146 on people, occupants of the building 146. The people health parameters 306 can indicate mental and/or physical health of occupants of the building 146. For example, temperature and/or humidity settings can be rated according to occupant comfort. Light levels, light color, and/or light hue can be rated according to the mental affect that the light has on the occupants. Similarly, services such as having a gym, personal trainer, healthy food options, etc. offered by the building 146 can indicate whether the scores describing whether the occupant health is high or low.

The space health parameters 304 can indicate the health levels of spaces of the building 146. For example, the presence of faults in building environmental control systems can indicate whether the building environmental control systems are operating well. Furthermore, emergencies such as flooding, fire, cyber security attacks, etc. can all indicate the health of space of the building 146.

In some cases, the overall building health score 308 which is made up of the three pillars of planet health parameters 302, space health parameters 304, and people health parameters 306 can be made up of sub categories. These various sub-categories may be the various subcategories described in FIGS. 6-10. In some cases, the people health parameters 306 can be made in three categories, air, productivity, and wellness. These categories can focus on the factors around the built environment related to occupant comfort, satisfaction, productivity, and/or overall wellness. In some cases, the space health parameters 304 can be divided into categories for system, safety and/or operations that focus on the factors around the built environment related to building system resiliency, asset and space maintenance, and/or life safety and security. In some embodiments, the planet health parameters 302 can be divided into categories of sustainability, emissions, and/or community that focus on resource sustainability, emissions tracking, and/or improved quality of life for local communities.

Figure 4:
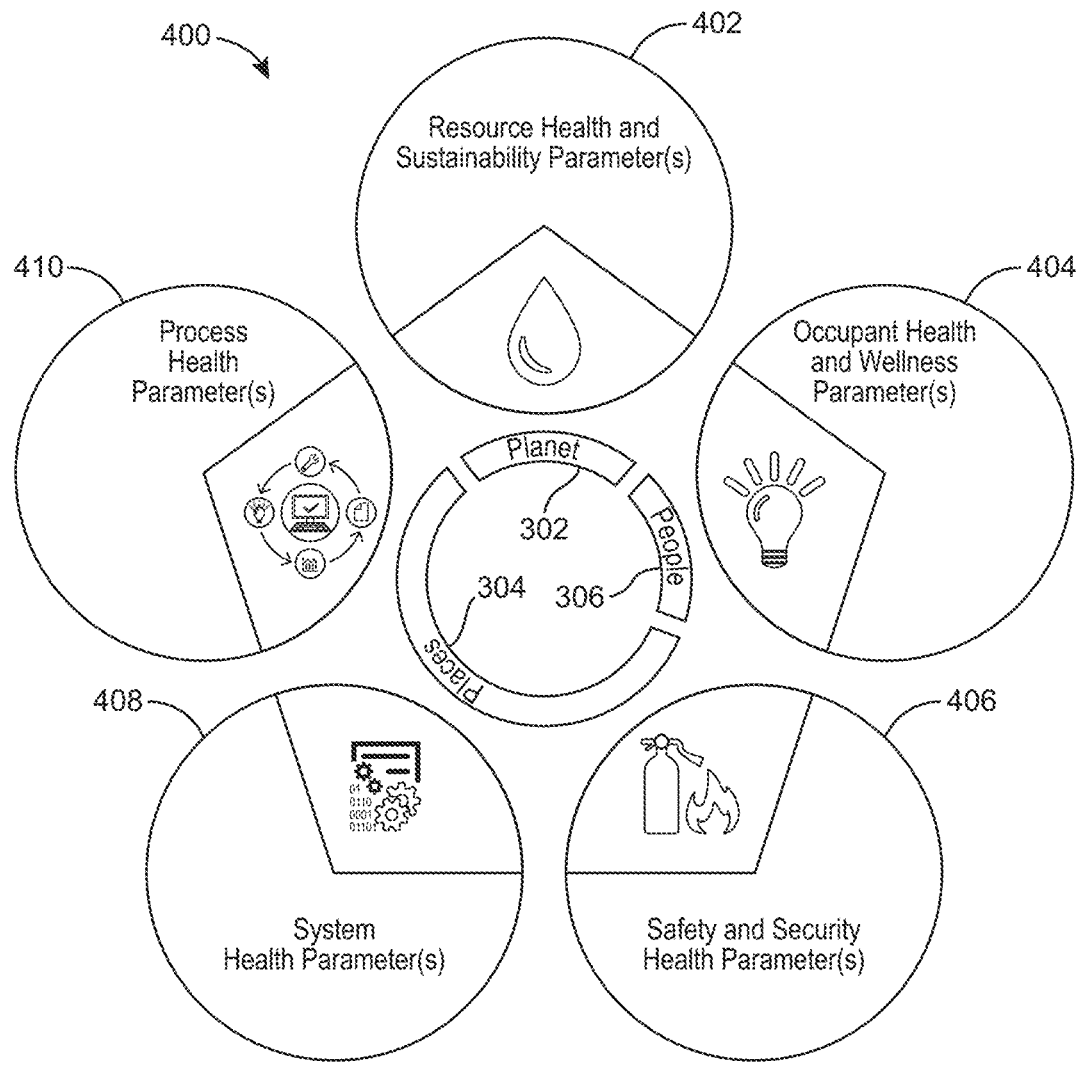
FIG. 4 is a schematic drawing of process health parameters, resource health and sustainability parameters, occupancy health and wellness parameters, safety and security health parameters, and system health parameters, according to an exemplary embodiment.

Referring now to FIG. 4, a diagram 400 of process health parameters 410, resource health and sustainability parameters 402, occupancy health and wellness parameters 404, safety and security health parameters 406, and system health parameters 408 is shown, according to an exemplary embodiment. The diagram 400 illustrates the planet health parameters 302, the people health parameters 306, and the space health parameters 304.

Furthermore, the relationships between the process health parameters 410, the resource health and sustainability parameters 402, the occupancy health and wellness parameters 404, the safety and security health parameters 406, and the system health parameters 408 and the planet health parameters 302, the people health parameters 306, and the space health parameters 304. As shown by the diagram 400, the process health parameters 410, the system health parameters 40, and the safety and security health parameters 406 are all parameters of the space health parameters 304. The resource health and sustainability parameters 402 are parameters of the planet health parameters 302. Furthermore, the occupant health and wellness parameters 404 are parameters of the people health parameters 306.

The process health parameters 410 can represent the health of processes of the building 146. The process health parameters 410 are shown and described in greater detail with respect to FIG. 9. The process health parameters 410 can be parameters that describe that presence and/or performance of processes such as regulatory compliance and audit, standard operating procedures, proactive maintenance and service, and/or quality of response. The process health parameters 410 can indicate the health of various services offered in the building 146, e.g., whether maintenance workflows are efficient, whether work order creation is automated, the presence of safety recommendations, the presence of informed capital planning services, whether cleaning services are efficient, etc.

The system health parameters 408 can be parameters that describe system health of systems of the building 146. The system health parameters 408 are shown and described in greater detail with respect to FIG. 8. The system health can be the health of a building automation system (BAS), fire systems, security systems, lighting systems, indoor positioning system data, electrical system data, etc. The system health can be reliability of control systems, the presence of autonomous control, the number of alarms, faults, manual override, etc. The system health parameters 408 can be based on air and water quality, sanitization of spaces, proactive asset maintenance, space utilization, whether spaces are smoke free, noise levels, space furnishing and usefulness, etc. The system health parameters 408 can include the software version of equipment of the building 146 and/or whether the equipment software versions are up to date.

The resource health and sustainability parameters 402 can indicate the effect of resource usage by the building system of the building 146 on the planet. The resource health and sustainability parameters 402 are shown and described in greater detail FIG. 10. The resource health and sustainability parameters 402 indicate the success of sustainability goals and/or net zero energy usage goals. The resource health and sustainability parameters 402 include the success of carbon footprint reduction. The resource health and sustainability parameters 402 indicate efficiency of HVAC operation, lighting operation, and/or utility usage. The resource health and sustainability parameters 402 indicate active utilization of spaces and assets. Furthermore, the resource health and sustainability parameters 402 indicate the presence and/or performance of central plant optimization and/or performance.

The resource health and sustainability parameters 402 further indicate energy health, e.g., whether electricity and/or water (e.g., hot water, cold water, etc.) is being used efficiently, whether HVAC systems and/or lighting control systems are operating autonomously to reduce energy usage, whether peak demand systems are operating properly, etc.

The occupant health and wellness parameters 404 indicate the mental, emotional, and/or physical health of occupants of the building 146. The occupant health and wellness parameters 404 are shown and described in greater detail with reference to FIG. 6. The occupant health and wellness parameters 404 indicate indoor air quality, the level of comfort for spaces of the building 146, whether a work environment is productive, the presence of frictionless experiences, the presence of social distancing, contact tracing, and engagement in the building 146, nourishment services, fitness services, stress, hand washing, etc.

The safety and security health parameters 406 can indicate health levels of security systems of the building 146. The safety and security health parameters 406 are shown and described in greater detail with reference to FIG. 7. The safety and security health parameters 406 indicate emergency responsiveness of security systems, the presence or absences of physical and/or cyber security threats, safety incidents that have occurred, alarm information, and/or whether safety and/or security needs of occupants of the building 146 are met. The safety and security health parameters 406 can indicate cyber security health levels, e.g., security levels of networks, Wi-Fi coverage in buildings, bandwidth availability of networks, antivirus presence and performance, firewall presence and performance, the presence of network security at particular ports, etc.

Figure 5A:
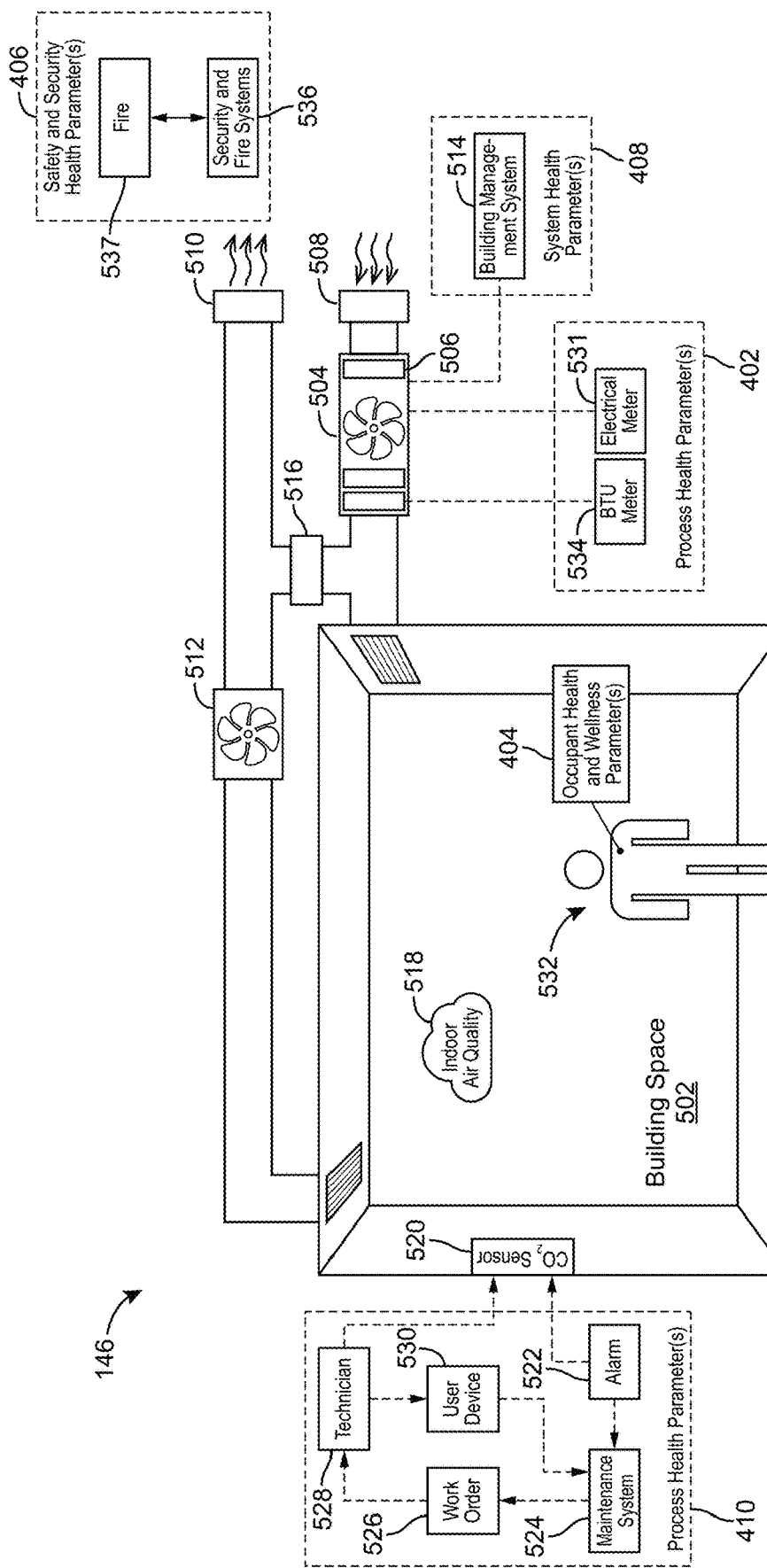
FIG. 5A is a schematic drawing of the health parameters of FIG. 4 shown in a building, according to an exemplary embodiment.

Referring now to FIG. 5A, the building 146 with the health parameters 402-410 of FIG. 4 is shown, according to an exemplary embodiment. The building 146 includes various pieces of equipment and a building space 502. However, any number and type of HVAC, security, fire response, or any other building subsystem can be included within the building 146 in addition to a variety of different spaces.

The building 146 includes an air handling unit 504 connected to a building management system 514 (e.g., one or more controllers). The building 146 further includes a British Thermal Unit (BTU) meter 534 and an electrical meter 531. The meters 534 and 531 can track the operation of the air handling unit 504, i.e., electricity used by the air handling unit 504 and/or thermal energy generated by the air handling unit 504. Furthermore, the meters 534 and 531 can measure electrical energy consumption of various pieces of equipment of the building 146 and/or energy generated by the pieces of equipment to heat or cool the building 146. The building 146 may further include water meters to track the water consumption and usage by equipment of the building 146. The building 146 can include electrical metering, gas metering, water metering, etc. and/or any other meter to track resource consumption of equipment of the building 146. The building 146 can include power generation, fuel management systems, and/or any other system.

The air handling unit 504 draws outside air through an outside air damper 506 and provides heated or cooled air to the building space 502. An exhaust fan 512 can exhaust air of the building space 502 out of the building 146 through the exhaust air damper 510.

The meters 534 and 531 can track energy usage of the building 146 and the efficiency of equipment of the building 146 to determine the effect of operation on the building 146 on the planet, e.g., the environment outside the building 146. The building health manager 128 can track the resource usage of the building 146 via the meters 534 and 531 and determine the resource health and sustainability parameters 402 to track an efficiency, sustainability, and/or energy usage of the building 146. For example, the building health manager 128 can determine whether an excessive amount of kWh is being consumed by the air handling unit 504.

Furthermore, occupant health and wellness parameters 404 can be determined for occupants of the building 146, e.g., the occupant 532, by the building health manager 128. The building health manager 128 can track what services are offered to the occupant 532, e.g., exercise programs, the availability of a gym, comfort levels of the building space 502, etc. The building health manager 128 can generate occupant health and wellness parameters 404 to track how well the building space 502 supports occupant mental and physical health.

The building 146 can determine safety and security health parameters 406. Security and fire systems 536 and 537 of the building can track events occurring in the building 146, e.g., the presence of fires, glass breaks, door forced open events, etc. Based on the presence or absence of fire or security threat events, the building health manager 128 can determine safety and security health parameters 406.

The building space 502 includes a carbon dioxide sensor 520. The carbon dioxide sensor 520 can cause an alarm 522 to be generated responsive to carbon dioxide readings going above a particular level. Responsive to the alarm 522 being generated, a maintenance system 524 can generate a work order 526. The work order 526 can identify the alarm 522, the carbon dioxide sensor 520, the building space 502, and/or any other system associate with the building space 502. The work order 526 can be provided to a user device 530 of a technician 528 who can work on the carbon dioxide sensor 520 or another system of the building 146 to resolve the alarm 522. Responsive to resolving the alarm 522, the technician 528 can provide a notice to the maintenance system 524.

The process health parameters 410 can be based on alarms, work orders, and technician actions such as the alarm 522 and the work order 526. The building health manager 128 can determine process health parameters 410 based on the performance of processes of the building 146. For example, an average response time indicating an average length of time for a technician to resolve a fault can be one of the process health parameters 410. Furthermore, the frequency of maintenance performed on building equipment of the building 146 can be another one of the process health parameters 410. Furthermore, the building health manager 128 can determine whether faults are present and in what number for building systems of the building 146, e.g., whether a fan is in a fault mode, whether a filter is clean, etc. The presence and number of the faults can be parameters of the process health parameters 410.

Figure 5B:
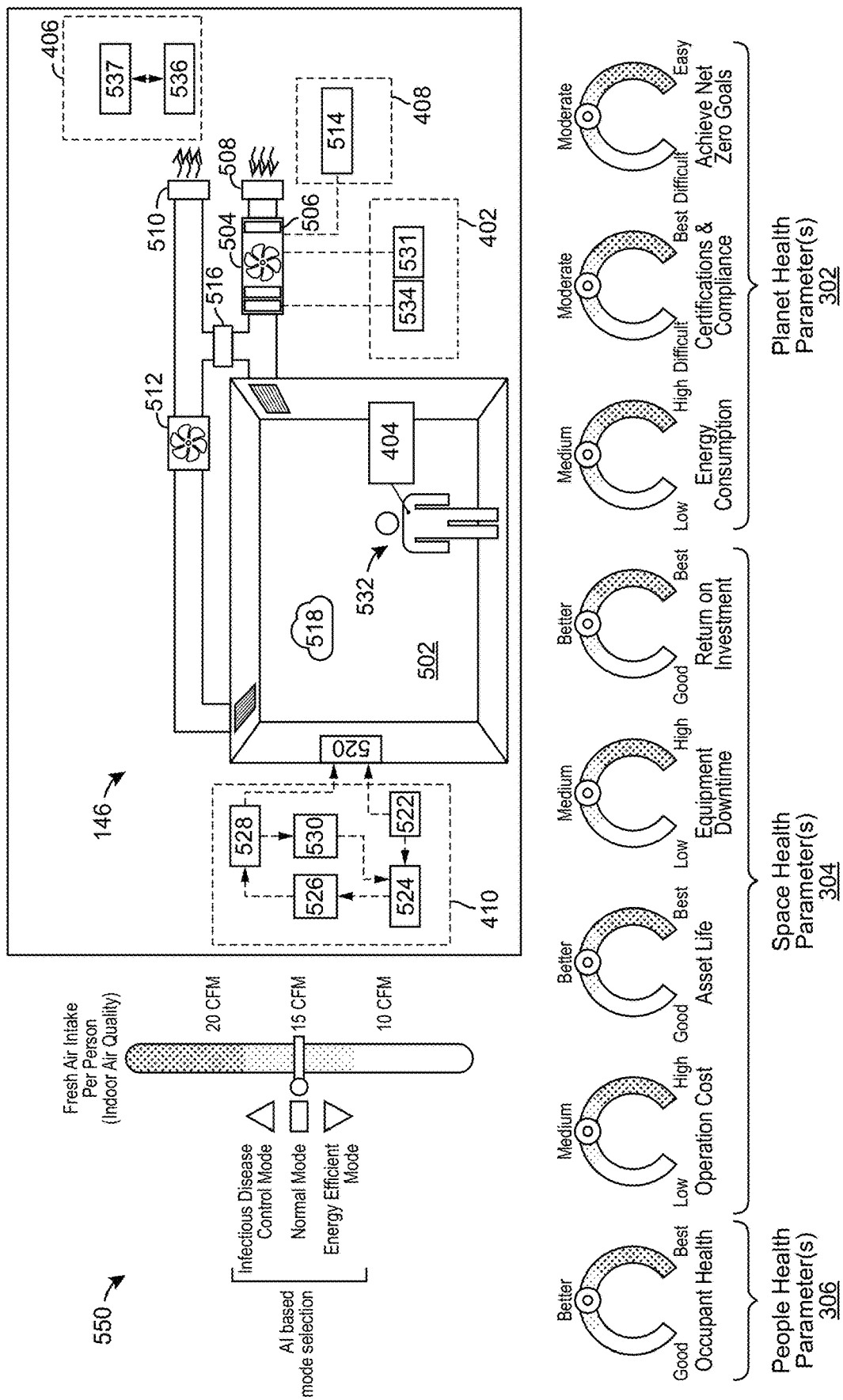
FIGS. 5B-5D are schematic drawings of the building of FIG. 5A where an artificial intelligence performs a mode selection for balancing the health parameters, according to an exemplary embodiment.
Figure 5C:
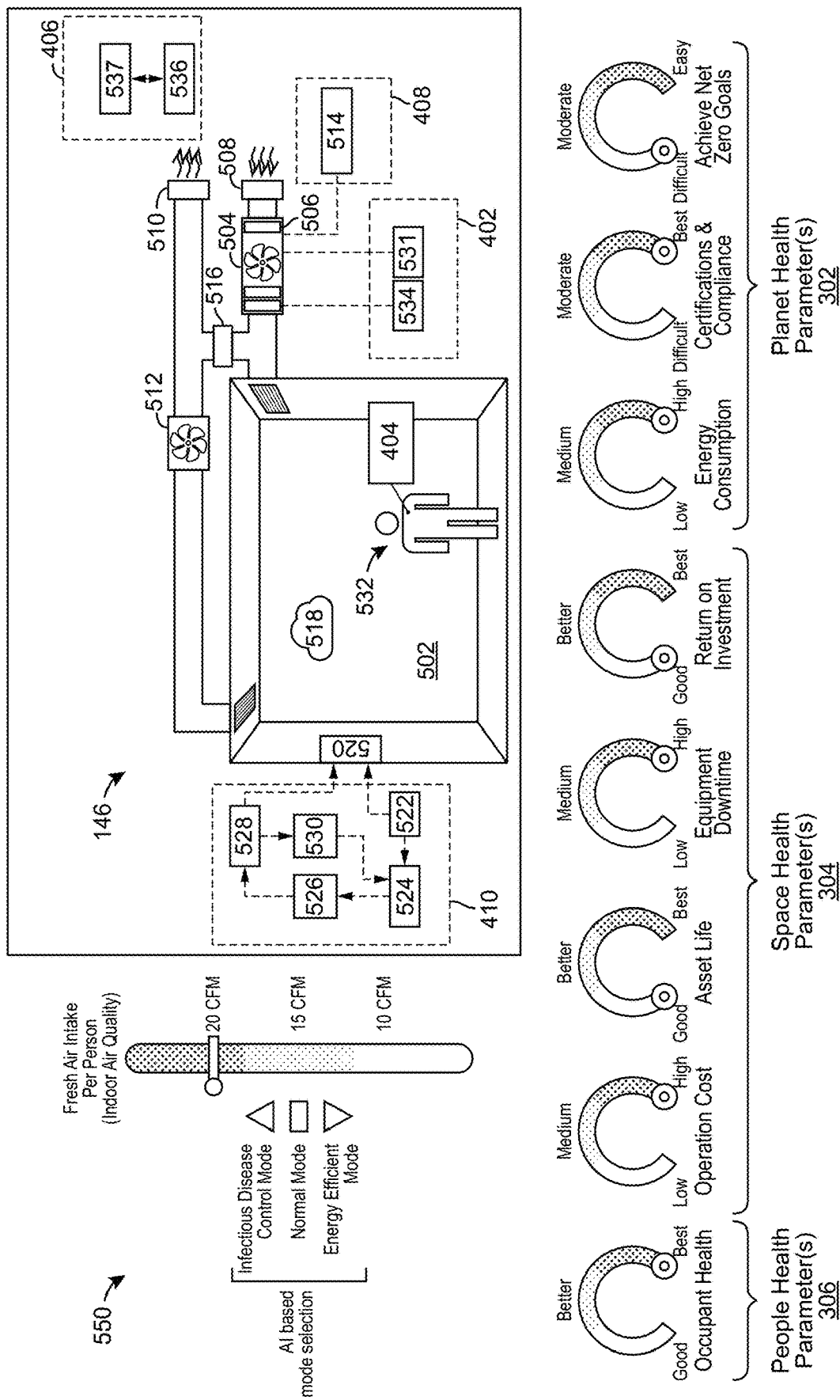
Figure 5D:
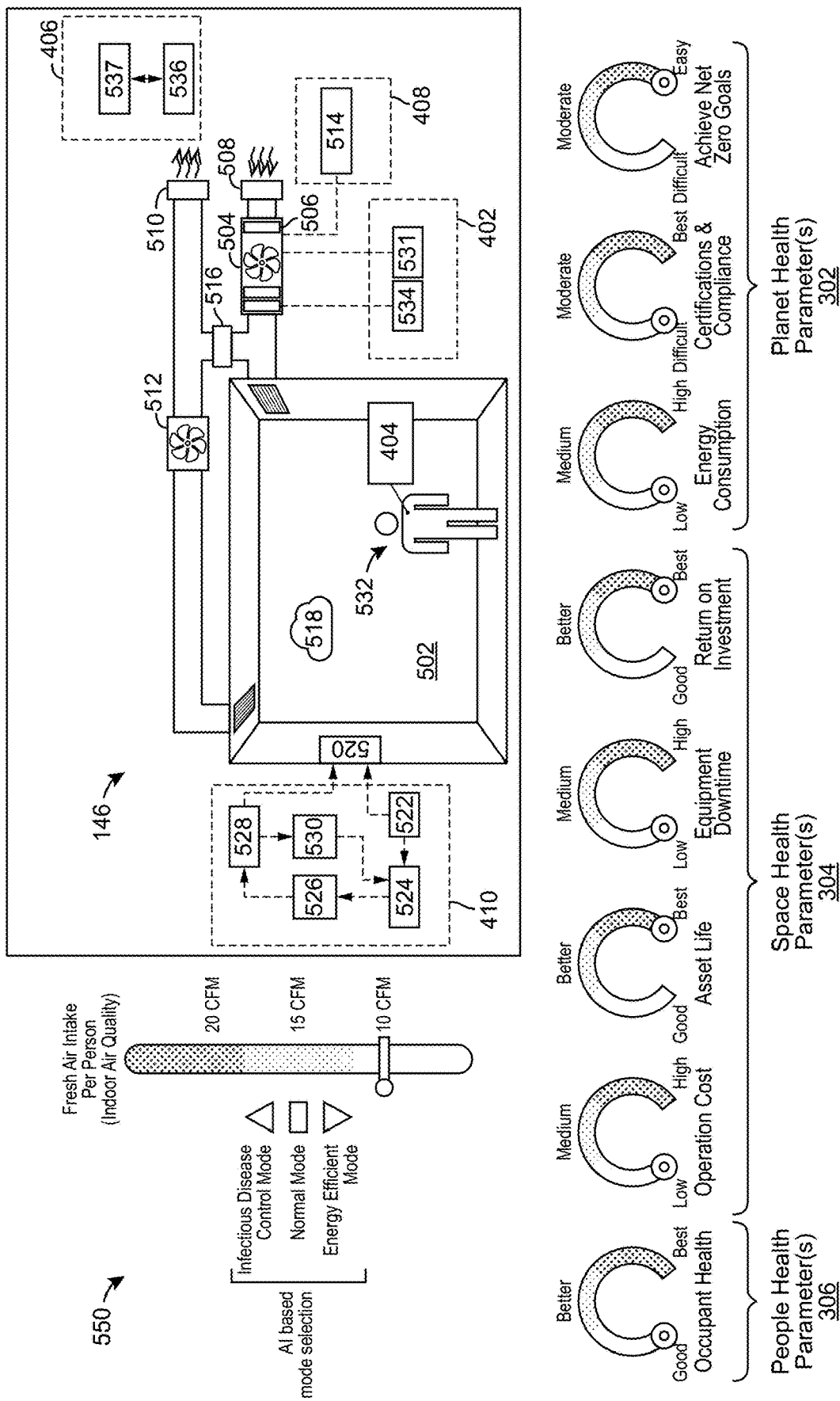

Referring now to FIGS. 5B-5D, schematic drawings of the building of FIG. 5A in the building of FIG. 5A where an artificial intelligence performs a mode selection for balancing the health parameters is shown, according to an exemplary embodiment. FIGS. 5B-5D illustrate balancing a fresh air intake per person parameter for the building space 502 by an artificial intelligence is shown. The artificial intelligence can be implemented and trained by the building health manager 128 and can be any type of artificial intelligence, e.g., a neural network, a linear programming component, a Gaussian model, a support vector machine, a Bayesian network, a decision tree, etc.

The building health manager 128 can implement an artificial intelligence that optimizes operation parameters of the building space 502. The artificial intelligence can determine what setting values result in optimal score(s) based on the people health parameters 306, the space health parameters 304, and the planet health parameters 302. The people health parameters 306 relate to occupant wellness, safety, satisfaction, and productivity of the building space 502. The people health parameters 306 can be parameters based on occupant health, e.g., whether air of the building space 502 is clean, whether ergonomics of the building space 502 are good, whether security of the building space 502 is present and operational, occupant wellness, and/or cleanliness and infection risk for occupants of the building space 502.

In some embodiments, adjusting environmental control parameters of the building management system 514 in the building space 502 to reduce the chance of air-borne infections between occupants can consume more energy and could make the building space 502 uncomfortable. Therefore, the artificial intelligence can solve and optimize for the people health parameters 306, the space health parameters 304, and the planet health parameters 302 to help a building achieve more of your objectives without sacrificing others, or at the very least inform a user of decisions for a building and provide operating recommendations to the users. In some embodiments, the element 550 is a user interface element that illustrates the operation of the artificial intelligence or an adjustable element for allowing a user to input control into a system. For example, when an infectious disease control mode of the element 550 is selected, as shown in FIG. 5C, the air flow increases, and the impact of this change can affect several other outcomes of the parameters 302-306. When the energy efficient mode of the element 550 is selected, as shown in FIG. 5D, the air flow decreases, and the impact of this change can affect the parameters 302-306. By understanding, calculating, monitoring, and reporting these impacts, the building health manager 128 can make it easier for a user to operate a buildings and meet more objectives for the building.

As shown in FIGS. 5B-5D, it can be seen that increasing the fresh air intake for the building space 502 will have an impact on multiple other aspects of building health as represented by the dials for the parameters 302-306. For example, by increasing the fresh air intake can require one or more fans to operate which can increase occupant health (the primary objective) but will also increase operation cost, lower asset life, increase risk for equipment downtime, increase energy consumption, etc. The element 550 can provide multi-factor decisions making for a building and putting owners/operators in control by informing their decisions and ultimately optimizing their objectives.

The planet health parameters 302 can include parameters that relate to resource sustainability and quality of life for local communities. The planet health parameters 302 can include energy consumption, certifications and compliance with energy standards, and whether or not the building space 502 achieves net zero emissions. The planet health parameters 302 include how much renewable energy is used for the building space 502, a carbon footprint of the building space 502, resource conservation for the building space 502, whether the building space 502 has reduced emissions, sustainability, etc.

The space health parameters 304 can include parameters that relate to building system resiliency factors, process and operations health that focuses on service effectiveness for asset and space maintenance and important tasks, and life safety and security health that focuses on physical and cyber security health as well as building emergencies and alarms. The space health parameters 304 can include operation cost of the building space 502, asset lift of assets of the building space 502, equipment downtime of equipment that operates the building space 502, and return on investment for the building space 502.

The space health parameters 304 can relate too life safety and security health, e.g., whether life safety systems are present for the building space 502, whether security and access control systems are present for the building space 502, cyber security status for equipment of the building space 502, emergency response systems presence and/or status for the building space 502, alarm management presence and/or status for the building space 502, etc.

The space health parameters 304 include process and operation health parameters, e.g., workflows (e.g., maintenance workflows), audits, permits, scheduled tasks, etc. The space health parameters 304 can further indicate system health of systems of the building space 502, e.g., health of automation systems, networks, electrical systems, metering systems of the building space 502.

The building health manager 128 can continuously measure criteria or factors that can impact the health of the building space 502, e.g., collect data for the people health parameters 306, space health parameters 304, and the planet health parameters 302. By measuring and calculating scores for these criteria, the building health manager 128 can systematically and repeatedly monitor and report on the people health parameters 306, the space health parameters 304, and the planet health parameters 302 for the building space 502. Furthermore, the building health manager 128 can track negative impacts to the scores, and offer reactive and predictive recommendations that would produce positive changes to the scores. The scoring implemented by the building health manager 128 provides a consistent, normalized view of a building space 502 health and removes the technical lens which makes the information faster and easier to consume.

The building health manager 128 can generate overall scores for the building space 502 and/or the people health parameters 306, the space health parameters 304, and the planet health parameters 302. The scores can be determined for a group of buildings, a building, or a particular space within a building. The scores can provide a baseline for health and performance on a consistent scale so a system or user can understand how well or poorly a building is performing. The scores can be generated in real-time for the building health manager 128 to provide real-time improvements and trended improvements over time. The scores can be generated by the building health manager 128 on a space and building level to help users or systems to identify the best and worst performing buildings of a group of buildings, floors of a building, spaces of a floor of a building, etc. Furthermore, the scores for multiple buildings determined by the building health manager 128 can be used to compare one building against peer buildings to understand how the one building is operating. Furthermore, the scores can be used to make informed capital planning and investment decisions.

Figure 6:
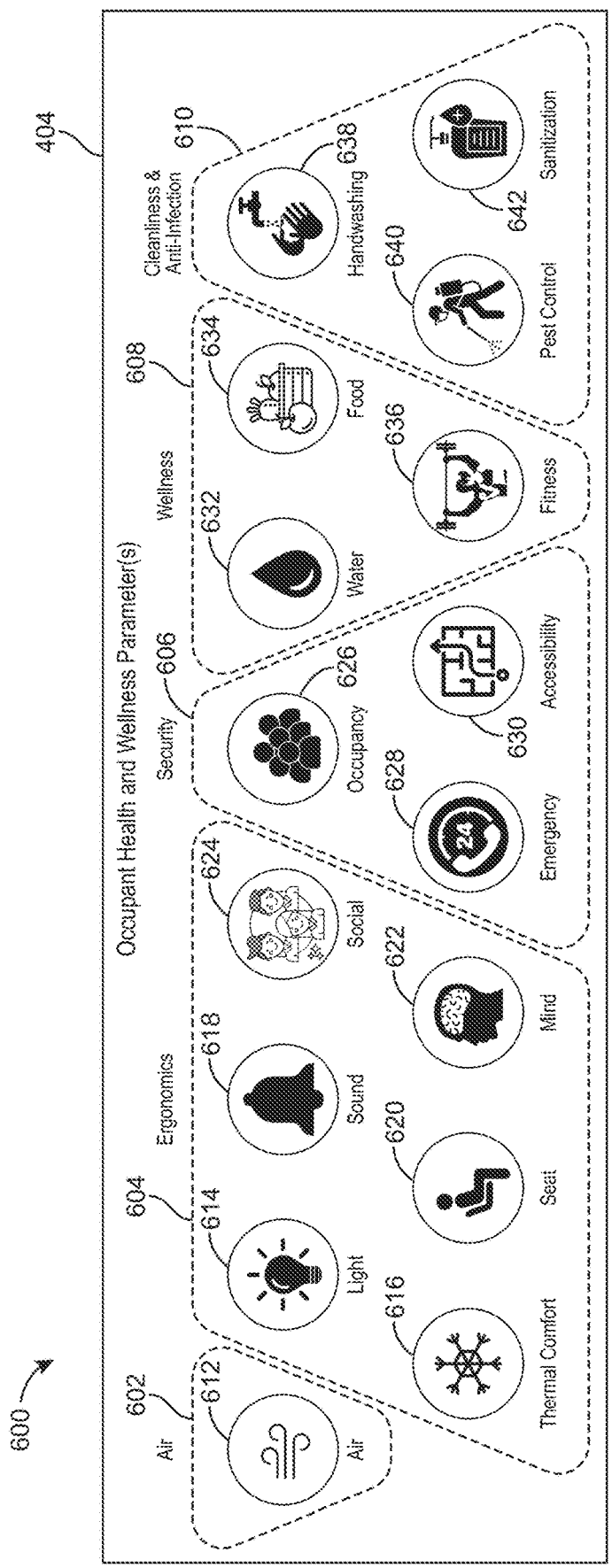
FIG. 6 is a schematic drawing of occupant health and wellness parameters, according to an exemplary embodiment.

Referring now to FIG. 6, a schematic drawing 600 of occupant health and wellness parameters 404 is shown, according to an exemplary embodiment. The occupant health and wellness parameters can be values, information, and/or scores describing various aspects of occupant health and wellness. The occupant health and wellness parameters 404 can be based on building data received by the building health manager 128 received from the building systems 142 and the external systems 144. The building data can indicate the presence and/or performance of the building systems 142 and/or systems or services offered by the building 146.

The occupant health and wellness parameters 404 include an air parameter 602, e.g., air parameter 612 which indicates whether air levels are healthy for an occupant. For example, the air parameter 612 can indicate whether there is enough airflow within the building 146 or what the levels of carbon dioxide ($CO_2$), volatile organic compound (VOC), pollen, pollution, etc. are for the building 146. The air parameter 612 can indicate whether the levels of gasses within the building 146 are healthy for a user.

The occupant health and wellness parameters 404 include ergonomics parameters 604 such as a light parameter 614, a sound parameter 618, a social parameter 624, a thermal comfort parameter 616, a seat parameter 620, and a mind parameter 622. The ergonomics parameters 604 indicate efficiency of occupants working in the building 146. The light parameter 614 indicates whether the light levels are ideal for a working environment. For example, if light levels are too low, occupants may not work efficiently since low light levels may make the occupants tired. However, if the light levels are too high, occupants may have trouble focusing.

The thermal comfort parameter 616 can indicate whether temperature and/or humidity levels of the building 146 are at comfortable levels for an occupant. The building health manager 128 can store a chart or table indicating temperature and humidity level ranges that are appropriate for various outdoor air temperatures. The building health manager 128 can compare current temperature and/or humidity levels to the chart or table to determine whether current temperature and humidity is comfortable or uncomfortable. The building health manager 128 can generate recommendations to improve the temperature and/or humidity by suggesting temperature levels and/or humidity levels that are comfortable for occupants at particular outdoor air temperature levels.

The seat parameters 620 can indicate whether occupants have comfortable and sufficient seating in the building 146. The seating can indicate chairs, tables, desks, couches, cafeteria tables and seating, etc. The building health manager 128 can receive information about the seating available in the building 146 and/or within spaces of the building 146. For example, the building health manager 128 can determine the seat parameters 620 by determining whether there are sufficient numbers of seats for a number of occupants, whether the seats are comfortable for occupants, etc.

The sound parameter 618 can indicate sound levels of the building 146 and/or building space and whether the sound levels are ideal for working conditions of a building. For example, the building health manager 128 can determine whether sound levels are too noisy for working environments, whether music is played within the building 146 and/or is of a genre ideal for working environments, whether noise cancellation is activated for the building 146 or a building space, etc.

The mind parameter 622 indicates whether services offered by the building help occupants mental health. For example, counseling services offered by the building 146, human resources services offered by the building 146, vacation time offered to employees, work load of employees, reported occupant stress levels, etc. The building health manager 128 can generate the mind parameters 622 from building data.

The social parameter 624 can indicate social offerings of the building 146. For example, the social parameter 624 can indicate the presence, frequency, and/or availability of social gatherings. For example, the social parameter 624 can be based on scheduling data received by the building health manager 128. Furthermore, the social parameter 624 can indicate whether the location of occupants of the building 146 is near other occupants to verify that occupants are not isolated. For example, the building health manager 128 can determine occupant desk locations and whether occupants desk locations are in proper proximity with other occupants for social purposes.

The occupant health and wellness parameters 404 include security parameters 606. The security parameters 606 can indicate whether occupants are secure within the building 146. The security parameter 606 include an occupancy parameter 626 which indicates occupant levels of the building 146, e.g., how many occupants are within the building 146. If too many occupants are within the building 146, the probability of danger may increase, the probability of the spread of disease may increase, etc. The building health manager 128 can determine occupant levels of the building 146 based on building data received from the building systems 142.

The security parameters 606 include an emergency parameter 628. The emergency parameter 628 can indicate emergency response readiness for the building 146. For example, the emergency parameter 628 can indicate whether emergency alert stations are within the building 146, whether security of the building 146 is properly staffed, whether building occupants are properly trained for emergency evacuation, etc. The security parameter 606 can include an accessibility parameter 630. The accessibility parameter 630 can indicate navigation abilities of the building 146, e.g., whether the building 146 has a system for navigating through spaces of the building 146.

The occupant health and wellness parameters 404 include wellness parameters 608. The wellness parameters 608 can track activities of a user, e.g., how much water, food, or exercise a user gets in a day, week, month, etc. The wellness parameters 608 include a water parameter 632 indicating how much water a user has drank. A user may record, via a user device, how much water the user drinks during a day. Similarly, the wellness parameters 608 includes a food parameter 634 indicating what food an occupant eats. A user may record what food the user consumes throughout the day and whether the food that the user has eaten is healthy. In some embodiments, the food parameter 634 indicates whether food services within the building 146, e.g., a cafeteria, offer healthy food, offers unhealthy food, offers nutrition advice services, etc.

The fitness parameters 636 indicate whether occupants of the building exercise and/or have access to exercise equipment, classes, gyms, etc. For example, whether occupants attend exercising classes, go to the gym, attend personal training sessions, etc. can be indicated by the fitness parameter 636. The fitness parameter 636 can indicate whether the building 146 has a gym, offers fitness classes, offers personal training, etc.

The cleanliness and anti-infection parameter 610 indicates whether the building 146 and/or occupants of the building 146 are clean. The cleanliness and anti-infection parameter 610 includes a handwashing parameter 638, a pest control parameter 640, and a sanitization parameter 642. For example, the handwashing parameter 638 indicates whether handwashing is available in the building 146 and/or whether sinks, air driers, soap dispensers, etc. are functioning properly. The sanitization parameter 642 indicates whether hand sanitizer dispensers are located at entrances of the building 146, at doorways, dispersed through the building 146, etc.

Figure 7:
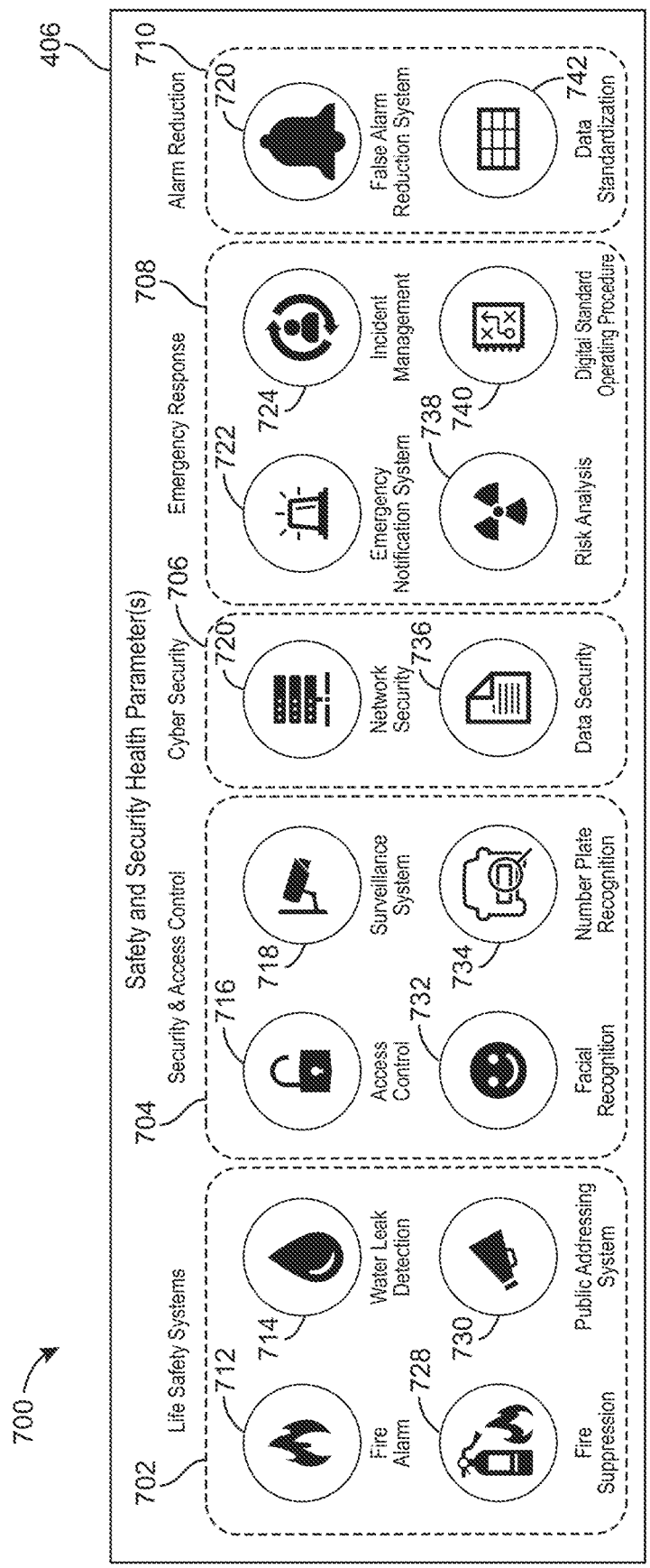
FIG. 7 is a schematic drawing of safety and security health parameters, according to an exemplary embodiment.

Referring now to FIG. 7, a schematic drawing of safety and security health parameters 406 are shown, according to an exemplary embodiment. The safety and security health parameters 406 include a life safety systems parameter 702, a security and access control parameter 704, a cyber-security parameter 706, an emergency response parameter 708, and alarm reduction parameter 710. The safety and security health parameters 406 can be based on building data received by the building health manager 128 received from the building systems 142 and the external systems 144. The building data can indicate the presence and/or performance of the building systems 142 and/or systems or services offered by the building 146.

The life safety systems parameter 702 include a fire alarm parameter 712 indicating whether a fire alarm system is present in the building 146 and/or whether the fire alarm system has detected fires and/or smoke within the building 146. The life safety systems parameters 702 include a water leak detection parameter 714. The water leak detection parameter 714 includes the presence of a water detection system and/or whether the water detection system has detected water leaks in the building 146. The life safety systems 702 include fire suppression parameter 728. The fire suppression parameter 728 indicates the presence and/or health of fire safety systems of the building 146. For example, the fire suppression parameter 728 can indicate whether placement of fire extinguishers in a building are appropriate, whether fire sprinkler systems are functioning properly, audit test results of fire suppression systems of the building 146, etc.

The public addressing system parameters 730 indicate whether a building addressing system is present in the building 146 and/or whether the public addressing system is operating correctly. For example, technicians can perform a test to verify that a public addressing system can broadcast messages properly and/or to all locations within a building. The result of the test can be one parameter of the public addressing system parameters 730.

The security and access control parameters 704 include parameters that indicate the presence and/or performance of security and access control systems of the building. For example, the building health manager 128 can be configured to receive alarm and/or fault data, maintenance reports, etc. of security and access control systems of the building 146 and determine the security and access control parameters 704 based on the data. The security and access control parameters 704 can include an access control system parameter 716 for an access control system, a surveillance system parameter 718 for a surveillance system, a facial recognition parameter 732 for a facial recognition system, and/or a number plate recognition parameter 734 for a number plate recognition system.

The cyber security parameter 706 indicates cyber security of the building 146. The cyber security parameter 706 indicates a network security parameter 720 indicating network security of the building 146, e.g., the number and type of current network cybersecurity threats (e.g., hacking threats, malware threats, etc.). Furthermore, the cyber security parameter 706 includes a data security parameter 736 indicating whether data storage of building systems of the building 146 are secure, e.g., whether they use the proper encryption, proper firewalls, etc.

The emergency response parameters 708 include parameters such as emergency notification system parameters 722, incident management parameters 724, risk analysis parameters 738, and/or digital standard operating procedure parameters 740. The emergency response parameters 708 can indicate the presence and/or performance of various systems of the building 146. The emergency response parameters 708 can indicate the presence and/or performance of emergency response systems in the building 146.

The emergency notification system parameter 722 can indicate the presence and/or performance of an emergency notification system, e.g., a siren system, a light flashing system, an exit system, an evacuation system, etc. The emergency response parameter 708 includes a risk analysis parameter 738. The risk analysis parameter 738 indicates the presence and/or performance of a risk analysis system that analyzes risk for a building. The risk analysis system may be the risk analysis system described with reference to U.S. patent application Ser. No. 16/783,936 filed Feb. 6, 2020, the entirety of which is incorporated by reference herein. Furthermore, the emergency response parameters 708 include an incident management parameter 724 indicating the presence and/or performance of an incident management system of the building 146. Furthermore, the emergency response parameter 708 includes a digital standard operating procedure parameter 740 indicating the presence and/or performance of a digital standard operating procedure system within a building 146. The digital standard operating procedure system may be the same and/or similar to the standard operating procedure system described in U.S. application Ser. No. 16/559,318 filed Sep. 3, 2019 and U.S. patent application Ser. No. 17/062,003 filed Oct. 2, 2020, the entirety of both of which are incorporated by reference herein.

Furthermore, alarm reduction parameters 710 include false alarm reduction system parameters 726 and/or data standardization parameter 742. The false alarm reduction system parameter 726 can indicate the presence and/or performance of a false alarm reduction system of the building 146. For example, the false alarm reduction system can be a system that receives false alarms in the building 146. The false alarm reduction system parameters 726 can indicate the success in reducing false alarms in the building 146. The false alarm reduction system can be the false alarm reduction system described in U.S. patent application Ser. No. 15/947,725 filed Apr. 6, 2018, the entirety of which is incorporated by reference herein.

Figure 8:
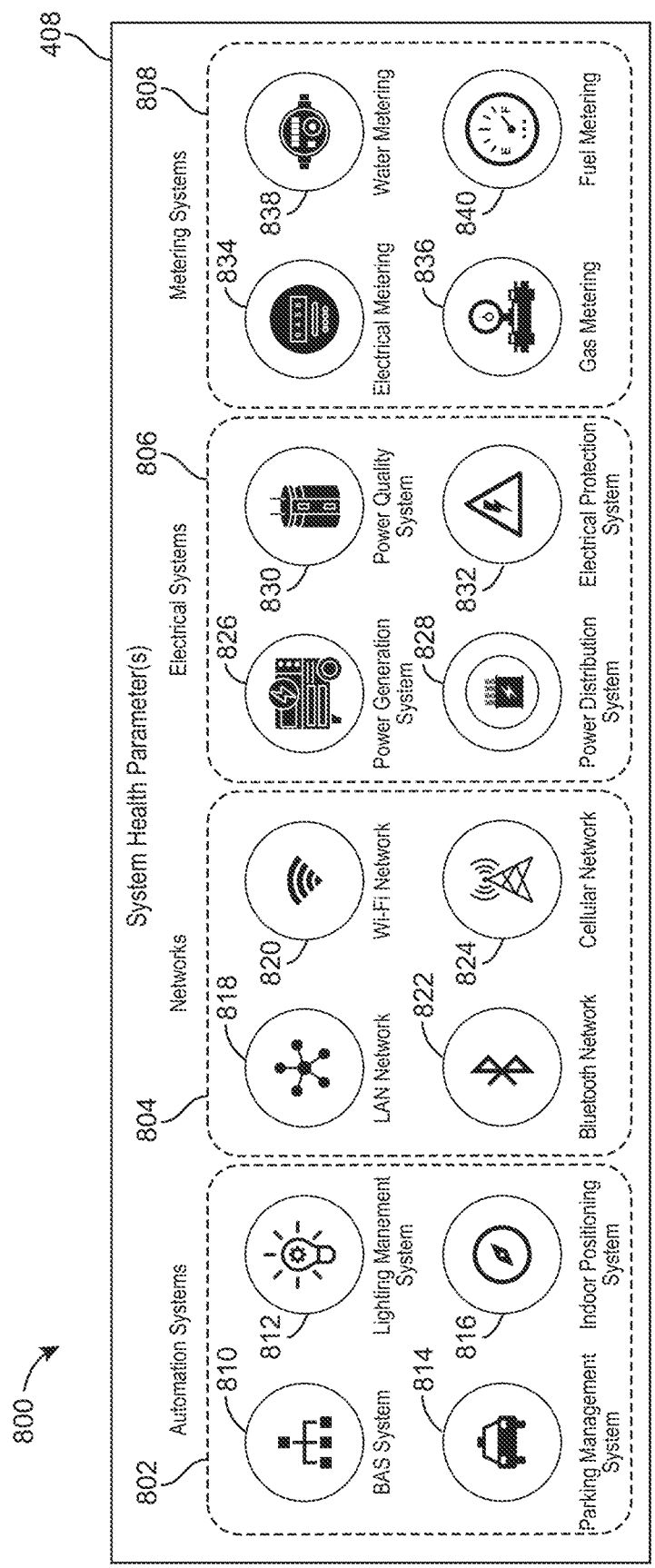
FIG. 8 is a schematic drawing of system health parameters, according to an exemplary embodiment.

Referring now to FIG. 8, a schematic drawing 800 of system health parameters 408 is shown, according to an exemplary embodiment. The system health parameters 408 include automation system parameters 802, networks parameters 804, electrical systems parameters 806, and metering systems parameters 808. The safety and security health parameters 406 can be based on building data received by the building health manager 128 received from the building systems 142 and the external systems 144. The building data can indicate the presence and/or performance of the building systems 142 and/or systems or services offered by the building 146.

The automation system parameters 802 indicate the presence and/or performance of automation systems of the building. For example, the building health manager 128 can determine whether automation systems are present within the building and/or operation correctly, e.g., whether faults are present and/or test results indicate that the automation systems are operating properly. The automation system parameters 802 include BAS system parameters 810 for a BAS system, lighting management system parameters 812 for a lighting management system, parking management system parameters 814 for a parking management system, and indoor positioning system parameters 816 for an indoor positioning system.

The networks parameters 804 can indicate the performance of networks of the building 146. For example, the network parameters 804 can be determined by the building health manager 128 based on network data received by the building health manager 128. The building health manager 128 can indicate performance parameters such as bandwidth, network speed (e.g., upload speed and/or download speed), network coverage within the building 146, etc. The networks parameters 804 include local area network (LAN) network parameters, Wi-Fi network parameters 820, Bluetooth network parameters 822, and/or cellular network parameters 824.

The electrical systems parameter 806 indicate the presence and/or performance of electrical systems within the building 146. For example, the building health manager 128 can be configured to receive data indicating the presence of various electrical systems and/or whether the various electrical systems are operating properly (e.g., whether the systems have faults). The electrical systems parameters 806 include a power generation system parameter 826 for power generation systems, a power quality system parameter 830 for power quality systems, a power distribution system parameter 828 for power distribution systems, and an electrical protection system parameter 832 for electrical protection systems.

The metering systems parameters 808 indicate the performance of meters of the building 146. For example, the metering systems parameters 808 indicate whether meters of the building have faults, the accuracy of the meters, the precision of the meters, etc. The building health manager 128 receives meter data and determines the health of the meters. Furthermore, the building health manager 128 can use meter measurements the meter data to determine the health of other system so the building. For example, the building health manager 128 can identify efficiencies or issues of building equipment based on the measurements of the meters. The metering systems parameters 808 include electrical metering parameters 834, gas metering parameters 836, water metering parameters 838, and/or fuel metering parameters 840.

Figure 9:
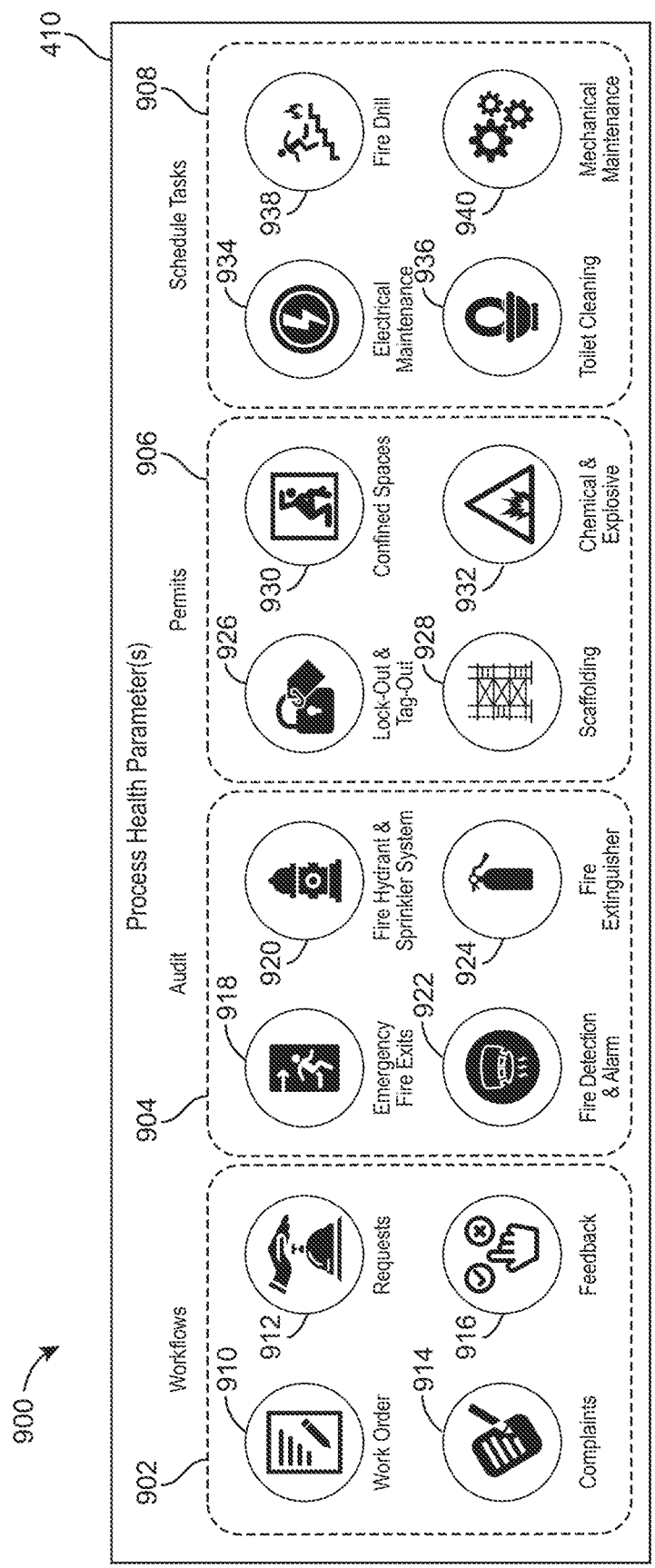
FIG. 9 is a schematic drawing of process health parameters, according to an exemplary embodiment.

Referring now to FIG. 9, a schematic drawing 900 of process health parameters 410 is shown, according to an exemplary embodiment. The process health parameters 410 include workflows parameters 902, audit parameters 904, permits parameters 906, and/or scheduled tasks parameters 908. The building health manager 128 can be configured to determine the process health parameters 410 based on building data received from the building 146. For example, the building data can indicate the presence and/or use of various services and systems within the building 146. Furthermore, the building data can indicate whether the systems are operating properly.

The workflows parameters 902 include a work order system parameter 910 for a work order system. The work order system can facilitate the automatic generation, or user requested generation, of work orders for technicians to repair systems of the building. The work order system parameters 910 can indicate the presence of a work order system in the building 146, an average response time for work orders (e.g., how quickly a work order is performed by a technician), etc. The workflows parameters 902 include requests parameters 912 for a request system of the building 146. The requests parameters 912 can indicate whether a request system is present in the building 146 and/or the performance of the request system, e.g., whether request are being responded to, the amount of time from when a request is generated to when a request is answered, etc.

The workflows parameters 902 include a complaints parameter 914 for a complaints system. The complaints system can be a system that allows a building occupant to file a complaint regarding the building 146. The complaints parameters 914 can indicate whether a complaints system is present in the building and/or the performance of the complaints system, e.g., how widely adopted the complaints system is, how quickly the complaints are addressed, etc. The workflows parameters 902 include a feedbacks parameter 916 for a feedback system. The feedbacks parameter 916 can indicate the presence, adoption, or review time of the feedback system.

The audit parameters 904 can indicate audit results of fire systems of a building. For example, audit results of emergency exists, fire hydrants and sprinkler systems, fire detection and alarm systems, and/or fire extinguishers. The building health manager 128 can be configured to receive audit data from audit systems for the various fire systems of the building. The audit parameters 904 include an emergency fire exits parameter 918 for emergency fire exits, a fire hydrant and sprinkler system parameter 920, a fire detection and alarm parameter 922, and a fire extinguishers parameter 924.

The permit parameters 906 indicate parameters for permits given out for various aspects of a building. For example, the permit parameters 906 include a lock-out and tag-out parameter 926, a confined spaces parameter 930, a scaffolding parameter 928, and a chemical and explosive parameter 932.

The scheduled tasks parameter 908 include an electrical maintenance parameter 934, a fire drill parameter 938, a toilet cleaning parameter 936, and a mechanical maintenance parameter 940. The scheduled tasks parameter 908 can indicate the health of task scheduling of various systems of the building 146. The task scheduling health can indicate that maintenance, drills, cleaning, etc. are scheduled and performed at an appropriate frequently. The scheduled tasks parameters 908 include an electrical maintenance parameter 934, a toilet cleaning parameter 936, a fire drill parameter 938, and a mechanical maintenance parameter 940.

Figure 10:
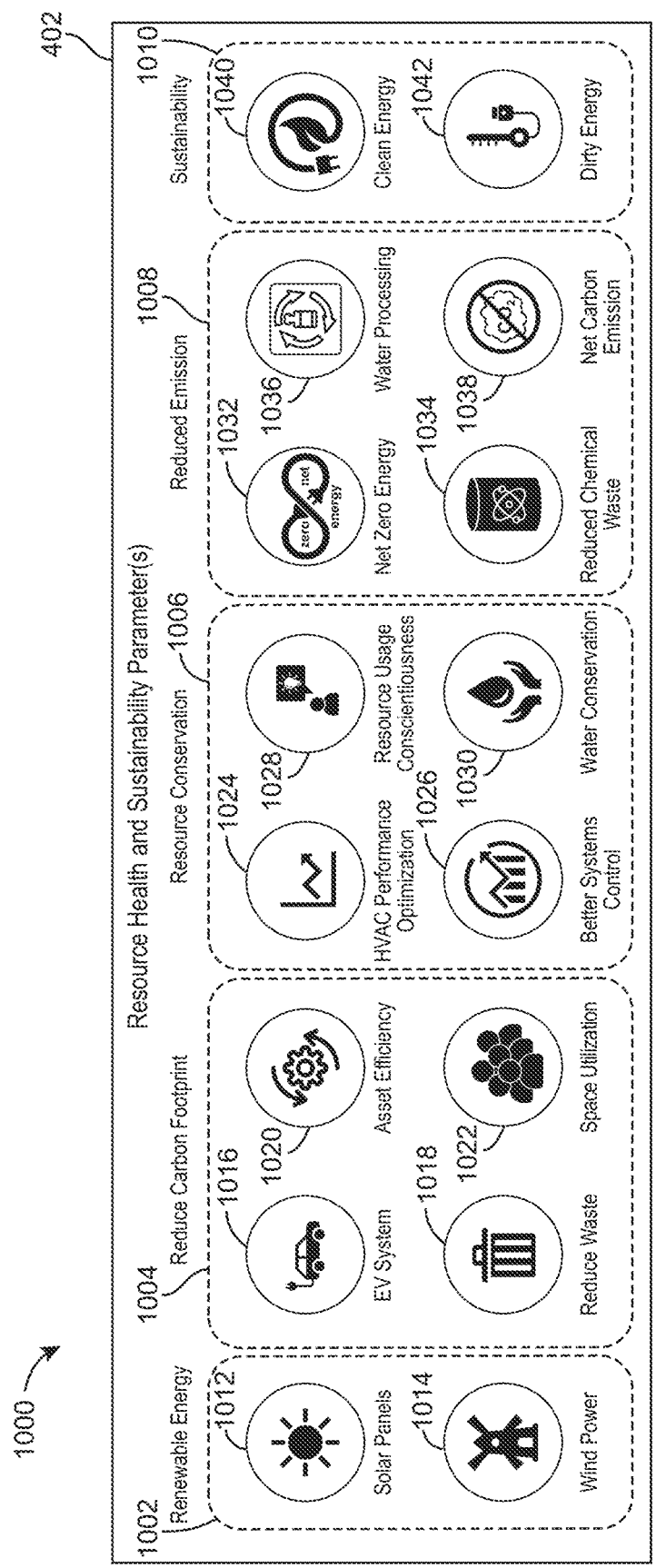
FIG. 10 is a schematic drawing of resource health and sustainability parameters, according to an exemplary embodiment.

Referring now to FIG. 10, a schematic drawing 1000 of resource health and sustainability parameters 402 is shown, according to an exemplary embodiment. The resource health and sustainability parameters 402 include parameters that indicate the effect of building operation of the building 146 on the environment. The building health manager 128 can be configured to receive building data from the building systems 142 and determine the resource and sustainability parameters 402.

The resource health and sustainability parameters 402 include renewable energy parameters 1002. The renewable energy parameters 1002 can indicate whether the building 146 uses renewable energy sources such as solar panels or wind power. The renewable energy parameters 1002 include a solar panels parameter 1012 for the presence of solar panels in the building 146 and wind power parameters for the presence in wind power systems associated with the building 146.

The reduce carbon footprint parameters 1004 can include an electric vehicle (EV) system parameter 1016 indicating whether an electric vehicle charging system is available in the building 146. The reduce waste parameter 1018 can track waste of the building 146 and indicate whether waste is increasing, decreasing, greater than a particular amount, less than a particular amount, etc. The reduce carbon footprint parameters 1004 include an asset efficiency parameter 1020 indicating whether equipment of the building 146 is operating efficiently or inefficiently. Furthermore, the reduce carbon footprint parameter 1004 include space utilization parameter 1022 which indicates whether spaces of the building are at the proper occupancy levels, e.g., whether spaces have to many occupants or not enough occupants.

The resource health and sustainability parameters 402 include an HVAC performance optimization parameter 1024 indicating if HVAC equipment of the building is optimized to utilize less energy. The resource conservation parameter 1006 indicates a better systems control 1026 indicating whether the building 146 includes system control that minimizes energy usage. Furthermore, the resource conservation parameter 1006 includes a water conservation parameter 1030 indicating water usage by the building 146. The water conservation parameter 1030 can indicate the presence of rainwater handling systems for the building that can reuse rainwater in the building. Furthermore, the resource conservation parameter 1006 includes a resource usage conscientiousness parameter 1028 indicating the presence of systems at the building 146 for users to log complaints indicating poor resource usage in the building 146.

The reduced emission parameters 1008 include parameters relating to emissions of the building 146. The building health manager 128 can be configured to receive building data from the building systems 142 and determine the reduced emission parameters 1008 based on the building data. For example, the net zero energy parameter 1032 can indicate whether the building 146 is at net zero energy, i.e., whether all energy consumed by the building 146 is created by the building 146, e.g., via wind power, solar power, etc. In some embodiments, the net zero energy parameter 1032 indicates how close to net zero energy production the building is at, e.g., a percentage or score. The reduced emission parameter 1008 includes a net carbon emission parameter 1038 indicating how close the building 146 is to net carbon neutrality.

The reduced emission parameter 1008 include a reduced chemical waste parameter 1034. The reduced chemical waste parameter 1034 can indicate the levels of chemical waste created by systems of the building 146, e.g., chemical waste created from disposed light bulbs, oil from oil changes of systems of the building, refrigerant fluid changes, etc. The reduced chemical waste can, in some cases, be air or water pollution prevention and/or reduction. The reduced emission parameters 1008 include a water processing parameter 1036. The water processing parameter 1036 indicates whether water reuse and processing systems are available at the building 146 that are configured to clean and filter used water and reuse the water in the building 146. The water processing parameter 1036 can further indicate the percentage of water used at the building 146 is reused water. Furthermore, the reduced emission parameter 1008 indicate carbon emission levels and/or whether the building 146 is at net zero carbon emission and/or how close the building 146 is to net zero carbon emission. In some cases, the reduced emissions parameter 1008 indicates reductions in light pollution and/or sound pollution.

The resource health and sustainability parameters 402 include sustainability parameters 1010. The sustainability parameters 1010 include a clean energy parameter 1040 and a dirty energy parameter 1042. The clean energy parameter 1040 can indicate what percentage or what amount of electrical energy consumed by the building 146 is clean energy, e.g., originating from clean energy sources such as wind power, solar power, nuclear, etc. The dirty energy parameter 1042 indicates what percentage or what amount of electrical energy consumed by the building 146 is dirty energy, e.g., originating from a coal power plant, gas generator, etc. In some cases the sustainability parameters 402 indicate walkability scores indicating the ability of individuals to walk to the building, outdoor community features for the building, product manufacturing and transport emissions, employee commuting emissions, energy efficiency, enhanced control implementation, active demand response, the presence energy star rated equipment, water management, etc.

Figure 11:
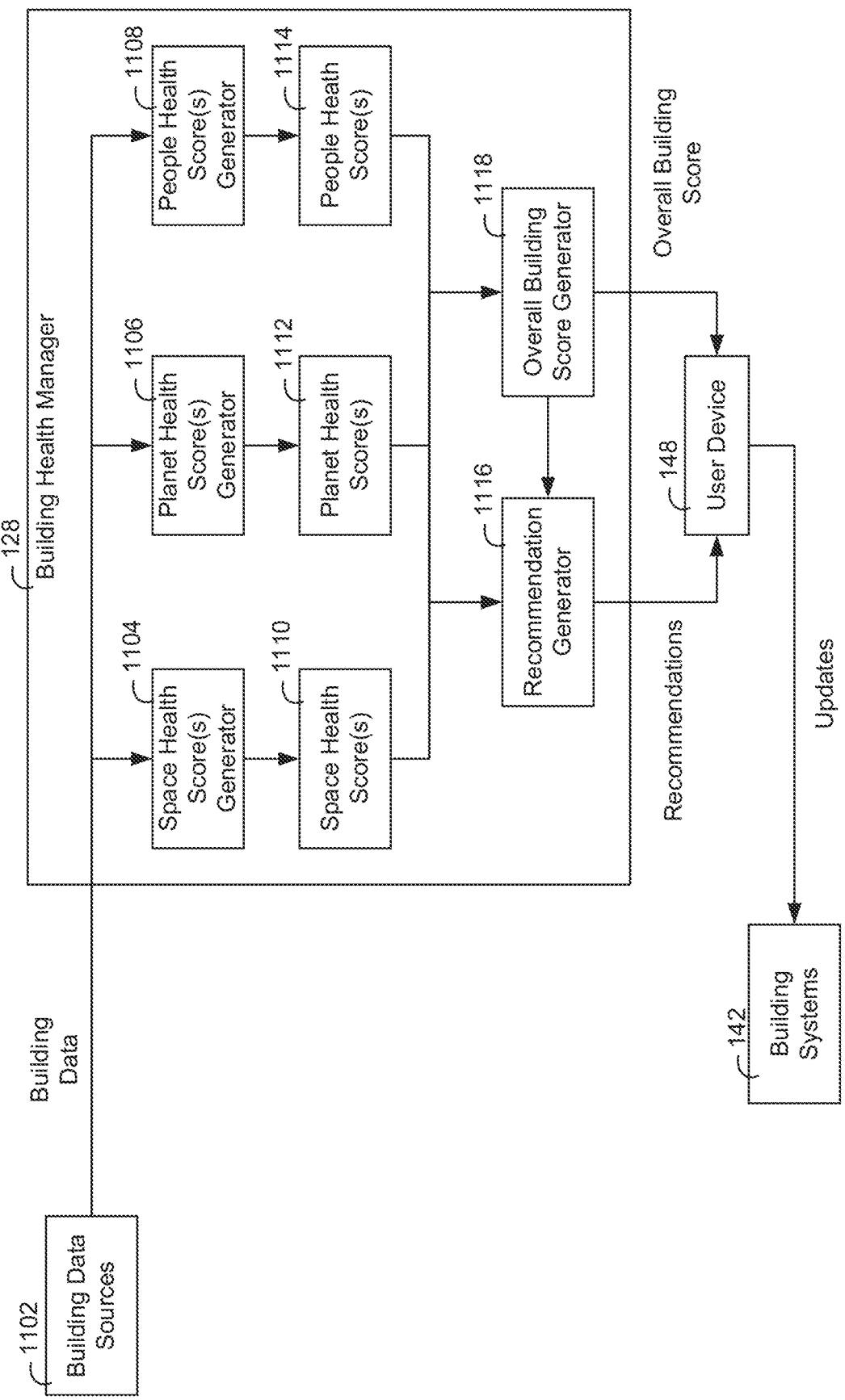
FIG. 11 is a block diagram of the building health manager generating an overall building score from space health scores, planet health scores, and people health scores, according to an exemplary embodiment.

Referring now to FIG. 11, the building health manager 128 is shown generating an overall building score from space health scores, planet health scores, and people health scores, according to an exemplary embodiment. The building health manager 128 can receive building data from building data sources 1102. For example, the building data sources 1102 can include local subsystems of the building 146 operating at the building, e.g., the building systems 142. Furthermore, the building data sources 1102 can include the external systems 144. The building data received by the building health manager 128 can include data such as space temperature, humidity, light levels, equipment fault data, water usage, occupant locations, meeting productivity, food or drink menu nutrition levels, occupant physical activity levels, and/or any other data as described with reference to FIGS. 1-10.

The building health manager 128 includes a space health scores generator 1104, a planet health scores generator 1106, and a people health scores generator 1108. The space health scores generator 1104 can generate space health scores 1110 for the space health parameters 304. The planet health scores generator 1106 can generate the planet health scores 1112 for the planet health parameters 302. The people health scores generator 1108 can generate people health scores 1114 for the people health parameters 306. In some embodiments, the scores generated by the space health scores generator 1104, the planet health scores generator 1106, and the people health scores generator 1108 are scores generated for the parameters described with reference to FIGS. 1-10.

For example, for the people health scores 1114, the people health scores generator 1108 can generate scores for parameters that indicate whether a workplace is safe and secure, whether a work environment is comfortable, enhanced productivity of a space, stress of occupants, nutrition and exercise of occupants, frictionless access and services offered by the building 146, social distancing and contact tracing of the building 146, and hand washing of the building space.

For example, the people health scores generator 1108 could generate scores for each parameter. For example, the people health score generator 1108 can generate a score of 9 for the workplace safety and security parameter, a score of 8 for the work environment comfortability parameter, a score of 7 for an enhanced productivity of a space parameter, a score of 7 for a stress of occupants parameter, a score of 8 for a nutrition and exercise of occupants parameter, a score of 10 for a frictionless movement parameter, a score of 6 for a social distancing parameter, a score of 9 for a contact tracing parameter, and a score of 7 for a hand washing parameter. Based on the scores for the parameters, the people health scores generator 1108 can generate a people health score, e.g., with a score of 8. Similar determinations can be generated for the space health scores 1110 by the space health scores generator 1104 and the planet health scores 1112 by the planet health scores generator 1106.

Based on the space health scores 1110, the planet health score 1112, and/or the people health scores 1114, the building health manager 128 can be configured to generate an overall building score with the overall building score generator 1118 of the building health manager 128. The overall building score generator 1118 can generate an average (e.g., a weighted average) of the space health scores 1110, the planet health scores 1112, and/or the people health scores 1114. The overall building score generator 1118 can be configure to provide the overall building score to a recommendation generator 1116 and/or the user device 148 via a user interface (e.g., the user interfaces shown and described with reference to FIGS. 13-18).

The recommendation generator 1116 can generate recommendations for improving the overall building score, the space health scores 1110, the planet health scores 1112, and/or the people health scores 1114. The recommendation generator 1116 can generate recommendations to update temperature of spaces, update lighting levels of spaces, offer healthier cafeteria food, offer workout classes, reduce employee workload, improve occupant social distancing, etc.

In some embodiments, the recommendations can be specific to the space health scores 1110, the planet health scores 1112, and/or the people health scores 1114. For example, the recommendations could be specific to the people health scores 1114. For example, the recommendation could be to condition meeting rooms prior to a meeting to ensure occupants are comfortable from the start, increase light levels in the building 146 due to lack of natural light, add a wayfinding service to the building 146 to help occupants efficiently navigate the building, remind occupants of proper hand washing techniques, etc.

In some embodiments, the planet health score generator 1106 can generate the planet health scores 1112 based on determinations made by emissions produced by the building data sources 1102 based optimizations resulting from various optimization systems. The various optimization systems may, in some embodiments, be the optimization system described in U.S. Patent Application No. 63/246,177 filed Sep. 20, 2021 for sustainability planning, which is incorporated by reference herein.

The recommendations can be provided to a user via the user device 148 by the recommendation generator 1116. The user device 148 can approve the recommendations and make updates to the building systems 142, e.g., the building health manager 128 can provide setting updates to the building systems 142 updating the operation of the building systems 142 in response to receiving user approval. In some embodiments, the building health manager 128 can generate work orders. For example, the work orders may be work orders to install new equipment or services, perform maintenance, etc. Furthermore, in some embodiments, the building health manager 128 can implement the recommendations automatically without requiring user approval.

Figure 12:
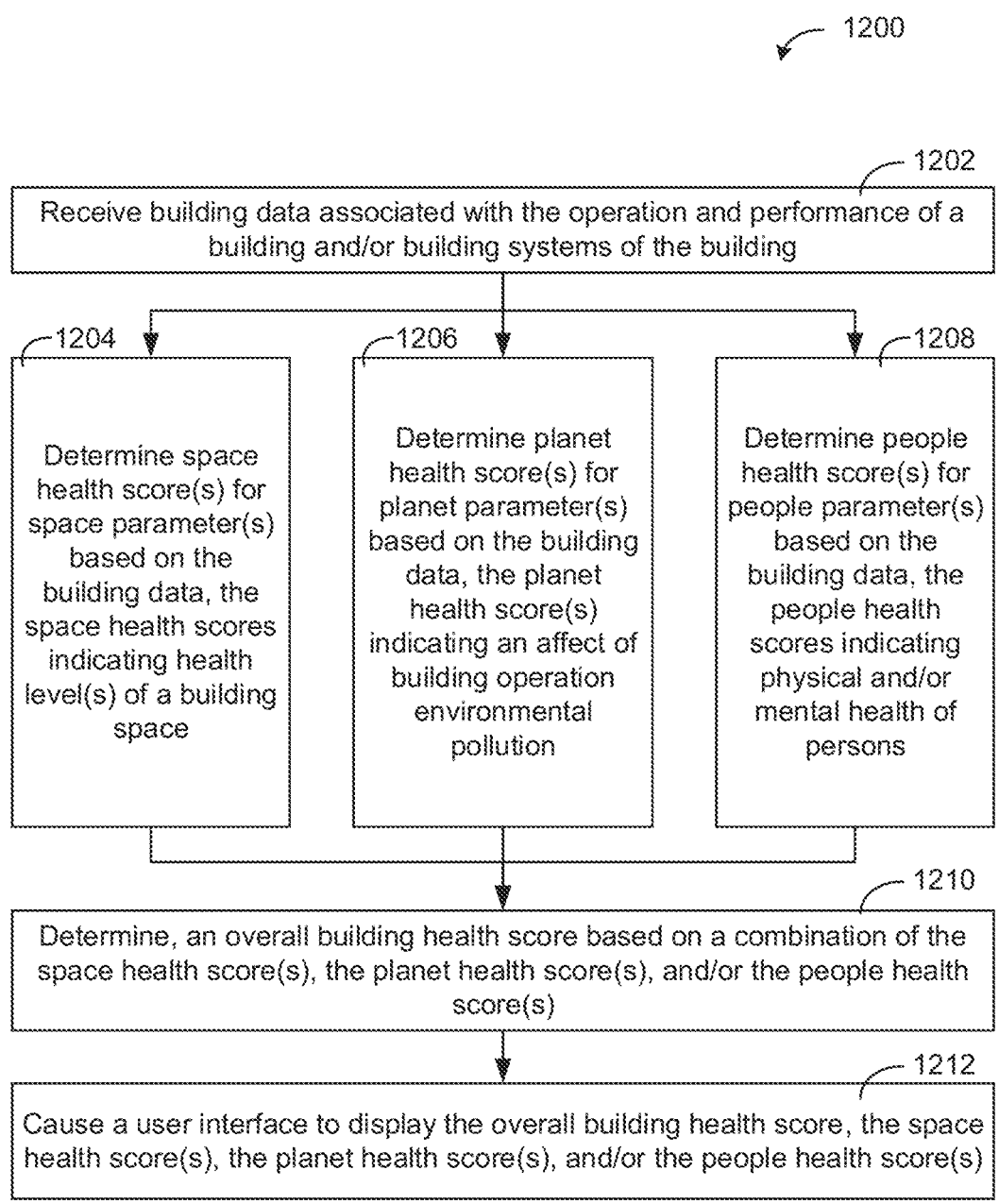
FIG. 12 is a flow diagram of a process of generating the overall building score from the space health scores, the planet health scores, and the people health scores, according to an exemplary embodiment.

Referring now to FIG. 12, a flow diagram of a process 1200 of generating the overall building score from the space health scores 1110, the planet health scores 1112, and the people health scores 1114 is shown, according to an exemplary embodiment. The building health manager 128 can be configured to perform the process 1200. Furthermore, any computing system or device described herein can be configured to perform the process 1200.

In step 1202, the building health manager 128 can receive building data associated with the operation and performance of the building 146 and/or the building systems 142. The building health manager 128 can receive operational data of the building systems 142, identifying information identifying what subsystems are present in the building 146, data from the external systems 144, etc.

In step 1204, the building health manager 128 can determine the space health scores 1110 for the space health parameters 304 based on the building data. For example, the building health manager 128 could determine a score for each of the space health parameters 304. In some embodiments, the building health manager 128 can generate a composite space health score based on the scores for each of the space health parameters 304.

In step 1206, the building health manager 128 can determine the planet health scores 1112 for the planet health parameters 302 based on the building data. For example, the building health manager 128 could determine a score for each of the planet health parameters 302. In some embodiments, the building health manager 128 can generate a composite planet health score based on the scores for each of the planet health parameters 302.

In step 1208, the building health manager 128 can determine the people health scores 1114 for the people health parameters 306 based on the building data. For example, the building health manager 128 could determine a score for each of the people health parameters 306. In some embodiments, the building health manager 128 can generate a composite people health score based on the scores for each of the people health parameters 306.

In step 1210, the building health manager 128 can be configured to generate an overall building health score based on a combination of the space health scores 1110, the planet health scores 1112, and the people health scores 1114. For example, the building health manager 128 can generate an average of the space health scores 1110, the planet health scores 1112, and the people health scores 1114. In some embodiments, the average is a weight average. In some embodiments, a user provides weight values for weighting each of the space health scores 1110, the planet health scores 1112, and the people health scores 1114.

In step 1212, the building health manager 128 can cause a user interface to display the overall building health score determined in the step 1210. In some embodiments, the building health manager 128 causes the user interface to include the space health scores 1110, the planet health scores 1112, and the people health scores 1114. The building health manager 128 can cause the user device 148 to display the user interface.

Figure 13:
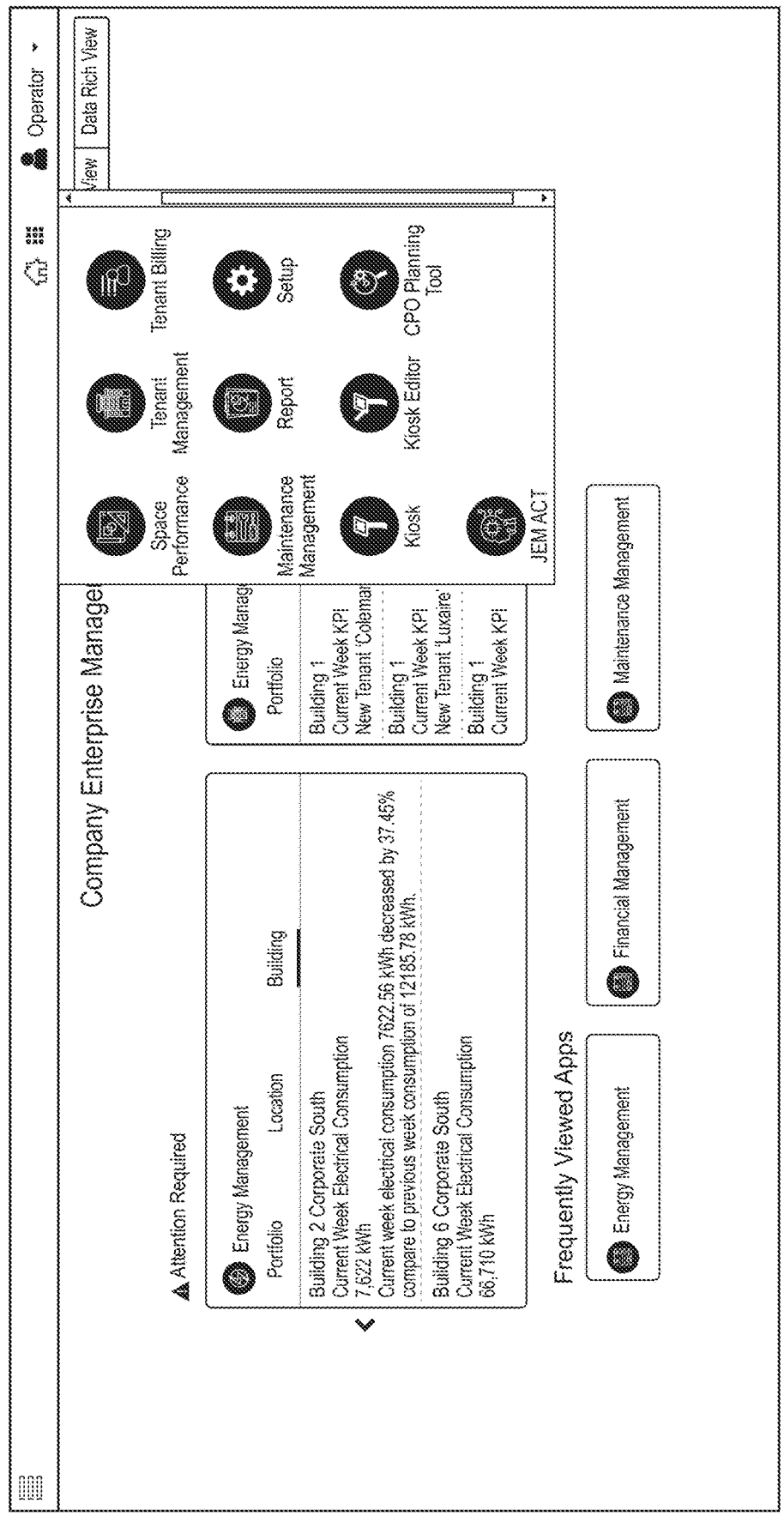
FIG. 13 is a building management interface, according to an exemplary embodiment.

Referring now to FIG. 13, a building management interface 1300 is shown, according to an exemplary embodiment. The building management interface 1300 displays information indicating actions that should be taken in a building and/or building notifications. The building management interface 1300 can provide a user with a summary of key performance indicators. Furthermore, the building management interface 1300 can provide a user with a menu to navigate to other user interfaces, e.g., the user interfaces described with reference to FIGS. 14-18.

Figure 14:
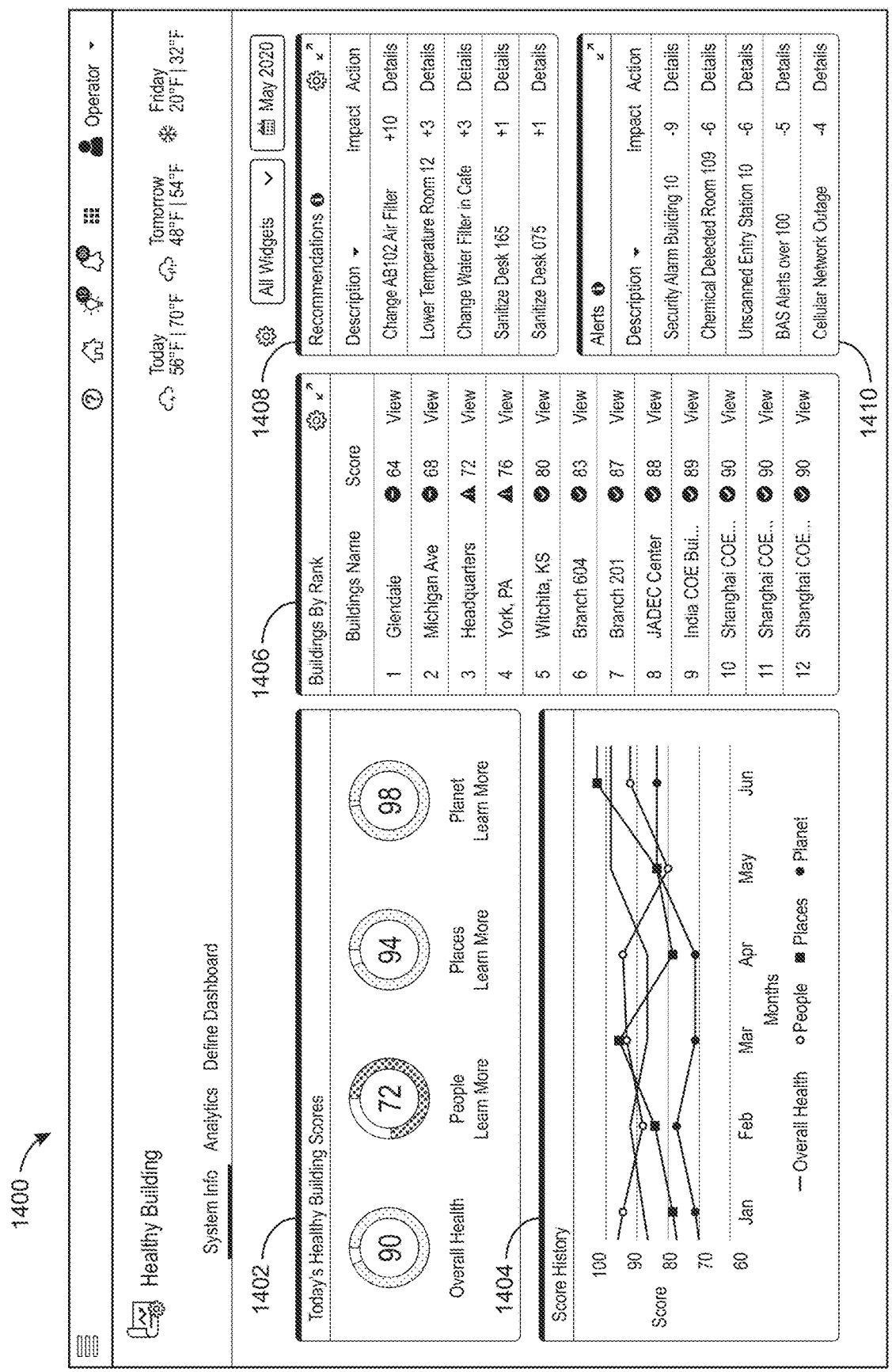
FIG. 14 is a building health interface, according to an exemplary embodiment.

Referring now to FIG. 14, a building health interface 1400 is shown, according to an exemplary embodiment. The interface 1400 includes an element 1402 indicating scores for a building for a particular day. The element 1402 can include an overall building health score determined by the building health manager 128 from the space health scores 1110, the planet health scores 1112, and/or the people health scores 1114. Furthermore, the element 1402 includes indications of the space health scores 1110, the planet health scores 1112, and the people health scores 1114. The interface 1400 further includes a score history element 1404. The element 1404 indicates a history of the overall health score, the space health scores 1110, the planet health scores 1112, and/or the people health scores 1114 trended over time.

The interface 1400 further includes ranked buildings for an entity in element 1406. The element 1406 indicates multiple different buildings associated with an entity, e.g., shopping locations associated with a retailer, office locations of a company, buildings of a campus, etc. The element 1406 can include an overall building score for each building of the element 1406 ranked in order from lowest score to highest score, in some embodiments.

Furthermore, the interface 1400 includes a recommendations element 1408 indicating multiple recommendations for improving the building 146. The recommendations of the recommendation element 1408 could be a recommendation to change the air filter of a device, lower temperature in a particular room, change a water filter in a cafeteria, sanitize particular desks, etc. Furthermore, the interface 1400 includes an alerts element 1410. The element 1410 indicates alerts for a building, issues that need to be addressed by a technician. For example, the alerts of the element 1410 can include a security alarm of a particular building, a dangerous chemical detected in a particular room, an unscanned entry of a user to a particular location of a building, a building automation system alert level increasing over a particular level, a cellular network outage at the building, etc.

Referring now to FIG. 15, an occupant health interface 1500 is shown, according to an exemplary embodiment. The occupant health interface 1500 indicates scores for the people health parameters 306. The occupant health interface 1500 includes an occupant health score element 1502. The element 1502 indicates a value for the people health scores 1114. For example, the element 1502 can indicate an overall people health score for the people health parameters 306 for a particular day.

The interface 1500 includes a wellness element 1504. The element 1504 can indicate scores and alerts for the water parameter 632, the fitness parameter 636, and the food parameter 634. The interface 1500 further includes a security element 1606 indicating scores and alerts for the occupancy parameter 626, the emergency parameter 628, and the accessibility parameter 630. The interface 1500 includes an air element 1508 indicating a score and associated alerts for the air parameter 612.

The interface 1500 includes an ergonomics element 1510 including indications of scores and alerts for the light parameter 614, the thermal comfort parameter 616, the seat parameter 620, the sound parameter 618, the mind parameter 622, and the social parameter 624. Furthermore, the interface 1500 includes a cleanliness and anti-infection element 1512. The element 1512 indicates scores and alerts for the handwashing parameter 638, the pest control parameter 640, and the sanitization parameter 642.

The interface 1500 includes a recommendations element 1514. The recommendations element 1514 further includes an impact value, whether positive or negative, for each recommendation indicating the impact that each recommendation has on the overall occupant health score. The recommendations element 1514 include a recommendation to change an air filter for a system, lower a temperature in a particular room, change a water filter in a cafeteria, sanitize particular desks, etc. Furthermore, the interface 1500 includes an element 1516 indicating alerts for the building and the impact of each alert on the overall occupant health score. The alerts can indicate a security alarm for a particular building, a chemical detection in a particular room, an unscanned occupant entry event at an entry station, a number of building automation system alerts going over a particular amount, a cellular network outage, etc.

Figure 16A:
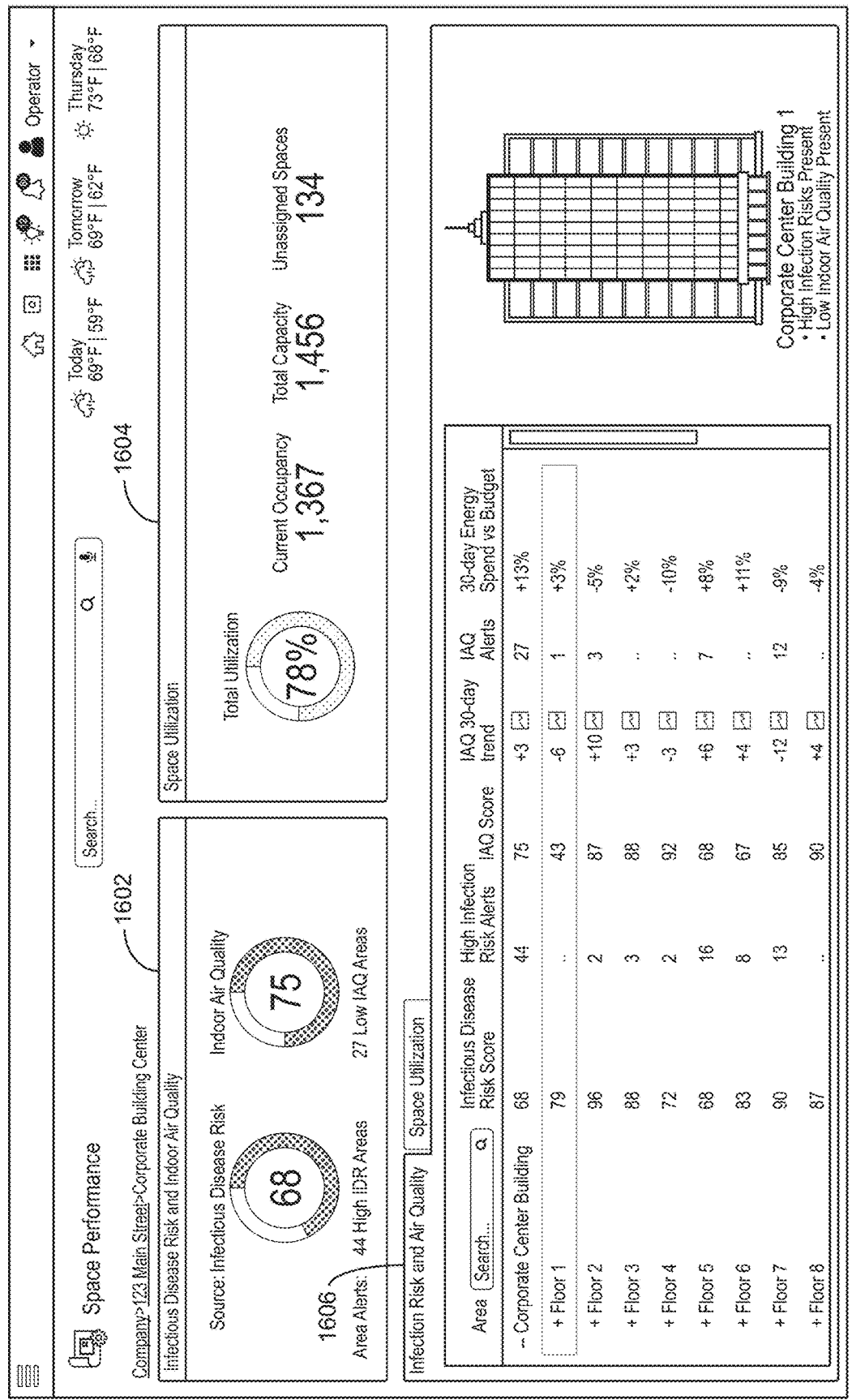
FIG. 16A is a space performance user interface including infection risk and air quality information, according to an exemplary embodiment.

Referring now to FIG. 16A, a space performance user interface 1600 including infection risk and air quality information is shown, according to an exemplary embodiment. The user interface 1600 includes an element 1602 indicating infectious disease risk for the building 146 and indoor air quality for the building 146. Furthermore, the space performance user interface 1600 includes an element 1604 indicating a space utilization element 1604.

The space performance user interface 1600 includes an infection risk and air quality element 1606. The element 1606 includes indications of various areas of a building, e.g., floors of the building 146. The element 1606 further includes infectious disease risk scores, high infection risk alerts, IAQ scores, an IAQ trend, IAQ alerts, and a thirty day energy spend vs. budget score for each of the spaces of the building 146.

Figure 16B:
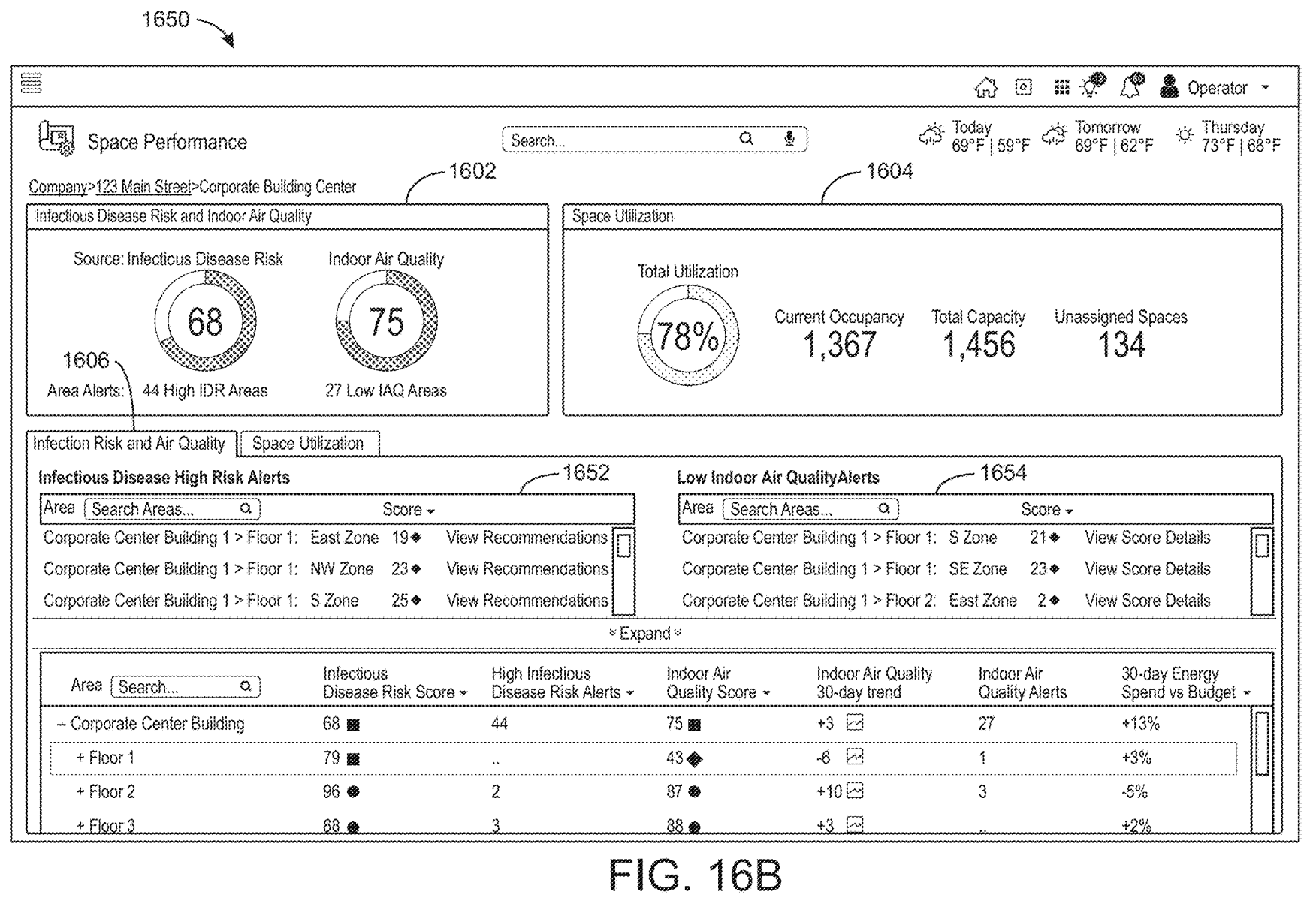

Referring now to FIG. 16B, another space performance user interface 1650 including infection risk and air quality information is shown, according to an exemplary embodiment. The interface 1650 can be similar to the interface 1600 of FIG. 16A and includes similar elements, e.g., the elements 1602-1606. Furthermore, the interface 1650 includes an element 1652 that includes an indication of alerts affecting an infectious disease risk score. The interface 1650 includes an element 1654 indicating alerts that affect indoor air quality.

Figure 16C:
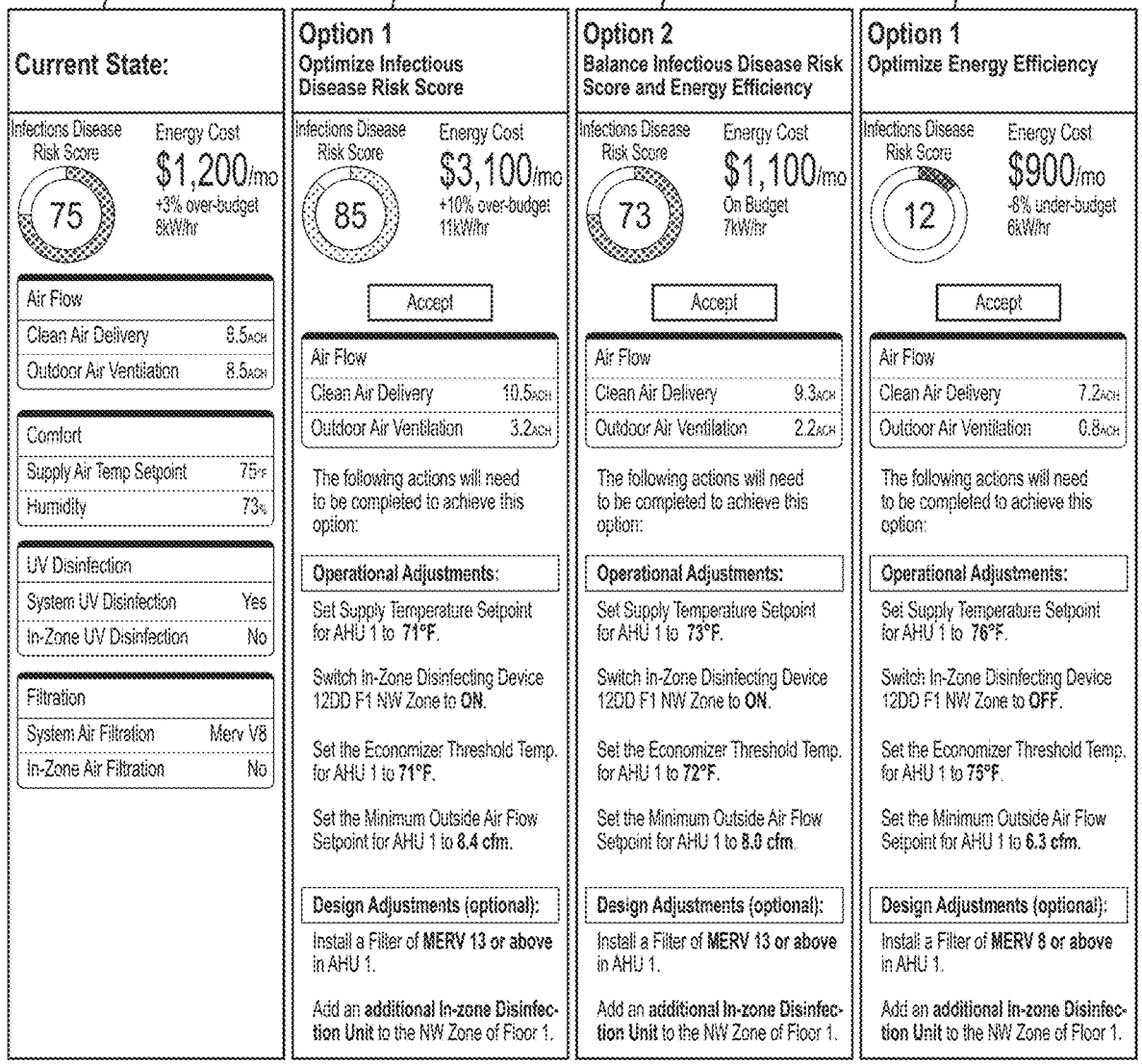
FIG. 16C is a user interface providing recommendations for a user to select from that affect an infectious disease risk score, according to an exemplary embodiment.

Referring now to FIG. 16C, a user interface 1660 providing recommendations for a user to select from that effect an infectious disease risk score is shown, according to an exemplary embodiment. The recommendation generator 1116 can generate the user interface 1660 and/or the recommendations included within the user interface 1660. The user interface 1660 includes an element 1662 indicating a current state of the user interface 1660. Furthermore, the user interface 1660 includes elements 1664-1668 indicating recommendations.

The element 1662 provides an indication of a score for infectious disease risk and a current monthly energy cost, e.g., a monthly energy bill. Furthermore, the element 1662 includes an indication of current values for settings such as air flow, comfort, ultraviolet (UV) disinfection, and filtration. Each of the recommendations of the elements 1664-1668 include updates to the values of the current settings. Furthermore, each of the elements 1664-1668 indicate operational adjustments and optional design adjustments.

Furthermore, each element 1664-1668 indicate predicted updates to the infectious disease risk score and monthly energy cost (e.g., increase or decreases) that will result from the settings of each recommendation. An accept element is included within each of the elements 1664-1668 allowing a user to interact with the interface 1660 and select one of the recommendations. Responsive to selecting one of the recommendations, e.g., the recommendation of element 1664, a user interface displaying operational adjustments 1670, e.g., the user interface 1680 can be displayed.

Referring now to FIG. 16D, a user interface 1680 including optional adjustments for one of the recommendations of the interface of FIG. 16C is shown, according to an exemplary embodiment. The user interface 1680 can be displayed responsive to a user interacting with the element 1664, e.g., "Option 1." The user interface 1680 includes operational adjustments 1681 and design adjustments 1682 which are optional. The operational adjustments 1681 summarize the changes for the recommendation. A user can navigate to a command and control element for each setting change to implement or review an automatic change made by the system to operating settings for the building systems 142. The design adjustments 1682 can be optional adjustments which do not affect the predictions of the recommendation but could improve the results of the recommendation. The element 1683 provides a description of the selected recommendation.

Referring now to FIG. 16E, a user interface 1684 including accepted operational adjustments for the one recommendation of FIG. 16D is shown, according to an exemplary embodiment. The user interface 1684 can be displayed responsive to the settings of the recommendation described in FIG. 16D is accepted by a user. Accepted operational adjustments 1685 and accepted design adjustments 1686 can be displayed in the user interface 1684.

Referring now to FIG. 16F, a user interface 1687 including optional adjustments for another one of the recommendations of the interface of FIG. 16C is shown, according to an exemplary embodiment. The user interface 1688 can be displayed responsive to a user interacting with the element 1666, e.g., "Option 2." The user interface 1687 includes operational adjustments 1688 and design adjustments 1689 which are optional. The operational adjustments 1688 summarize the setting changes for the recommendation. A user can navigate to a command and control element for each setting change to implement or review an automatic change made by the system to operating settings for the building systems 142. The design adjustments 1689 can be optional adjustments which do not affect the predictions of the recommendation but could improve the results of the recommendation. The element 1690 provides a description of the selected recommendation.

Figure 16G:
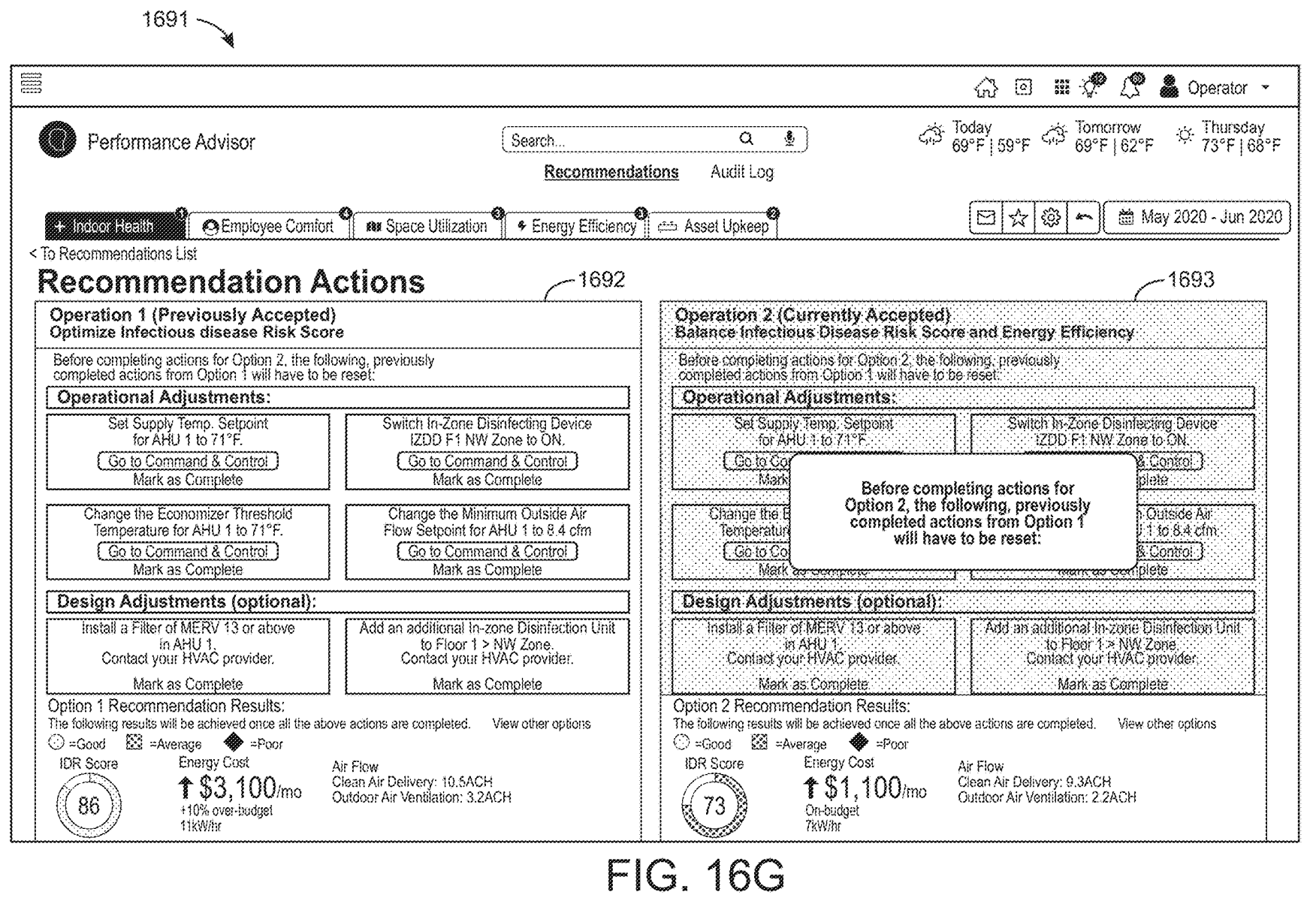

Referring now to FIG. 16G, a user interface 1691 including recommendations where a first recommendation needs to be reset before a second recommendation can be accepted is shown, according to an exemplary embodiment. The user interface 1691 can be displayed responsive to a user selecting a recommendation after a first recommendation is selected, e.g., the second recommendation conflicts with the first recommendation. In FIG. 16G, the example is the "Option 2" being selected after the "Option 1" is selected. Element 1692 provides a summary of the "Option 1," a recommendation selected via element 1664 of FIG. 16C. The element 1693 can provide a summary of the "Option 2," a recommendation selected via element 1666 of FIG. 16C.

Figure 17:
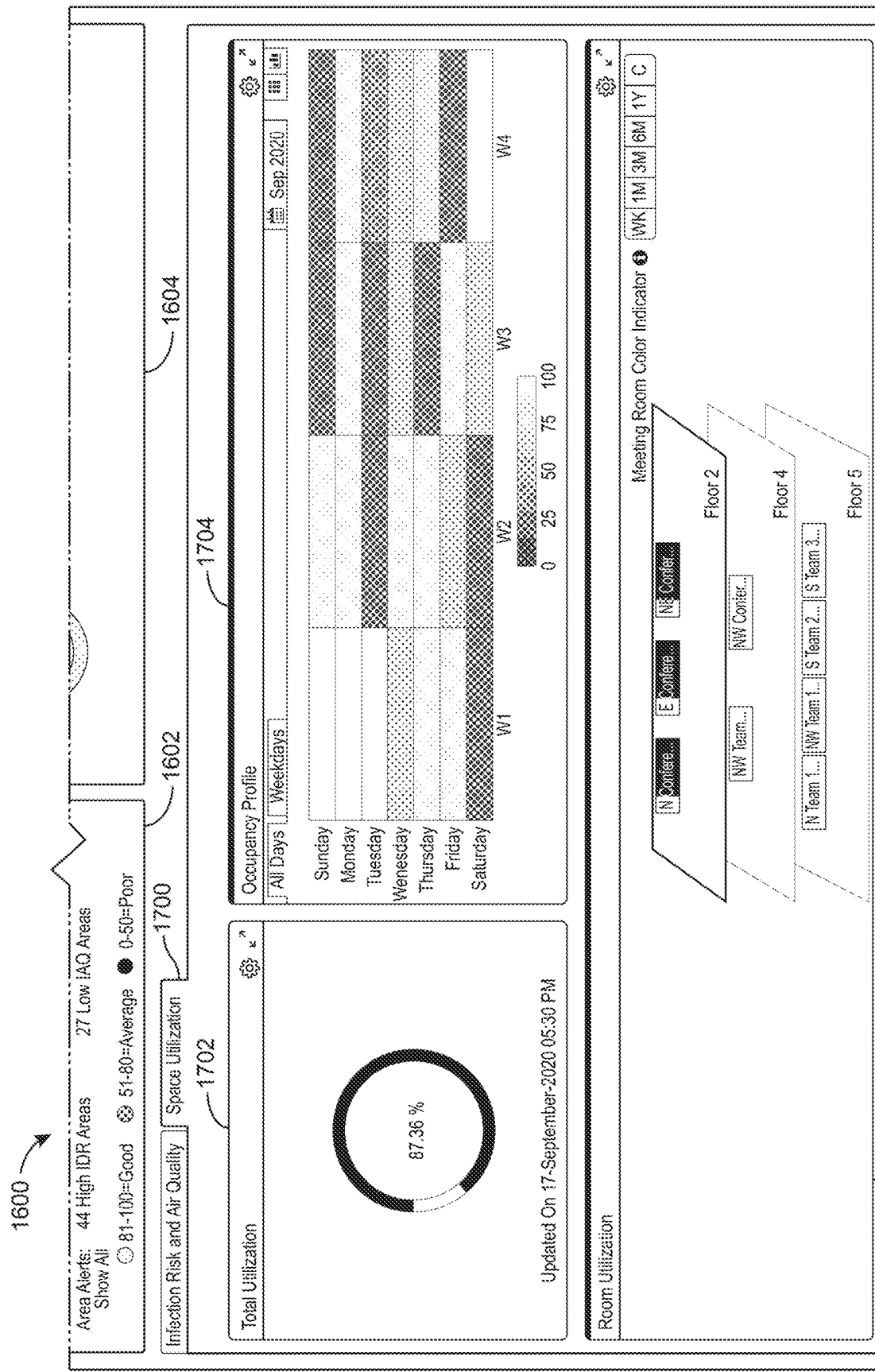
FIGS. 17-18A-B is the space performance user interface of FIGS. 16A-B including space utilization information, according to an exemplary embodiment.
Figure 18A:
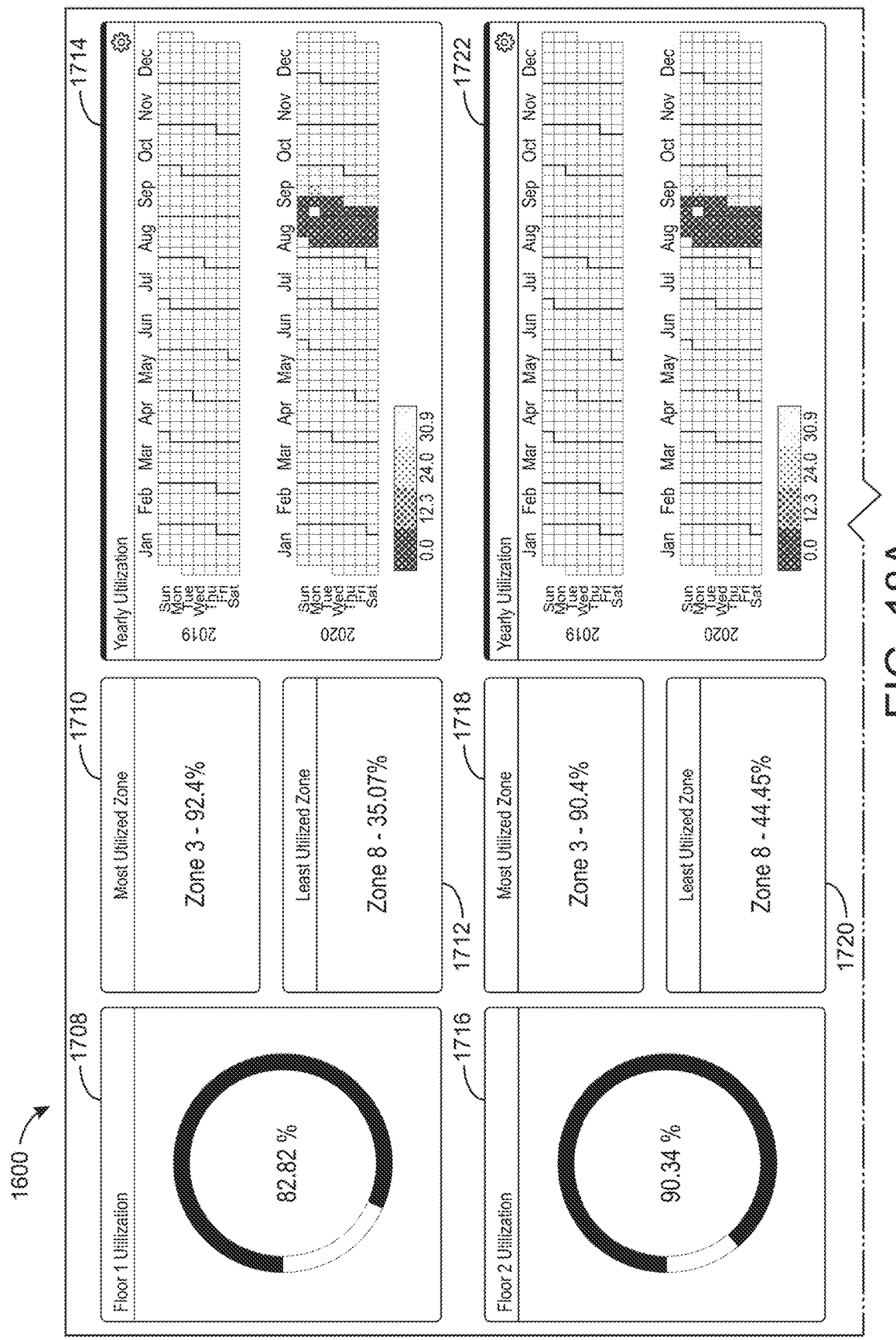
Figure 18B:
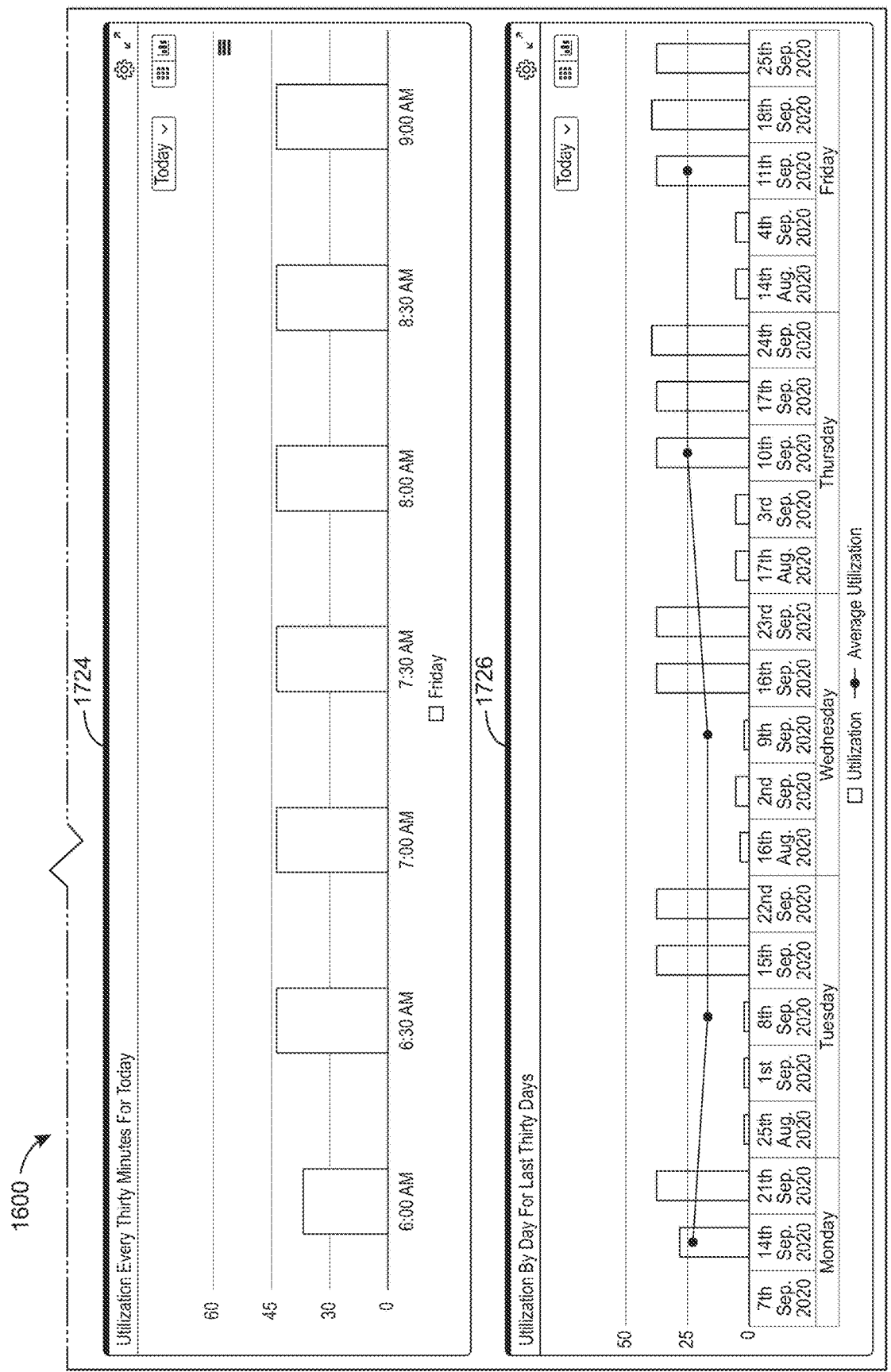

Referring now to FIGS. 17-18A-B, the space performance user interface 1600 including space utilization information is shown, according to an exemplary embodiment. The space performance user interface 1600 includes a space utilization element 1700. The element 1700 includes a total utilization 1702 indicating an overall occupancy level of the building 146. The element 1700 includes an occupancy profile 1704 indicates occupancy profiles for various days of the week for the building 146. Furthermore, the element 1706 indicates meeting rooms of various floors of the building 146 and the utilization of each meeting room.

The space performance user interface 1600 includes a floor utilization element 1708 indicating the floor utilization of a "Floor 1" of the building 146. The space performance user interface 1600 further includes a most utilized zone element 1710 indicating which zone of the "Floor 1" of the building 146 is the most utilized zone. Furthermore, the space performance user interface 1600 includes a least utilized zone element 1712 indicating the least utilized zone in the building 146.

The space performance user interface 1600 includes a yearly utilization element 1714 indicating the yearly space utilization of areas of the building 146. The space performance user interface 1600 indicates a floor utilization element 1716 indicating floor utilization for a "Floor 2" of the building 146. The space performance user interface 1600 includes a most utilized zone element 1718 indicating which zone of the "Floor 2" is the most utilized zone. Similarly, the space performance user interface 1600 indicates a least utilized zone element 1720 of the "Floor 2." The space performance user interface 1600 includes a yearly utilization element 1722 of the "Floor 2" of the building 146. Furthermore, the space performance user interface 1600 indicates a utilization element 1724 indicating utilization of the building 146 for every thirty minutes of a day. The space performance user interface 1600 further indicates an element 1726 indicating utilization of the building 146 by day for the last thirty days.

Figure 19:
FIG. 19 is a table of air quality parameter scoring, according to an exemplary embodiment.

Referring now to FIG. 19, is a table 1900 of air quality parameter scoring is shown, according to an exemplary embodiment. The table 1900 can indicate scoring for the air parameters 602. The table 1900 indicates sub parameters such as carbon dioxide, duct static pressure, air velocity, air replacement, total volatile organic compound (TVOC), particulate matters, air replacement, etc. The parameters can be parameters measured and/or controlled by the building systems 142 in the building 146. Furthermore, the table 1900 indicates a criteria for scoring each sub parameter. Each sub parameter includes an allocated score (e.g., the allotted score to the parameter if the criterial is met), a total instances parameter, a deviation instances parameter, and a score calculation (e.g., an equation based on the allocated score parameter, the total instances parameter, and/or the deviation instances parameter).

Indoor air quality (IAQ) may depend on the presence and abundance of pollutants in the indoor environment that may cause harm. People spend 80-90% of time in enclosed building, in some cases. During this time, the occupants may inhale indoor air pollutants that could result in short-term or long-term health problems. A ventilation system can be installed in the building 146 to bring required fresh air in from outside (e.g., clean air changeovers) and dilute occupant-generated pollutants (e.g., carbon dioxide) and product-generated pollutants (e.g., volatile organic compounds). Poorly ventilated spaces promote symptoms such as headache, fatigue, shortness of breath, sinus congestion, cough, sneezing, eye, nose, throat, and skin irritation, dizziness, and nausea. Furthermore, an airborne disease (e.g., COVID-19) can spread through transmission from one person to another in tiny particles of water and virus called aerosols. Aerosols can stay floating in the air for hours and can travel long distances. Aerosols can build up if the air inside is not circulated and/or filtered by the building 146 the right way.

Figure 20:
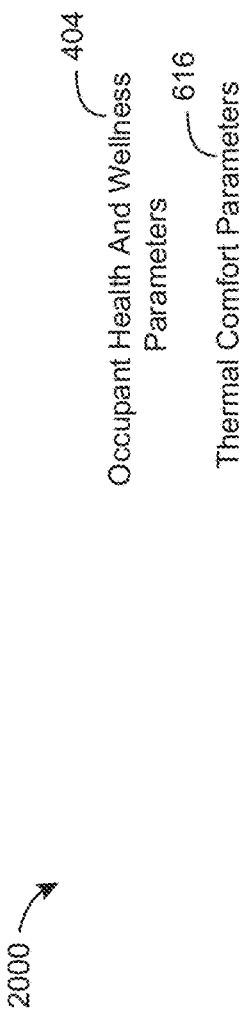
FIG. 20 is a table of thermal comfort parameter scoring, according to an exemplary embodiment.

Referring now to FIG. 20, a table 2000 of thermal comfort parameter scoring is shown, according to an exemplary embodiment. The table 2000 can indicate scoring for the air parameters 602. The table 2000 indicates sub parameters such as dry bulb temperature, personalized control optimum start, and/or humidity control, etc. The sub parameters can be parameters measured and/or controlled by the building systems 142 in the building 146. Furthermore the table 2000 indicates a criteria for scoring each sub parameter. Each sub parameter includes an allocated score (e.g., the allotted score to the parameter if the criterial is met), a total instances parameter, a deviation instances parameter, and a score calculation (e.g., an equation based on the allocated score parameter, the total instances parameter, and/or the deviation instances parameter).

Thermal conditions may be integral to the occupant experience in the building 146. Ventilation, temperature control, and/or humidity are all factors of the building 146 that may contribute significantly to workplace experience and task capabilities. A study on workplace thermal conditions and/or health impacts observed that workers experienced itchy, watery eyes, headaches, and/or throat irritation when thermal factors such as ventilation, humidity, and heat were unfavorable.

When indoor environments are too warm, there is evidence of increases in sick building syndrome symptoms, negative moods, elevated heart rate, respiratory issues, and feelings of fatigue. Thermal comfort can be more important to office worker performance than job stress or job satisfaction. Thermal comfort may be influenced by objective factors like air temperature, mean radiant temperature, air speed, and humidity, as well as personal factors like metabolic activity level and thermal insulation from clothing.

Referring now to FIG. 21, a table 2100 of light parameter scoring is shown, according to an exemplary embodiment. The table 2100 can indicate scoring for the light parameters 614. The table 2100 indicates sub parameters such as desk light control, meeting room light control, outdoor conditions, etc. The sub parameters can be parameters indicating the presence or absence of certain systems of the building systems 142 in the building 146. Furthermore the table 2100 indicates a criteria for scoring each sub parameter. Each sub parameter includes an allocated score and a score calculation. The calculation can indicate that the allocated score is attributed to the sub parameter if the system referenced by the sub parameter is present in the building 146.

The eye can have dual roles. The eye can detect light to allow us to see but also detects light to tell the brain what time of day it is. These visual and non-visual effects of light can have different sensitivities to light intensity, spectrum, timing, pattern, and/or light history and are served by different light detectors (photoreceptors) in the eye. Both roles are important considerations when assessing the quality of a built environment. Light may be the main driver of the visual and circadian systems. Light levels typically experienced indoors (e.g., tens to hundreds of lux) can induce non-visual responses. Therefore the type of lighting occupants are exposed to during the day and night may need to be optimized. Light exposure can impact mood and reduces symptoms of depression in individuals. Light also has acute effects on our cognitive function and sleep.

Referring now to FIG. 22, a table 2200 of light sunshade parameter scoring is shown, according to an exemplary embodiment. The table 2200 can indicate scoring for light sunshade parameters. The table 2100 indicates sub parameters for sunshade control. The sub parameters can be parameters indicating the presence and/or operation of sunshade control systems of the building systems 142 in the building 146. Furthermore the table 2200 indicates a criteria for scoring each sub parameter. Some sub parameters includes an allocated score and a score calculation. The calculation can indicate that the allocated score is attributed to the sub parameter if the system referenced by the sub parameter is present in the building 146. For one sunshade control sub parameter, a total number of instances and a total number of deviations are used in a score calculation to determine a score of the sunshade control parameter.

Figure 23:
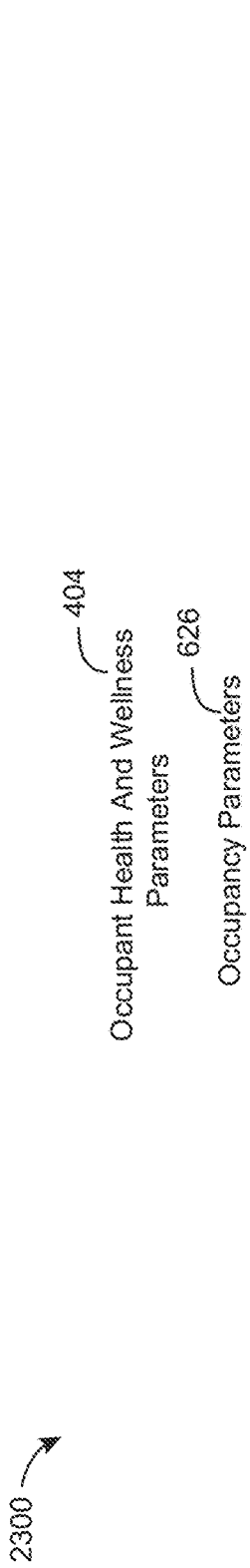
FIG. 23 is a table of occupancy parameter scoring, according to an exemplary embodiment.

Many studies on the health impacts of daylight have reported evidence for potential benefits including improvement to vision and sleep quality and reduced symptoms of myopia, eye strain, headache, and depression. Daylight exposure and/or access to windows at work have been linked to improved sleep duration and mood, reduced sleepiness, lower blood pressure and increased physical activity, whereas lack of natural light has been associated with physiological, sleep, and depressive symptoms. Office workers exposed to electric and natural lighting conditions have reported experiencing less glare and less sleepiness earlier in the day under natural lighting compared to when they were under electric lighting. Moreover, not only intensity but also the timing of daytime light exposure has been found to influence body mass index (BMI) in adults, with lower BMI in those who receive most of their bright light exposure earlier rather than later in the day Referring now to FIG. 23, a table 2300 of occupancy parameter scoring is shown, according to an exemplary embodiment. The table 2300 can indicate scoring for light sunshade parameters. The table 2300 indicates sub parameters for occupancy. The sub parameters can be parameters indicating a number of occupants sensed by the building systems 142 in the building 146. Furthermore the table 2300 indicates a criteria for scoring each sub parameter. Some sub parameters include an allocated score, a total instances, a deviation instances, and a score calculation.

Referring now to FIG. 24, a table 2400 of healthy building parameter scoring is shown, according to an exemplary embodiment. The table 2400 can indicate scoring for the seating parameters 620. The table 2400 indicates sub parameters for seating parameters. The sub parameters can be parameters indicating the presence of hot-desking and/or seating systems of the building systems 142 in the building 146. Furthermore, the table 2400 indicates a criteria for scoring each sub parameter. Some sub parameters includes an allocated score and a score calculation. The calculation can indicate that the allocated score is attributed to the sub parameter if the system referenced by the sub parameter is present in the building 146.

The seating parameters 620 can indicate whether ample active workstations, such as a sit-stand or treadmill desk are available in the building 146. Sedentary behavior has been linked to numerous negative health outcomes, including obesity, type 2 diabetes, cardiovascular and metabolic risks and premature mortality. Sedentary behavior also poses health risks, despite activity levels, and may even negate the positive health effects associated with physical activity. Active workstations may be effective at decreasing time spent sitting, thereby increasing energy expenditure. Studies do not suggest there is an impact on productivity for sit-stand or treadmill desks with more mixed findings for bicycle desks. Evidence further suggests that offering active workstations along with education, prompts and/or behavior change counseling may support sustained behavior change and further reduce sitting time.

Figure 25:
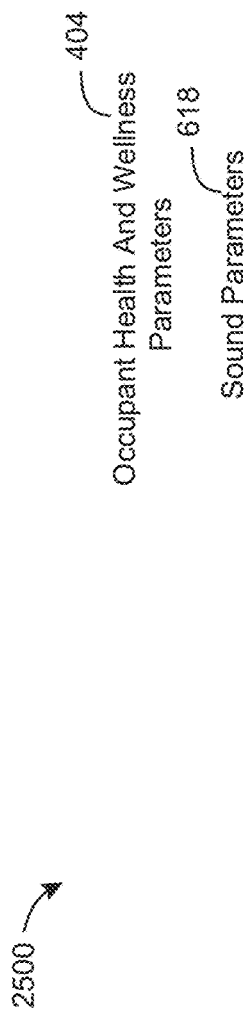
FIG. 25 is a table of sound parameter scoring, according to an exemplary embodiment.

Referring now to FIG. 25, a table 2500 of sound parameter scoring is shown, according to an exemplary embodiment. The table 2500 can indicate scoring for the sound parameters 618. The table 2500 indicates sub parameters for sound, e.g., noise level, music, etc. The sub parameters can be parameters indicating noise levels sensed by the building systems 142 in the building 146. Furthermore, the sub parameters indicate music playing actions that the building systems 142 can take in the building 146. Furthermore the table 2500 indicates a criteria for scoring each sub parameter. Some sub parameters are associated with an allocated score and a score calculation.

Noise may be defined as an "unwanted or disturbing sound" that interferes with normal activities such as work, sleeping, and/or conversation. Noise enters building interiors from outside sources such as aircraft, road traffic, trains, lawn mowers, snow blowers, and/or the operation of heavy equipment at construction sites. Indoors, noise can be generated from a mechanical system, HVAC systems, office equipment, vacuum cleaners, industrial machinery, and/or conversations among occupants.

The presence of background noise can also be disruptive and interfere with an ability of an individual to communicate and clearly perceive speech at a normal speaking volume. Thus, a building occupant may need to raise their voice to compensate. On the contrary, the music involves the use of the whole brain. Music can improve memory, attention, physical coordination and mental development. Classical music can stimulate the regeneration of brain cells. Classical music, played at a moderate volume, can encourage creativity, and/or repair brain damage.

Referring now to FIG. 26, a table 2600 of sanitization parameter scoring is shown, according to an exemplary embodiment. The table 2600 can indicate scoring for the sanitization parameters 642. The table 2600 indicates sub parameters regarding sanitization in the building 146. The sub parameters can indication a sanitization schedule of a space, a space sanitization status, and/or sanitization requests for a space. The table 2600 indicates a criteria for scoring each sub parameter. Some sub parameters are associated with an allocated score and a score calculation.

Referring now to FIG. 27, a table 2700 of food parameter scoring is shown, according to an exemplary embodiment. The table 2700 can indicate scoring for the food parameters 634. The table 2700 indicates sub parameters regarding food ordering, nourishment, fruit basket ordering, food break areas and eating areas, etc. in the building 146. The table 2700 indicates a criteria for scoring each sub parameter. Some sub parameters are associated with an allocated score and a score calculation.

Healthy diets have the potential to nurture human health and prevent several diet-related diseases, including cardiovascular disease, high blood pressure and diabetes. However, poor nutrition remains a top contributor to disease. Fruits and vegetables may be a key component of a healthy dietary pattern for the prevention of chronic disease. However, most individuals around the world do not meet the daily recommended five servings. Nutrition education has been shown to be more effective when focused on changing specific behaviors, rather than only increasing knowledge. The scope of nutrition and food education may also be broader than personal nutrition and health. For example, education can cover topics, such as safe food handling practices, gardening and food production techniques, as well as food preparation skills.

Referring now to FIG. 28, a table 2800 of fitness parameter scoring is shown, according to an exemplary embodiment. The table 2800 can indicate scoring for the fitness parameters 636. The table 2800 indicates sub parameters regarding fitness programs offered in the building 146, fitness awareness, occupant activity levels, gym occupancy status, bicycle stand booking, etc. The table 2800 indicates a criteria for scoring each sub parameter. Some sub parameters are associated with an allocated score and a score calculation.

Nearly a quarter of the global population do not achieve physical activity guidelines and is considered physically inactive. Key determinants of physical activity behavior include time, convenience, motivation, self-efficacy, weather conditions, travel and family obligations, fear of injury, lack of social support, and/or environmental barriers such as availability of sidewalks, parks and/or bicycle lanes. Physical inactivity has emerged as a primary focus of public health, due to a rise in premature mortality and chronic diseases attributed to inactive lifestyles, including type 2 diabetes, cardiovascular disease, depression, stroke and some forms of cancer. Physical activity can be intimately tied to prevention of these chronic conditions and overall health across the lifespan.

Referring now to FIG. 29, a table 2900 of handwashing parameter scoring is shown, according to an exemplary embodiment. The table 2900 can indicate scoring for the handwashing parameters 638. The table 2900 indicates sub parameters regarding hand washing, soap dispensers, touchless hand washing, etc. The table 2800 indicates a criteria for scoring each sub parameter. Some sub parameters are associated with an allocated score and a score calculation.

Handwashing with soap can remove germs from hands. This can help prevent infections because people frequently touch their eyes, nose, and mouth without even realizing it. Germs can get into the body through the eyes, nose and mouth and make people sick. Furthermore, germs from unwashed hands can get into foods and drinks while people prepare or consume them. Germs can multiply in some types of foods or drinks, under certain conditions, and make people sick. Germs from unwashed hands can be transferred to other objects, like handrails, tabletops, or toys, and then transferred to hands of another person. Proper and frequent handwashing can reduce the number of people who get sick with diarrhea by 23-40%, reduce diarrheal illness in people with weakened immune systems by 58%, reduces respiratory illnesses, like colds, in the general population by 16-21%, and/or reduce absenteeism due to gastrointestinal illness in schoolchildren by 29-57%.

Referring now to FIG. 30, a table 3000 of water quality parameter scoring is shown, according to an exemplary embodiment. The table 3000 can indicate scoring for water quality parameters 632. The table 3000 indicates sub parameters for water quality. The sub parameters can be parameters indicating contaminant levels, awareness, hot water quality, water refilling stations, water quality, and/or occupant dehydration alerts. Furthermore the table 3000 indicates a criteria for scoring each sub parameter. Some sub parameters include an allocated score, a total instances, a deviation instances, and a score calculation.

Water quality can be important because it directly affects the health of the people. When water quality is compromised, its usage puts users at risk of developing health complications. However, many people do not drink enough water, even where safe water is easily accessible. To ensure water quality, it is necessary to test water quality regularly and install water purification system for removal of contaminants, if necessary. Combinations of various building automation system can be used to make drinking water easily accessible and remind occupant if enough water is not consumed during office hours.

Figure 31:
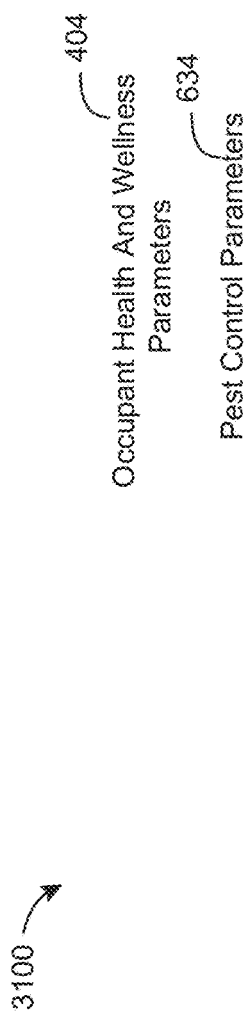
FIG. 31 is a table of pest control parameter scoring, according to an exemplary embodiment.

Referring now to FIG. 31, a table 3100 of pest control parameter scoring is shown, according to an exemplary embodiment. The table 3100 can indicate scoring for pest control parameters 640. The table 3100 indicates sub parameters for pest control. The sub parameters can be parameters indicating pest control scheduling, pest detections, pest control status, no entry alerts for pest control periods, etc. The table 3100 indicates a criteria for scoring each sub parameter and score calculation for each sub parameter.

Figure 32:
FIG. 32 is a table of emergency parameter scoring, according to an exemplary embodiment.

Referring now to FIG. 32, a table 3200 of emergency parameter scoring is shown, according to an exemplary embodiment. The table 3200 can indicate scoring for emergency parameters 628. The table 3200 indicates sub parameters for the emergency parameters 628. The sub parameters can be parameters indicating a SOS button for occupancy emergencies, an alert and location sharing feature, a SOS alert for inorganic gas levels, and/or an SOS alert for occupants in the case of bush fires, etc. The table 3200 indicates a criteria for scoring each sub parameter and score calculation for each sub parameter.

Figure 33:
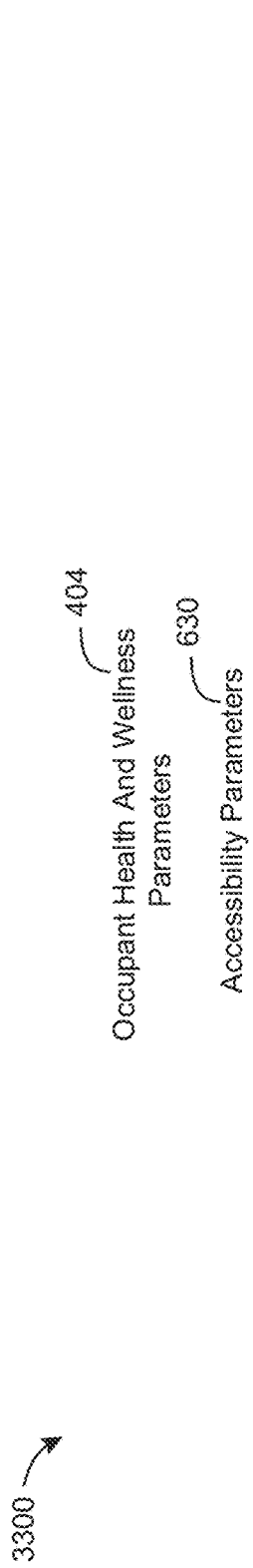
FIG. 33 is a table of accessibility parameter scoring, according to an exemplary embodiment.

Referring now to FIG. 33, a table 3300 of accessibility parameter scoring is shown, according to an exemplary embodiment. The table 3300 can indicate scoring for accessibility parameters 630. The table 3300 indicates sub parameters for outdoor access, indoor navigation, etc. The table 3300 indicates a criteria for scoring each sub parameter and score calculation for each sub parameter.

Referring now to FIG. 34, a table 3400 of mind parameter scoring is shown, according to an exemplary embodiment. The table 3400 can indicate scoring for mind parameters 622. The table 3400 indicates sub parameters for the presence and/or absence of services of the building 146, e.g., mental health awareness, access to organization (e.g., a mental health education program), access to suicide prevention resources, and/or access to organization stress management programs, etc. The table 3400 indicates a criteria for scoring each sub parameter and score calculation for each sub parameter.

Referring now to FIG. 35, a table 3500 of social parameter scoring is shown, according to an exemplary embodiment. The table 3500 can indicate scoring for social parameters 624. The table 3500 indicates sub parameters for the presence and/or absence of services of the building 146, e.g., alerts and notifications of organization social events, colleague birthday reminders, nearby social events, etc. The table 3500 indicates a criteria for scoring each sub parameter and score calculation for each sub parameter.

Referring now FIG. 36, a table 3600 of physical user health parameter scoring is shown, according to an exemplary embodiment. The table 3600 can indicate scoring for physical user health parameters. The table 3600 indicates sub parameters for the presence and/or absence of services of the building 146, e.g., customized alerts to occupants to low away from a screen, an alert for occupants when a person is less than three feet away from them, a service to update sick leave, contact tracing, a service to handle air replacement requests, alerts or notifications for occupant irregularities in health data, etc. The table 3600 indicates a criteria for scoring each sub parameter and score calculation for each sub parameter.

Figure 37:
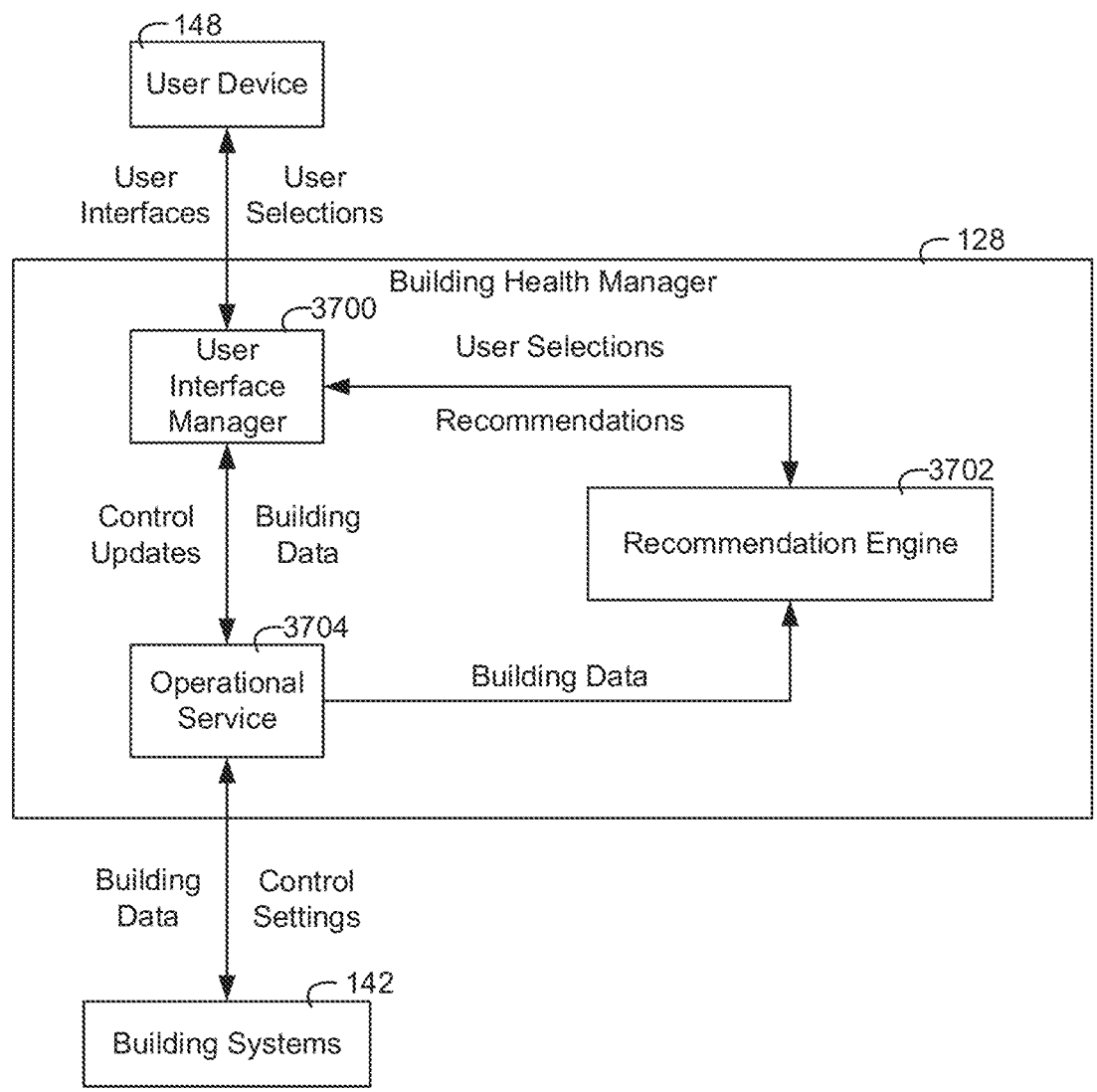
FIG. 37 is a block diagram of the building health manager generating user interface recommendations, according to an exemplary embodiment.

Referring now to FIG. 37, the building health manager 128 generating user interface recommendations is shown, according to an exemplary embodiment. The building health manager 128 can be implemented for a building and/or campus of buildings. In some embodiments, the building health manager 128 can be implemented for one or multiple buildings owned by an entity located in various locations, e.g., a chain of stores. In some embodiments, the building health manager 128 is implemented for the building 146 as described with reference to FIG. 1.

The building health manager 128 includes a user interface manager 3700, an operational service 3704, and a recommendation engine 3702. The user interface manager 3700 can be configured to generate and manager various user interfaces, for example, the user interfaces and interface elements. Furthermore, the user interface manager 3700 can provide the user interfaces to the user device 148 and receive user interactions, e.g., selections made via the user interfaces with the user device 148. The interfaces generated by the user interface manager 3700 can include recommendations generated by the recommendation engine 3702. User selections to approve or decline recommendations can be communicated to the recommendation engine 3702 by the user interface manager 3700.

The recommendation engine 3702 can be configured to receive building data from the operational service 3704. The building data can be data indicating the performance of the building systems 142 and/or various spaces of a building. The recommendation engine 3702 can perform one or more machine learning and/or artificial intelligence based algorithms to generate recommendations. Furthermore, based on user selections associated with the recommendations, e.g., approving or rejecting a recommendation, the recommendation engine 3702 can perform learning to generate future recommendations. The recommendation engine 3702 can implement various modeling and/or learning algorithms, e.g., neural networks (e.g., recurrent neural networks (RNNs), convolutional neural networks (CNNs), etc.), support vector machines (SVMs), Bayesian networks, a constraint tool model, etc.

In some embodiments, the recommendation engine 3702 performs learning algorithms based on a persona of a user of the user device 148 (e.g., technician, building manager, tenant, etc.). For example, the persona may indicate the goals and responsibilities of the user. The recommendation engine 3702 can be configured to generate personalized recommendations for each of multiple users based on the persona of each user.

The operational service 3704 can be configured to collect building data from the building systems 142. Furthermore, the operational service 3704 can be configured to implement control settings for the building systems 142, e.g., execute control algorithms based on the control settings and/or communicate the control settings to the building systems 142. The control settings can be suggested control settings suggested by the recommendation engine 3702 and approved by a user via a user interface generated by the user interface manager 3700.

Figure 38:
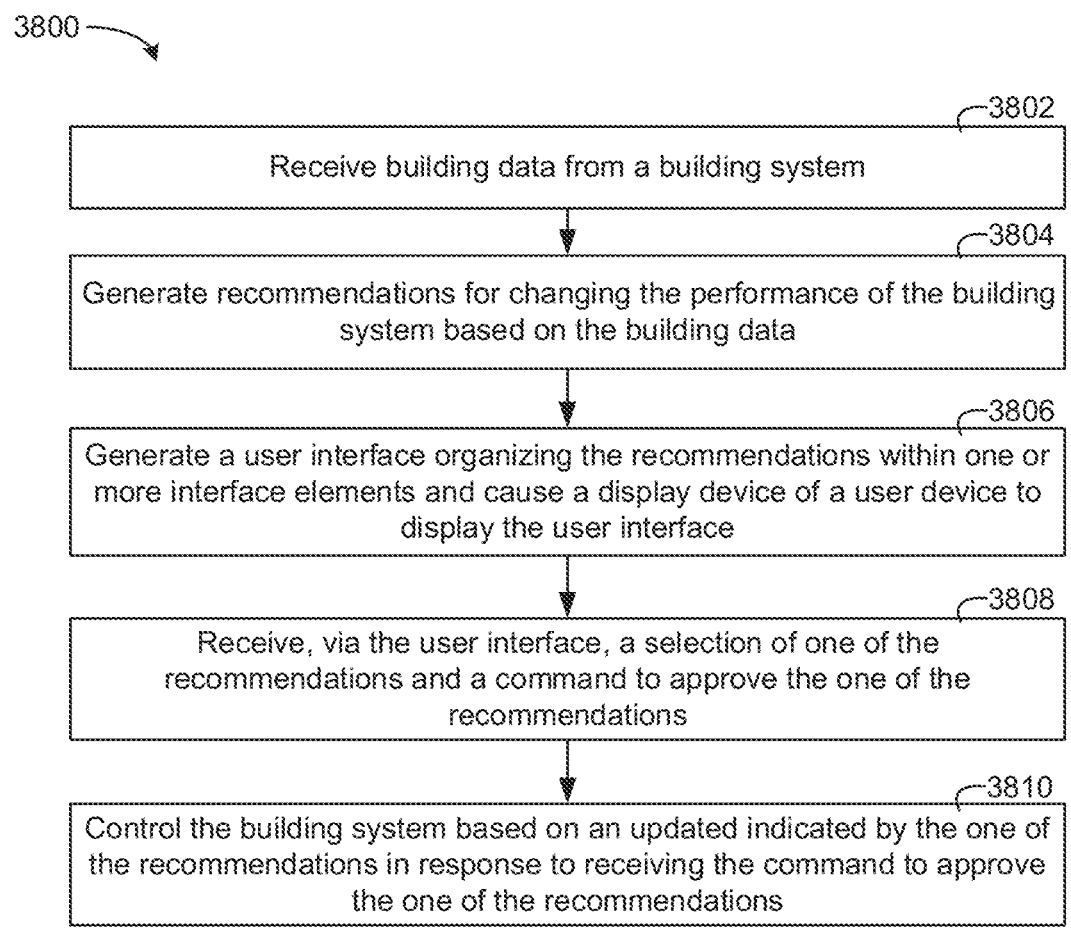
FIG. 38 is a flow diagram of a process of generating user interface recommendations, according to an exemplary embodiment.

Referring now to FIG. 38, a process 3800 of generating user interface recommendations is shown, according to an exemplary embodiment. In some embodiments, the building health manager 128 can be configured to perform some and/or all of the process 3800.

In step 3802, the building health manager 128 can receive building data from the building systems 142. The building data can indicate energy usage, runtime information, zone temperatures, and/or any other measured characteristic or operating parameter of the building systems 142.

In step 3804, the recommendation engine 3702 generates a recommendation to update control of the building systems 142. The recommendation may be a recommendation to change a control setting of the building systems 142. The recommendation may be to perform maintenance on the building systems 142.

In step 3806, the user interface manager 3700 generates a user interface that organizes the recommendations generated in the step 3804 and causes a display device of the user device 148 to display the interfaces. The user interface can organize the recommendations according to categories. For example, the user interface can organize the recommendations based on whether the recommendations improve employee productivity (e.g., optimize a space, create comfortable temperature or humidity for the space, etc.), improve space utilization (e.g., optimizes a space), result in energy efficiency (e.g., e.g., optimize the performance of equipment), and/or relate to asset upkeep (e.g., maintenance of building equipment, implement control settings that improve equipment life, etc.).

In step 3808, the user interface manager 3700 can receive a selection of one of the recommendations of the interface generated in the step 3806 and a command to approve the one of the recommendations. The recommendation selected and approved by the user via the user device 148 can include one or more recommended control settings for the building systems 142. In step 3810, the operational service 3704 operates the building systems 142 based on the updated control settings.

Referring generally to FIGS. 39-48, interfaces are shown that can be generated, managed, and controlled by building health manager 128. All of the interfaces shown and described herein can be generated, managed, and controlled by the building health manager 128. The building health manager 128 can cause the user device 148 (a display device of the user device 148) to display the interfaces and receive user input via the interfaces. The building health manager 128 can generate all of the scoring, alert, and recommendation information of the interfaces of FIGS. 39-48.

Figure 39:
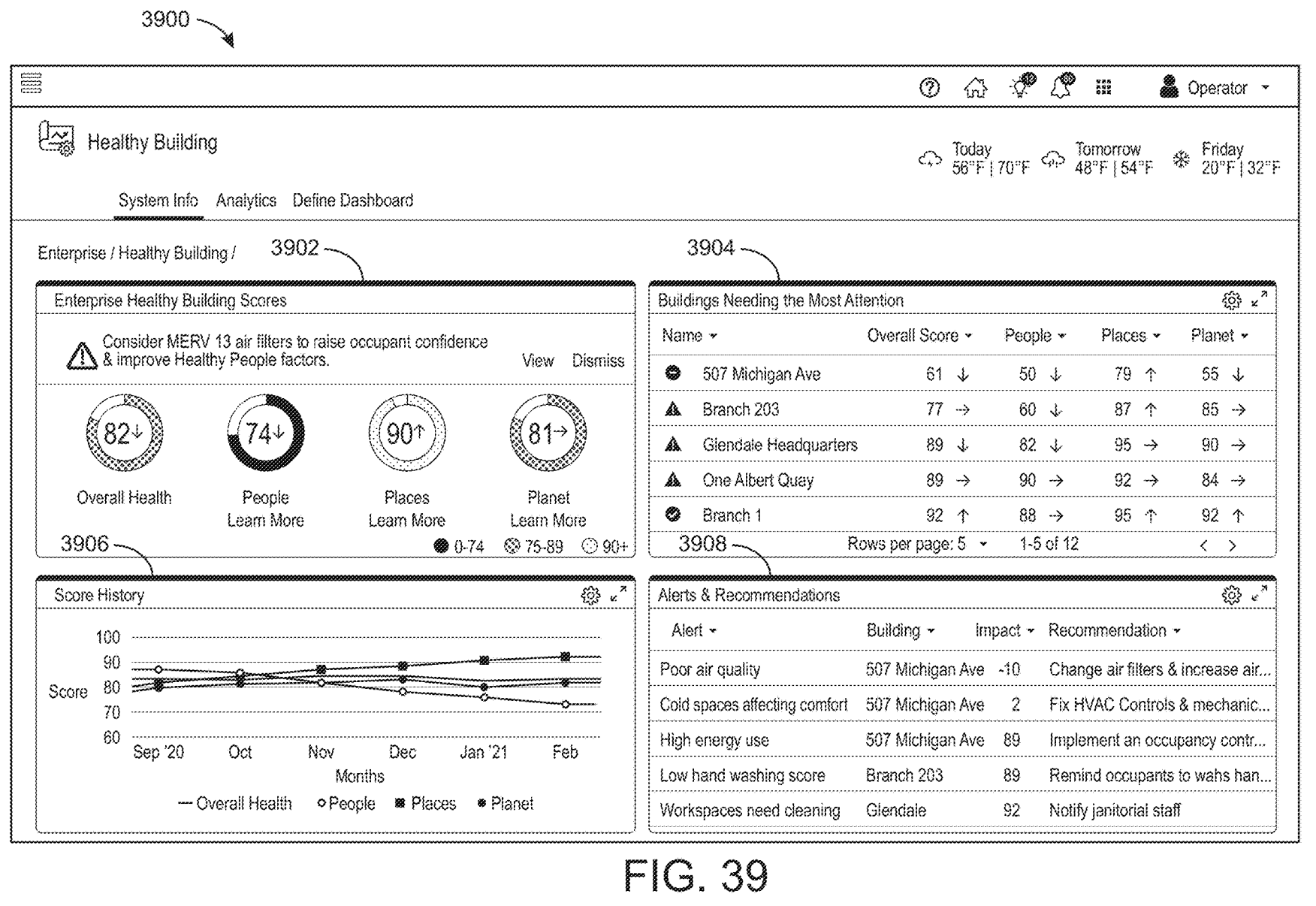

Referring now to FIG. 39, a building health interface 3900 for a group of buildings is shown, according to an exemplary embodiment. The interface 3900 includes an element 3902 for healthy building scores for an enterprise (e.g., a group of buildings). The element 3902 can include an overall health score, a people health score for the people health parameters 306, a places health score for the space health parameters 304, and a planet health score for the planet health parameters 302. Colors, e.g., red, yellow, or green can be used to represent poor, moderate, or good performance of the various cores. In some embodiments, the score ranges for each parameter can be customized by a user.

The interface 3900 includes a score history element 3906. The element 3906 includes trends for the scores of the element 3902. The element 3902 includes a month by month trend for an overall health score, a people health score of the people health parameters 306, a places health score for the space health parameters 304, and a planet health score for the planet health parameters 302.

The element 3904 indicates buildings that need the most attention. The element 3904 includes a list of buildings in a particular filtered order. The order may be lowest overall score to highest overall score or highest overall score to lowest overall score. The list can further indicate overall scores for each building, people scores for each building, places scores for each building, and/or planet health scores for each building. Responsive to interacting with buildings in the element 3904, another interface can be displayed for the building interacted with (e.g., the interface 4000 of FIG. 40).

The interface 3900 includes an element 3908. The element 3908 includes alerts for the buildings. The element 3908 includes alerts such as poor air quality, cold spaces affecting comfort, high energy use, low hand washing score, and/or workspaces that need cleaning. Furthermore, the element 3908 includes an impact for each alert, e.g., an indication of how many score points for the overall score. Furthermore, the element 3908 includes recommendations for addressing each alert.

Figure 40:
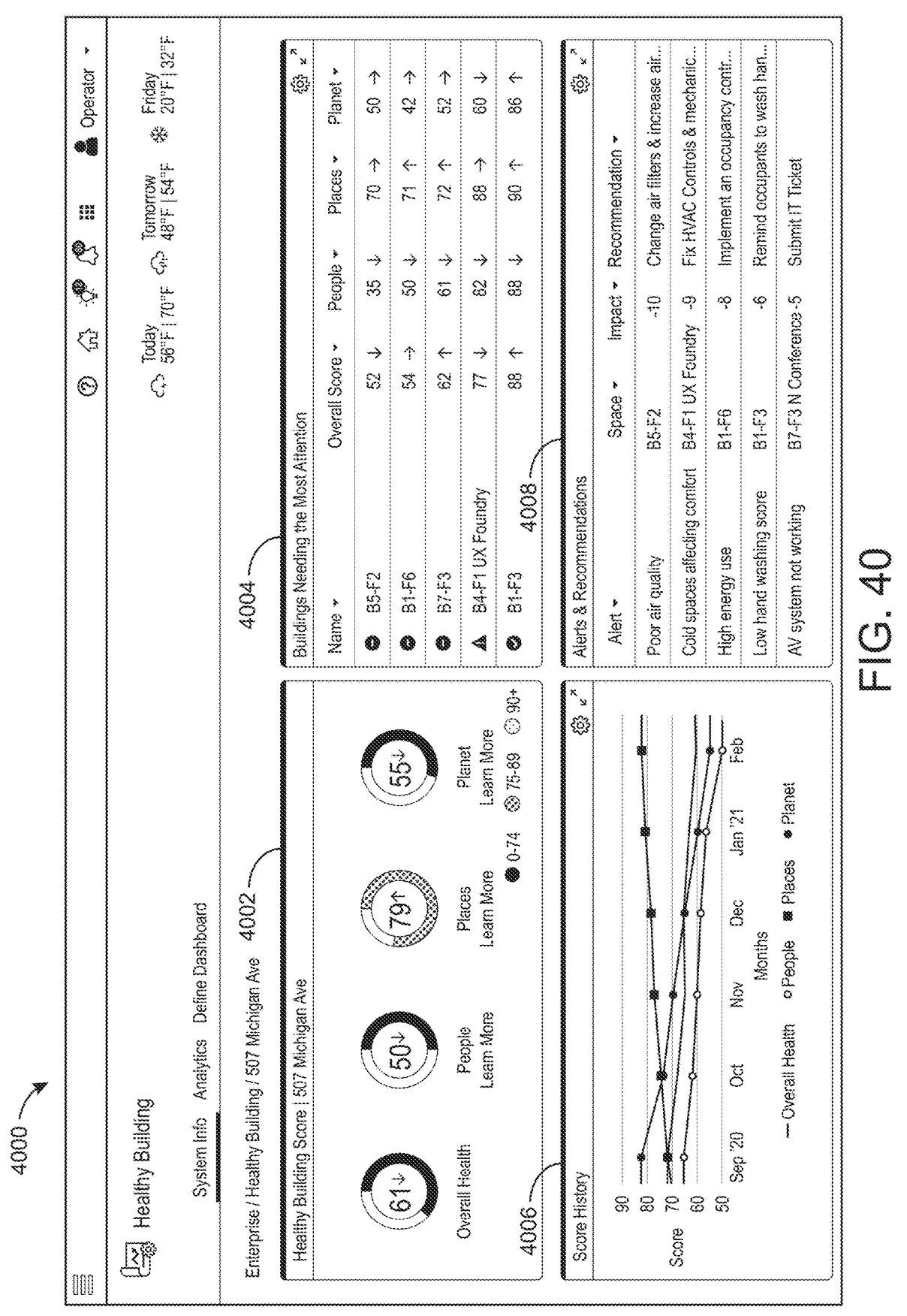

Referring now to FIG. 40, a building health interface 4000 for one building of the group of buildings discussed with reference to the interface 3900 of FIG. 39, according to an exemplary embodiment. The building health interface 4000 includes the same information described in FIG. 39 but instead of being for a group of buildings, the building health interface 4000 is for one selected building. The element 4002 includes an overall health score, a people health score, a places health score, and a planet health score for the one building. Similarly, the element 4006 includes trends of overall health, people health scores, place health scores, and/or planet health scores for one building.

The element 4004 includes various spaces of the one building ordered from lowest overall space score to highest overall space score. The element 4004 includes the spaces in a list with indications of overall score, people score, places score, and planet score for each space. Furthermore, the interface 4000 includes an element 4008 including alerts for various spaces of the one building, an impact of each alert, and a recommendation for addressing each alert.

Figure 41:
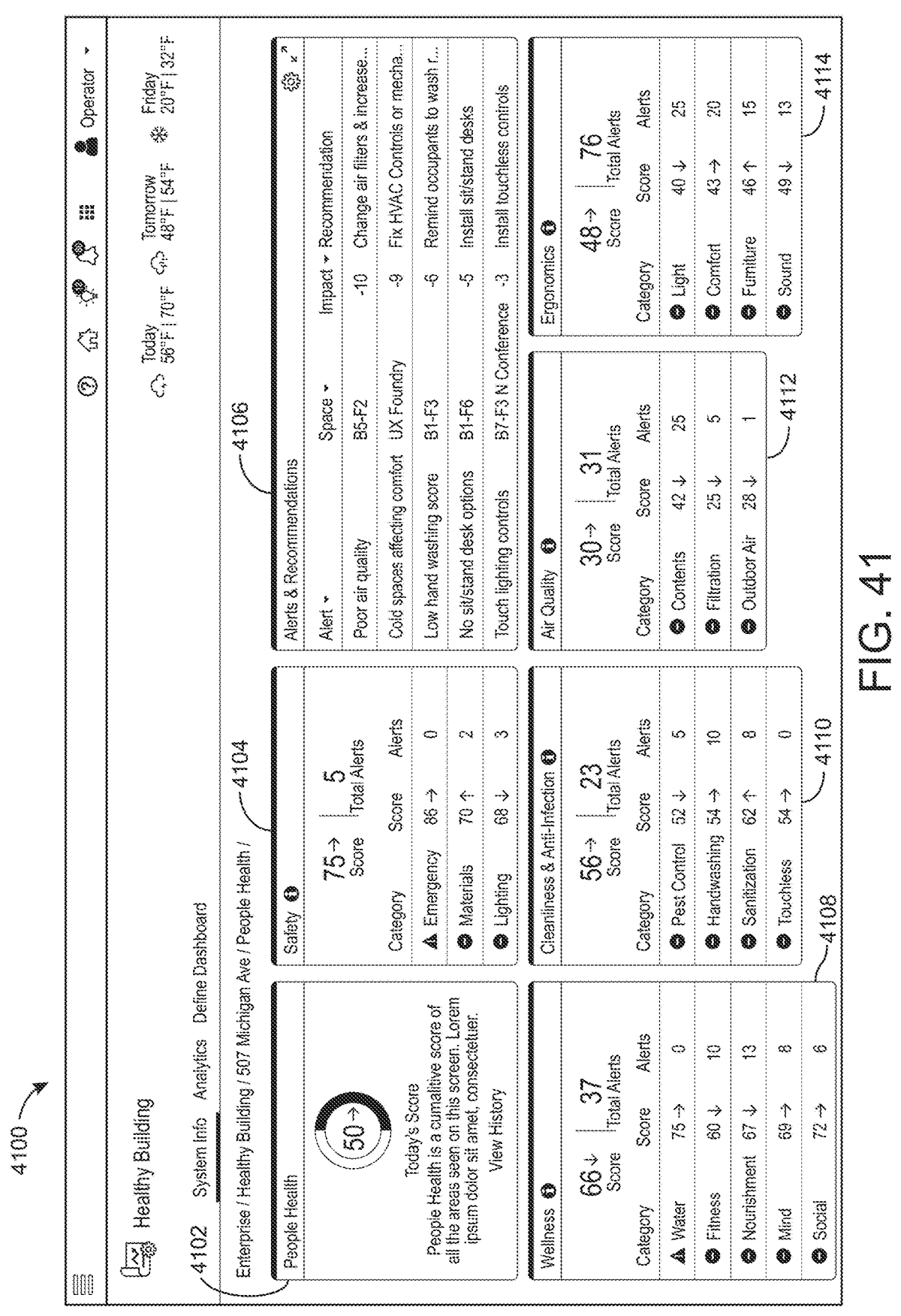

Referring now to FIG. 41, is a schematic drawing of a people health information interface 4100 of the one building of the group of buildings of FIG. 40, according to an exemplary embodiment. The building health manager 128 can generate similar interfaces for the planet health parameters 302 and/or the space health parameters 304. The interface 4100 includes an element 4102 indicating a people health score for the building for the people health parameters 306. The element 4104 includes an element 4104 for the security parameter 606 indicating a score for the security parameter 606, total alerts for the parameter 606, and indications of each alert category, score, and number of alerts in each category.

The interface 4100 includes an element 4106 indicating alerts that impact the people health parameters 306. The interface 4100 includes an element 4108 indicating scores and alerts for the wellness parameters 608. The interface 4100 includes an element 4110 indicating scores and alerts for the cleanliness and anti-infection parameters 610. The interface 4100 includes an element 4112 indicating scores and alerts for the air quality parameters 602. The interface 4100 includes an element 4114 indicating scores and alerts for the ergonomics parameters 604.

Figure 42:
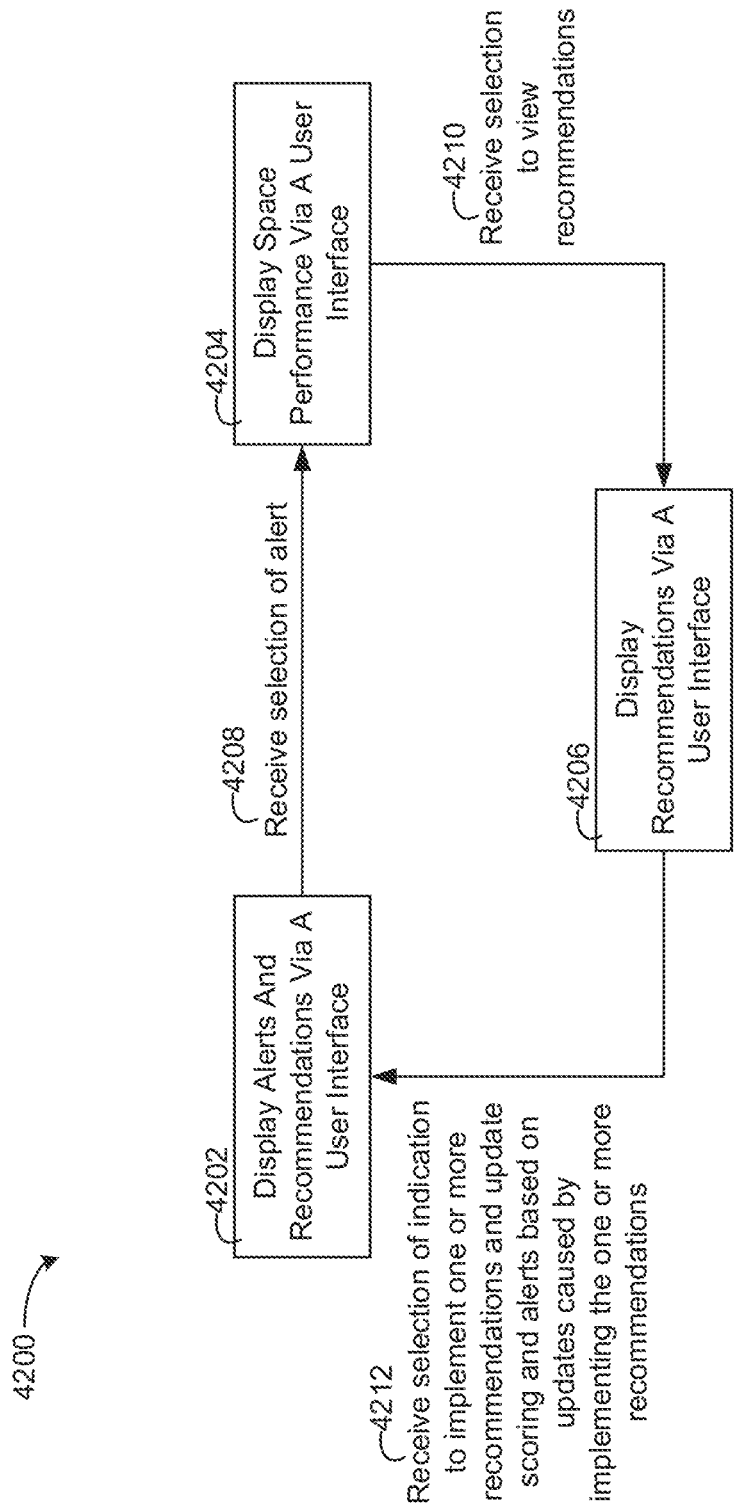
FIG. 42 is a process of closed-loop operation for implementing recommendations based on health scores of the user interfaces of FIGS. 43-46, according to an exemplary embodiment.

Referring now to FIG. 42, a process 4200 of closed-loop operation for implementing recommendations based on health scores of the user interfaces of FIGS. 43-46 is shown, according to an exemplary embodiment. The process 4200 shows the effects a recommendation would have on multiple factors. These factors relate to planet health parameters 302, the people health parameters 306, and/or the space health parameters 304 but also to the monetary costs and/or savings that result from implementing a recommendation. The process 4200 provides a feedback loop for continuous improvement of a space, building, and/or group of buildings, i.e., a user reviews scores and implements recommendations to improve said scores which are again reviewed by the user and further recommendations may be implemented.

Figure 43:
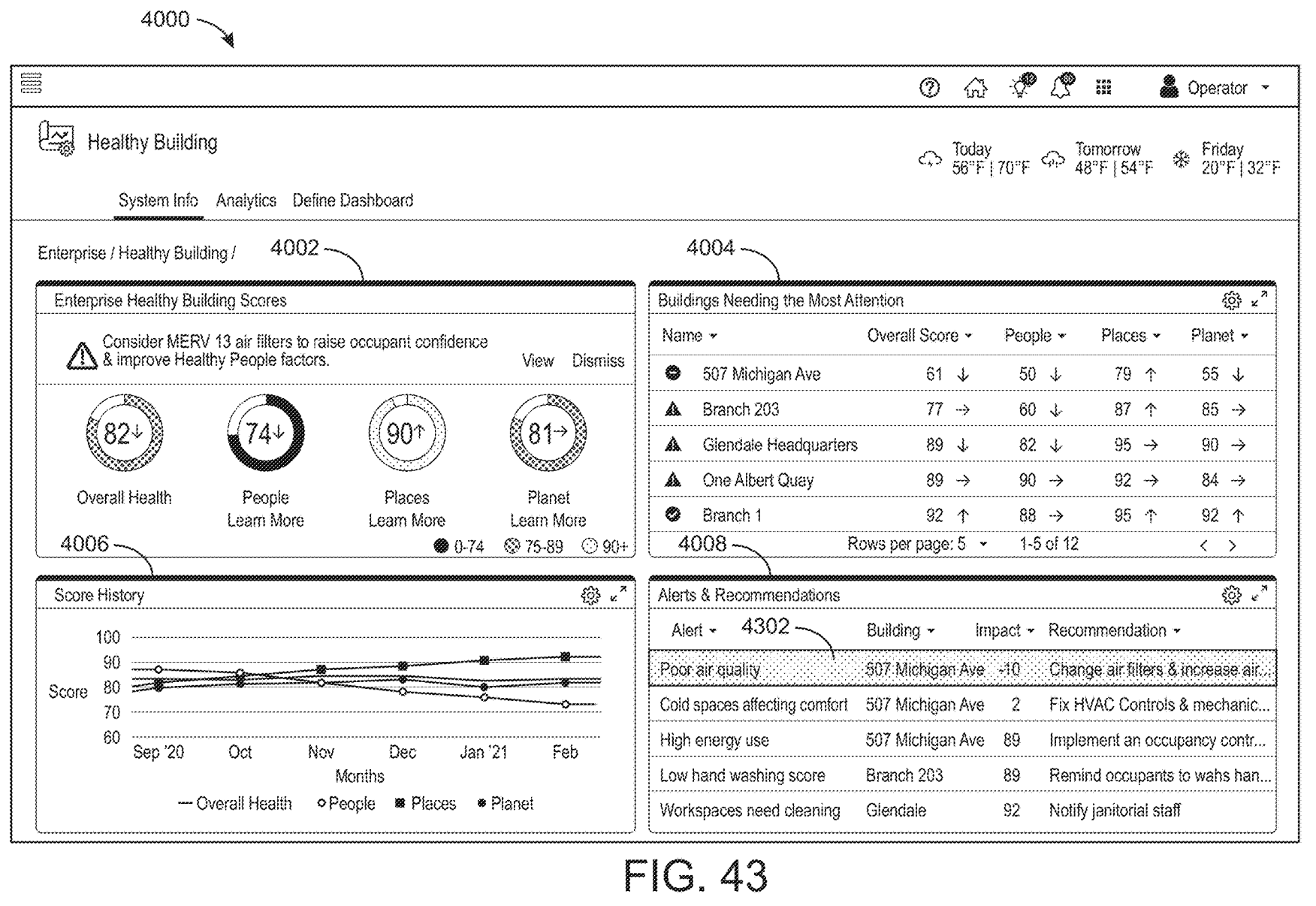

The process 4200 includes a step 4202 where the building health manager 128 displays an interface including alerts and recommendations, e.g., the interface 4000 shown in FIG. 43. The recommendations can be selectable by a user, i.e., in step 4208 a user can select one alert of the alerts. For example, in the interface 4000 in FIG. 43, a poor air quality alert is selected.

Figure 44:
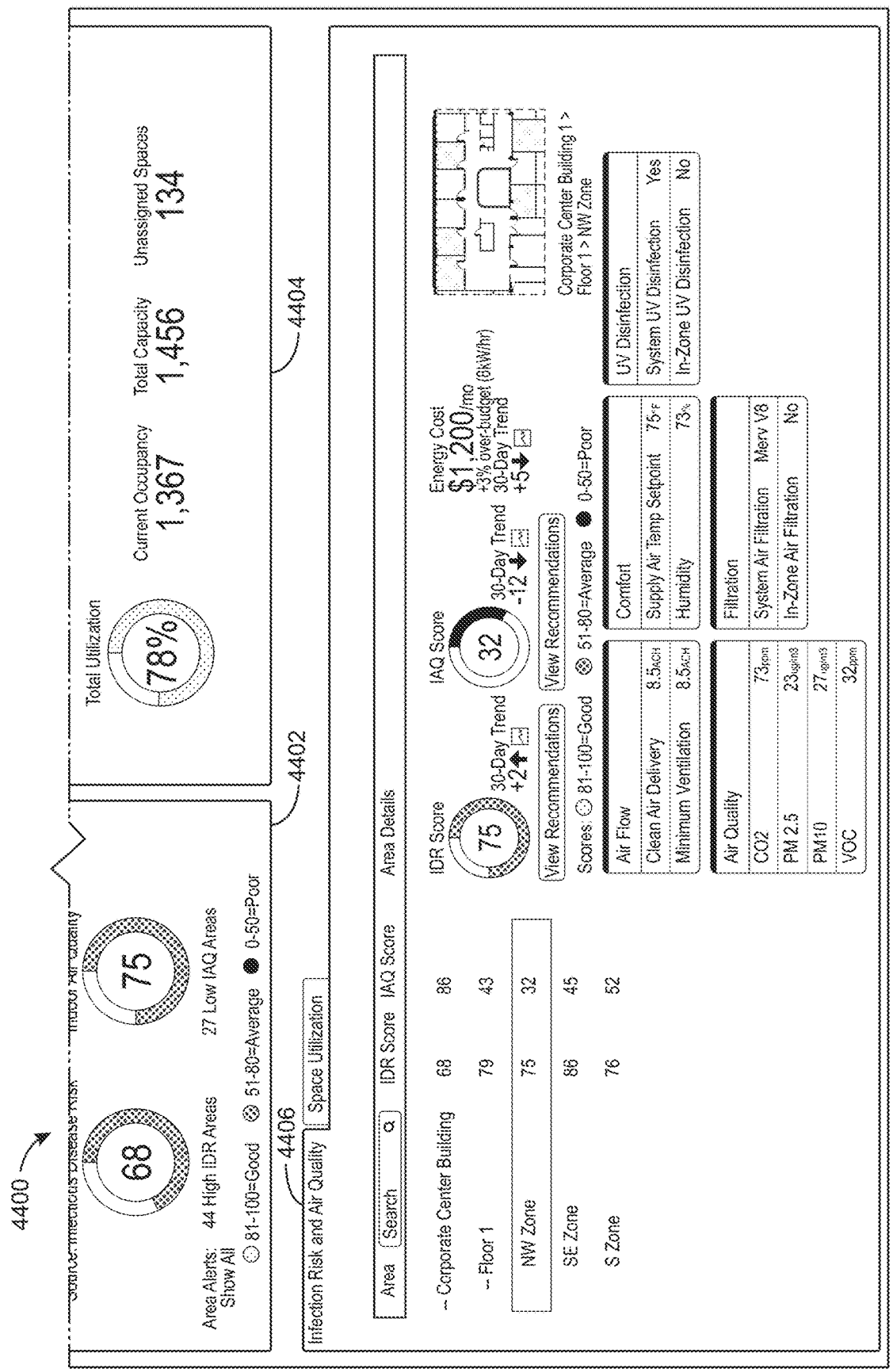
FIG. 44 is a schematic drawing of an interface showing air quality information displayed responsive to selecting the air quality alert of FIG. 43, according to an exemplary embodiment.

In step 4204, the building health manager 128 can display a space performance interface, e.g., the interface 4400 shown in FIG. 44. The interface 4400 can provide information on infection risk and air quality for the space that the selected alert is occurring in. In step 4210, the building health manager 128 receives a selection to view recommendations of the space. In step 4206, the building health manager 128 displays recommendations for the space via a user interface, e.g., the interface 4600 of FIGS. 46A-B.

A user can provide input to the user interface 4600 selecting one recommendation of the recommendations of the interface 4600 (step 4212). The selection can cause the building health manager 128 to implement operating commands for the recommendation and operate the building systems 142 based on the operating commands. The resulting operation updates cause changes to the operation of the building which in turn can reflect changes to the overall building score, the score of the planet health parameters 302, the scores of the people health parameters 306, and/or the scores of the space health parameters 304. This can result additional changes made by the user to implement other recommendations or control updates, this can form a closed-loop operation of the building with the health scores.

Referring now to FIG. 43, a schematic drawing of the building health interface 4000 of FIG. 40 where a user selects an air quality alert with an associated recommendation is shown, according to an exemplary embodiment. In FIG. 43, a user selects one alert of the alerts of the element 4008 with selection 4302. In selection 4302, a poor air quality alert is selected.

Referring now to FIG. 44, an interface 4400 showing air quality information displayed responsive to selecting the air quality alert of FIG. 43 is shown, according to an exemplary embodiment. The interface 4400 includes an element 4402 providing scores for infectious disease risk and indoor air quality for a particular building. The interface 4400 further includes an element 4404 providing a space utilization of the particular building. The element 4404 indicates a total percentage utilization of the building, a current occupancy of the building, a total occupant capacity of the building, and an indication of a number of unassigned spaces.

The element 4406 indicates infection risk and air quality for a particular space of a particular floor of the building. The element 4406 includes an infectious disease risk score and an indoor air quality risk score for the space. Current operating parameters for the space are further shown in the element 4406, airflow parameters (e.g., clean air deliver, minimum ventilation), comfort parameters (e.g., supply air temperature setpoint, humidity), ultraviolet (UV) disinfection parameters (e.g., a binary indication o perform system UV disinfection and/or in-zone UV disinfection), an air quality parameter (e.g., CO2, PM2.5, PM10, VOC, etc.), and/or filtration parameters (e.g., system air filtration, in-zone air filtration, etc.).

The element 4406 further shows an energy cost for the space and a floor plan indicating where the space is located on a particular floor. The element 4406 includes a view recommendations element to view recommendations for improving the infectious disease risk score and/or the indoor air quality score.

Figure 45A:
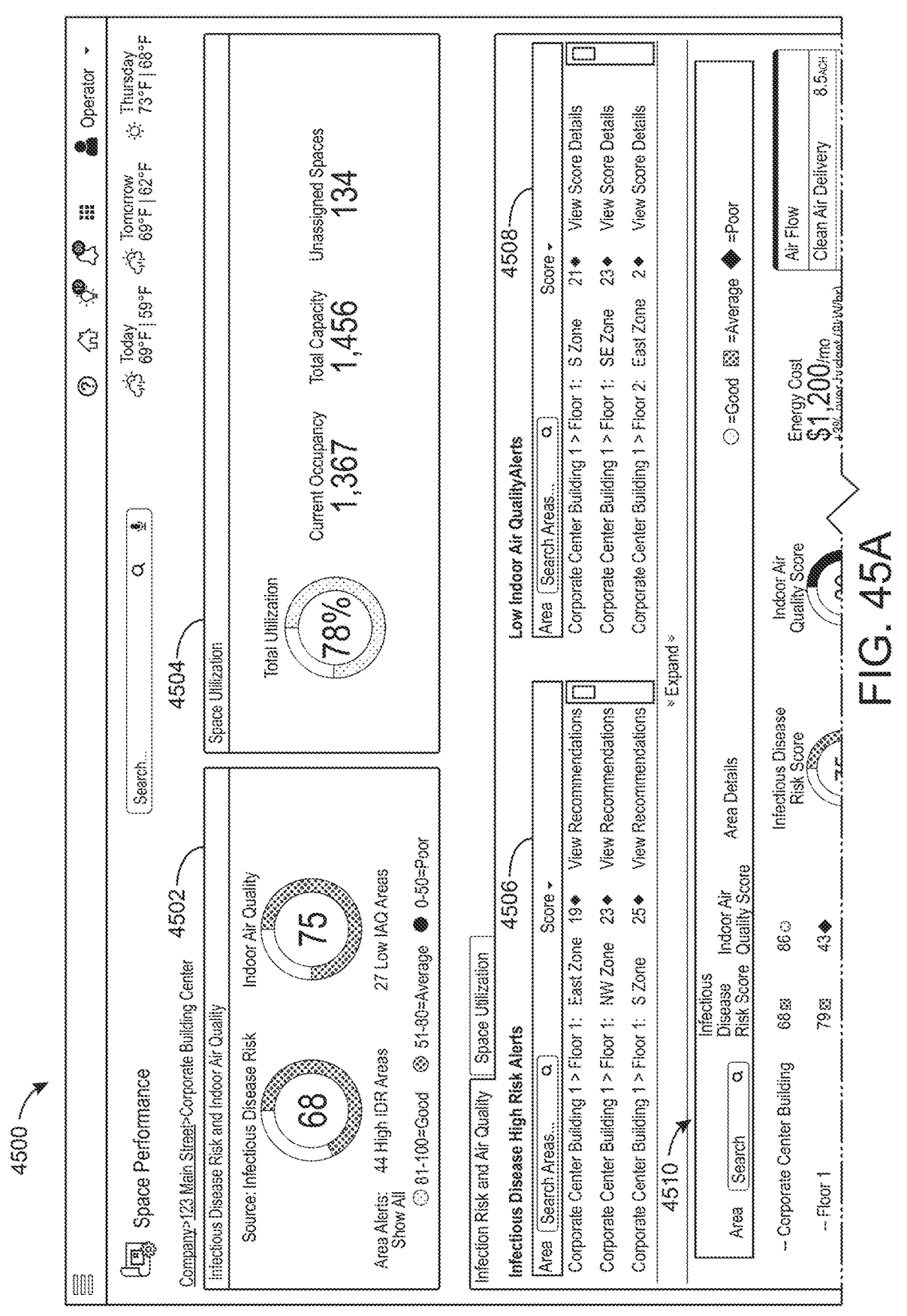
Figure 45B:
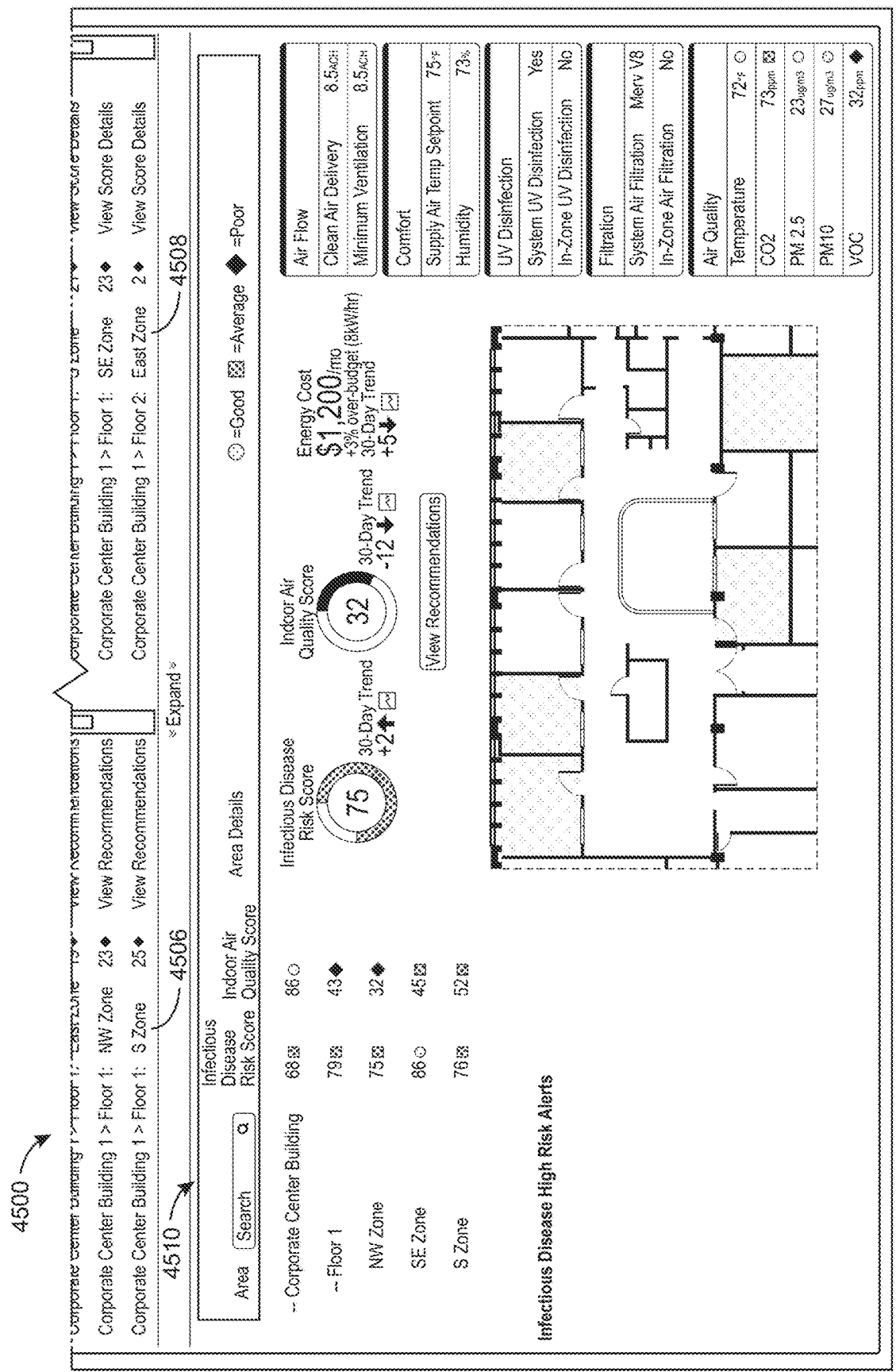

Referring now to FIGS. 45A-B, an interface 4500 showing infectious disease related risk information and recommendations is shown, according to an exemplary embodiment. The interface 4500 can be another version of the interface 4400. The interface 4500 includes an element 4502 indicating an infectious disease risk score and an indoor air quality score for a building. Furthermore, the element 4504 of the interface 4500 indicates a total occupant utilization of the space. The interface 4500 further includes an element 4506 providing alerts for various areas of the building pertaining to an infectious disease risk. The interface 4500 further includes an element 4508 providing alerts for various areas of the building pertaining to low indoor air quality.

The element 4510 of the interface 4500 includes indications of information for one of multiple selected areas of the building. The element 4510 includes a floor map indicating a floor and an indication of the selected space on the floor map. The element 4510 further includes an infectious disease risk score for the selected space, an indoor air quality score for the selected space, and an energy cost for the selected space. Furthermore, the element 4510 further includes indications of operating parameters for the selected space. The operating parameters can be airflow parameters (e.g., clean air delivery level, minimum ventilation level), comfort parameters (e.g., supply air temperature setpoint, humidity), UV disinfection parameters (e.g., system UV disinfection, in-zone UV disinfection), filtration parameters (e.g., system air filtration, in-zone air filtration), and/or air quality parameters (e.g., temperature, CO2, PM2.5, PM10, VOC).

Figure 46B:
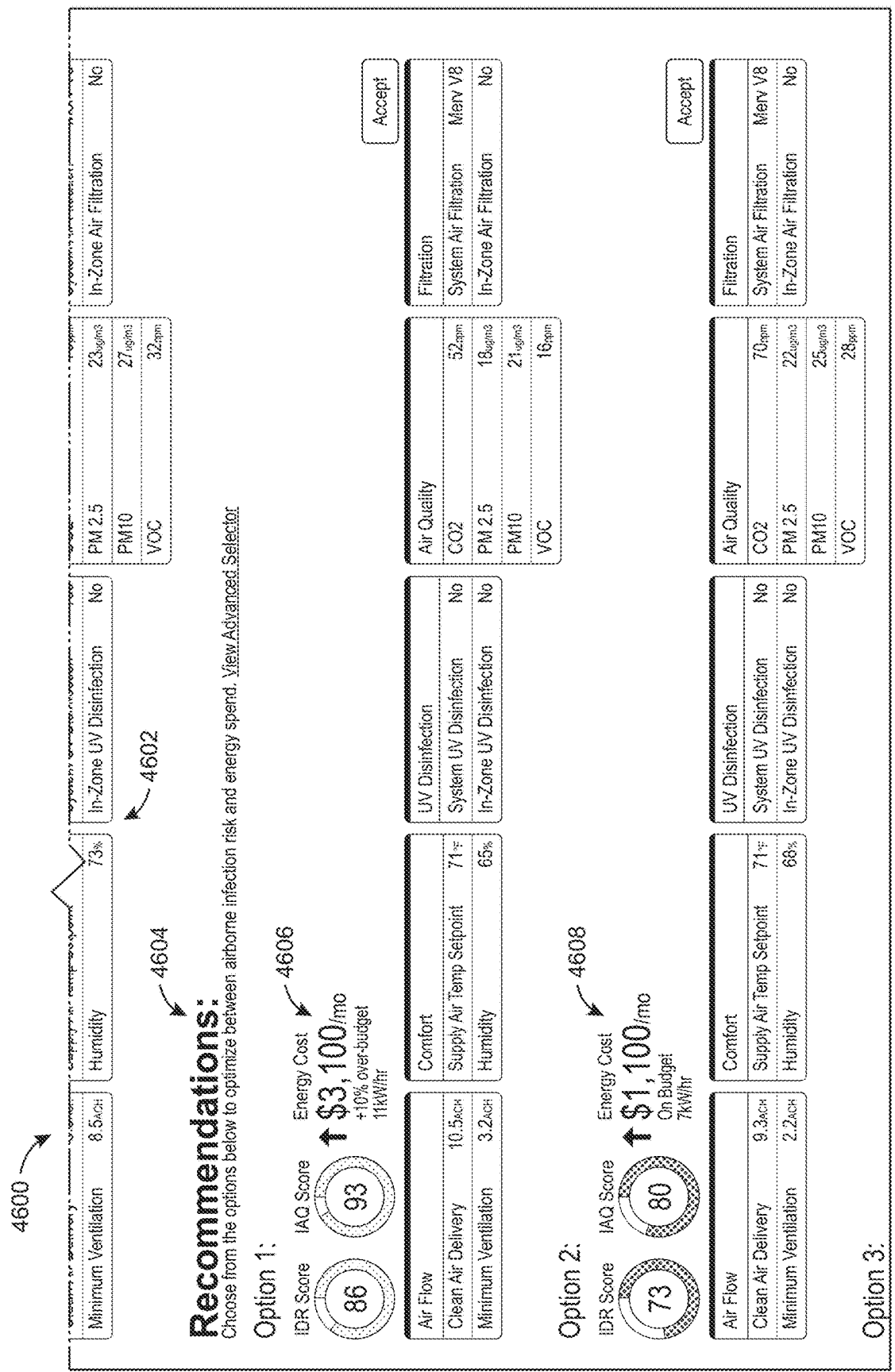

Referring now to FIGS. 46A-B, an interface 4600 including recommendations addressing infectious disease transmission risk is shown, according to an exemplary embodiment. The interface 4600 incudes a current state element 4602. The element 4602 indicates current conditions of a building and/or space. The element 4602 indicates a current infectious disease risk score and a current indoor air quality score. Furthermore, the element 4602 indicates a current monthly energy cost for the building or space. The current values for the operating parameters for air flow, comfort, UV disinfection, air quality, and/or filtration are shown in the element 4602.

The interface 4600 indicates recommendations 4602 generated by the building health manager 128. The recommendations 4604 includes a recommendation 4606. The recommendation 4606 indicates one option for improving the infectious disease score and/or the indoor air quality score. The recommendation 4606 indicates a prediction of an infectious disease risk score and an indoor air quality score that will result from improved values for the air flow parameters, comfort parameters, UV disinfection parameters, air quality parameters, and/or filtration parameters. The recommendation 4606 includes an accept element that a user can interact with to accept the recommendation 4606 and implement operation of building systems based on the values of the parameters shown in the recommendation 4606. A predicted energy cost is further shown in the recommendation 4606. The predicted energy cast can be a predicted cost of operating at the new parameter values.

The interface 4600 includes a recommendation 4608. The recommendation 4608 recommends new parameter values for the air flow, comfort, UV disinfection, air quality, and filtration parameters that results in increased infectious disease risk score and the indoor air quality score. The increase in scores for the recommendation 4608 is less than the increase resulting from the recommendation 4606. However, the predicted energy cost of the recommendation 4608 is on budget and is less than the over budget energy cost resulting from the recommendation 4606. The recommendation 4608 includes an element to accept the recommendation 4608 and implement the parameter values of the recommendation 4608.

In some embodiments, the recommendations 4606 and 4608 are generated based on the recommendation engine 3702 as shown in FIG. 37. The recommendations 4606 and 4608 can be generated by an artificial intelligence and can be generated based on historical user input in order to generate recommendations that meet the goals of a user and/or organization.

Figure 47:
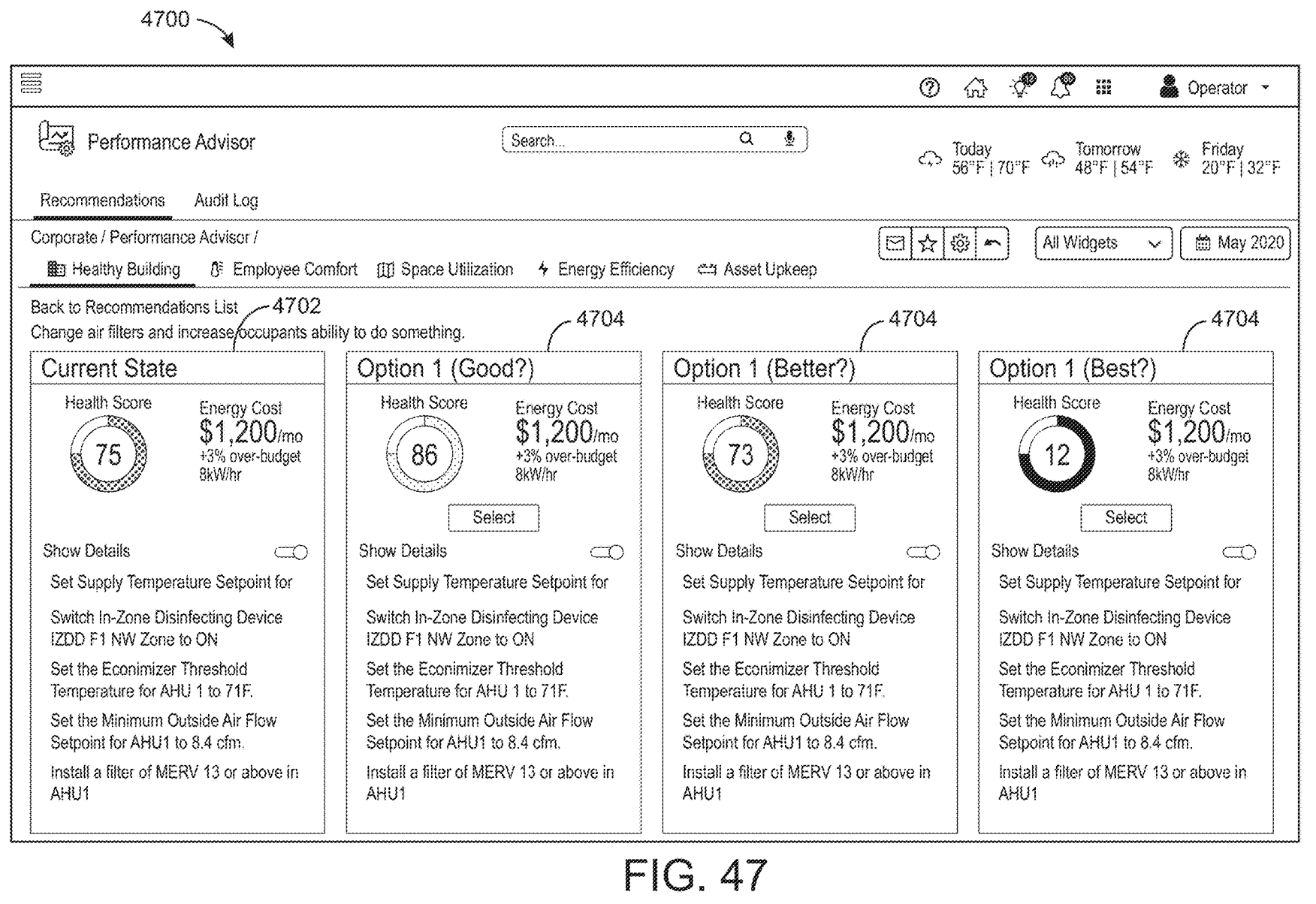

Referring now to FIG. 47, an interface 4700 including recommendations for improving user health scores for a building space is shown, according to an exemplary embodiment. The interface 4700 includes a current state 4702 indicating a current health score, operating settings, and energy cost of the operating settings. The interface 4700 further includes recommendations 4704-4708 which can each include different recommended operating settings, each set of operating settings resulting in a different health score and/or energy cost. Each of the recommendations 4704-4708 include a select element to select and implement said recommendation. The recommendations 4704-4708 can be generated by the recommendation engine 3702 of FIG. 37.

Figure 48:
FIG. 48 is a schematic drawing of an interface including a list of building health recommendations, according to an exemplary embodiment.

Referring now to FIG. 48, a schematic drawing of an interface 4800 including a list of health building recommendations is shown, according to an exemplary embodiment. The interface 4800 can include a list of recommendations generated by the recommendation engine 3702. The recommendation engine 3702 can generate each recommendation to address an alert that has occurred. The alert can be an indication of an event that decreases a health score of the building. For example, alerts can be that an outdoor air temperature is higher than a set amount, physical distancing practices are not being followed, etc.

The list of the interface 4800 indicates a time that each recommendation was generated, a numerical increase to an overall health score that will result from the recommendation, a category of the recommendation (e.g., air, space, fitness, mechanical maintenance, etc.), a space that the recommendation impacts, etc. The list of the interface 4800 includes a check mark to accept each of the alerts and an "x" mark to reject each of the alerts.

Referring now to FIG. 49, a command and control interface 4900 where a user can input operating settings for building equipment is shown, according to an exemplary embodiment. The interface 4900 includes command and control for a particular AHU, AHU 1 of a specific zone, floor, building, and campus of an entity. The interface 4900 can provide an input for a user to review and set command and status settings. Furthermore, the interface 4900 allows a user to make a command or set a status indefinitely and/or for a user specified time. The control manger 214 can receive the settings and commands via the interface 4900 and operate the building systems 142 based on the settings and commands.

Figure 50:
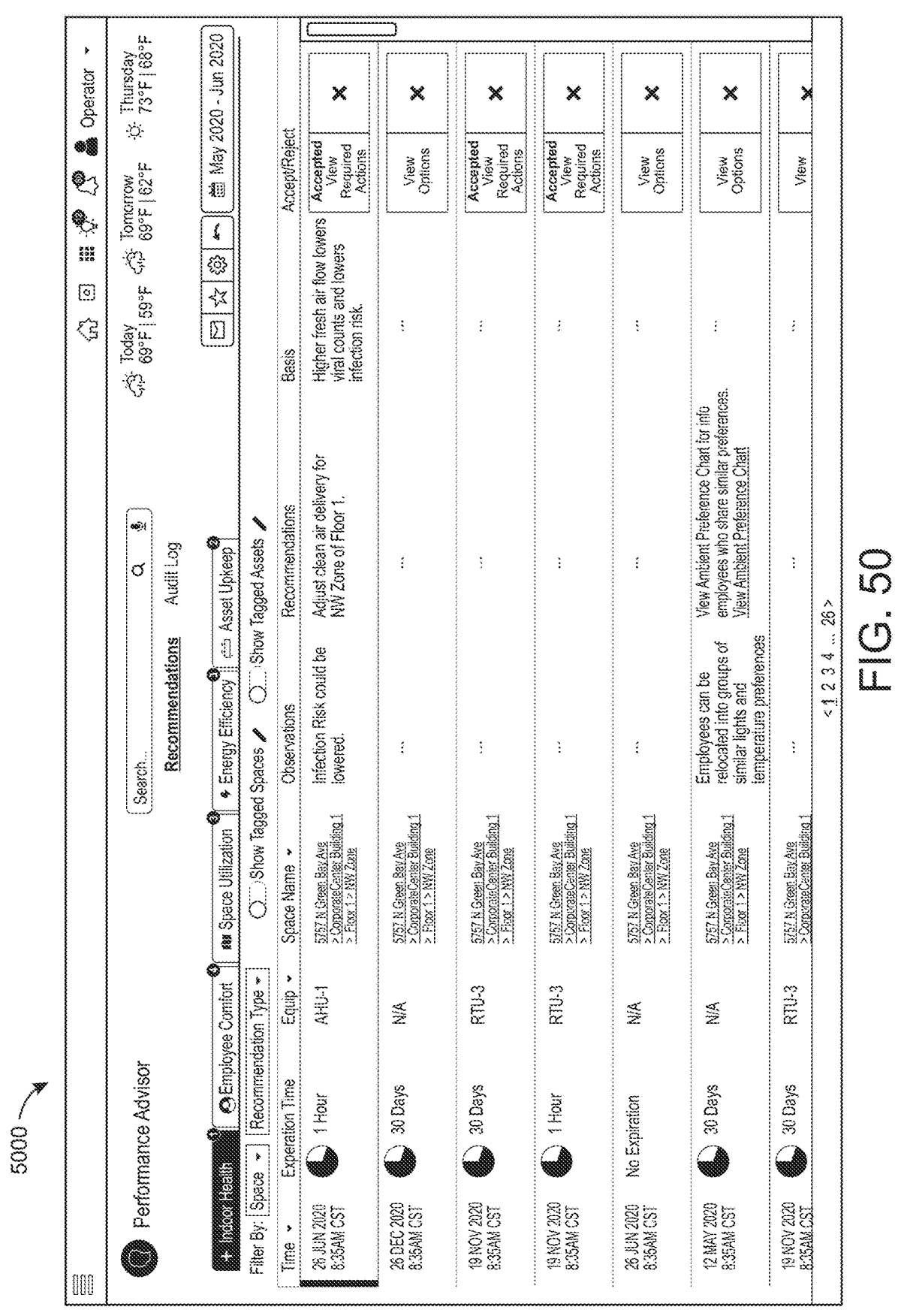

Referring now to FIG. 50, a user interface 5000 including recommendations relating to indoor health is shown, according to an exemplary embodiment. The interface 5000 can provide recommendations generated by the recommendation generator 1116. The recommendations of the interface 5000 can be specific to indoor health, e.g., space health scores of the space health parameters 304. The user interface 5000 can present the recommendations in an ordered list with time, expiration time, equipment, space name, observations, recommendations, and a basis for each entry. The user can accept and/or reject each recommendation of the user interface 5000. Responsive to accepting one of the recommendations, the control manager 214 can update operation of the building systems 142 appropriately.

Referring now to FIG. 51, a user interface 5100 of an audit log of recommendations of the user interface of FIG. 50 is shown, according to an exemplary embodiment. The user interface 5100 can provide a log of accepted and rejected recommendations to enable to review a history of their decisions. For each recommendation, the user interface 5100 can indicate rejected recommendations, accepted recommendations, and whether a user enabled auto-accept features.

Figure 52:
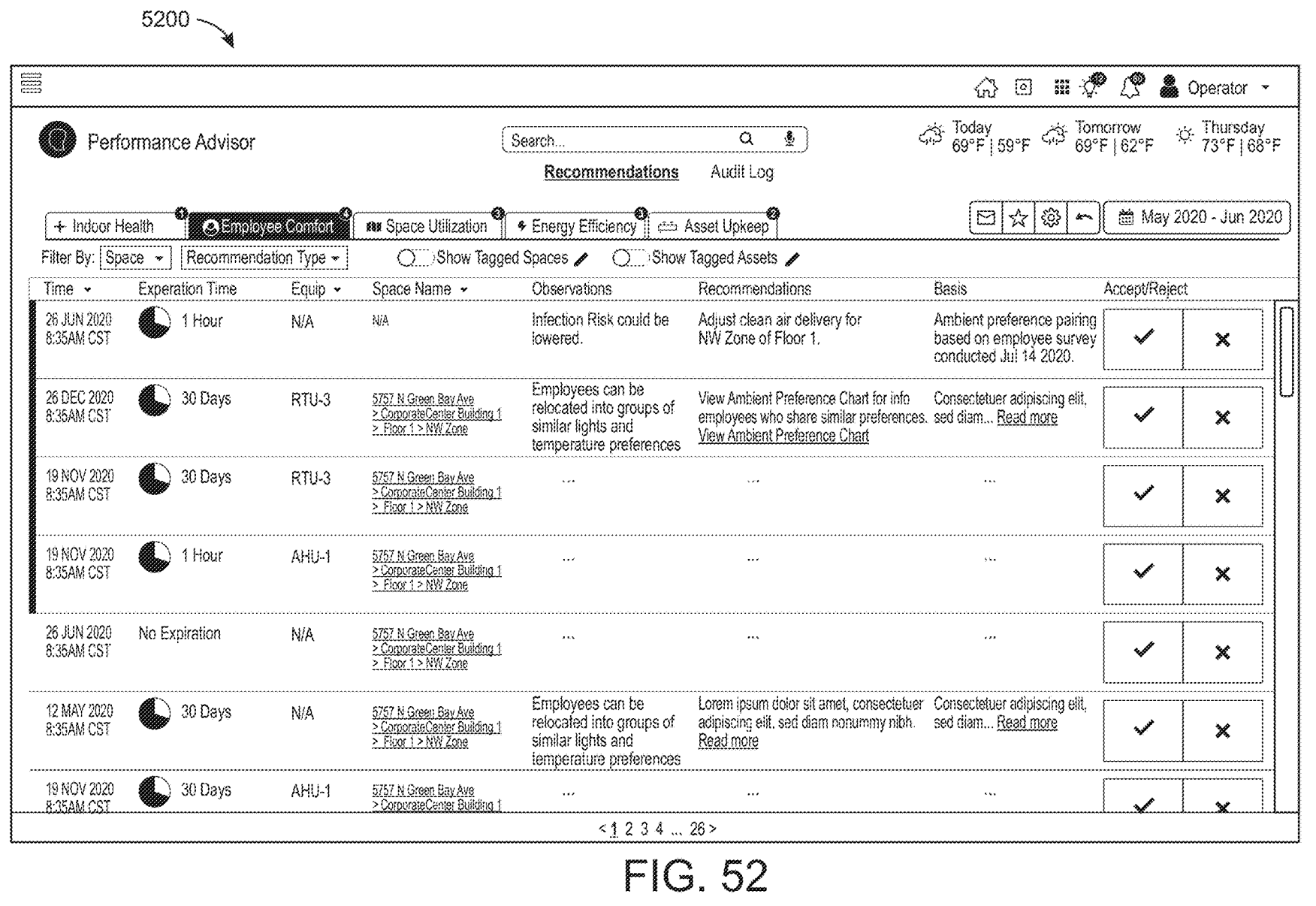

Referring now to FIG. 52, a user interface 5200 including recommendations relating to occupant comfort is shown, according to an exemplary embodiment. The interface 5200 can provide recommendations generated by the recommendation generator 1116. The recommendations of the interface 5200 can be specific to employee comfort, e.g., the occupant health and wellness parameters 404, the ergonomics parameters 604, and/or the thermal comfort parameter 616. The user interface 5002 can present the recommendations in an ordered list with time, expiration time, equipment, space name, observations, recommendations, and a basis for each entry. The user can accept and/or reject each recommendation of the user interface 5200. Responsive to accepting one of the recommendations, the control manager 214 can update operation of the building systems 142 appropriately.

Figure 53:
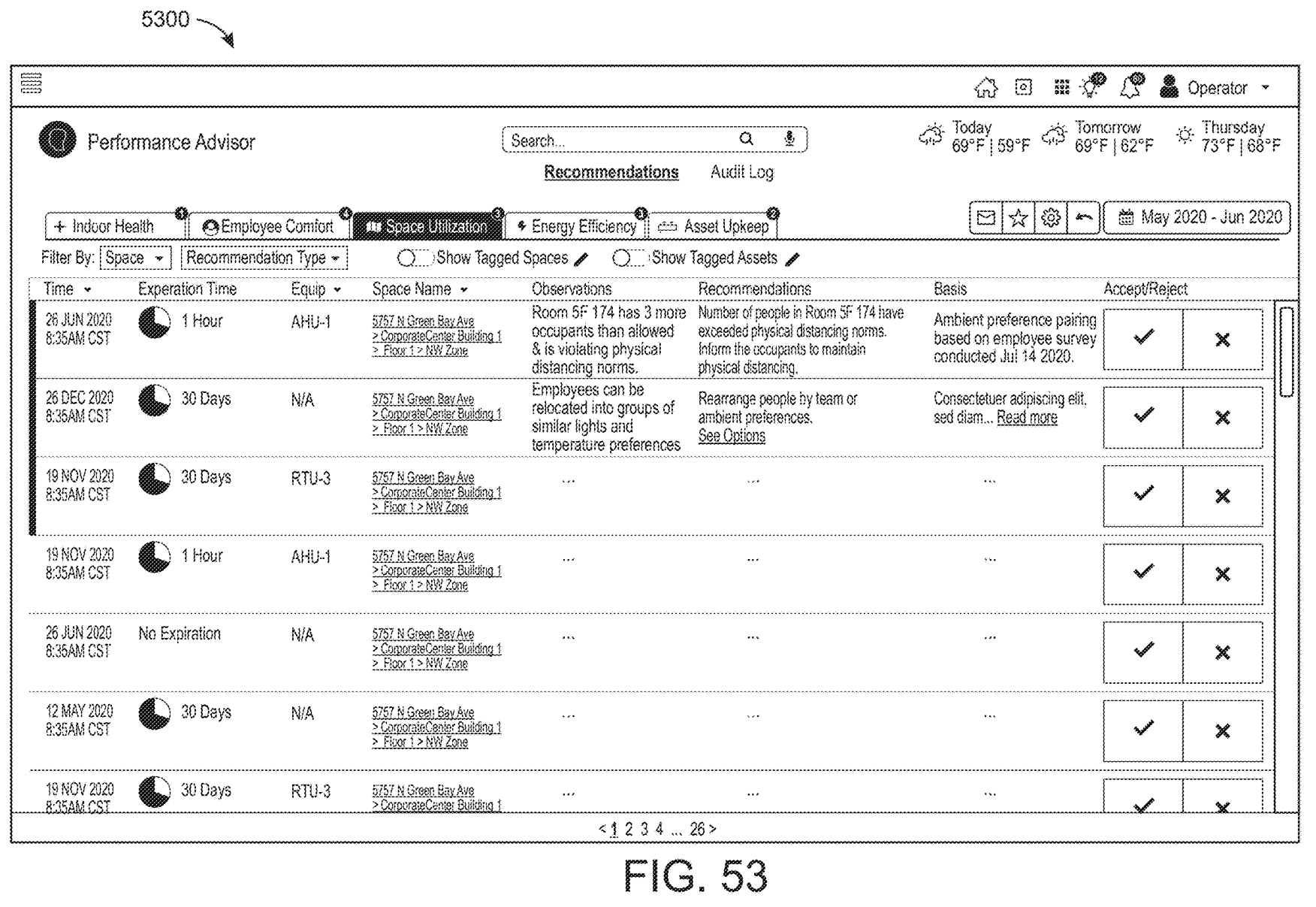

Referring now to FIG. 53, a user interface 5300 including recommendations relating to space utilization is shown, according to an exemplary embodiment. The interface 5300 can provide recommendations generated by the recommendation generator 1116. The recommendations of the interface 5300 can be specific to space utilization, e.g., the resource health and sustainability parameters 402, the reduce carbon footprint parameters 1004, and/or the space utilization parameter 1022, the ergonomics parameters 604, and/or the thermal comfort parameter 616. The user interface 5300 can present the recommendations in an ordered list with time, expiration time, equipment, space name, observations, recommendations, and a basis for each entry. The user can accept and/or reject each recommendation of the user interface 5300. Responsive to accepting one of the recommendations, the control manager 214 can update operation of the building systems 142 appropriately.

Figure 54:
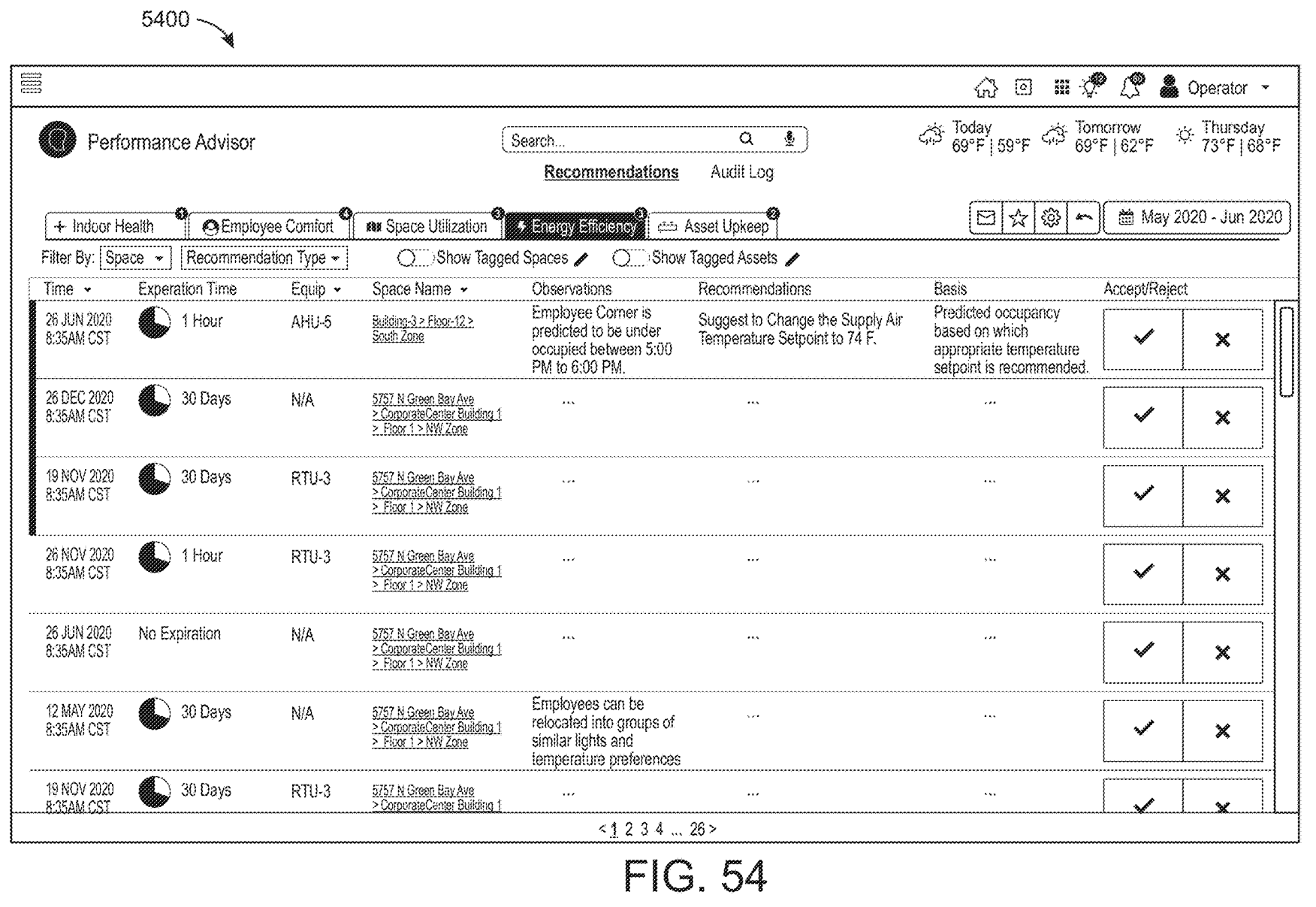

Referring now to FIG. 54, a user interface 5400 including recommendations relating to energy efficiency is shown, according to an exemplary embodiment. The interface 5400 can provide recommendations generated by the recommendation generator 1116. The recommendations of the interface 5400 can be specific to space utilization, e.g., the resource health and sustainability parameters 402, the reduce carbon footprint parameters 1004, and/or the space utilization parameter 1022, the ergonomics parameters 604, and/or the thermal comfort parameter 616. The user interface 5400 can present the recommendations in an ordered list with time, expiration time, equipment, space name, observations, recommendations, and a basis for each entry. The user can accept and/or reject each recommendation of the user interface 5400. Responsive to accepting one of the recommendations, the control manager 214 can update operation of the building systems 142 appropriately.

Figure 55:
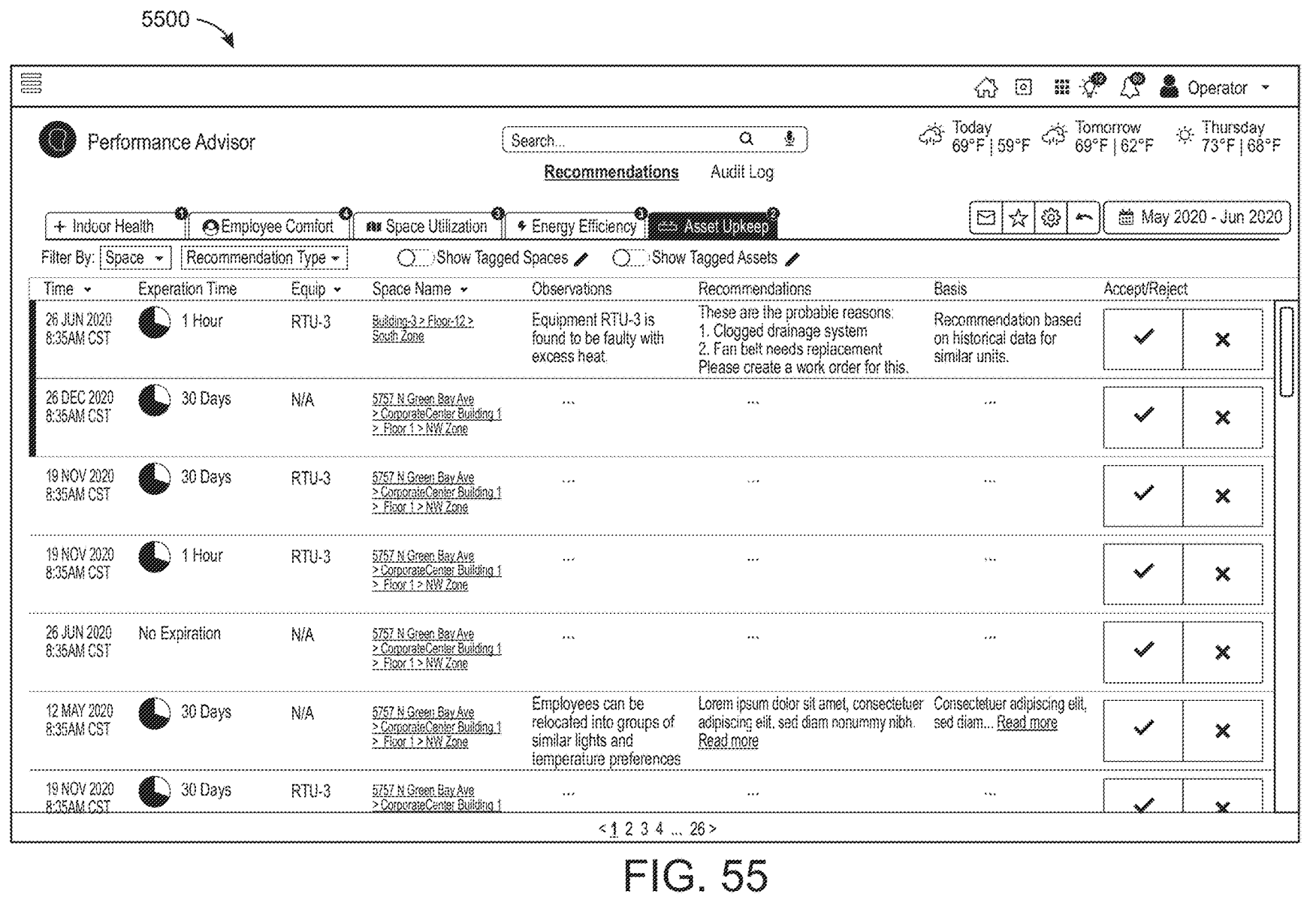

Referring now to FIG. 55, a user interface 5500 including recommendations relating to asset upkeep is shown, according to an exemplary embodiment. The interface 5500 can provide recommendations generated by the recommendation generator 1116. The recommendations of the interface 5500 can be specific to asset upkeep, e.g., the safety and security health parameters 405. The user interface 5500 can present the recommendations in an ordered list with time, expiration time, equipment, space name, observations, recommendations, and a basis for each entry. The user can accept and/or reject each recommendation of the user interface 5500. Responsive to accepting one of the recommendations, the control manager 214 can update operation of the building systems 142 appropriately.

Figure 56A:

Referring now to FIGS. 56A-B, a user interface 5600 including indoor health recommendations, employee productivity recommendations, space utilization recommendations, energy efficiency recommendations, and asset upkeep recommendations, according to an exemplary embodiment. The user interface 5600 can be a composite user interface that incorporates all of the information of the user interfaces FIG. 50-FIG. 55. The user interface 5600 can be provided via an email or via a smartphone.

The user interface 5600 includes various recommendations for indoor health in indoor health element 5602, e.g., recommendations for improving scores pertaining to the space health parameters 304. The user interface 5600 includes various recommendations for employee productivity in employee productivity element 5604, e.g., recommendations for improving scores pertaining to the occupant health and wellness parameters 404, the ergonomics parameters 604, and/or the thermal comfort parameter 616. The user interface 5600 includes various recommendations for space utilization in space utilization element 5606, e.g., recommendations for improving scores pertaining to the resource health and sustainability parameters 402, the reduce carbon footprint parameters 1004, and/or the space utilization parameter 1022, the ergonomics parameters 604, and/or the thermal comfort parameter 616.

The user interface 5600 includes various recommendations for energy efficiency in energy efficiency element 5608, e.g., recommendations for improving scores pertaining to the resource health and sustainability parameters 402, the reduce carbon footprint parameters 1004, and/or the space utilization parameter 1022, the ergonomics parameters 604, and/or the thermal comfort parameter 616. The user interface 5600 includes various recommendations for asset upkeep in asset upkeep element 5610, e.g., recommendations for improving scores pertaining to the safety and security health parameters 405.

Figure 57:
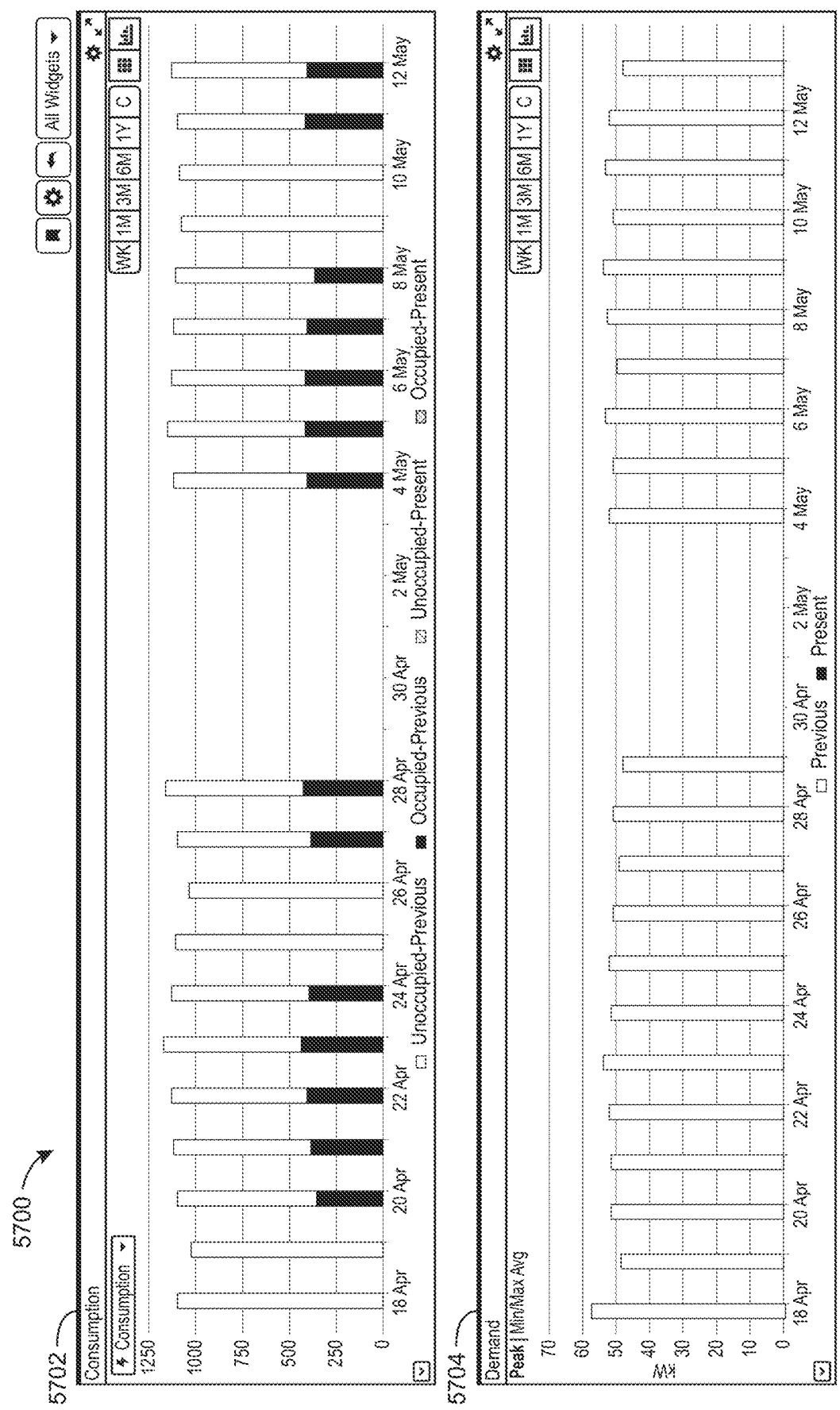
FIG. 57 is a user interface with a plot of consumption and demand of a building, according to an exemplary embodiment.

Referring now to FIG. 57, a user interface 5700 with a plot of consumption and demand of a building is shown, according to an exemplary embodiment. The user interface 5700 includes an element 5702 providing a plot of energy consumption in kilowatt hours (KWH) for various days. The plot of the element 5702 further provides an occupancy status. The energy consumption of the plot of the element 5702 can be the electrical energy consumption of the building systems 142. The user interface 5700 includes an element 5704 that provides a plot of a peak (or alternatively minimum, maximum, or average) energy demand in kilowatts (kW) for various days. The plot of the element 5704 can indicate demand of the building systems 142.

Figure 58:
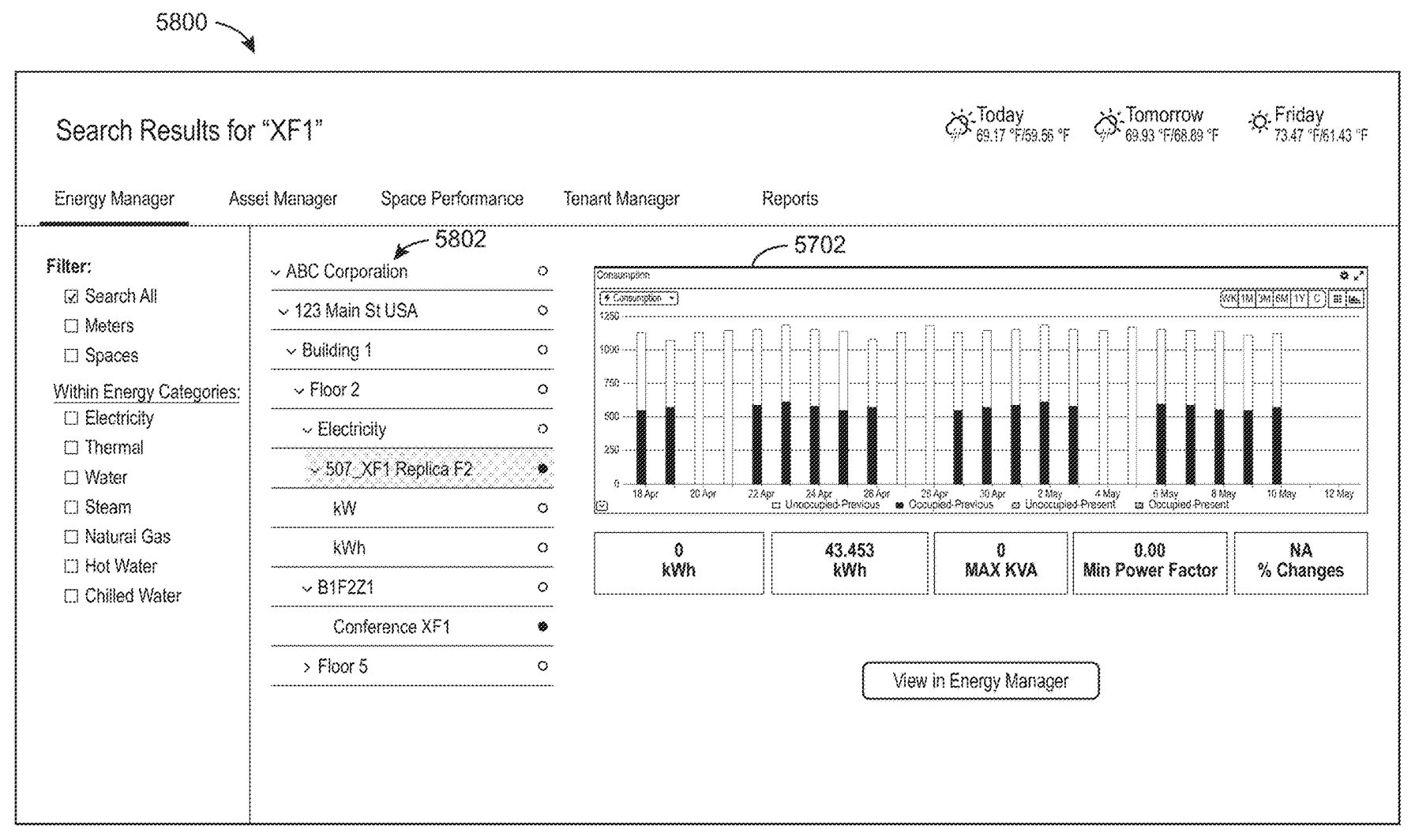

Referring now to FIG. 58, a user interface 5800 indicating energy consumption for a space that a user searches for is shown, according to an exemplary embodiment. The user interface 5800 includes a navigation element 5802. The navigation element 5802 can allow a user to search/navigate to a specific campus, building, and/or space of an entity. Responsive to a user selecting a specific building or space, the user interface 5800 can display the element 5702 specific to the selected building or space, e.g., displaying consumption or demand for the selected building or space.

Figure 59:
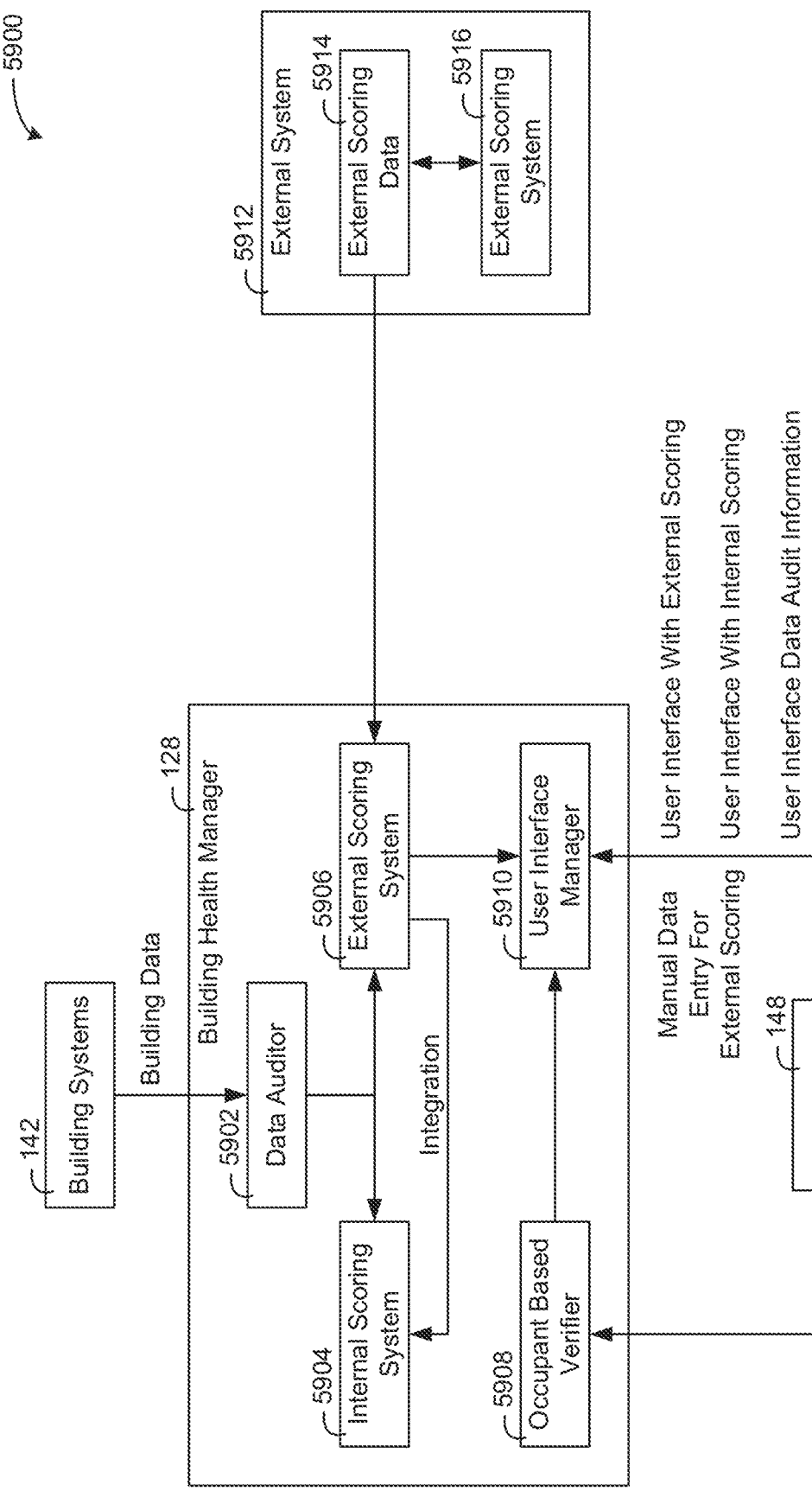
FIG. 59 is a block diagram of the building health manager performing building health scoring based on an external scoring model of an external system, according to an exemplary embodiment.

Referring now to FIG. 59, a system 5900 including the building health manager 128 performing building health scoring based on a scoring model, such as an external or third-party scoring model of an external system 5912, is shown, according to an exemplary embodiment. In some implementations, the building health manager 128 can be configured to implement the scoring of the external system 5912. The external system 5912 can be a system developed and/or managed by an entity other than the entity associated with the development and/or implementation of the building health manager 128. While various embodiments described herein discuss implementing or integrating with a scoring model from an external system, it should be understood that, in various implementations, the scoring model may be a third-party model defined by a third party, but the information used to determine the score under the model may be obtained by system 5900 without obtaining it from the third party directly (e.g., without obtaining it from the external system 5912), such as by measuring relevant data directly or obtaining it from one or more other parties. In some implementations, the features described herein may be used to implement a first party scoring model. All such modifications are contemplated within the scope of the present disclosure.

In some embodiments, the external system 5912 can implement an external scoring system 5916 that performs scoring for the building 146 according to a particular standard or set of standards. This particular standard or set of standards may be separate from the scoring described in FIGS. 1-58 and 61-66. The external scoring system 5916 can be configured to implement scoring such as the scoring for FITWELL, RESET, GREENMARK, LEED, WELL, etc. The external scoring data 5914 can be data in the various categories, sub-categories, parameters, options, etc. of the building 146 that is needed to perform building scoring via the external scoring system 5916 according to the various scoring models and/or calculations of the scoring standards of the external scoring system 5916. While the external scoring system 5916 is shown as a part of the external system 5912 in the illustrated embodiment, it should be understood that, in other embodiments, the scoring functionality provided by the external scoring system 5916 may be performed in part or in whole by the building health manager 128 (e.g., the building health manager 128 may include the scoring system functionality and conduct the scoring alone or in combination with the external system 5912).

In some embodiments, the building health manager 128 can be configured to integrate the scoring of the external scoring system 5916, e.g., via the external scoring system 5906). In some embodiments, the building health manager 128 can implement the external scoring method of the external scoring system 5916 and display the information in user interfaces so that the user can view scoring results of the external scoring system 5906 but also the internal scoring system 5904 which implements the scoring described in FIGS. 1-58 and 61-66.

In some embodiments, the internal scoring system 5904 can integrate the determinations of the external scoring system 5906. In some embodiments, the scores for the planet health parameters 302, the space health parameters 304, and/or the people health parameters 306 can be based in whole or in part on one or more scores of an external scoring methodology determined by the external scoring system 5916. For example, in some embodiments, the people health parameters 306 can be based on one or more scores determined based on the WELL building standard. In some embodiments, the space health parameters 304 can be based in whole or in part on scores determined based on the LEED building standard. Furthermore, in some embodiments, the space health parameters 304 can be based in whole or in part on the data auditing of the data auditor 5902. While the illustrated embodiment shows the internal scoring system 5904 and the external scoring system 5906 as separate components, it should be understood that, in some implementations, the building health manager may include a single scoring system that integrates aspects of both an internal scoring methodology and an external or third party scoring methodology.

In some embodiments, the building health manager 128 provides a certification, via the scoring of the external scoring system 5906, indicating whether the building 146 is meeting a particular score of the external scoring system 5906. In some embodiments, the external scoring system 5906 implements external scoring of one or multiple different external scoring systems. Different certification organizations may exist with their own definitions, evaluation criteria, and scoring models. The external scoring system 5906 can implement the various different scoring methodologies so that the user can review the performance of their building with respect to each scoring methodology.

The building health manager 128 can receive building data from the building systems 142. The building data can be processed through the data auditor 5902. The data auditor

5902 can analyze the building data to verify the integrity of the data, e.g., verify that the data is not corrupted by network errors, equipment faults, etc. The data auditor 5902 can perform the various data verification techniques described in U.S. patent application Ser. No. 16/685,814 filed Nov. 15, 2019 and U.S. patent application Ser. No. 16/685,834 filed Nov. 15, 2019, the entirety of which is incorporated by reference herein. In some embodiments, a user interface or user interfaces can be displayed on the user device 148 which indicate the results of the data audit performed by the data auditor 5902. In some embodiments, the data auditor 5902 cleans data, e.g., performs normalizations, removes corrupt data, fills in missing data points, etc. In some embodiments, a model based data point filling technique could be used by the data auditor 5902 to fill in missing data points. A result and/or record of the data cleaning can be displayed in a user interface by the user interface manager 5910. In some embodiments, the user may have control over when and what types of data cleaning is performed via the user interface. For example, a user could receive a recommendation to perform cleaning in the user interface, accept the cleansing recommendation, and historical data (which control algorithms may be run against) could run based on the cleansed data.

In some embodiments, the external scoring system 5906 can implement scoring for the an external building standard such as WELL, LEED, or any other scoring standard. The user interface manager 5910 can generate one or more user interfaces that provide scores of the external building standard and/or actionable recommendations for improving the scores of the external building standard. In some embodiments, the external scoring system 5906 can use sensor and/or BMS data received form the building system 142 and use the data in the external scoring system 5906 to generate scores for the external building standard. In some embodiments, the data is used in an air concept of the WELL standard. In some embodiments, the scoring standards may relate to one or more of healthy people, places, or planet/environment. For example, a scoring model (e.g., WELL standard model) relating to person/building occupant health may be used, a scoring model (e.g., LEED standard model) relating to building/building space/external environment/planet health (e.g., carbon emissions performance) may be used, etc.

The external building standard can use criteria for calculating the scores of the external building standard (e.g., two hundred or more criteria for the WELL standard). In some embodiments, the data for the scoring can be the external scoring data 5914. In some embodiments, the data can be entered manually by a user via the user device 148, e.g., via a manual configuration interface. The manual configuration interface can include input elements specific to a particular building standard, e.g., an interface specific to entering WELL data and/or an interface specific to entering LEED data.

In some embodiments, the building health manager 128 can keep a historical record of the various scores of the external building standard. The user interface 5910 can generate a user interface that includes the various current scores and/or historical scores of the external building standard and indicate compliance. In some embodiments, the recommendation generator 1116 can be configured to generate recommendations to improve the external building standard scores. These recommendations can be provided in the user interface including the external building scores. In some embodiments, the recommendation generator 1116 can identify recommendations that conflict with each other (e.g. recommendations for occupant comfort, air quality, energy savings, etc. that conflict) and inform user who can then prioritize different parameters (e.g. prioritize occupant comfort and air quality during occupied times and prioritize energy savings during unoccupied times).

In some embodiments, the occupant based verifier 5908 can receive occupant feedback via the user device 148. In some embodiments, the feedback is received via a mobile application run at least partially on the user device 148. The feedback can be used by the occupant based verifier 5908 to verify the scores provided to the user via the user interfaces generated by the user interface manager 5910. For example, a score for occupant thermal comfort can be verified based on comfort feedback of the occupants of the building 146 provided via the user device 148. The feedback can confirm if people agree with the thermal comfort scores generated by the building health manager 128. In some embodiments, the occupant feedback may be used to validate whether certain sensed or reported data is reflective of the actual building environment; for example, occupant feedback may be used to verify whether a non-smoking policy indicating that occupants cannot smoke inside a building or within a certain distance of entrances is actually complied with by occupants. The result of the feedback can be an agreement or disagreement (thumbs up or thumbs down) with the scores generated by the building health manager 128. In this regard, the occupants can be treated as sensors by the building health manage 128 and the data collected from the occupants can be used as sensor data to verify the scores of the building health manager 128. In various embodiments, the feedback may be received in a different manner than via a mobile app, such as via a web interface, via a different type of computing device, via manual survey data, etc. In some embodiments, aspects of the scoring output may indicate whether they have been generated in part based on occupant feedback (e.g., to provide enhanced confidence that the scoring is reflective of actual occupant experience).

Figure 60:
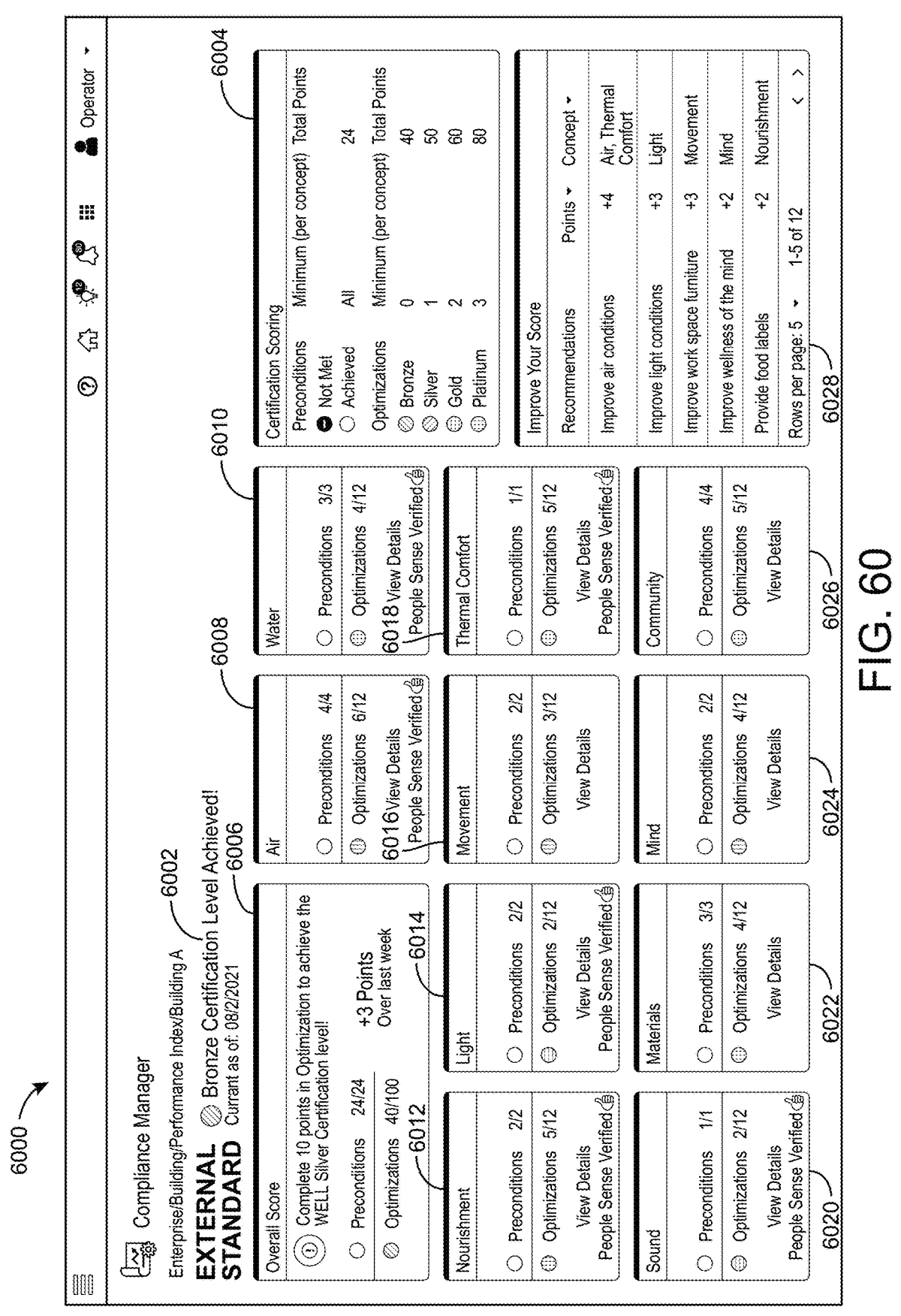

Referring now to FIG. 60, a user interface 6000 providing scoring for factors of the external scoring model is shown, according to an exemplary embodiment. The user interface 6000 can be generated by the user interface manager 5910 based on the scoring generated by the external scoring system 5906. In some embodiments, the user interface 6000 displays scores for an external scoring model, e.g., the WELL building standard.

The interface 6000 includes a certification level 6002 indicating the certification level (e.g., gold, silver, bronze, platinum, etc.) that the building 146 has achieved based on the scoring performed by the external scoring system 5906. The element 6004 indicates certification scoring and point allocations. The element 6006 indicates an overall score for the building 146. The element 6008 indicates scoring for air, the element 6010 indicates scoring for water, the element 6012 indicates scoring for nourishment, the element 6014 indicates scoring for light, the element 6016 indicates scoring for movement, the element 6018 indicates scoring for thermal comfort, the element 6020 indicates scoring for sound, the element 6022 indicates scoring for materials, the element 6024 indicates scoring for mind, and the element 6026 indicates scoring for community. The elements 6008, 6010, 6012, 6014, 6018, 6020 include elements indicating whether occupant feedback has verified the scores, in some embodiments.

The element 6028 can include various recommendations for improving the scores of the interface 6000. For example, the various recommendations can be generated by the recommendation generator 1116. The recommendations can each indicate a points increase that will result to a particular concept, e.g., air, thermal comfort, light, movement, mind, nourishment, etc. The recommendations can be ordered from greatest points increase to lowest points increase.

Figure 61:
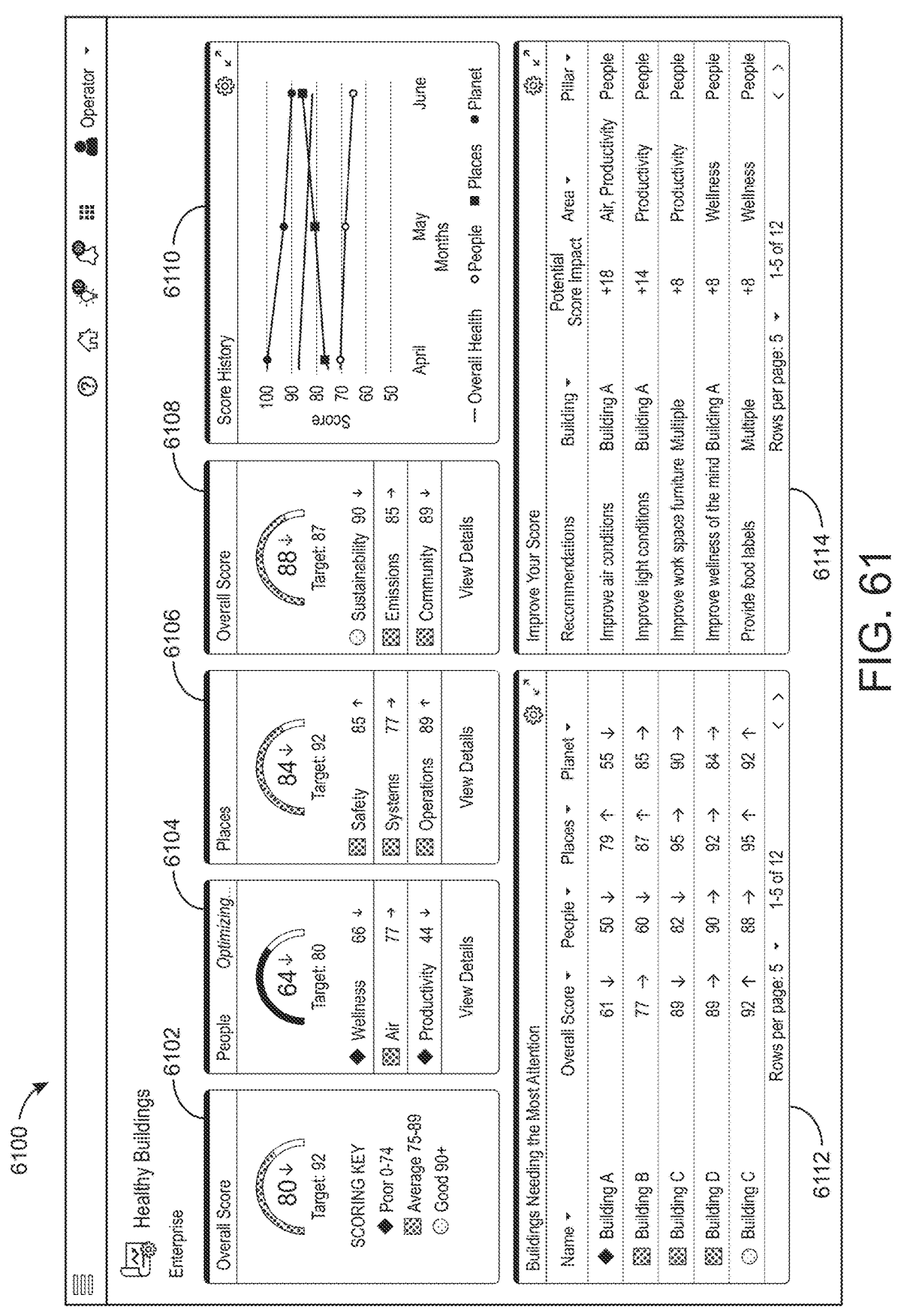

Referring now to FIG. 61, a user interface 6100 including a healthy building scoring for the building 146 is shown, according to an exemplary embodiment. The user interface 6100 can be generated by the user interface manager 5910 based on the scoring performed by the internal scoring system 5904 based on the various parameters described in FIGS. 3, 4, and 6-10. The scores of the user interface 6100 can be generated for a specific building and/or for a specific group of buildings (e.g., an enterprise).

The user interface 6100 can include an element 6102 indicating an overall score for the building 146, e.g., the overall building health score 308. The element 6104 indicates scores for the people health parameters 306. The element 6106 indicates scores for the space health parameters 304. The element 6108 indicates scores for the planet health parameters 302. The scores of the elements 6102-6108, e.g., the overall score, the people, score, the places score, and the planet score can be trended by the building health manager 128. The score history element 6110 can trend the scores of the elements 6102-6018 via a trend chart. The scores 6102-6018 provide a consistent and centered mechanism to quickly compare very different categories of information. For example, at a glance a user can understand that their enterprise is delivering the lowest people scores related to wellness and productivity.

The elements 6102-6108 can provide a quick view of building health scores across people, places, and planet categories, as well as subcategories, e.g., wellness, air, productivity, safety, systems, operations, sustainability, emissions, community, etc. The score history element 6110 can help users understand how the scores for the categories and parameters change over time. For example, the trend graph of the element 6110 can indicate that people and planet scores have been declining at the same time a places score is rising. This could lead a user to believe that actions taken in the safety and operations categories are having a negative side effect with other categories.

The interface 6100 includes an element 6112 that sorts multiple buildings of a group (e.g., of a particular university, of a retail entity, of a business enterprise, etc.) based on the overall building scores determined by the building health manager 128. The sorted buildings of the element 6112 indicate which buildings are in the greatest need of attention. The element 6112 helps a user to quickly compare the performance of multiple buildings of a group, e.g., of an enterprise.

The element 6114 indicates recommendations for improving the scores of the interface 6100. The recommendations of the element 6114 indicates recommendations for various buildings and/or groups of buildings (e.g., implement the same recommendation in multiple buildings). The recommendations of the element 6114 indicate a recommendation goal, a potential score impact (e.g., a score impact across all subgroups of a group), an area, and a pillar. In the element 6114, the recommendations are shown to all relate to the people category. This is because a user has selected that the people score should be optimized, e.g., prioritized over other scores. In some embodiments, a user can set target scores for the building health manager 128 to generate recommendations to achieve. The scores can be prioritized in the element 6114 such that the highest impact scores appear at the top of the list.

Figure 62:
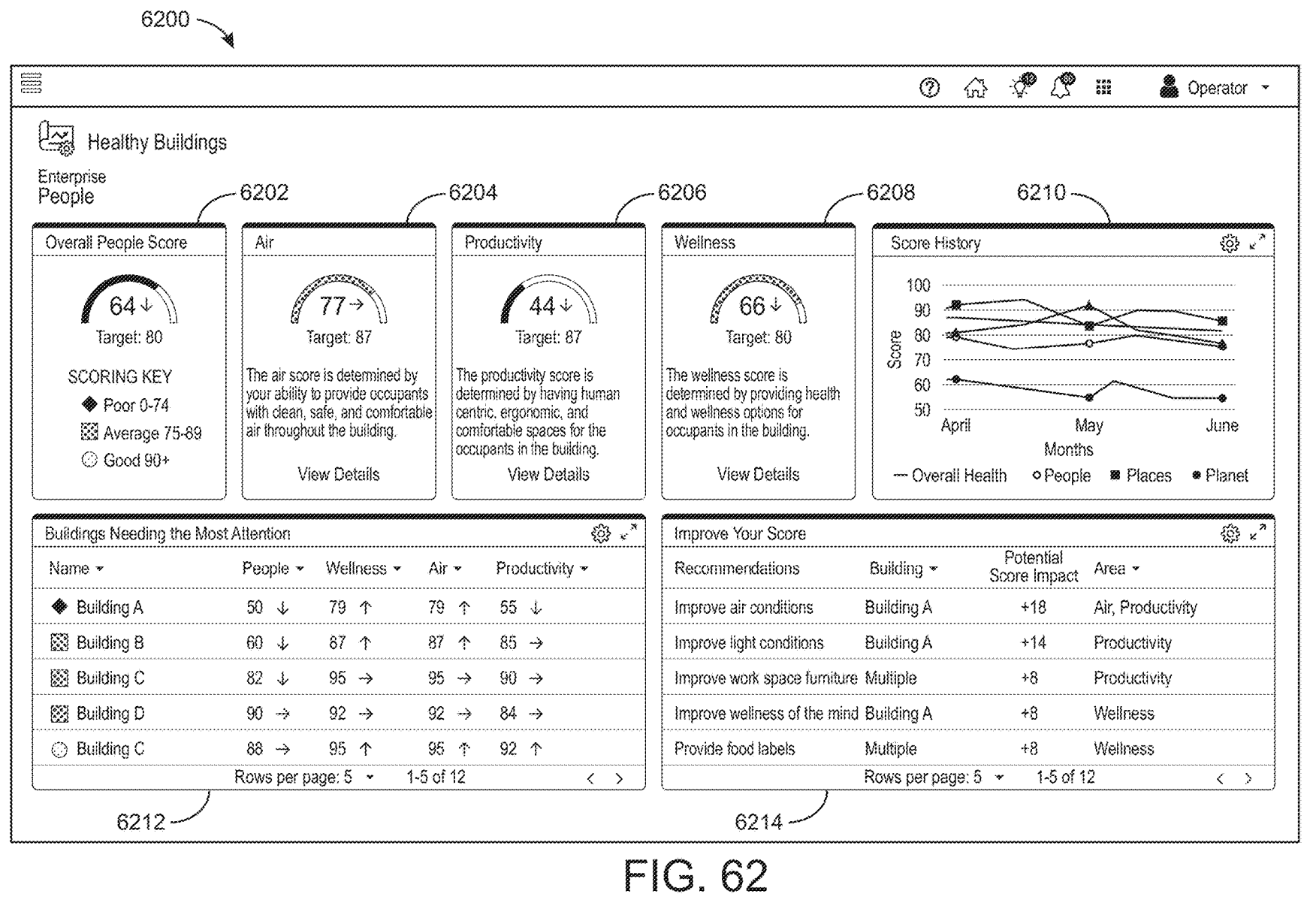

Referring now to FIG. 62, a user interface 6200 including people related healthy building scores for the building 146 is shown, according to an exemplary embodiment. While the interface 6100 of FIG. 61 shows scores for the people, places, and planet categories, the interface 6200 shows scores for the people specific category. The interface 6200 includes scores specific to sub categories of the people category, e.g., air, productivity, and wellness.

The interface 6200 includes an overall people score 6202, this can be similar or the same as the element 6104 of the interface 6100. The element 6204 indicates scores for the air category, e.g., an indication of how clean, safe, and comfortable air is for occupants. The element 6206 indicates a score for productivity, the score can indicate human centric, ergonomic, and space comfort related features of the building. The element 6208 indicates a wellness score indicating health and wellness related options for occupants of the building 146. The element 6210 indicates a score history of the various people, air, productivity, and wellness scores of the elements 6202-6208. The building ranking of element 6212 can, in some embodiments, be related to the people related scores of the elements 6202-6208. Similarly, the recommendations of the element 6214 can be recommendations for improving air, productivity, and wellness related scores of the elements 6204-6208.

Figure 63:
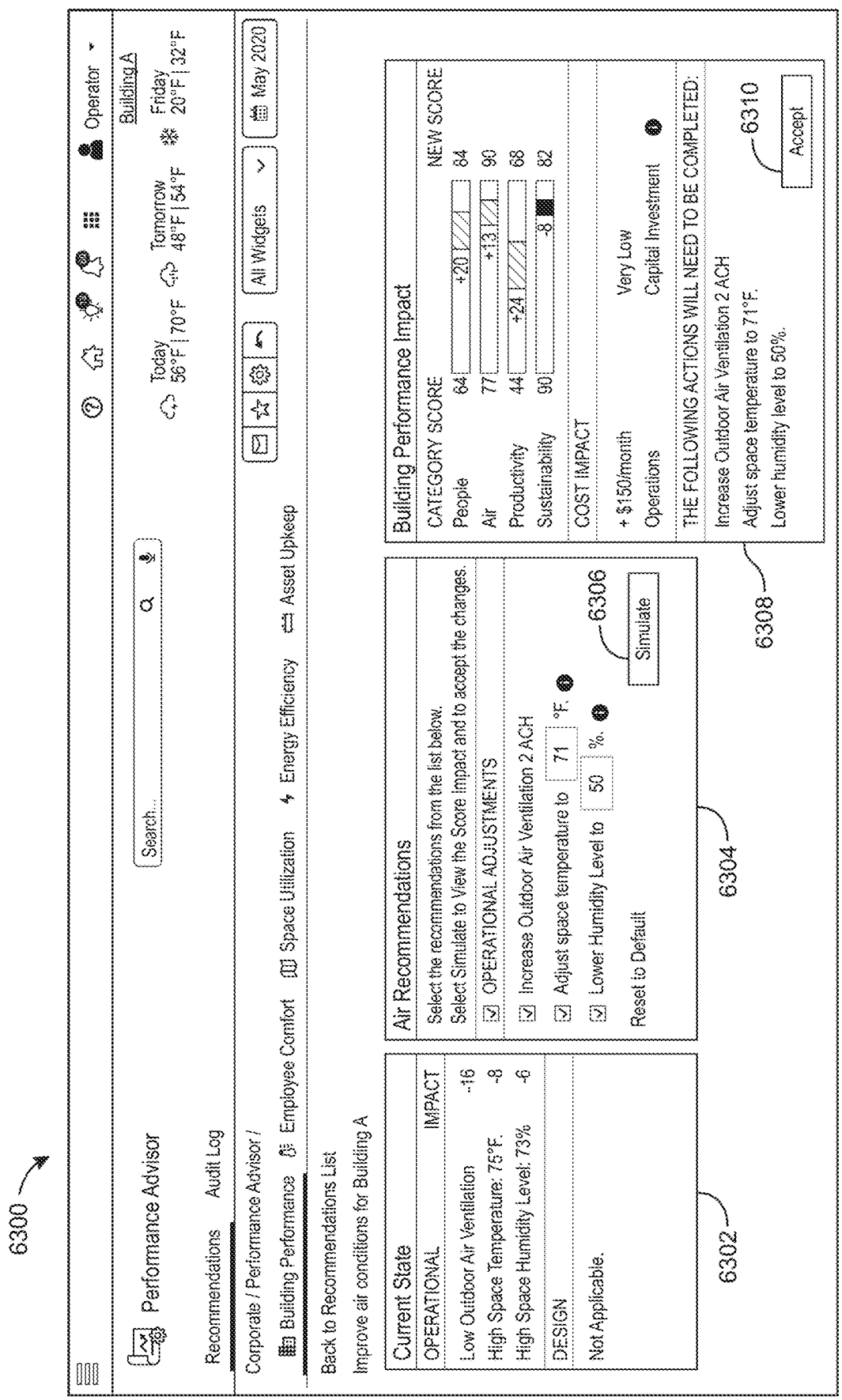
FIG. 63 is schematic diagram of a user interface providing a recommendation for improving the healthy building scoring for the building, according to an exemplary embodiment.

Referring now to FIG. 63, a user interface 6300 providing a recommendation for improving the healthy building scoring for the building 146 is shown, according to an exemplary embodiment. In some embodiments, the user interface 6300 may be displayed responsive to interacting with a particular recommendation of the interfaces 6100 and 6200 of FIGS. 61 and 62. The recommendation of the interface 6300 can be a recommendation for improving conditions of a particular building. The user interface 6300 includes an element 6302 indicating a current operational state of the building, e.g., the level of outdoor ventilation, space temperature and space humidity. The negative score impact of each of these settings is included in the element 6302.

The element 6304 indicates recommendations for improving the parameters of the element 6302. The recommendations may be air recommendations to increase an outdoor air ventilation to two air changes per hour, adjust a space temperature, and/or lower a humidity. A user can select or deselect each parameter change. Furthermore, the user can adjust the value of some or all off the parameters. If the user adjusts the values for the parameters, the user can interact with the simulate button 6306, causing the building health manager 128 to run a simulation. The simulation can identify the score impact resulting from the values for the parameters and display the results to the user, this can be shown in the element 6308. In some cases, multiple recommendations may apply to one parameter or set of parameters. In this regard, the user can select the changes they wish to take and simulate the results to verify that the changes result in the objective that they desire.

The element 6308 indicates score impacts of the settings of the element 6304. The element 6308 further indicates a cost impact of the scores of the element 6304. The simulated results of the element 6308 are shown with score impacts, cost impacts, and actions that need to be completed. The scores of the element 6308 can allow a user to quantify and visualize the multi-faceted impacts that the changes of the element 6304 will have. If a user interacts with the accept button 6310, the settings selected in the element 6304 can be implemented, e.g., manually implemented by the building systems 142 and/or implemented by a technician in the building 146 through the generation and delivery of a work order to a device of the technician. In some embodiments, interacting with the accept button 6310 can follow a recommendation link that takes the user to a performance advisor for further evaluation and taking action. In some embodiments, interacting with the accept button 6310 creates a workflow (e.g., work order) for implementing the changes.

Figure 64:
FIG. 64 is a schematic diagram of another user interface providing a recommendation for improving the healthy building scoring for the building, according to an exemplary embodiment.

Referring now to FIG. 64, a schematic diagram of another user interface 6400 providing a recommendation for improving the healthy building scoring for the building 146 is shown, according to an exemplary embodiment. The user interface 6400 includes elements for another recommendation for a building. The element 6402 indicates a current state regarding low light levels for the building 146, e.g., inefficient lighting controls, no natural light or views, and no human-centric lighting features. The negative impact of each feature is shown in the element 6402.

The element 6404 indicates a lighting recommendation for improving lighting. One operational adjustment is to increase light levels to a higher light density. Design adjustments may be to add occupancy-based controls, add natural light to more spaces, add indoor nature (plants, water falls, etc.) or outside views through décor, add lighting with human-centric features, etc. The various design and operational changes can be selected or unselected by a user. In some embodiments, the values of the operational adjustments can be changed by a user. The changes can be simulated by the building health manager 128 responsive to the user interacting with the element 6406. The element 6408 can be displayed (or information of the element 6408 populated) responsive to the user interacting with the simulate button 6406.

Figure 66:
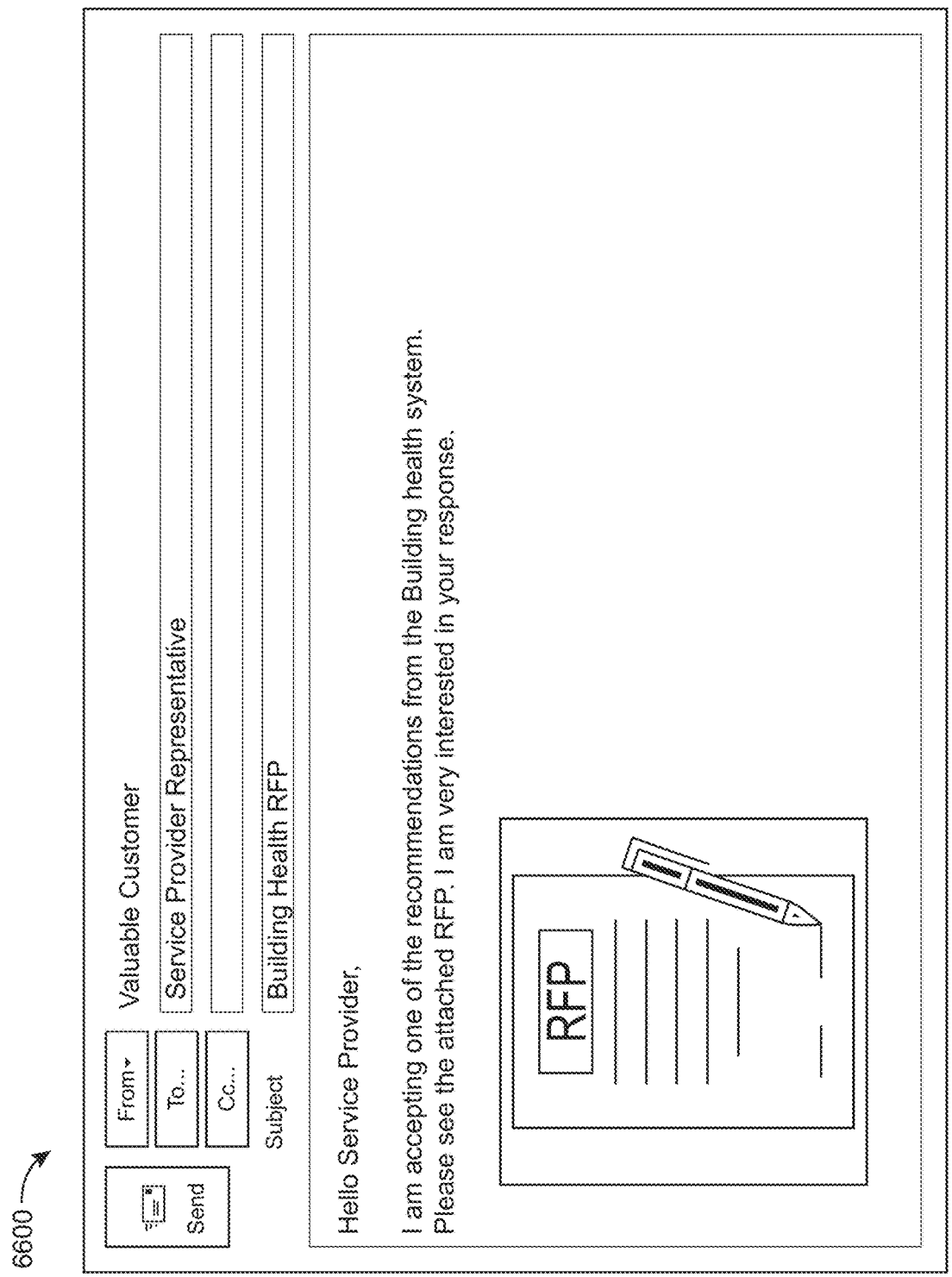
FIG. 66 is a user interface for emailing a service provider a request for proposal (RFP) for an accepted recommendation of the user interface of FIG. 64, according to an exemplary embodiment.

The element 6408 indicates a building performance impact of the various operational and design changes selected in the element 6404. The element 6408 can illustrate the adjustment in score for various categories. Furthermore, the element 6408 can indicate the financial impact of the changes. The changes that need to be implemented can be summarized in the element 6408. Responsive to interacting with the accept button 6410 that changes can be implemented (e.g., various features the same as or similar to those discussed in FIG. 63 can occur). For example, automatic work order generation, automatic implementation of control settings, etc. can be implemented by the building health manager 128. In some embodiments, a request for proposal (RFP) as shown in FIG. 66 can be generated responsive to interacting with the element 6410. In some embodiments, because the changes are in part design changes, a technician needs to be commissioned to implement the changes. In situations where a technician needs to be commissioned, the RFP request can be generated.

Figure 65:
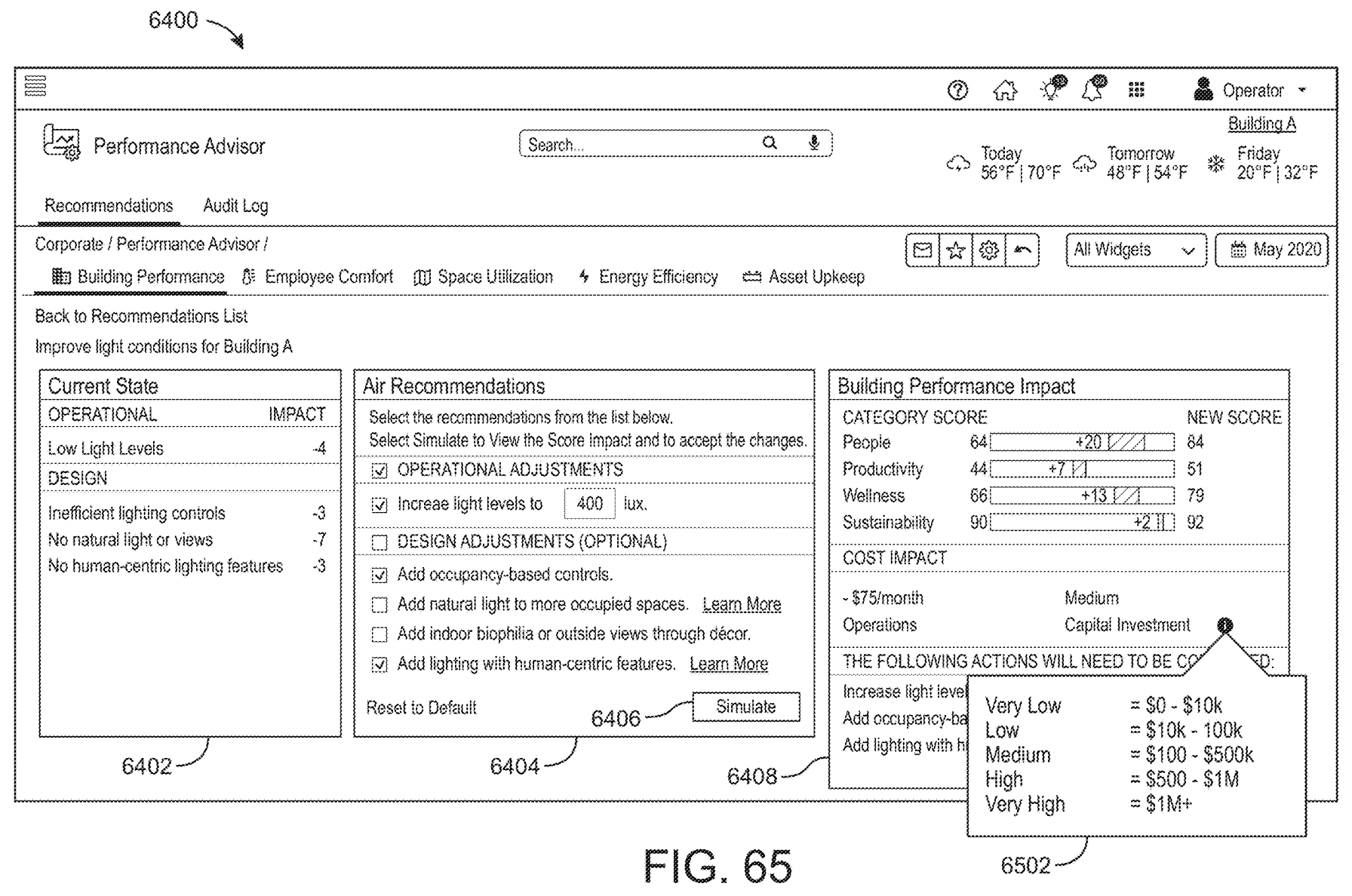

Referring now to FIG. 65, the user interface 6406 providing a recommendation for improving the healthy building scoring for the building and including a key 6502 indicating various ranges of capital costs for a building performance improvement is shown, according to an exemplary embodiment. The key 6406 can indicate "Very Low," "Low," "Medium," "High," and/or "Very High" financial cost categories and a corresponding price ranges for the "Very Low," "Low," "Medium," "High," and/or "Very High" categories.

Referring now to FIG. 66, a user interface 6600 for emailing a service provider a request for proposal (RFP) for an accepted recommendation of the user interface of FIG. 65 is shown, according to an exemplary embodiment. The interface 6600 can be generated automatically in an email program, e.g., OUTLOOK, GMAIL, PROTONMAIL, etc. The email can, in some embodiments, include a RFP. The RFP can in some embodiments, be a file (e.g., WORD document, PDF document, text document, etc.) describing the operational and/or design changes desired by a user. The operational and/or design changes can be the updates shown in FIGS. 63-65.

Figure 67A:
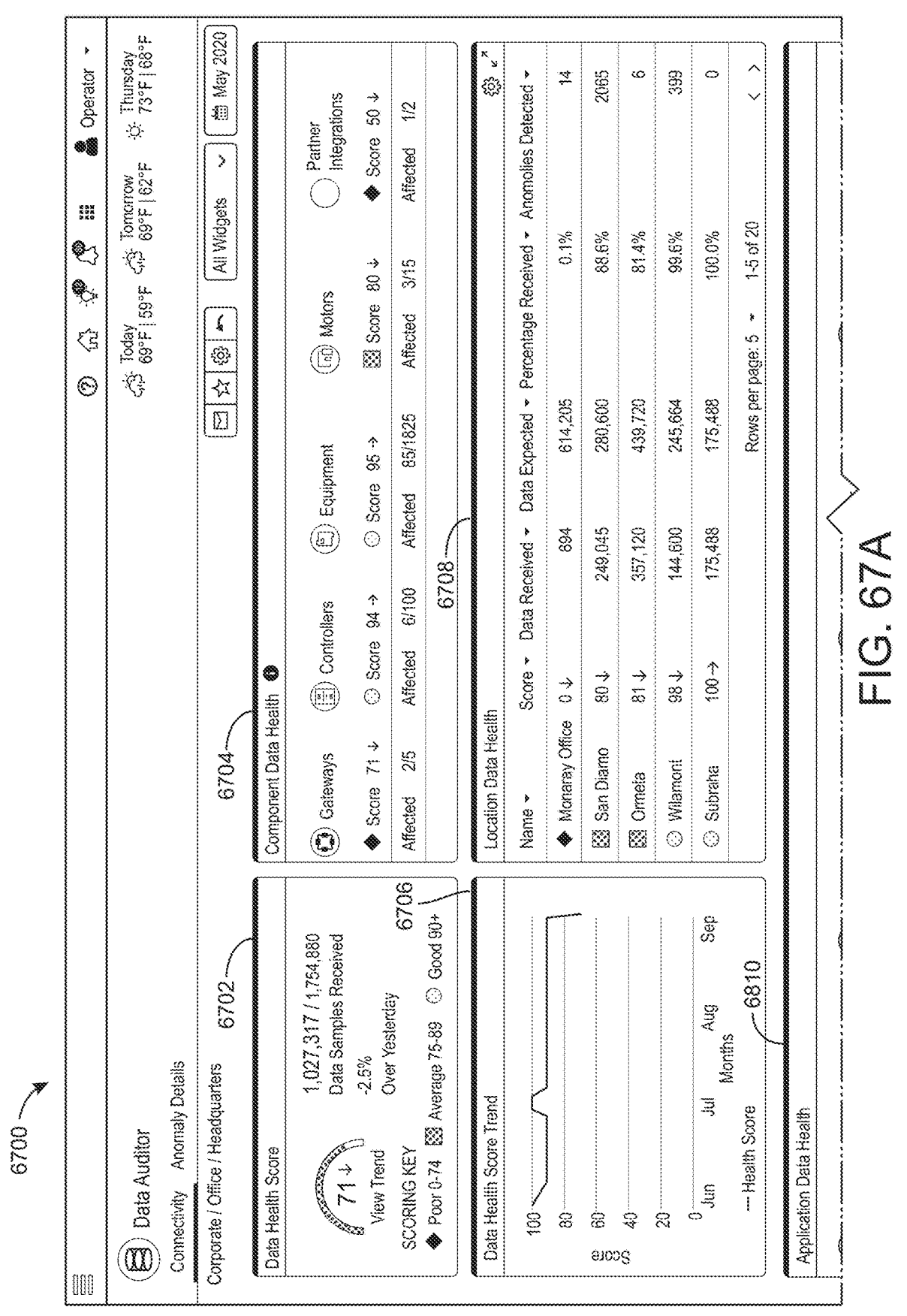
Figure 67B:
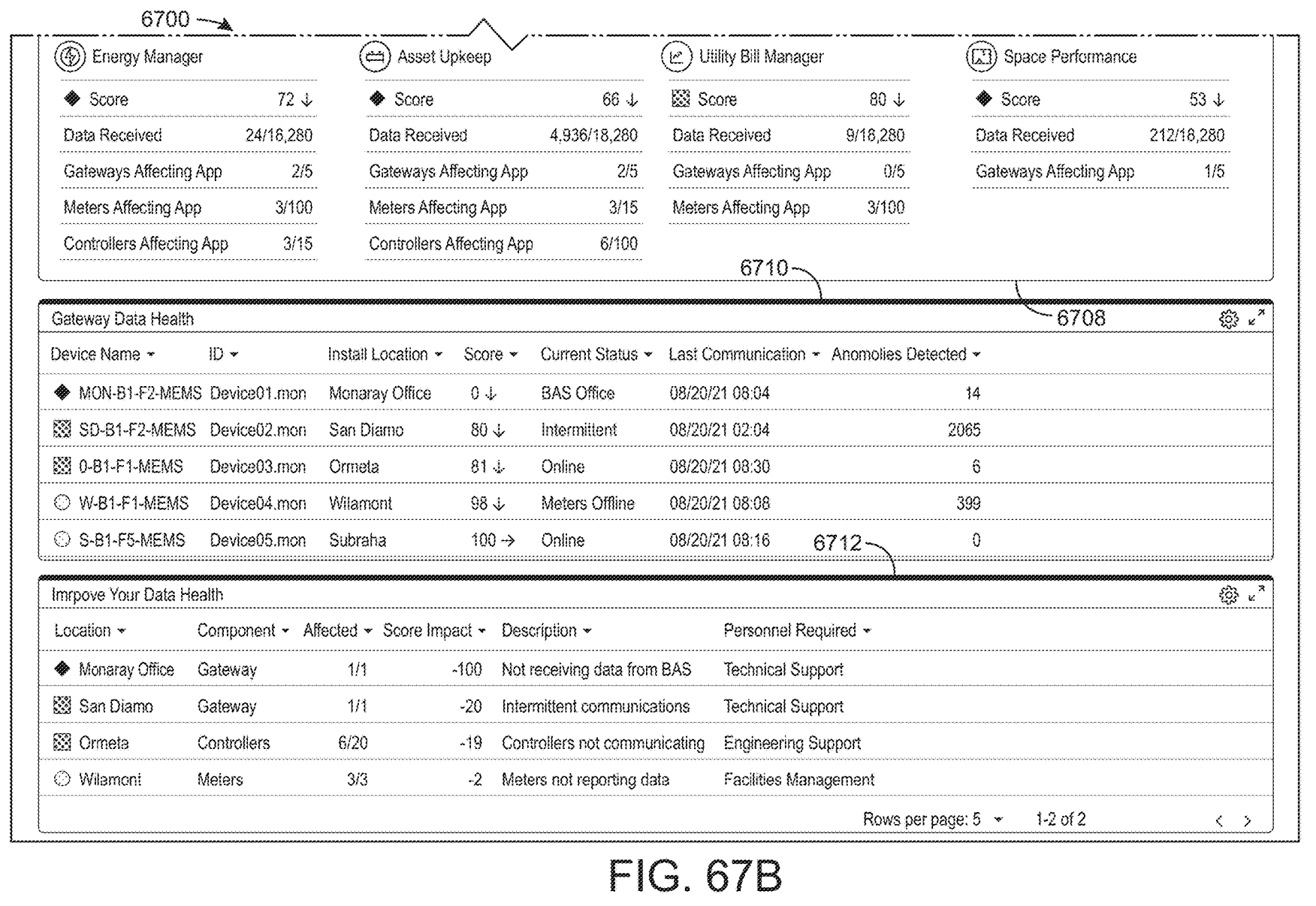

Referring now to FIGS. 67A-B, a user interface 6700 including data health scores is shown, according to an exemplary embodiment. In some embodiments, the data auditor 5902 can perform scoring, data derivations, and/or analysis to generate the various pieces of information of the user interface 6700. In some embodiments, the user interface manager 5910 can generate the user interface 6700 based on the various pieces of information generated based on the data auditor 5902.

The user interface 6700 includes a data health score element 6702. The element 6702 includes an overall data health score. The overall data health score can be (or can be based on) a numeric value indicating the amount of data that the data auditor 5902 has received. The overall data health score indicates whether the data received is correct and valid (e.g., free from anomalies). Because data can become unreliable, e.g., corrupt, incorrect based on equipment faults, lost via network transfer, etc. it may be important for the operation of the building for a user to be able to review the overall data health score and make operations and/or improvements to the building (e.g., update control settings, update network parameters, perform equipment maintenance, etc.) to improve the overall data health score.

The element 6702 includes an overall score that is a percentage value, e.g., 71 points out of 100 points. The element 6702 includes the scoring for various data health score ranges, e.g., poor being 0-74, average being 75-89, and good being 90 or above. The element 6702 further indicates the total number of samples received by the data auditor 5902 from the building systems 142 and the expected number of data samples. In some embodiments, the overall data health score is the percentage of received data samples to the expected data samples (e.g., 100%*(1,027,317/1,754,880)=59%)). Furthermore the overall health score can be generated based on the number of received data samples that are anomalous (e.g., change at a rate that is physically impossible, are values that are statistical outliers, etc.). In some embodiments, the overall health score has a non-linear relationship with the number of anomalies. For example, a percentage of received data samples can be decreased in a non-linear manner with increases to the number of data anomalies. The element 6702 can further indicate a change in the overall data health score over time, e.g., a down arrow or up arrow indicating the overall change over a period of time (e.g., the past day). Furthermore, a percentage change in the overall data health score can be included in the element 6702 (e.g., up 3% over the last week, down −2.5% over the last day, etc.).

The user interface 6700 includes a component data health element 6704. The element 6704 indicates data health scores on a component level. The components may be component types, e.g., device types such as gateways, controllers, equipment, meters, and/or external data sources (e.g., partner integrations). The data health scores can be determined by the data auditor 5902 for each device type based on data received for the device type. Furthermore, the data auditor 5902 can determine the number of devices of each device type that are providing anomalous and/or corrupt data. The proportion of devices of each device type can be included in the element 6704.

The user interface 6700 includes a data health score trend 6706. The trend 6706 can indicate a trend of the overall data health score of the element 6702. The trend can indicate a data health score for an enterprise, for a building, for a space of a building, for a data source type, for a device, for an application, etc. In some embodiments, the trend 6706 can be a trend for device types (e.g., a data health score for gateways, controllers, equipment, etc.). Furthermore, the trend 6706 could be a data health trend for a specific piece of equipment, e.g., a particular sensor located in a particular zone of a building. The trend 6706 can trend the data health score over seconds, minutes, hours, months, years, etc. The trend 6706 can, in some embodiments, be a time correlated reliability data stream. Time correlated reliability data streams are described in U.S. patent application Ser. No. 16/685,814 filed Nov. 15, 2019, the entirety of which is incorporated by reference herein.

The user interface 6700 includes a location data health element 6708. The element 6708 includes data health scores for various physical locations, e.g., spaces, buildings, campuses, etc. Furthermore, data health metrics for each location is shown in the element 6708, e.g., amount of data received, expected amount of data to be received, percentage of data received, and/or number of data anomalies detected. The data auditor 5902 can sort received data based on each location and generate a score for the data of each location.

The user interface 6700 includes an application data health element 6710. The element 6710 can indicate the data health scores for various applications. The data health scores can indicate the health of data consumed by various different applications, e.g., the various user systems 102. The element 6710 indicates data health scores for data consumed by an energy manager, an asset manager, a utility bill manager, and/or a space performance application. The element 6710 can indicate the overall data health score for each application, the amount of data received by each application, the portion of gateways affecting the applications, the portion of meters affecting the applications, and/or the number of controllers affecting the applications.

The user interface 6700 includes a gateway data health element 6712 indicating data health for various gateways of a building. The gateways can be gateways of the building 146, e.g., gateways of the edge platform 106. The data health element 6712 can indicate various gateways by name, by identifier, and/or by installation location (e.g., space, building, and/or campus). The data auditor 5902 can generate data health scores for each gateway based on the data received from each specific gateway.

The element 6712 further indicates an overall data health score for each gateway. Furthermore, a change (e.g., up, down, percentage up, percentage down, etc.) is included for each gateway indicating how the data health score for each gateway has changed over the past hour, day, week, month, etc.). The status of each gateway is further included in the element 6712, e.g., whether the gateway is offline, online, has intermittent connection, etc. The status can further indicate whether systems connected to the gateway that the gateway collects data for are online, offline, and/or intermittent (e.g., a BAS system, a meter, a sensor, an actuator, etc.). Furthermore, a date and/or time that a last message was received from each gateway is included in the element 6717. The element 6712 further includes indications of the number of data anomalies detected for each gateway, e.g., the number of data samples collected by the gateways that is anomalous.

The user interface 6700 includes an element 6714 for improving data health. The element 6714 includes indications of actions that can be taken to make improvements to the data health of various locations, devices, applications, etc. Each action of the element 6714 can indicate the location for which the action is to be taken, a device type for the action, the number of affected devices, a negative impact on the score, a description of the issue, and the personnel needed to perform the action and resolve the issue. In some embodiments, the action is generating a work order that is pushed to a technician (e.g., automatic assignment), the work order describing steps for resolving the issue. In some embodiments, the action is automatically performing an action, e.g., resetting the device (e.g., rebooting, resetting operating settings, etc.), reconfiguring network parameters for the device, performing a device software update, etc. In some embodiments, a user can accept or reject each action of the element 6714 via an accept or reject element in the element 6714. In some embodiments, the element 6714 can indicate the person who is responsible for addressing the issue, e.g., technical support, engineering support, facility maintenance, etc. In some embodiments, a user device of a user may be pushed a link to the user interface 6700 or a specific section of the user interface 6700 by the data auditor 5902. The link can queue an individual to review certain pieces of information that may be important for a person to review and understand, e.g., for a technician to understand when resolving a particular data health issue at a building.

In some embodiments, the data auditor 5902 can generate the data health scores based on whether there are data gaps or intermittent connections with a data source. Missing data and/or an intermittent connection may indicate an error in the communication of data and that the data is corrupted. In some embodiments, the data auditor 5902 can identify whether data is stuck, e.g., has not changed for a particular period of time indicating that the data is the result of an equipment error. Furthermore, the data auditor 5902 can identify whether data values are physically possible.

Furthermore, the data auditor 5902 can compare data values received from the various data sources to a range of acceptable values, e.g., determine whether the data values for a particular point type are between a minimum and a maximum value for the particular point type. If a data value is outside the range, the data may be counted as a data anomaly and decrease the data health score for the data source. In some embodiments, the data auditor 5902 can analyze the rate of change of the value reported by the various data sources. The data auditor 5902 may store a range of rates of changes for various data types, e.g., zone sensor measurements, duct pressures, etc. The data auditor 5902 can determine a rate of change for received values and compare the determined rate of change against the expected rates of changes to determine if the data is healthy or anomalous.

In some embodiments, the data auditor 5902 can perform a statistical analysis on the received data to identify average and/or historical ranges of data values. The data auditor 5902 can compare the current values to the statistical ranges for the data to determine whether the data is heathy. In some embodiments, the data auditor 5902 can generate a statistical confidence for each data value. If the confidence is lower than a particular level, the data value can be classified as anomalous, in some embodiments. In some embodiments, the data auditor 5902 could perform a statistical analysis based on peers. For example, a data type of various devices of the same type (e.g., temperature measurements of various temperature sensors) could be evaluated together to identify whether the data is anomalous or healthy. As another example, a static pressure of one AHU of a building could be compared to static pressures of other AHUs of other buildings.

In some embodiments, the data auditor 5902 can identify a historical median value for values of a data source. The data auditor 5902 can identify whether data values deviate by a particular amount from the median value and classify the data values as healthy if they are within the particular amount from the median value. For example, the data auditor 5902 could determine whether the data value is within a particular number of standard deviations from a mean value or median value. For example, if five consecutive data samples are outside a particular number of standard deviations from the mean value or the median value, it may indicate that the data values are anomalous. In some embodiments, the window of samples considered in the statistical analysis may refresh daily and/or monthly. The size of the window may influence the sensitivity of the analysis. In some embodiments, the window is modifiable by a user and/or determined statistically. Using a median to determine the data health of data values may be more accurate than using an average, in some cases. For example, if data values range from one to ten generally, but a single data value is over 50 k, the average may be driven high by the 50 k data point and therefore may not be useful in determining data health.

In some embodiments, the data auditor 5902 can generate scores in a linear manner or a non-linear manner. For example, the data auditor 5902 could generate the data health scores linearly or non-linearly with the number of data anomalies detected. In some embodiments, the data auditor 5902 identifies a percentage of data anomalies of a total amount of data that a data source has produced. The data auditor 5902 can perform a non-linear decrease of the data health scores based on the percentage or number of the anomalies. In some embodiments, the ramping down of the data health scores can increase rapidly as the percentage of anomalies goes over a particular level, e.g., 5%. In some embodiments, the data auditor 5902 can generate a percentage value of number of received vs. number of expected data samples. The percentage value can then be ramped down by the data auditor 5902 based on the number of data anomalies detected by the data auditor 5902.

The data auditor 5902 can perform a chain analysis, in some embodiments. For example, the data auditor 5902 can isolate various devices as being the sources of anomalous data. For example, if a gateway is reporting anomalous data, the data auditor 5902 can perform a further analysis on controllers, sensors, and/or actuators that feed data to the particular gateway. First, the data auditor 5902 can identify whether the gateway is healthy. If the gateway is healthy, the data auditor 5902 can isolate the data health issue to one of the devices connected to the gateway. For example, the data auditor 5902 can isolate the source of the anomalous data to a particular controller, sensor, and/or actuator, in some embodiments. This chain analysis can determine whether the source of data errors is the gateway itself or the controller which the gateway is collecting data from.

Figure 68A:
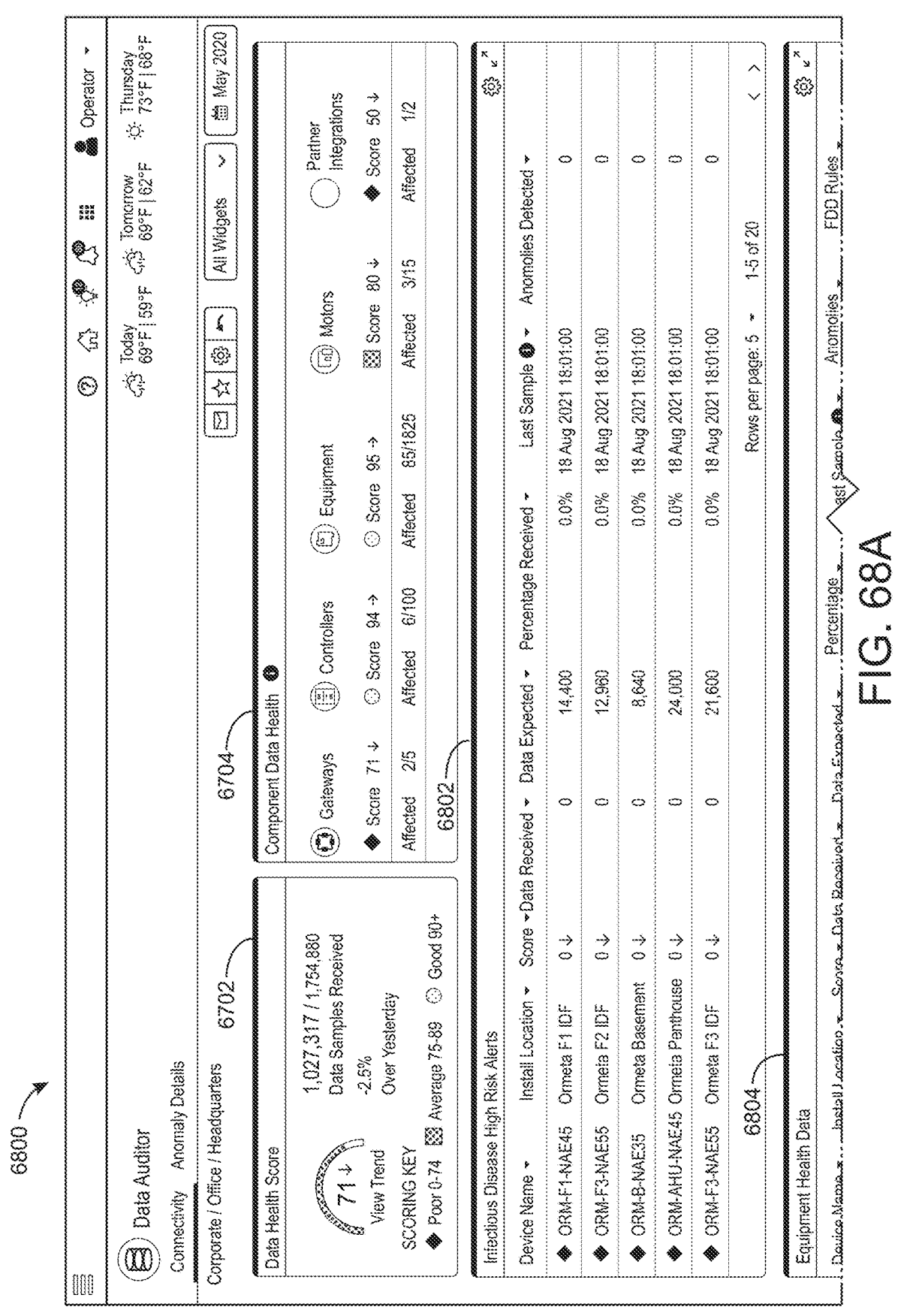

Referring now to FIGS. 68A-B, a user interface 6800 including data health scores for various data sources and data metrics for the various data sources used to determine the data health scores is shown, according to an exemplary embodiment. The user interface 6800 includes the elements 6702 and 6704 described in the user interface 6700. The user interface 6800 further includes elements 6802-6808 indicating data health for various data sources in various equipment categories, e.g., controllers, equipment, meters, and/or partner data sources. The elements 6802-6806 indicate device names, device locations, data health scores, data received, data expected to be received, percentage of data received, date and/or time of last data sample received, number of data anomalies detected, fault detection and diagnostics (FDD) rules impacted by device, etc.

Figure 69:
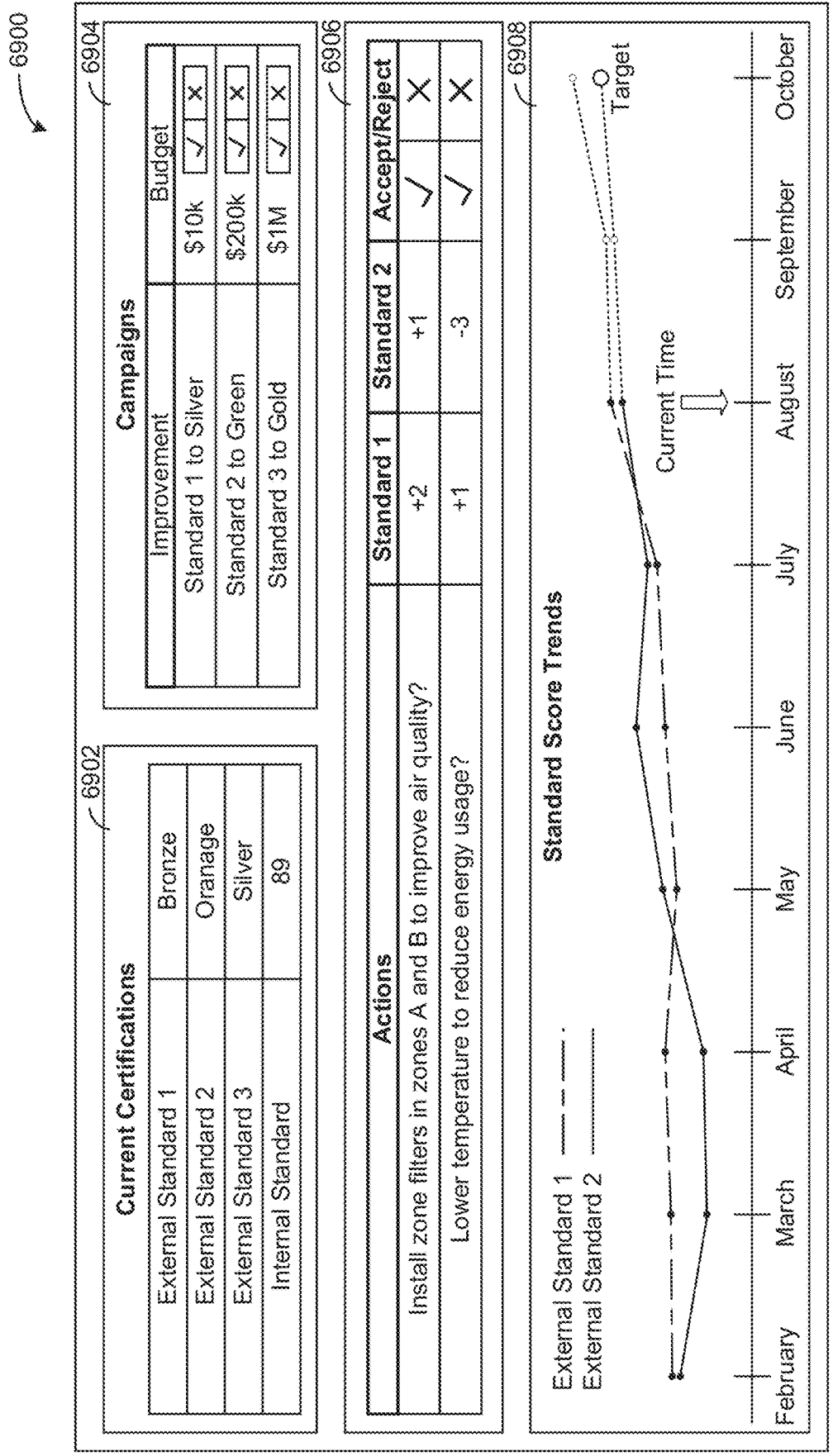
FIG. 69 is a schematic diagram of a user interface comparing scoring for multiple scoring standards, according to an exemplary embodiment.

Referring now to FIG. 69, a user interface 6900 comparing scoring and improvement actions for multiple scoring standards is shown, according to an exemplary embodiment. The user interface 6900 includes a current certifications element 6902. The element 6902 indicates scoring for various external and/or internal standards. The building health manager 128 can be configured to generate the various scores of the external and/or internal standards. For example the various external standards 1-3 could be WELL standards, LEED standards, and/or any other standard. The internal standard could be the standard described in FIGS. 1-58. The scores of the element 6902 can, in some embodiments, be a certification determined (e.g., determined by the external scoring system 5905) and/or received by the building health manager 128, e.g., received via an API connecting the building health manager 128 with an external system that generates an external certification and/or score.

In some embodiments, the building health manager 128 can be configured to communicate (e.g., in a bidirectional manager) with external standards systems to retrieve data indicating the certifications given to the building 146. The building health manager 128 can present all of the certifications within the single user interface, e.g., the user interface 6900. This single user interface can allow a user to understand and prioritize between different certifications.

The user interface 6900 includes an element 6904 indicating different campaigns for achieving various certification levels of the various internal and/or external standards. The element 6904 can include various campaigns for achieving various certification levels with a particular budget. The campaigns can represent a set of actions to be taken over time to achieve the new certification level. By surfacing a single campaign, a user can approve or reject the campaign causing various decisions to be implemented without requiring the user to take the time to review and understand each individual decision. In some embodiments, if the user interacts with the decision, the user interface 6900 can provide a description of each decision for the campaign allowing a user to review and/or edit the details of the campaign. Accepting one of the campaigns can cause the building health manager 128 to implement the various campaigns, e.g., generate work orders, configure the operation of the building subsystems 142, etc.

In some embodiments, the building health manager 128 can be configured to perform one or more artificial intelligence and/or machine learning algorithms to generate recommendations for improving a performance of a building and/or to acquire a certification for the building. The recommendations can be included in the campaigns 6904. In some embodiments, the building health manager 128 can determine whether certain standard is met by performance of the building. The standard may be a particular building health score. The standard might be an ASHRAE standard for building design. Responsive to the standard being met, the building health manager 128 can generate recommendations for acquiring the certification.

In some embodiments, analyzing whether the building meets a standard is important for implementing artificial intelligence and/or machine learning for generating improvement recommendations and/or performing building optimization. Analyzing the building performance relative to the standard can ensure that the building control systems are performing up to their base design standards. If a building is not performing up to its base standard, then artificial intelligence and/or machine learning may not operate well given the poor foundation upon which the artificial intelligence may be trained and/or operate on. The various building health scores generated herein can inform the building health manager 128 whether or not the building is up to the standard for adding intelligent software, such as artificial intelligence and/or machine learning. The building health scores can be used to determine whether the building is ready for more intelligence solutions to be added for the building.

The user interface 6900 includes an element 6906 indicating various actions for improving the various external and/or internal standards. Because each standard can indicate a unique methodology for scoring, the various actions may affect the scores of the various methodologies differently. In some cases, a particular action might increase the score of one standard but decrease another score of a different standard. In some embodiments, the impact resulting from each action can be represented in the element 6906 and an element allowing the user to accept and/or rejection each action is included in the element 6906. In some embodiments, the building health manager 128 can operate to implement the various actions responsive to a user accepting the action.

The user interface 6900 includes an element 6908 indicates trends of various scores of the external and/or internal standards. In the element 6908 a first and second external standard are shown. The scores are shown for various months of a year but can, in some embodiments, be shown for days, months, years, decades, etc. In some embodiments, the scores can be recorded by the building health manager 128 over time and plotted within the element 6908. Furthermore, the building health manager 128 can identify projections to the change in the scores over time based on historical data and/or actions taken to improve the scores. In some embodiments, a user can interact with the element 6908 to define a target. The target can indicate a desired level of the external standard set via the user (e.g., through an interface touch, a cursor click, etc.). The building health manager 128 can identify the target and generate one or more actions to achieve the goal.

Figure 70:
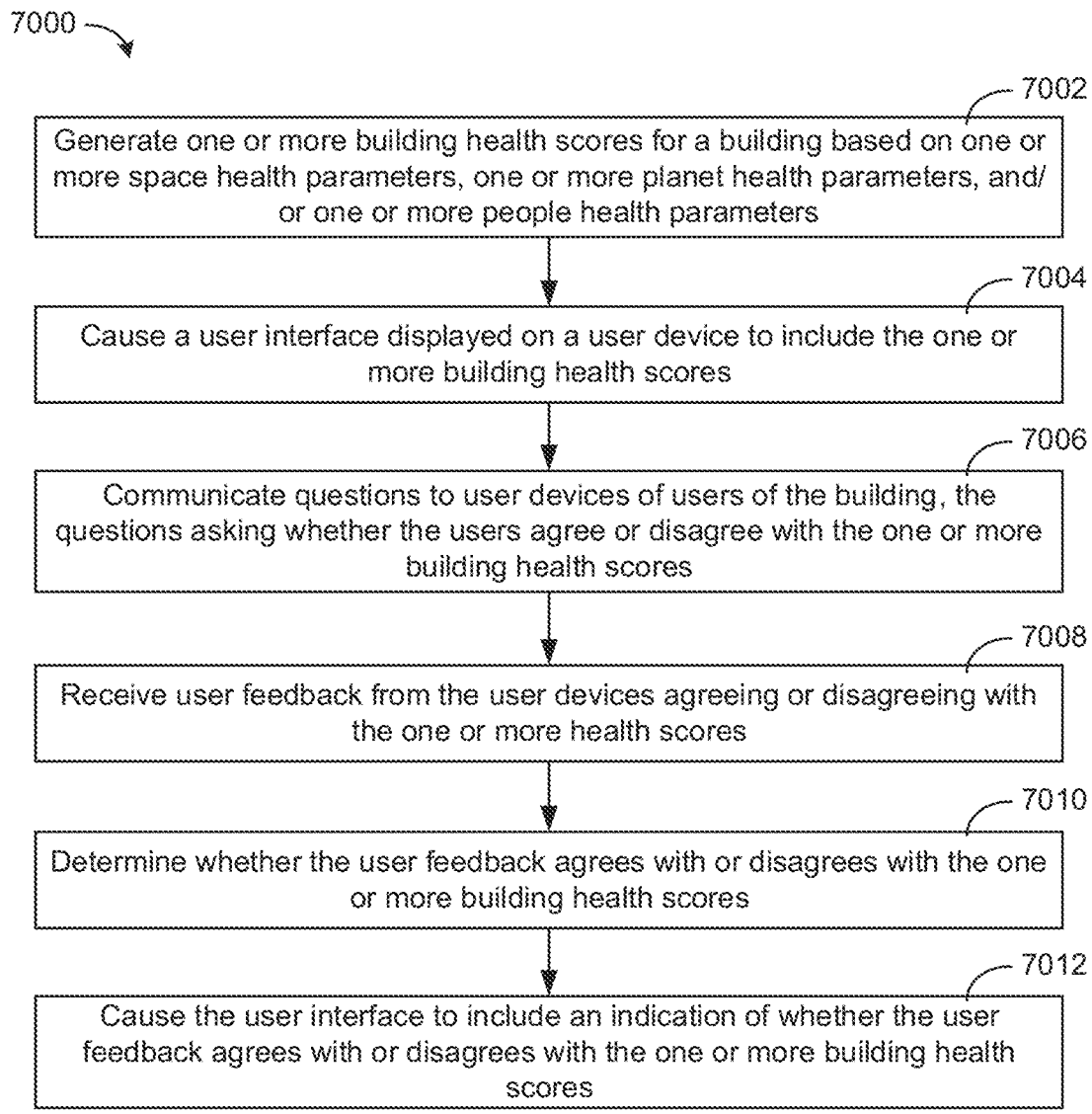
FIG. 70 is a flow diagram of a process of using occupant feedback to verify the building health scores, according to an exemplary embodiment.

Referring now to FIG. 70, a process 7000 of using occupant feedback to verify the building health scores is shown, according to an exemplary embodiment. The process 7000 can be performed by the occupant based verifier 5908. Furthermore, components such as the building health manager 128 can be configured to perform the process 7000. In some embodiments, any computing device described herein can be configured to perform the process 7000.

In step 7002, the building health manager 128 can generate one or more building health scores for a building (e.g., the space health scores 1110, the planet health scores 1112, the people health scores 1114, and/or the overall building health score 308) based on one or more space health parameters 304, one or more planet health parameters 302, and/or one or more people health parameters 306. The building health manager 128 can, in some embodiments, generate the various building health scores as described in FIGS. 11-12 and/or FIG. 59. In step 7004, the building health manager 128 can cause a user interface displayed on the user device 148 to display the various building health scores. The user interfaces may be the user interfaces described in FIGS. 13-18, 39-58, and/or 60-69.

In step 7006, the verifier 5908 causes questions to be communicated to various user devices of users (e.g., the user device 148) of the building 146. The questions ask the users to agree or disagree with the one or more building health scores generated in the step 7002. In some embodiments, the verifier 5908 pseudo-randomly selects users from a list of users of the building stored by the verifier 5908 and/or communicates the questions to the users via a mobile application notification, a text message, a message of a messaging application, an email, and/or any other communications means. The list may, in some embodiments, identify users of the building and the associated mobile devices, laptop computers, usernames for applications, etc.

In some embodiments, the verifier 5908 can select users to be questioned based on demographic data (e.g., age data, gender data, race, length of time spent in the building 146, body weight, height, level of fitness, etc.) and/or various other factors. The verifier 5908 can select a group of users from a total set of users from the building to accurately represent the total demographic makeup of the building.

In some embodiments, the users may receive questions on their user devices provided by the verifier 5908 responsive to the users being located in a particular area. The user locations can be determined through GPS tracking, Wi-Fi tracking, beacon-tag communication, etc. The questions communicated to the users may ask questions about the current location of the user. Systems and methods for detecting user location in a building are described in U.S. patent application Ser. No. 17/220,795 filed Apr. 1, 2021, the entirety of which is incorporated by reference herein. In some embodiments, users may be prompted to answer questions when they pass through a certain point, e.g., as they badge in through a certain door, badge into a facility, request access to a meeting room, etc. The user may only gain access to the location by an access control system after the user answers the questions provided by the verifier 5908.

In some embodiments, the message communicated by the verifier 5908 can prompt the user to answer questions about various elements, e.g., a score, policy, and/or condition. In some embodiments, the elements cannot be sensed and/or verified by sensors. Furthermore, in some cases where sensors are present, it may be valuable to verify that the sensors are measuring properly, e.g., measuring accurately. If an element cannot be verified by a sensor (or there is no sensor present to verify the element), the verifier 5908 can determine to verify the element through user feedback. For example, after a heavy rain, the may be the potential for flooding in the building. However, there may not be sensors present to detect whether flooding has occurred. The verifier 5908 could communicate a message asking if the building is flooded and communicate the message to the various users. The users could confirm whether or not they have seen flooding. Similar questions could be pushed to users asking the users whether the temperature is comfortable, whether the cafeteria food is healthy, whether a hallway is properly lit, etc. The questions can be made for the various score categories of the building 146, e.g., the questions may ask about the score for the various parameters discussed herein, e.g., at FIGS. 3-10 and/or FIG. 60.

In some embodiments, the question can include voting buttons. The buttons may be a selection of a score in a range of scores (e.g., 0-10). The buttons could be a thumbs up and/or thumbs down button. The buttons could be a smiley face or a frowning face. The buttons could be smiley faces of a range of expressions (e.g., red frowning face, orange unhappy face, yellow okay face, green smiley face). The feedback to the questions may, in some embodiments, be text based feedback typed and/or spoken by the user.

In step 7008, the verifier 5908 can receive the user feedback from the user devices responsive to communicating the questions to the user devices. The feedback can indicate agreement or disagreement with particular building health scores generated and/or displayed in the steps 7002-7004. In some embodiments, the feedback can be indications of levels of agreement or disagreement with various building health scores.

The feedback could indicate, in some embodiments, that a staircase is not well lit. The question may ask whether a stairwell is light well. The verifier 5908 could determine that a work order should be generated to replace light bulbs and/or install new lighting in the staircase based on the feedback. The question could ask whether food provided in a cafeteria is healthy. The verifier 5908 could determine that a work order should be generated to order healthy food for the cafeteria based on the feedback. The questions could ask whether the user has windows near them. Responsive to an indication that there are no windows near the user, the verifier 5908 could generate a work order to add more windows in the area. In some embodiments, the questions and feedback can be used to discover the preference of various users.

In step 7010, the verifier 5908 can determine whether the feedback received in the step 7008 agrees with or disagrees with the one or more building health scores. In some embodiments, the verifier 5908 can aggregate the feedback received from all of the users in various categories. For example, the verifier 5908 could generate an average feedback score for every health building score category. In some embodiments, the average feedback score can indicate the overall agreement and/or disagreement with the various categories. In step 7012, the aggregate feedback for the various categories of building health scores can be presented along with the building health scores. For example, the thumbs up or the thumbs down elements of the user interface 600 of the FIG. 60 could be displayed by the verifier 5908.

In some embodiments, the verifier 5908 can remove biases from the feedback data. The verifier 5908 can identify whether certain users respond repeatedly with the same feedback, users who always respond with negative feedback, employee teams that only have positive feedback, etc. In some embodiments, the verifier 5908 can exclude user feedback that is detected to be biased.

In some embodiments, the verifier 5908 can identify that one or more systems require a calibration based on the feedback data. For example, a temperature sensor for a zone may not be operating correctly. Based on the temperature measurements of the sensor, the building health manager 128 could determine that the space is comfortable. However, if the occupant feedback of the step 7008 disagrees with the fact that the space is comfortable, the verifier 5908 can determine that the sensor for the space needs to be recalibrated and/or replaced.

In some embodiments, the verifier 5908 could communicate feedback from the various users to the data auditor 5902 in making data health determinations. In some embodiments, the user feedback disagreeing with a particular score could indicate that the equipment providing the data is in a fault state. In some embodiments, the user feedback could indicate that the data itself provided by the equipment is corrupted, anomalous, etc.

Figure 71:
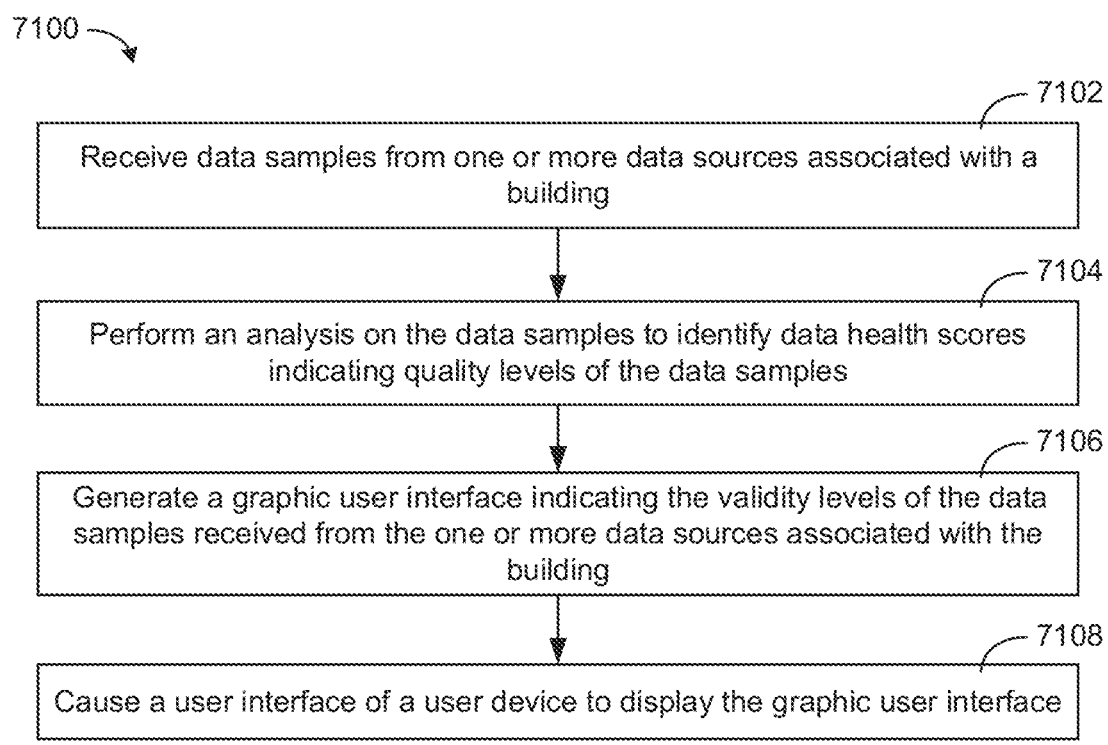
FIG. 71 is a flow diagram of a process of generating data health scores for building data, according to an exemplary embodiment.

Referring now to FIG. 71, a process of generating data health scores for data is shown, according to an exemplary embodiment. The process 7100 can be performed by the data auditor 5902. Furthermore, components such as the building health manager 128 can be configured to perform the process 7100. In some embodiments, any computing device described herein can be configured to perform the process 7100.

In step 7102, the data auditor 5902 can receive data samples from one or more data sources associated with the building. The data sources can be internal and/or external data sources. For example, the data sources could be data sources owned by the building, operated by the building, and/or installed within the building. The data sources could be gateways, controllers, sensors, actuators, etc. The data sources may, in some embodiments, be external data sources that are owned and/or operated by another entity. The data sources could be outdoor weather data (e.g., temperature, humidity, air quality, etc.). The data sources could provide data such as weather forecasts, bus schedules, disease infection rates, etc.

In step 7104, the data auditor 5902 could perform an analysis of the data samples to identify data health scores for the data samples. The data health scores can indicate the quality and/or validity levels of the data samples. The data health scores could indicate an overall health score of a data source based on the data health of individual data samples. The data health scores for individual data samples could be a binary healthy or anomalous determination. In some embodiments, the data auditor 5902 could identify the data health scores based on levels of each data point and/or the amount of data received. The analysis performed by the data auditor 5902 could be a peer analysis, a temporal analysis, an artificial intelligence based analysis, etc. In some embodiments, the analysis detects whether a data source is experiencing a fault and if the data source is experiencing a fault that the data source is producing unreliable data. In some embodiments, a detection of anomalous data may indicate that the equipment is in a fault state.

In some embodiments, the data auditor 5902 identifies data health for various data sources based on the proportion of data samples received from the data source and an expected number of data samples. Furthermore, the data auditor 5902 can determine the data health for the various data sources based on the number of anomalous data samples reported by the data source. In some embodiments, the data auditor 5902 can perform an analysis for each data sample by comparing a value of the data sample to a range, comparing a rate of change of the data samples to an acceptable rate of change, determining whether the value of the data sample is a predefined amount greater or less than a mean or median of a historical window of time, etc.

In some embodiments, the data auditor 5902 can generate data health scores for individual data sources, e.g., each particular controller, each sensor, etc. based on the data analyzed for each specific device. In some embodiments, the data auditor 5902 can determine the data health scores on an equipment type group. For example, the data auditor 5902 could generate a data health score for all controllers of a building by analyzing all controller data health scores and/or by analyzing the data reported by all of the controllers together. The data auditor 5902 could further determine data health based on application (e.g., analyze the data consumed by the application), by building, by campus, by enterprise, etc.

In some embodiments, the data auditor 5902 could identify top issues that may be causing poor data health. In some embodiments, the data auditor 5902 could push a set of top issues that could be causing a data source to be creating anomalous data to a technician (e.g., to a user device of the technician, e.g., the user device 148). For example a work order could be assigned to a particular technician to resolve an issue causing a sensor to create anomalous data and the top five most likely reasons why the anomalous data is being created. In some embodiments, the technician, when the issue is resolved, can provide an indication via the user device indicating what the reason for the issue was. The technician can provide an indication that one of the potential issues pushed to the technician was the reasons for the anomalous data. This feedback from technicians can be collected over time and used to train models that suggest the potential issues for anomalous data.

In step 7106, the data auditor 5902 can generate a user interface indicating the various data health scores determined in the step 7104. In some embodiments, the user interface manager 5910 generates the user interface based on data received from the data auditor 5902. In some embodiments, the user interface is the user interface 6700 of FIGS. 67A-B and/or the user interface 6800 of FIGS. 68A-B. In step 7108, the user interface manager 5910 can cause the user device 148 to display the user interface generated in the step 7106.

Figure 72:
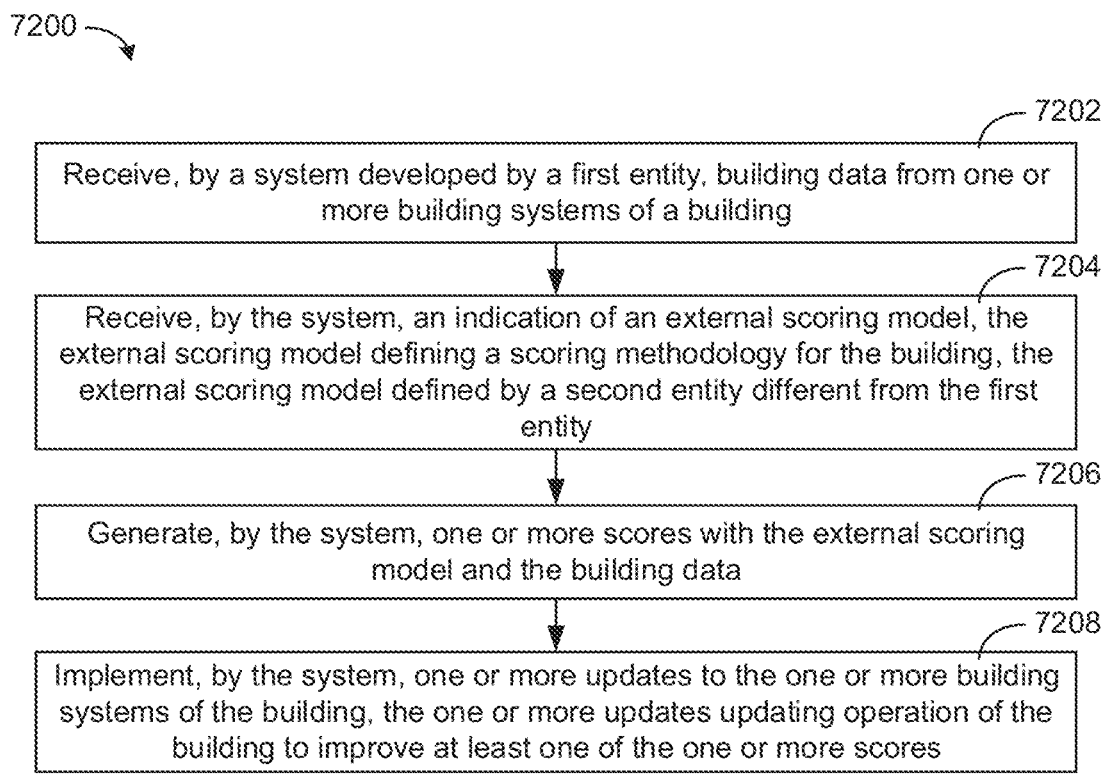
FIG. 72 is a flow diagram of a process of generating scores with an external scoring model, according to an exemplary embodiment.

Referring now to FIG. 72, a process 7200 of generating scores with an external scoring model is shown, according to an exemplary embodiment. The process 7200 can be performed by the external scoring system 5906. Furthermore, components such as the building health manager 128 can be configured to perform the process 7200. In some embodiments, any computing device described herein can be configured to perform the process 7200.

In step 7202, the external scoring system 5906 receives building data from one or more building systems of the building 146. For example, the external scoring system 5906 can receive building data from the building systems 142. In some embodiments, the external scoring system 5906 receives the data from the data auditor 5902. In some embodiments, the external scoring system 5906 is developed by a first entity, e.g., it is developed, managed, produced, implemented, sold, etc. by the first entity. The first entity may be a software developer, a company, etc.

In step 7204, the external scoring system 5906 can receive an indication of an external scoring model. The external scoring model can define a scoring methodology for the building 146. The external scoring model can be defined by a second entity, different from the first entity of the step 7202. For example, the second entity could be a second software developer, a second company, etc. The external scoring system 5906 can receive an external scoring model and/or methodology run by the external scoring system 5916 of the external system 5912, in some embodiments. In some embodiments, the external scoring system 5906 receives the external scoring model from the external system 5912 via an API of the external system 5912.

In step 7206, the external scoring system 5906 can generate one or more scores with the external model received in the step 7204 and the building data received in the step 7202. The one or more scores can be certification levels, percentage levels, etc. The various scores can be displayed in a user interface by the external scoring system 5906, in some embodiments. For example, the external scoring system 5906 could cause the user interface manager 5910 to display the user interface 6000 of FIG. 60 and/or the user interface 6900 of FIG. 69.

In step 7208, the building health manager 128 can implement one or more updates to the building systems 142. The one or more updates update operation of the building 146 to improve the one or more scores generated in the step 7206. The operations could be operating settings of AHUs, VAVs, thermostats, humidifiers, security systems, access control systems, filtration systems, etc. In some embodiments, the updates could be work orders pushed to a technician or other person to install new equipment, perform maintenance to improve the performance of other pieces of equipment, manually change settings of the equipment, etc.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

In various implementations, the steps and operations described herein may be performed on one processor or in a combination of two or more processors. For example, in some implementations, the various operations could be performed in a central server or set of central servers configured to receive data from one or more devices (e.g., edge computing devices/controllers) and perform the operations. In some implementations, the operations may be performed by one or more local controllers or computing devices (e.g., edge devices), such as controllers dedicated to and/or located within a particular building or portion of a building. In some implementations, the operations may be performed by a combination of one or more central or offsite computing devices/servers and one or more local controllers/computing devices. All such implementations are contemplated within the scope of the present disclosure. Further, unless otherwise indicated, when the present disclosure refers to one or more computer-readable storage media and/or one or more controllers, such computer-readable storage media and/or one or more controllers may be implemented as one or more central servers, one or more local controllers or computing devices (e.g., edge devices), any combination thereof, or any other combination of storage media and/or controllers regardless of the location of such devices.

What is claimed:

1. A building system of a building including one or more non-transitory storage devices storing instructions thereon that, when executed by one or more processors, cause the one or more processors to:
   receive a plurality of data samples from building equipment of the building;
   identify a number of one or more data samples of the plurality of data samples that are anomalous indicating that one or more pieces of the building equipment are possibly experiencing a fault;
   compare a number of the plurality of data samples received from the building equipment with a number of the plurality of data samples expected to be received from the building equipment to determine a proportion of the number of the plurality of data samples received from the building equipment to the number of the plurality of data samples expected to be received from the building equipment;
   decrease a value of the proportion based on the number of the one or more data samples that are anomalous to generate one or more data health scores for the building equipment, the one or more data health scores indicating quality levels of the plurality of data samples;
   generate user interface data configured to cause a user device to display a user interface providing indications of the one or more pieces of building equipment that are possibly experiencing the fault and the one or more data health scores and at least one indication of the proportion of the number of the plurality of data samples received from the building equipment to the number of the plurality of data samples expected to be received from the building equipment; and
   based on the generated one or more data health scores, communicate operational commands to the building equipment causing the building equipment to operate to improve the quality levels of the plurality of data samples.

2. The building system of claim 1, wherein the instructions cause the one or more processors to:
   perform one or more operations based on the one or more data health scores, wherein the one or more operations improve the quality levels of the plurality of data samples.

3. The building system of claim 2, wherein the instructions cause the one or more processors to perform the one or more operations by generating a work order including instructions to perform one or more maintenance activities on the building equipment, wherein performing the one or more maintenance activities on the building equipment improves the quality levels of the plurality of data samples.

4. The building system of claim 1, wherein the building equipment includes a plurality of pieces of building equipment of the building;
   wherein the one or more data health scores include an overall data health score for the building indicating an overall data health of data of the plurality of pieces of building equipment.

5. The building system of claim 1, wherein the instructions cause the one or more processors to:
   record a plurality of values of a health score of the one or more data health scores over time as the plurality of values are generated;
   generate a trend element, the trend element providing a trend of the plurality of values of the health score; and
   cause the user interface to include the trend element.

6. The building system of claim 1, wherein the plurality of data samples include a plurality of building data sample sets produced by a plurality of pieces of building equipment of the building equipment;
   wherein the plurality of pieces of building equipment include a first piece of building equipment of a first type that provides a first data sample set and a second piece of building equipment of a second type that provides a second data sample set;
   wherein the instructions cause the one or more processors to:
      generate a first data health score based on the first data sample set and a second data health score based on the second data sample set;
      generate a user interface element including:
         a first indication of the first type and a first corresponding indication of the first data health score; and
         a second indication of the second type and a second corresponding indication of the second data health score; and
      cause the user interface to include the user interface element.

7. The building system of claim 1, wherein the instructions cause the one or more processors to:
   receive first data samples from a first piece of building equipment associated with a first building and receive second data samples from a second piece of building equipment associated with a second building;
   generate a first data health score for the first building, the first data health score indicating first quality levels of the first data samples;
   generate a second data health score for the second building, the second data health score indicating second quality levels of the second data samples;

generate a user interface element including:
a first indication of the first building and a first corresponding indication of the first data health score;
a second indication of the second building and a second corresponding indication of the second data health score; and
cause the user interface to include the user interface element.

8. The building system of claim 1, wherein the instructions cause the one or more processors to:
execute a first application and a second application;
identify, from the plurality of data samples, a first data set consumed by the first application and a second data set consumed by the second application;
generate a first data health score based on the first data set and a second data health score based on the second data set;
generate a user interface element including a first indication of the first application and a first corresponding indication of the first data health score and a second indication of the second application and a second corresponding indication of the second data health score; and
cause the user interface to include the user interface element.

9. The building system of claim 1, wherein the building equipment include a first building device and a second building device;
wherein the plurality of data samples includes first building data samples of the first building device and second building data samples of the second building device;
wherein the one or more data health scores include a first data health score for the first building device based on the first building data samples and a second data health score for the second building device based on the second building data samples;
wherein the instructions cause the one or more processors to:
generate a user interface element including a first indication of the first building device and a first corresponding indication of the first data health score and a second indication of the second building device and a second corresponding indication of the second data health score; and
cause the user interface to include the user interface element.

10. The building system of claim 1, wherein the instructions cause the one or more processors to identify data anomalies of the plurality of data samples by performing at least one of:
determining whether a data value of a data sample of the plurality of data samples is outside a range of values;
determining whether values of data samples of the plurality of data samples change at a rate that is outside a range of rates of change; or
performing a peer comparison by comparing data samples of the plurality of data samples of the building equipment to a peer metric, the peer metric based on data samples of a plurality of pieces of building equipment of a same type as the building equipment.

11. The building system of claim 10, wherein the value of the proportion decreases non-linearly with an increase to a number of data anomalies of the plurality of data samples.

12. A method comprising:
receiving, by a processing circuit, a plurality of data samples from building equipment of a building;
identifying, by the processing circuit, a number of one or more data samples of the plurality of data samples that are anomalous indicating that one or more pieces of the building equipment are possibly experiencing a fault;
comparing, by the processing circuit, a number of the plurality of data samples received from the building equipment with a number of the plurality of data samples expected to be received from the building equipment to determine a proportion of the number of the plurality of data samples received from the building equipment to the number of the plurality of data samples expected to be received from the building equipment;
decreasing, by the processing circuit, a value of the proportion based on the number of the one or more data samples that are anomalous to generate one or more data health scores for the building equipment, the one or more data health scores indicating quality levels of the plurality of data samples;
generating, by the processing circuit, user interface data configured to cause a user device to display a user interface providing indications of the one or more pieces of building equipment that are possibly experiencing the fault and the one or more data health scores and at least one indication of the proportion of the number of the plurality of data samples received from the building equipment to the number of the plurality of data samples expected to be received from the building equipment; and
based on the one or more data health scores generated by the processing circuit, communicating, by the processing circuit, operational commands to the building equipment causing the building equipment to operate to improve the quality levels of the plurality of data samples.

13. The method of claim 12, further comprising:
recording, by the processing circuit, a plurality of values of a health score of the one or more data health scores over time as the plurality of values are generated;
generating, by the processing circuit, a trend element, the trend element providing a trend of the plurality of values of the health score; and
causing, by the processing circuit, the user interface to include the trend element.

14. The method of claim 12, further comprising:
executing, by the processing circuit, a first application and a second application;
identifying, by the processing circuit, from the plurality of data samples, a first data set consumed by the first application and a second data set consumed by the second application;
generating, by the processing circuit, a first data health score based on the first data set and a second data health score based on the second data set;
generating, by the processing circuit, a user interface element including a first indication of the first application and a first corresponding indication of the first data health score and a second indication of the second application and a second corresponding indication of the second data health score; and
causing, by the processing circuit, the user interface to include the user interface element.

15. The method of claim 12, further comprising identifying, by the processing circuit, data anomalies of the plurality of data samples by performing at least one of:
determining whether a data value of a data sample of the plurality of data samples is outside a range of values;

determining whether values of data samples of the plurality of data samples change at a rate that is outside a range of rates of change; or performing a peer comparison by comparing data samples of the plurality of data samples of the building equipment to a peer metric, the peer metric based on data samples of a plurality of pieces of building equipment of a same type as the building equipment.

16. A building system of a building including:

one or more non-transitory storage devices storing instructions thereon; and one or more processors configured to execute the instructions causing the one or more processors to:

receive a plurality of data samples from building equipment of the building;

identity a number of one or more data samples of the plurality of data samples that are anomalous indicating that the building equipment is experiencing a fault;

compare a number of the plurality of data samples received from the building equipment with a number of the plurality of data samples expected to be received from the building equipment to determine a proportion of the number of the plurality of data samples received from the building equipment to the number of the plurality of data samples expected to be received from the building equipment;

decrease a value of the proportion based on the number of the one or more data samples that are anomalous to generate one or more data health scores for the building equipment, the one or more data health scores indicating quality levels of the plurality of data samples;

generate user interface data configured to cause a user device to display a user interface providing indications of the one or more pieces of building equipment that are possibly experiencing the fault and the one or more data health scores and at least one indication of the proportion of the number of the plurality of data samples received from the building equipment to the number of the plurality of data samples expected to be received from the building equipment; and based on the generated one or more data health scores, communicate operational commands to the building equipment causing the building equipment to operate to improve the quality levels of the plurality of data samples perform one of more operations based on the one or more data health scores, wherein the one or more operations improve the quality levels of the plurality of data samples.

* * * * *